United States Patent [19]

Ohta et al.

[11] Patent Number: 5,895,435
[45] Date of Patent: Apr. 20, 1999

[54] VEHICLE DRIVE MODE ESTIMATING DEVICE, AND VEHICLE CONTROL APPARATUS, TRANSMISSION SHIFT CONTROL APPARATUS AND VEHICLE DRIVE FORCE CONTROL APPARATUS INCLUDING DRIVE MODE ESTIMATING DEVICE

[75] Inventors: Takashi Ohta; Yoshio Ito, both of Toyota; Yasunari Nakamura; Hideo Tomomatsu, both of Nagoya; Syoichi Sayo; Kagenori Fukumura, both of Toyota; Hiroji Taniguchi, Okazaki; Masuji Oshima, Kariya; Hiroyuki Yoshida, Inazawa; Kisaburo Hayakawa, Aichi-ken; Masataka Osawa, Nagoya, all of Japan

[73] Assignee: Toyota Jidosha Kabushiki Kaisha, Toyota, Japan

[21] Appl. No.: 08/808,433

[22] Filed: Feb. 28, 1997

[30] Foreign Application Priority Data

| Mar. 1, 1996 | [JP] | Japan | 8-045025 |
| Sep. 4, 1996 | [JP] | Japan | 8-234413 |
| Sep. 4, 1996 | [JP] | Japan | 8-234414 |

[51] Int. Cl.[6] ............... G06G 7/70; G06F 15/18
[52] U.S. Cl. ............... 701/59; 701/57; 701/58; 701/55; 477/120; 477/904; 706/905
[58] Field of Search ............... 701/51, 52, 53, 701/117, 110, 118, 204, 59, 77, 58, 54, 55, 56, 57; 477/107, 34, 118, 120, 901, 904; 123/361; 706/23, 25, 905, 900, 913

[56] References Cited

U.S. PATENT DOCUMENTS

| 5,272,428 | 12/1993 | Spiegel et al. ............... 701/110 |
| 5,483,446 | 1/1996 | Momose et al. ............... 701/1 |
| 5,532,929 | 7/1996 | Hattori et al. ............... 701/110 |
| 5,566,072 | 10/1996 | Momose et al. ............... 701/117 |

FOREIGN PATENT DOCUMENTS

| 58-31499 | 7/1983 | Japan. |
| 3-204468 | 9/1991 | Japan. |
| 4-102757 | 4/1992 | Japan. |
| 6-221420 | 8/1994 | Japan. |
| 7-101271 | 4/1995 | Japan. |
| 7-167272 | 7/1995 | Japan. |

*Primary Examiner*—Jacques H. Louis-Jacques
*Attorney, Agent, or Firm*—Oblon, Spivak, McClelland, Maier & Neustadt, P.C.

[57] ABSTRACT

Apparatus for estimating a drive mode of a motor vehicle desired by an operator of the motor vehicle, including a variable calculating device and a drive mode estimating device, wherein the variable calculating device calculates at least one of drive mode indicating variables such as a drive force of the vehicle desired by the operator upon starting of the vehicle, a maximum rate of increase of the drive force, a maximum deceleration of the vehicle upon operation of a manually operated member for brake application to the vehicle, a coasting run time of the vehicle and a steady run time of the vehicle, and wherein the drive mode estimating device includes a neural network which receives the drive mode indicating variable or variables calculated by the variable calculating device, so that the drive mode estimating device estimates the drive mode of the motor vehicle desired by the operator on the basis of an output of the neural network. The output of the neural network may be used to control a desired controllable system of the vehicle such as an automatic transmission and a vehicle drive force control device.

53 Claims, 49 Drawing Sheets

FIG. 2

| POSITIONS OF SHIFT LEVER AND TRANSMISSION | | SOLENOID COILS | | $C_1$ | $C_2$ | $B_1$ | $B_2$ | $F_1$ | $B_3$ | $F_2$ | $C_0$ | $F_0$ | $B_0$ |
|---|---|---|---|---|---|---|---|---|---|---|---|---|---|
| | | No.1 | No.2 | | | | | | | | | | |
| P | | ⊗ | ⊗ | | | | | | | | ○ | | |
| R | | ⊗ | ⊗ | | ○ | | | | ○ | | ○ | | |
| N | | ⊗ | ⊗ | | | | | | | | ○ | | |
| D | 1st | ○ | × | ○ | | | | | | | ○ | ○ | |
| | 2nd | ○ | ○ | ○ | | | ○ | | | ○ | ○ | ○ | |
| | 3rd | × | ○ | ○ | | | ○ | ○ | | | ○ | ○ | |
| | O/D | × | × | ○ | | | ○ | ○ | | | | | ○ |
| S | 1st | ○ | × | ○ | | | | | | | ○ | ○ | |
| | 2nd | ○ | ○ | ○ | | | ○ | ○ | | ○ | ○ | ○ | |
| | 3rd | × | ○ | ○ | ○ | | ○ | ○ | | | ○ | ○ | |
| | (O/D) | × | × | ○ | ○ | | ○ | | | | | | ○ |
| L | 1st | ○ | × | ○ | | | | | ○ | | | ○ | ○ |
| | 2nd | ○ | ○ | ○ | ○ | ○ | ○ | ○ | ○ | ○ | ○ | ○ | |

1

VEHICLE DRIVE MODE ESTIMATING DEVICE, AND VEHICLE CONTROL APPARATUS, TRANSMISSION SHIFT CONTROL APPARATUS AND VEHICLE DRIVE FORCE CONTROL APPARATUS INCLUDING DRIVE MODE ESTIMATING DEVICE

This application is based on Japanese Patent Applications No. 8-45025 filed Mar. 1, 1996 and No. 8-234413 filed Sep. 4, 1996 and No. 8-234414, the contents of which are incorporated hereinto by reference.

BACKGROUND OF THE INVENTION

1. Field of the Invention

The present invention relates to a drive mode estimating device for a motor vehicle, which is adapted to estimate a vehicle drive mode desired by the vehicle operator, and an apparatus which uses an output of such a drive mode estimating device, for controlling a controllable system of a vehicle, such as a shift control apparatus for controlling an automatic transmission and a drive force control apparatus for controlling a drive force of the vehicle.

2. Discussion of the Related Art

A motor vehicle may be equipped with various control devices, which include: a shift control device for controlling an automatic transmission having a plurality of speed ratios or gear positions, so as to automatically shift the transmission to an appropriate gear position, on the basis of currently detected engine load and vehicle running speed and according to predetermined shift patterns; a steering control device for controlling the steering force of a power steering system; a suspension control device for controlling the damping force or spring characteristics of a shock absorber in the suspension system; and a throttle valve control device for controlling a throttle valve on the basis of a currently detected amount of operation of an accelerator pedal and according to a predetermined relationship between the throttle valve opening angle and the amount of operation of the accelerator pedal. Generally, it is desirable to control these control devices so that the vehicle drive mode desired by the vehicle operator is reflected on the controlled vehicle drive torque, steering force of the steering system, damping force or spring characteristics of the shock absorber, and throttle opening angle.

There have been proposed some techniques for reflecting the vehicle operator's desired drive mode on the manner of control of an automatic transmission. An example of such techniques is disclosed in JP-A-6-221420, wherein a suitable one of different shift patterns for the automatic transmission is selected depending upon whether the vehicle operator desires to drive the vehicle in a sporty drive mode with a comparatively high degree of drivability, or in an economy drive mode with a relatively high degree of fuel economy. A determination as to whether the vehicle operator desires the sporty drive mode or the economy drive mode is based on output signals of various sensors provided on the vehicle, which signals are processed by a neural network which utilizes previously obtained data indicative of relationships between the vehicle drive modes and drive mode indicating parameters or variables detected by the sensors.

For instance, one of the different shift patterns is selected on the basis of the rate of change of the opening angle of a throttle valve of an engine, when the throttle opening angle is larger than a predetermined threshold. An example of a shift control apparatus adapted to practice this technique is disclosed in JP-B-58-31499.

2

The conventional shift control methods for the automatic transmission, as disclosed in JP-A-6-221420, uses a neural network which is adapted to receive signals indicative of vehicle running speed, opening angle of a throttle valve, vehicle acceleration, activation of a braking system, a currently selected gear position of the transmission, and a rate of change of the throttle valve opening. The vehicle drive mode desired by the vehicle operator is estimated on the basis of a relatively large number of outputs of the neural network which are considered to represent the operator's desired vehicle drive mode. This arrangement does not permit sufficiently high accuracy of estimation of the desired vehicle drive mode in a short time. If the number of the outputs of the neural network used to estimate the desired vehicle drive mode is increased to improve the reliability of estimation of the desired drive mode, the operating response of the neural network to the operator's manipulation to drive the vehicle is inevitably deteriorated, whereby the actual control of the vehicle does not meet the operator's desired drive mode.

In the shift control apparatus disclosed in JP-B-58-31499, one of the shift patterns is selected depending upon the rate of change of the opening angle of the throttle valve, even if the opening angle of the throttle valve is abruptly changed (abruptly increased and decreased) in a short time, as long as the throttle opening angle is larger than the threshold. The abrupt change of the throttle opening angle does not necessarily reflect the drive mode of the vehicle desired by the vehicle operator, and the transmission shift pattern selected on the basis of the abrupt change of the throttle opening angle does not necessarily meet the operator's desired drive mode of the vehicle. Thus, this conventional technique does not permit sufficiently accurate estimation of the operator's desired drive mode.

JP-A-3-204468 discloses a technique for determining a control pattern for a continuously variable transmission of a motor vehicle, on the basis of a rate of change of a drive mode index value which reflects a vehicle operator's intention regarding the vehicle drive mode, and an average value of the rate of change. This publication JP-A-3-204468 also discloses a technique for fuzzy inference of such a drive mode index value, on the basis of a difference between a maximum value of an increase rate of the opening angle of a throttle valve and an average value of the increase rate, and the opening angle of the throttle valve. JP-A-7-167272 discloses a technique for estimating a drive mode index indicative of the degree of the vehicle operator's desire to accelerate the vehicle, with improved estimation response, wherein a higher one of the engine load and the tire load is obtained, and this higher load value is filtered with a filtering constant which is changed depending upon the rate of change of the amount of operation of the accelerator pedal and a change in the load value.

In the above techniques, however, a tendency of change of the presently detected drive mode indicating variables from the drive mode indicating variables detected in the past is not taken into account to obtain the drive mode index, and therefore the obtained drive mode index does not accurately represent the vehicle operator's desired drive mode which meets the operator's manipulation of the vehicle and the running conditions such as the road condition. These conventional techniques which do not utilize the past drive mode indicating variables may suffer from erroneous estimation of the operator's desired drive mode, since a change in the operator's desired drive mode may not be reflected by the operator's manipulation of the vehicle under some operating and running conditions of the vehicle. The use of the filtering constant which varies with the variables detected for a relatively short time period is not effective enough to prevent the erroneous estimation of the operator's desired vehicle drive mode.

SUMMARY OF THE INVENTION

It is therefore a first object of the present invention to provide a drive mode estimating device for a motor vehicle, which assures sufficiently high accuracy of estimation of the vehicle operator's desired drive mode and a sufficiently high degree of operating response to the operator's manipulation of the vehicle.

It is a second object of this invention to provide a vehicle control apparatus such as an automatic transmission shift control apparatus, which is highly responsive to the operator's desired vehicle drive mode.

It is a third object of this invention to provide a drive mode estimating device for a motor vehicle, which assures sufficiently high accuracy of estimation of the vehicle operator's desired drive mode, even when the opening angle of the throttle valve is abruptly changed in a short time.

It is a fourth object of the present invention to provide a drive force control apparatus for a motor vehicle, which is capable of controlling the vehicle drive force in a manner which accurately reflects the vehicle operator's intention regarding the drive mode.

In an effort to achieve the above objects, the present invention was developed, in the light of a finding by the present inventors that the drive mode desired by the vehicle operator has close relationships with drive mode indicating variables such as a drive force of the vehicle desired by the operator upon starting of the vehicle, a maximum rate of increase of the drive force, a maximum deceleration of the vehicle upon operation of a manually operated member for brake application to the vehicle, a coasting run time of the vehicle and a steady run time of the vehicle, and a finding that the drive mode desired by the vehicle operator can be accurately and efficiently estimated by a neural network which operates on the basis of those drive mode indicating variables.

The first object indicated above may be achieved according to a first aspect of the present invention, which provides a drive mode estimating device for estimating a drive mode of a motor vehicle desired by an operator of the motor vehicle, comprising: variable calculating means for calculating at least one of drive mode indicating variables selected from a group consisting of an amount of operation of manually operated means operated by the operator for designating a drive force of the vehicle desired by the operator upon starting of the vehicle, a maximum rate of increase of said amount of operation of said manually operated means, a maximum deceleration of the vehicle upon operation of a manually operated member for brake application to the vehicle, a coasting run time of the vehicle and a steady run time of the vehicle; and drive mode estimating means including a neural network receiving the at least one of drive mode indicating variables calculated by the variable calculating means, the drive mode estimating means estimating the drive mode of the motor vehicle desired by the operator on the basis of an output of the neural network.

In the drive mode estimating device of the present invention, the drive mode of the motor vehicle desired by the vehicle operator is estimated on the basis of the output of the neural network which is adapted to receive at least one of the drive mode indicating variables consisting of the amount of operation of the manually operated means upon starting of the vehicle, maximum rate of increase of the amount of operation of the manually operated means, maximum deceleration of the vehicle upon operation of the brake operating member, coasting run time of the vehicle and steady run time of the vehicle. Thus, the present drive mode estimating device is arranged to estimate the drive mode of the motor vehicle desired by the vehicle operator, by utilizing drive mode indicating variables which are not conventionally used. Accordingly, the vehicle operator's desired drive mode of the vehicle can be more accurately estimated in a relatively short time, with a significantly improved response to the vehicle operator's manipulation of the vehicle to drive the vehicle.

The second object indicated above may be achieved according to a second aspect of this invention, which provides an apparatus for controlling a motor vehicle including a controllable system, comprising a drive mode estimating device according to the first aspect of the invention described above, for estimating a drive mode of the motor vehicle desired by an operator of the vehicle, and a control device for controlling the controllable system according to the drive mode estimated by the drive mode estimating means of the drive mode estimating device. In the present vehicle control apparatus, the controllable system of the vehicle is controlled by the control device according to the drive mode estimated by the drive mode estimating means of the drive mode estimating device, so as to meet the operator's desired drive mode as represented by the operator's manipulation of the vehicle. Namely, the control device is capable of controlling the controllable device such as an automatic transmission system of the vehicle with a sufficiently improved response to the operator's manipulation of the vehicle.

The second object indicated above may also be achieved according to a third aspect of this invention, which provides a shift control apparatus for controlling an automatic transmission of a motor vehicle, comprising a drive mode estimating device according to the first aspect of this invention described above, for estimating a drive mode of the motor vehicle desired by an operator of the vehicle, and a shift control device for controlling a speed ratio of the automatic transmission according to the drive mode estimated by the drive mode estimating means of the drive mode estimating device.

The drive mode estimating device according to the first aspect of the invention may also be used for controlling a steering control device for controlling a steering force of a power steering system of the vehicle, or a suspension control device for controlling a damping force or spring characteristics of a shock absorber of a suspension system of the vehicle. In this case, the steering force of the power steering system, or the damping force or spring characteristics of the shock absorber may be suitably controlled according to the drive mode estimated by the drive mode estimating means of the drive mode estimating device.

In one preferred form of the third aspect of the invention, the shift control apparatus further comprises: throttle opening obtaining means for obtaining an opening angle of a throttle valve of an engine of the vehicle; vehicle speed obtaining means for obtaining a running speed of the motor vehicle; a shift pattern memory for storing a plurality of different shift patterns for shifting the automatic transmission in different manners, each of the different shift patterns representing a relationship between the speed ratio of the automatic transmission, and the opening angle of the throttle valve and the running speed of the vehicle; and shift pattern selecting means for selecting one of the plurality of shift patterns, according to the drive mode estimated by the drive mode estimating means of the drive mode estimating device. In this form of the shift control apparatus, the shift control device is adapted to change the speed ratio of the automatic transmission on the basis of the opening angle of the throttle valve and the running speed of the vehicle which are obtained by the throttle opening obtaining means and the vehicle speed obtaining means, respectively, and according to the shift pattern selected by the shift pattern selecting means. The present shift control apparatus is capable of controlling the automatic transmission to be shifted to a suitable operating position which meets the drive mode desired by the vehicle operator, so as to assure a relatively high degree of acceleration or drivability of the vehicle, or a relatively high degree of fuel economy of the engine, depending upon the desire of the vehicle operator.

In another preferred form of the third aspect of this invention, the shift control apparatus further comprises highest gear inhibiting means for inhibiting a shift-up operation of the shift control device to shift up the automatic transmission to a highest gear position when the output of the neural network of the drive mode estimating means of the drive mode estimating device is not smaller than a predetermined threshold. The highest gear inhibiting means cancels the inhibition of the shift-up operation of the shift control means when the output of the neural network is smaller than the predetermined threshold while the motor vehicle is running in a steady state at a substantially constant speed. The present shift control apparatus permits the vehicle to be driven with a sufficient drive force when the output of the neural network of the drive mode estimating means of the drive mode estimating device is equal to or larger than the predetermined threshold.

According to a first preferred form of the drive mode estimating device according to the first aspect of the present invention described above, the drive mode estimating means estimates the drive mode of the motor vehicle on the basis of the output of the neural network when each one of the above-indicated at least one of the drive mode indicating variables is calculated by the variable calculating means. Since the drive mode desired by the vehicle operator is estimated each time the variable calculating means calculates any one of the drive mode indicating variables, the response of the drive mode estimating device to the operator's manipulation of the vehicle is improved.

According to a second preferred form of the first aspect of the invention, the drive mode estimating device further comprises operation amount detecting means for detecting the amount of operation of the manually operated means by the operator for designating an output of an engine of the vehicle, and vehicle speed detecting means for detecting a running speed of the vehicle, and the variable calculating means comprises starting output calculating means for calculating, as the drive force of the vehicle desired by the operator upon starting of the vehicle, a starting output of the engine upon starting of the vehicle, on the basis of the amount of operation of the manually operated means detected by the output detecting means, and the running speed of the vehicle detected by the vehicle speed detecting means. In the present drive mode estimating device, the starting output of the engine desired by the vehicle operator is used by the drive mode estimating means to determine the drive mode desired by the vehicle operator. Since the operator's desired starting output of the engine has a close relationship with the drive mode desired by the vehicle driver, the reliability or accuracy of estimation of the operator's desired drive mode by the drive mode estimating means is significantly improved.

The starting output calculating means preferably includes vehicle stop determining means for determining that the vehicle is stopped, vehicle speed rise detecting means for detecting that the running speed of the vehicle has been raised to a predetermined level, and desired starting output determining means for determining the starting output of the engine, on the basis of the amount of operation of the manually operated means by the operator when the running speed of the vehicle has been raised to the predetermined level after the vehicle is stopped.

According to a third preferred form of the drive mode estimating device, the drive mode estimating means further includes output detecting means for detecting an amount of operation of manually operated means by the operator for designating an output of an engine of the vehicle, and the variable calculating means comprises maximum output increase rate calculating means for calculating a maximum rate of increase of the output of the engine, on the basis of a maximum rate of increase of the amount of operation of the manually operated means detected by the output detecting means, except when an amount of operation of said manually operated means is abruptly changed. In the present drive mode estimating device, the maximum rate of increase of the amount of operation of the manually operated means by the operator for designating the output of the engine is used to estimate the operator's desired drive mode of the vehicle, except when the amount of operation of the manually operated means is abruptly changed in a short time. The use of the maximum rate of increase of the operation amount of the manually operated means for designating the engine speed assures improved reliability of estimation of the operator's desired drive mode. The manually operated means may be an accelerator pedal. In this case, the maximum increase rate of the amount of operation of the accelerator pedal is used except when a so-called "tip-in" action (abrupt depressing and immediate releasing in a short time) of the accelerator pedal has occurred.

According to a fourth preferred form of the drive mode estimating device, the manually operated means for designating the output of the engine comprises an accelerator pedal, and the engine has a throttle valve whose opening angle changes with an amount of operation of the accelerator pedal, the maximum output increase rate calculating means comprising: maximum throttle opening increase rate updating means for storing and updating a maximum rate of increase of the opening angle of the throttle valve; abrupt change detecting means for detecting abrupt depression followed by immediate releasing of the accelerator pedal in a short time; maximum throttle opening increase rate determining means for determining, as a maximum value of an increase rate of the opening angle of the throttle valve, the maximum rate of increase of the opening angle updated by the maximum throttle opening increase rate updating means when the abrupt depression followed by immediate releasing of the accelerator pedal is not detected by the abrupt change detecting means; and maximum throttle opening determining means for determining a maximum value of the opening angle of the throttle valve on the basis of the maximum value of the increase rate of the opening angle determined by the maximum throttle opening increase rate determining means.

The abrupt change detecting means may be adapted to detect the abrupt depression and immediate releasing of the accelerator pedal when one of the following two conditions is satisfied: 1) the opening angle of the throttle valve a predetermined time after the maximum value of the opening angle is determined is not larger than a predetermined first threshold, and the rate of increase of the opening angle is zero or negative; and 2) the rate of increase of the opening angle is positive, and the opening angle is smaller than a predetermined second threshold.

According to a fifth preferred form of the drive mode estimating device, the variable calculating means determines each of at least one of the coasting run time, the steady run time and the maximum deceleration of the vehicle at a predetermined time interval, and the drive mode estimating means estimates the drive mode of the vehicle desired by the operator, on the basis of the output of the neural network when the neural network receives each one of the above-indicated at least one of the coasting run time, the steady run time and the maximum deceleration of the vehicle which is determined by the variable calculating means at the predetermined time interval.

According to a sixth preferred form of the drive mode estimating device, the variable calculating means comprises at least one of coasting run time calculating means for calculating the coasting run time of the vehicle and steady run time calculating means for calculating the steady run time of the vehicle, and the drive mode estimating means estimates the drive mode of the vehicle desired by the operator, on the basis of the output of the neural network each time the neural network receives at least one of the coasting run time and the steady run time which is determined by the variable calculating means at a predetermined time interval. Since the coasting run time and/or the steady run time of the vehicle which is/are utilized to estimate the operator's desired drive mode is calculated at the predetermined time interval, the response of the drive mode estimating means to the operator's manipulation of the vehicle is improved even the vehicle is coasting without an accelerator pedal being depressed, or running in a steady state at a substantially constant speed. That is, the absence of operation of the accelerator pedal is a kind of the operator's manipulation of the vehicle, which reflects the operator's desire to drive the vehicle with a high degree of fuel economy.

In one advantageous arrangement of the above sixth preferred form of the drive mode estimating device, the steady run time calculating means comprises: steady run determining means for determining that an amount of change of a running speed of the vehicle is held within a predetermined range; first time counting means for measuring a first time length during which the amount of change of the running speed is held within the predetermined range, the steady run determining means determining a steady run of the vehicle if the first time length exceeds a predetermined threshold; second time counting means for measuring a second time length during which the steady run determining means continues to determine the steady run of the vehicle; and steady run time determining means for determining the steady run time of the vehicle, on the basis of the second time length measured by the second time counting means, the steady run time determining means repeatedly determining the steady run time at a predetermined time interval while the steady run is determined by the steady run time determining means.

In another advantageous arrangement of the above sixth preferred form of the drive mode estimating device, the coasting run time calculating means comprises: coasting run determining means for determining a coasting run of the vehicle if the amount of operation of said manually operated means is substantially zero; time counting means for measuring a time length during which the coating run determining means continues to determine the coasting run of the vehicle; and coasting run time determining means for determining the coasting run time of the vehicle, on the basis of the time length measured by the time counting means, the coasting run time determining means repeatedly determining the coasting run time at a predetermined time interval while the coasting run is determined by the coasting run time determining means.

According to a seventh preferred form of the drive mode estimating device according to the first aspect of this invention, the variable calculating means comprises maximum deceleration calculating means for calculating the maximum deceleration of the vehicle during brake application to the vehicle, at a predetermined time interval, and the drive mode estimating means estimates the drive mode of the vehicle desired by the operator, on the basis of the output of the neural network each time the neural network receives the maximum deceleration determined by the maximum deceleration calculating means.

Preferably, the maximum deceleration calculating means of the variable calculating means comprises: maximum deceleration updating means for storing and updating a deceleration value of the vehicle during the brake application; time counting means for measuring a predetermined time interval; and maximum deceleration determining means for determining, as maximum braking deceleration of the vehicle, the deceleration value updated by the maximum deceleration updating means, if the updated deceleration value is larger than a predetermined threshold. If the deceleration value subsequently stored by the maximum deceleration updating means is equal to the maximum braking deceleration or is not different by more than a predetermined value than the maximum braking acceleration, the maximum deceleration determining means determines the subsequently obtained deceleration value as the maximum braking deceleration, at the time interval measured by the time counting means.

According to an eighth preferred form of the drive mode estimating device, the variable calculating means comprises: longitudinal acceleration updating means for storing and updating longitudinal acceleration of the vehicle, so that the neural network of the drive mode estimating means receives the updated longitudinal acceleration of the vehicle; and longitudinal acceleration input ignoring means for inhibiting the longitudinal acceleration updating means from applying the updated longitudinal acceleration to the neural network while a transmission of the vehicle is in the process of a shifting action. In this form of the drive mode estimating device, the acceleration value of the vehicle is not utilized by the neural network to estimate the operator's desired drive mode while the transmission is in the process of a predetermined shifting action which does not reflect the operator's desired drive mode of the vehicle. For example, shift-up action of the transmission, and a shift-down action of the transmission from the highest gear position to the next highest gear position do not represent the operator's desired drive mode. The present arrangement is also effective to improve the accuracy of estimation of the drive mode desired by the vehicle operator.

The longitudinal acceleration updating means may comprise maximum longitudinal acceleration updating means for storing an acceleration value of the vehicle in a memory and updating the acceleration value stored in the memory if the newly obtained acceleration value is larger than the stored value. The longitudinal acceleration input ignoring means may comprise inhibiting means for inhibiting an input of the acceleration value to the maximum longitudinal acceleration updating means while the transmission is in the process of the predetermined shifting action.

According to a ninth preferred form of the drive mode estimating device, the variable calculating means comprises signal peak calculating means for calculating at least one of a maximum value of the amount of operation of the manually operated means, a maximum value of a speed of an engine, and a maximum value of deceleration of the vehicle, for a predetermined period of time, so that the neural network of the drive mode estimating means receives the above-indicated at least one of the maximum values, and the drive mode estimating means selects one of a plurality of different drive modes of the vehicle, the different drive modes including a sporty drive mode for driving the vehicle with a higher degree of acceleration than in the other of the drive modes, the signal peak calculating means comprising: vehicle turn determining means for determining that the vehicle is turning; and peak hold means for inhibiting the at least one of the maximum values from being applied to the neural network of the drive mode estimating means while the sporty drive mode is selected by the drive mode estimating means and while the vehicle turn determining means determines that the vehicle is turning.

According to a tenth preferred form of the drive mode estimating device, the drive mode estimating means selects one of a plurality of different drive modes of the vehicle, the different drive modes including a sporty drive mode for driving the vehicle with a higher degree of acceleration than in the other of the drive modes, and the variable calculating means comprises: at least one of maximum output updating means for updating a maximum amount of operation of manually operated means for a predetermined period of time, maximum engine speed updating means for updating a maximum speed of an engine of the vehicle for a predetermined period of time, and maximum deceleration updating means for updating maximum deceleration of the vehicle for a predetermined period of time, so that the neural network of the drive mode estimating means receives an output of the above-indicated at least one of the maximum output updating means, maximum engine speed updating means and maximum deceleration updating means; vehicle turn determining means for determining that the vehicle is turning; and peak hold means for inhibiting the at least one of the maximum output updating means, the maximum engine speed updating means and the maximum deceleration updating means from applying an output thereof to the neural network of the drive mode estimating means while the sporty drive mode is selected by the drive mode estimating means and while the vehicle turn determining means determines that the vehicle is turning. In the present drive mode estimating device, at least one of the maximum values indicated above is not used by the neutral network while the vehicle is turning in the sporty drive mode. When or before the vehicle is turning along a curve, the amount of operation of the manually operated means is reduced, and the vehicle is decelerated by brake application. However, the reduction of the amount of operation of the manually operated means and the deceleration of the vehicle are only temporary and do not represent the operator's desire to change the sporty drive mode to the other modes such as an economy drive mode in which the vehicle is driven with a relatively high degree of fuel economy. In the absence of the vehicle turn determining means and the peak hold means, the drive mode estimating means might select one of the drive modes other than the sporty drive mode even though the vehicle operator desires to drive the vehicle in the sporty drive mode. Thus, the present device assures improved accuracy or reliability of estimation of the operator's desired drive mode of the vehicle.

In one advantageous arrangement of the above tenth preferred form of the drive mode estimating device, the manually operated means comprises an accelerator pedal, and the variable calculating means further comprises abrupt change detecting means for detecting abrupt depression followed by immediate releasing of the accelerator pedal in a short time, and inhibiting means for inhibiting the at least one of the maximum output updating means, the maximum engine speed updating means and the maximum deceleration updating means from updating a corresponding one of the maximum amount of operation of the manually operated means, the maximum speed of the engine and the maximum deceleration of the vehicle, if the abrupt depression followed by immediate releasing of the accelerator pedal is detected by the abrupt change detecting means. Usually, the abrupt depression followed by immediate releasing of the accelerator pedal takes place due to a change in the road surface condition on which the vehicle is running, and does not reflect the vehicle operator's desired drive mode. Thus, the accuracy of estimation of the desired drive mode is improved in the present arrangement.

The vehicle turn determining means may adapted to determine that the vehicle is turning, if the releasing speed of the accelerator pedal is higher than a predetermined threshold when the sporty drive mode is selected by the drive mode estimating means, except when the abrupt depression followed by immediate releasing of the accelerator pedal is detected, or if the deceleration of the vehicle during brake application to the vehicle is higher than a predetermined threshold. In this case, the turning of the vehicle can be detected without using a steering angle sensor.

Preferably, peak hold cancelling means may be provided for disabling the operation of the peak hold means if the above-indicated at least one of the maximum output updating means, the maxim engine speed updating means and the maximum deceleration updating means receives a new value larger than the maximum value held by the peak hold means, while the peak hold means is operated. The provision of this peak hold cancelling means is effective to improve the accuracy of estimation of the drive mode while the vehicle is turning. The peak hold cancelling means may be adapted to disable the operation of the peak hold means if the accelerator pedal is depressed again while the peak hold means is operated.

According to an eleventh preferred form of the drive mode estimating device, the motor vehicle has an engine, and a transmission having a plurality of gear positions including a highest gear position and a next highest gear position, and the variable calculating means comprises: engine speed detecting means for detecting a speed of the engine; maximum engine speed updating means for updating a maximum value of the speed of the engine for a predetermined period of time so that the neural network of the drive mode estimating means receives the maximum value of the speed of the engine updated by the maximum engine speed updating means; and engine speed compensating means for compensating the speed of the engine detected by the engine speed detecting means when the transmission is placed in the next highest gear position after the vehicle has been running in a steady state at a substantially constant speed for more than a predetermined length of time, the engine speed compensating means compensating the detected speed of the engine such that the compensated speed of the engine is lowered to a value which is equal to the detected speed of the engine multiplied by a speed ratio of the highest gear position, so that the maximum engine speed updating means receives the compensated speed of the engine, and updates the maximum value of the speed of the engine when the transmission is placed in the nest highest gear position after the vehicle has been running in the steady state for more than the predetermined length of time. When the vehicle is running in a steady state at a substantially constant speed with the transmission placed in the next highest gear position, the vehicle operator does not generally have a desire to drive the vehicle with comparatively high acceleration, even if the engine speed is relatively high, that is, higher than when the transmission is placed in the highest gear position. In the absence of the engine speed compensating means, the drive mode estimating means may erroneously estimate that the vehicle operator desires to drive the vehicle with comparatively high acceleration, while in fact the vehicle operator desires to drive the vehicle in a normal drive mode, for example. Thus, the engine speed compensating means is effective erroneous estimation of the operator's desired drive mode of the vehicle while the vehicle is running in a steady state with the transmission placed in the second highest gear position.

According to a twelfth preferred form of the first aspect of the invention, the drive mode estimating device further comprises: vehicle turn determining means for determining that the vehicle is turning; and drive mode estimation inhibiting means for inhibiting an operation of the neural network of the drive mode estimating means if the vehicle turn determining means determines that the vehicle is turning, the drive mode estimating inhibiting means commanding the neural network to hold the output thereof before the operation of the neural network is inhibited by the drive mode estimation inhibiting means. When the vehicle is turning, the vehicle is usually deceleration due to brake application before the vehicle turning. In the absence of the drive mode estimation inhibiting means, therefore, the drive mode estimating means may erroneously estimate that the vehicle operator desires to drive the vehicle with comparatively low acceleration or with comparatively high fuel economy, while in fact the vehicle operator continues to drive the vehicle with comparatively high acceleration after the turning of the vehicle. Thus, the drive mode estimating means is effective to prevent erroneous estimation of the operator's desired drive mode when the vehicle is turning.

The third object indicated above may be achieved according to a fourth aspect of the present invention, which provides a drive mode estimating device for estimating a drive mode of a motor vehicle desired by an operator of the motor vehicle, comprising: drive mode estimating means for estimating the drive mode of the vehicle desired by the operator of the vehicle, on the basis of an amount of operation of manually operated means operated by the operator for designating a desired drive force of the vehicle; maximum operation amount determining means for determining a maximum value of the amount of operation of the manually operated means; and drive mode estimation inhibiting means for inhibiting an operation of the drive mode estimating means to estimate the drive mode on the basis of the amount of operation of the manually operated means, if a difference between the maximum value of the amount of operation of the manually operated means determined by the maximum operation amount determining means and a value of the amount of operation at a first point of time which is a predetermined time after a second point of time at which the maximum value is determined is larger than a predetermined threshold value.

In the drive mode estimating device constructed as described above according to the fourth aspect of this invention, the drive mode estimation inhibiting means is adapted to determine the difference between the maximum value of the amount of operation of the manually operated means determined by the maximum operation amount determining means and a value of the amount of operation of the manually operated means at the point of time the predetermined time after the point of time at which the maximum value of the amount of operation of the manually operated means is determined. The drive mode estimation inhibiting means is further adapted to inhibit the operation of the drive mode estimating means to estimate the vehicle operator's desired drive mode of the vehicle on the basis of the amount of operation of the manually operated means, if the determined difference indicated above is larger than the predetermined threshold value. According to this arrangement, the operation of the drive mode estimating means is inhibited when the amount of operation of the manually operated means such as an accelerator pedal is abruptly increased and then immediately decreased in a short time for some reason or other. Thus, the present drive mode estimating device is capable of accurately estimating the drive mode of the vehicle desired by the vehicle operator. The abrupt increase and immediate decrease of the amount of operation of the manually operated means result in abrupt increase followed by immediate decrease of the opening angle of the throttle valve of the engine of the vehicle. In the present device, the drive mode estimating means is permitted to estimate the operator's desired drive mode on the basis of the amount of operation of the manually operated means or the rate of change of this amount of operation, which is obtained when the manually operated means is not abruptly operated in a so-called "tip-in" fashion.

In a first preferred form of the drive mode estimating device according to the fourth aspect of the invention, the drive mode estimation inhibiting means permits the operation of the drive mode estimating means to estimate the drive mode of the vehicle desired by the operator, if the difference is not larger than the predetermined threshold value.

In a second preferred form of the invention according to the fourth aspect of the invention, the drive mode estimating device further comprises: maximum increase rate determining means for determining a maximum value of an increase rate of the amount of operation of the manually operated means; and critical value determining means for determining a critical value of the amount of operation of the manually operated means, the critical value being a value obtained at the first point of time which is a predetermined time after a third point of time at which the maximum value of the increase rate is determined by the maximum increase rate determining means, and wherein the predetermined the drive mode estimation inhibiting means determining the difference on the basis of the maximum value determined by the maximum operation amount determining means and the critical value determined by the critical value determining means.

In one advantageous arrangement of the above second preferred form of the drive mode estimating device, the maximum operation amount determining means monitors the maximum value of the amount of operation of the manually operated means for a predetermined sampling time period after the third point of time at which the maximum value of the increase rate is determined by the maximum increase rate determining means, and the predetermined time between the first point of time and the third point of time is a sum of a time between the third point of time and the first point of time, and one of the sampling time period and a time between the third point of time and a fourth point of time at which a minimum value of the amount of operation of the manually operated means is determined.

In a third preferred form of the drive mode estimating device according to the fourth aspect of the invention, the motor vehicle has an engine, and a throttle valve those opening angle changes with a change in the amount of operation of the manually operated means, the drive mode estimating means includes a neural network, and the maximum operation amount determining means and the drive mode estimation inhibiting means constitute a part of variable calculating means connected to the neural network, the variable calculating means including: starting throttle angle calculating means for calculating a starting value of the opening angle of the throttle valve upon starting of the vehicle; maximum throttle opening increase rate calculating means for calculating a maximum rate of increase of the opening angle of the throttle valve during acceleration of the vehicle; maximum deceleration calculating means for calculating a maximum deceleration of the vehicle upon operation of a manually operated member for brake application to the vehicle; coasting run time calculating means for calculating a coasting run time of the vehicle; steady run time calculating means for calculating a steady run time of the vehicle; and signal peak calculating means for calculating peak values of input signals which include a signal indicative of the opening angle of the throttle valve. In this case, the neural network of the drive mode estimating means receives outputs of the starting throttle angle calculating means, the maximum throttle opening increase rate calculating means, the coasting run time calculating means, the steady run time calculating means and the signal peak calculating means. The input signals may include signals indicative of the vehicle running speed, opening angle of the throttle valve, speed of the engine, input shaft speed of an automatic transmission, a currently selected position of a shift lever, and an operation of a brake pedal.

In a fourth preferred form of the drive mode estimating device according to the fourth aspect of the invention, the vehicle has a shift control apparatus for controlling an automatic transmission whose speed ratio is variable, a steering force control apparatus for controlling a steering force of a power steering system, and a suspension control apparatus for controlling a damping force or spring characteristics of a shock absorber of a suspension system, an output of the drive mode estimating means being applied to the shift control apparatus, the steering force control apparatus and the suspension control apparatus, for controlling the speed ratio of the automatic transmission, the steering force of the power steering system and the damping force or spring characteristics of the shock absorber, according to the drive mode selected by the drive mode estimating means.

In a fifth preferred form of the drive mode estimating device according to the fourth aspect of this invention, the vehicle has an engine provided with a throttle valve, and a shift control apparatus for controlling an automatic transmission whose speed ratio is variable, the shift control apparatus comprising: throttle opening obtaining means for obtaining an opening angle of the throttle valve; vehicle speed obtaining means for obtaining a running speed of the motor vehicle; a shift pattern memory for storing a plurality of different shift patterns for shifting the automatic transmission in different manner, each of the different shift patterns representing a relationship between the speed ratio of the automatic transmission, and the opening angle of the throttle valve and the running speed of the vehicle; and shift pattern selecting means for selecting one of the plurality of shift patterns, according to the drive mode estimated by the drive mode estimating means. In this case, the shift control apparatus changes the speed ratio of the automatic transmission on the basis of the opening angle of the throttle valve and the running speed of the vehicle which are obtained by the throttle opening obtaining means and the vehicle speed obtaining means, respectively, and according to the shift pattern selected by the shift pattern selecting means. This arrangement permits suitable selection of the gear position of the automatic transmission for driving the vehicle with a sufficient drive force or with relatively high fuel economy, in the drive mode desired by the vehicle operator.

In a sixth preferred form of the drive mode estimating device according to the fourth aspect of the invention, the drive mode estimating means includes a neural network which receives the amount of operation of the manually operated means upon starting of the vehicle, a maximum rate of increase of the amount of operation of the manually operated means, a maximum deceleration of the vehicle upon operation of a manually operated member for brake application to the vehicle, a coasting run time of the vehicle, and a steady run time of the vehicle, the drive mode estimating means estimating the drive mode desired by the operator, on the basis of an output of the neural network, when the neutral network receives each one of the amount of operation of the manually operated means upon starting of the vehicle, the maximum rate of increase and the maximum deceleration, coasting run time and steady run time of the vehicle. Since the drive mode is selected when each of the above-indicated variables is received by the neural network, the response of the drive mode estimating device to the operator's manipulation of the vehicle is significantly improved.

The first object indicated above may also be achieved according to a fifth aspect of this invention, which provides a drive mode estimating device for estimating a drive mode of a motor vehicle desired by an operator of the motor vehicle, comprising: drive mode estimating means for obtaining from time to time a non-processed drive mode index value for estimating the drive mode of the vehicle desired by the operator, on the basis of drive mode indicating variables relating to manipulation of the vehicle by the operator; standard drive mode estimating means for obtaining a standard drive mode index value on the basis of the non-processed drive mode index values which have been obtained by the drive mode estimating means; and output filtering means for filtering the non-processed drive mode index value presently obtained by the drive mode estimating means, with a filtering constant which varies as a function of the standard drive mode index value obtained by the standard drive mode estimating means, the output filtering means generating a processed drive mode index value as a result of filtering the non-processed drive mode index value.

In the present drive mode estimating device, the non-processed drive mode index value is obtained from time to time by the drive mode estimating means on the basis of the drive mode indicating variables, and the standard drive mode index value is obtained by the standard drive mode estimating means, on the basis of the non-processed drive mode index values which have been obtained by the drive mode estimating means. The presently obtained non-processed drive mode index value is filtered by the output filtering means, with the filtering constant which is changed as a function of the standard drive mode index value obtained by the standard drive mode estimating means. As a result of filtering the non-processed drive mode index value, a processed drive mode index value is obtained from the output filtering means. Since the standard drive mode index value indicative of the standard drive mode of the vehicle in the past is reflected on the filtering constant used to obtain the processed drive mode index value, the drive mode of the vehicle represented by the processed drive mode index value accurately reflects the vehicle operator's intention as represented by the manner of the operator's manipulation of the vehicle.

In one preferred form of the drive mode estimating device according to the fifth aspect of this invention, the output filtering means filters the non-processed drive mode index value only when the non-processed drive mode index value is changing toward a value which indicates an economy drive mode of the vehicle in which the vehicle should be driven so as to increase fuel economy of the vehicle. In this arrangement, the output filtering means is not operated to filter the non-processed drive mode index value, when the non-processed drive mode index value is changing in a direction to select a sporty drive mode with the accelerator pedal being abruptly depressed by the vehicle operator to increase the vehicle drive force. In this case, the processed drive mode index value is rapidly changed in the direction to select the sporty drive mode, whereby the response of the processed drive mode index value is increased. When the non-processed drive mode index value is changing in a direction to select the economy drive mode, on the other hand, there is a possibility of erroneous estimation of the operator's desired drive mode as being the economy drive mode, while in fact the operator desires to continue the sporty drive mode. Namely, the accelerator pedal may be temporarily released during vehicle running in the sporty drive mode, for some reason or other relating to the vehicle running or operating condition or road condition. In this case, the output filtering means is operated to filter the non-processed drive mode index value, so that the response of the processed drive mode index value is lowered to prevent the erroneous estimation that the vehicle is driven in the economy drive mode.

In a second preferred form of the drive mode estimating device according to the fifth aspect of the invention, the output filtering means includes means for determining the filtering constant such that the filtering constant is larger when the standard drive mode index value indicates a drive mode of the vehicle in which the vehicle should be driven so as to increase a drive force for driving the vehicle, than when the standard drive mode index value indicates a drive mode of the vehicle in which the vehicle should be driven so as to increase fuel economy of the vehicle. In this arrangement, the filtering constant remains to be large even when the non-processed index value has decreased toward the economy drive mode, as long as the standard drive mode index value which has been relatively large remains on the side of the sporty drive mode. In this case, therefore, the response of the processed index value is lowered by the filtering operation using the relatively large filtering constant, and the possibility of erroneous estimation of the vehicle operator's desired drive mode is minimized. Conversely, the filtering constant remains to be small even when the index value has increased toward the sporty drive mode, as long as the standard drive mode index value which has been relatively small remains on the side of the economy drive mode. In this case, the response of the index value is increased by the filtering operation using the relatively small filtering constant, permitting accurate estimation of the operator's desired drive mode.

According to a third preferred form of the present fifth preferred form of the invention, the drive mode estimating device further comprises drive force selecting means for selecting a drive force for driving the vehicle, on the basis of the processed drive mode index value obtained by the output filtering means. In this arrangement, one of a plurality of shift patterns for controlling an automatic transmission or one of a plurality of relationships between the throttle opening angle and the accelerator pedal is selected by the drive force selecting means on the basis of the processed drive mode index value obtained by filtering the non-processed drive mode index value. Accordingly, the automatic transmission or the throttle actuator for controlling the throttle valve is controlled so as to drive the vehicle in the drive mode desired by the vehicle operator whose intention is represented by the drive mode indicating variables.

The drive mode estimating device according to the above third preferred form of the fifth aspect of the invention may be suitably used for a motor vehicle which includes an engine, an automatic transmission, and shift control means for automatically shifting the automatic transmission on the basis of a load of the engine and a running speed of the vehicle, and according to one of a plurality of shift patterns. In this case, the suitable shift pattern is selected by the drive force selecting means on the basis of the processed drive mode index value.

The drive mode estimating device according to the above third preferred form of the fifth aspect of the invention may also be suitably used for a motor vehicle which has an engine with a throttle valve, an accelerator pedal, and throttle control means for controlling an opening angle of the throttle valve on the basis of an amount of operation of the accelerator pedal, and according to one of a plurality of relationships between the opening angle of the throttle valve and the amount of operation of the accelerator pedal. In this case, the suitable relationship is selected by the drive force selecting means on the basis of the processed drive mode index value.

The first object indicated above may also be achieved according to a sixth aspect of the present invention, which provides a drive mode estimating device for estimating a drive mode of a motor vehicle desired by an operator of the motor vehicle, comprising: drive mode estimating means for obtaining from time to time a drive mode index value for estimating the drive mode of the vehicle desired by the operator, on the basis of at least one first drive mode indicating variable generated in relation to manipulation of the vehicle by the operator, and at least one second drive ode indicating variable generated at a predetermined time interval; standard drive mode estimating means for obtaining a standard drive mode index value on the basis of the non-processed drive mode index values which have been obtained by the drive mode estimating means; and input filtering means for filtering the at least one second drive mode indicating variable, with a filtering constant which varies as a function of the standard drive mode index value obtained by the standard drive mode estimating means.

In the drive mode estimating device according to the sixth aspect of this invention, the drive mode index value is obtained from time to time by the drive mode estimating means, on the basis of the above-indicated at least one first drive mode indicating variable generated in relation to manipulation of the vehicle by the operator, and the above-indicated at least one second drive mode indicating variable generated at a predetermined time interval. Further, the standard drive mode index value is obtained by the standard drive mode estimating means, on the basis of the drive mode index values which have been obtained by the drive mode estimating means. The above-indicated at least one second drive mode indicating variable is filtered by the input filtering means, with a filtering constant which varies as a function of the standard drive mode index value obtained by the standard drive mode estimating means. Since the second drive mode indicating variable used to obtain the drive mode index value is filtered by taking into account the standard drive mode index value indicative of the standard drive mode of the vehicle in the past, the drive mode of the vehicle represented by the drive mode index value accurately reflects the vehicle operator's intention as represented by the manner of the operator's manipulation of the vehicle.

In a first preferred form of the drive mode estimating device according to the sixth aspect of this invention, the input filtering means filters the at least one second drive mode indicating variable, only when the drive mode index value obtained by the drive mode estimating means is changing toward a value which indicates a drive mode of the vehicle in which the vehicle should be driven so as to increase fuel economy of the vehicle. In this arrangement, the output filtering means is not operated to filter the second drive mode indicating variable or variables, when the drive mode index value is changing in a direction to select a sporty drive mode with the accelerator pedal being abruptly depressed by the vehicle operator to increase the vehicle drive force. In this case, the drive mode index value is rapidly changed in the direction to select the sporty drive mode, whereby the response of the drive mode index value is increased. When the drive mode index value is changing in a direction to select the economy drive mode, on the other hand, there is a possibility of erroneous estimation of the operator's desired drive mode as being the economy drive mode, while in fact the operator desires to continue the sporty drive mode. Namely, the accelerator pedal may be temporarily released during vehicle running in the sporty drive mode, for some reason or other relating to the vehicle running or operating condition or road condition. In this case, the output filtering means is operated to filter the second drive mode indicating variable or variables, so that the response of the drive mode index value is lowered to prevent the erroneous estimation that the vehicle is driven in the economy drive mode.

In a second preferred form of the drive mode estimating device according to the sixth aspect of the invention, the input filtering means includes means for determining the filtering constant such that the filtering constant is larger when the standard drive mode index value indicates a drive mode of the vehicle in which the vehicle should be driven so as to increase a drive force for driving the vehicle, than when the standard drive mode index value indicates a drive mode of the vehicle in which the vehicle should be driven so as to increase fuel economy of the vehicle. In this arrangement, the filtering constant remains to be large even when the drive mode index value has decreased toward the economy drive mode, as long as the standard drive mode index value which has been relatively large remains on the side of the sporty drive mode. In this case, therefore, the response of the index value is lowered by the filtering operation using the relatively large filtering constant, and the possibility of erroneous estimation of the vehicle operator's desired drive mode is minimized. Conversely, the filtering constant remains to be small even when the index value has increased toward the sporty drive mode, as long as the standard drive mode index value which has been relatively small remains on the side of the economy drive mode. In this case, the response of the drive mode index value is increased by the filtering operation using the relatively small filtering constant, permitting accurate estimation of the operator's desired drive mode.

In a third preferred form of the sixth aspect of the invention, the drive mode estimating device further comprises drive force selecting means for selecting a drive force for driving the vehicle, on the basis of the drive mode index value obtained by the drive mode estimating means. In this arrangement, one of a plurality shift patterns for controlling an automatic transmission or one of a plurality of relationships between the throttle opening angle and the accelerator pedal is selected by the drive force selecting means on the basis of the drive mode index value obtained by the drive mode estimating means. Accordingly, the automatic transmission or the throttle actuator for controlling the throttle valve is controlled so as to drive the vehicle in the drive mode desired by the vehicle operator whose intention is represented by the drive mode indicating variables.

The drive mode estimating device according to the above third preferred form of the sixth aspect of the invention may be suitable used for a motor vehicle which includes an engine, an automatic transmission, and shift control means for automatically shifting the automatic transmission on the basis of a load of the engine and a running speed of the vehicle, and according to one of a plurality of shift patterns. In this case, the suitable shift pattern is selected by the drive force selecting means on the basis of the drive mode index value obtained by the drive mode estimating means.

The drive mode estimating device according to the above third preferred form of the sixth aspect of the invention may also be suitably used for a vehicle which has an engine with a throttle valve, an accelerator pedal, and throttle control means for controlling an opening angle of the throttle valve on the basis of an amount of operation of the accelerator pedal, and according to one of a plurality of relationships between the opening angle of the throttle valve and the amount of operation of the accelerator pedal. In this case, the suitable relationship is selected by the drive force selecting means on the basis of the drive mode index value obtained by the drive mode estimating means.

In a fourth preferred form of the sixth aspect of the invention, the drive mode estimating device further comprises variable calculating means for calculating the above-indicated at least one first variable and the above-indicated at least one second drive mode indicating variable, and the variable calculating means calculating as the at least one first drive mode indicating variable an amount of operation of manually operated means operated by the operator of the vehicle for designating a drive force of the vehicle desired by the operator upon starting of the vehicle, a maximum rate of increase of the amount of operation of the manually operated means, a maximum deceleration of the vehicle upon operation of a manually operated member for brake application to the vehicle, a coasting run time of the vehicle and a steady run time of the vehicle, the variable calculating means calculating as the at least one second drive mode indicating variable a maximum value of each of at least one input signal, and a maximum value of a running speed of the vehicle, at a predetermined time interval. In this case, the drive mode estimating means includes a neural network which receives each of the first and second drive mode indicating variables when each of the first and second drive mode indicating variables is calculated by the variable calculating means.

In one advantageous arrangement of the above fourth preferred form of the drive mode estimating device according to the sixth aspect of the invention, the drive mode estimating means obtains the drive mode index value on the basis of an output of the neural network, when each of the first and second drive mode indicating variables is calculated by the variable calculating means. In this arrangement, the drive mode estimating means obtains the drive mode index value when each one of the first and second drive mode indicating variables is received by the neutral network, whereby the response of the drive mode estimating means is improved.

In a fifth preferred form of the drive mode estimating device according to the sixth aspect of the invention, the variable calculating means includes input signal distribution calculating means for calculating a distribution value of each of the at least one input signal, for a predetermined period of time, and the drive mode estimating means receives the distribution value. This arrangement is effective to prevent erroneous estimation that the vehicle operator desires the sporty drive mode, when the vehicle is running at a relatively high speed on a superhighway with a relatively high engine speed in the economy drive mode. This erroneous estimation can be prevented since the distribution values of the vehicle speed and engine speed are comparatively small in the running condition indicated above.

The fourth object indicated above may be achieved according to a seventh aspect of this invention, which provides a drive force control apparatus for controlling a drive force for driving a motor vehicle, comprising: drive mode estimating means for obtaining from time to time a drive mode index value for estimating the a drive mode of the vehicle desired by an operator of the vehicle, on the basis drive mode indicating variables relating to manipulation of the vehicle by the operator; standard drive mode estimating means for obtaining a standard drive mode index value on the basis of the drive mode index values which have been obtained by the drive mode estimating means; and drive force selecting means for selecting a drive force for driving the vehicle, on the basis of the drive mode index value obtained by the drive mode estimating means and the standard drive mode index value obtained by the standard drive mode.

In the drive force control apparatus according to the seventh aspect of the present invention, the drive force for driving the vehicle is selected by the drive force selecting means, on the basis of the drive mode index value obtained by the drive mode estimating means and the standard drive mode index value obtained by the standard drive mode estimating means. The present apparatus is capable of suitably selecting the vehicle drive force, so as to drive the vehicle as desired by the vehicle operator.

The present drive force control apparatus may be suitably used for a motor vehicle which has an automatic transmission, and shift control means for controlling the automatic transmission according to a selected one of a plurality of shift patterns. In this case, the drive force selecting means comprises threshold determining means for determining at least one threshold for selecting the drive force, on the basis of the standard drive mode index value obtained by the standard drive mode estimating means, and comparing and determining means for comparing the drive mode index value obtained by the drive mode estimating means, with the threshold, and determining one of the plurality of shift patterns as a result of comparison of the drive mode index value with the threshold, whereby the drive force is selected by the drive force selecting means.

The present drive force control device may be suitably used for a motor vehicle which includes an engine, an automatic transmission, and shift control means for automatically shifting said automatic transmission on the basis of a load of said engine and a running speed of the vehicle, and according to one of a plurality of shift patterns. In this case, the suitable shift pattern is selected by said drive force selecting means on the basis of said drive mode index value obtained by said drive mode estimating means.

The present drive force control device may also be used for a vehicle which has an engine with a throttle valve, an accelerator pedal, and throttle control means for controlling an opening angle of said throttle valve on the basis of an amount of operation of said accelerator pedal, and according to one of a plurality of relationships between said opening angle of said throttle valve and said amount of operation of said accelerator pedal. In this case, the suitable relationship is selected by said drive force selecting means on the basis of said drive mode index value obtained by said drive mode estimating means.

In a preferred from of the drive force control apparatus, the standard drive mode estimating means obtains the standard drive mode index value by subjecting the drive mode index value obtained by the drive mode estimating means, to a smoothing operation or a weighted averaging operation.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIG. 2 is a view indicating combinations of operating positions of the automatic transmission and operating states of solenoid-operated valves and frictional coupling devices provide for shifting the automatic transmission;

DETAILED DESCRIPTION OF THE PREFERRED EMBODIMENTS

Figure 1:
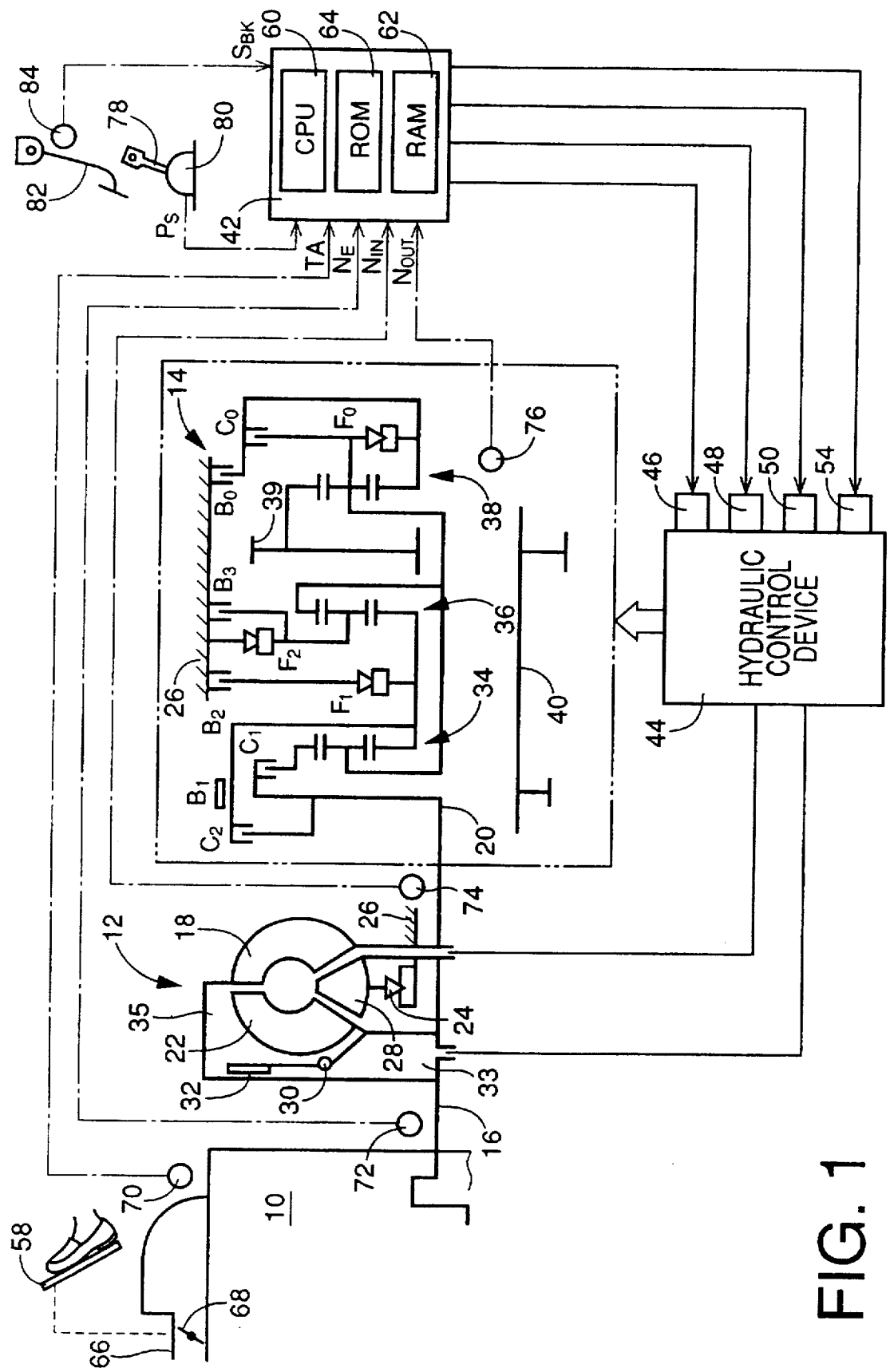
FIG. 1 is a schematic view showing a shift control apparatus for controlling an automatic transmission of a motor vehicle, which apparatus includes an operator's desired drive mode estimating device constructed according to one embodiment of the present invention.

Referring first to FIG. 1, there are shown a part of a power transmitting system of a motor vehicle, and a shift control apparatus for controlling an automatic transmission 14 disposed in the power transmitting system. The vehicle is equipped with an engine 10, the output of which is transmitted to drive wheels of the vehicle through a torque converter 12, automatic transmission 14, a differential gear device and an axle.

The torque converter 12 includes: a pump impeller 18 connected to a crankshaft 16 of the engine 10; a turbine impeller 22 which is connected to an input shaft 20 of the automatic transmission 14 and to which a drive force is transmitted through a fluid from the pump impeller 18; a stationary impeller 28 fixed to a stationary housing 26 through a one-way clutch 24; and a lock-up clutch 32 connecting the pump and turbine impellers 18, 22 through a damper 30. The lock-up clutch 32 has a releasing oil chamber 33 and an engaging oil chamber 35, and is brought to an engaged state by a difference between hydraulic pressures in the releasing and engaging oil chambers 33, 35.

The automatic transmission 14 is a planetary gear type transmission having a plurality of gear positions, for example, four or five forward-drive positions, and one rear-drive position. Where the automatic transmission 14 has the four forward=drive positions, the transmission 14 includes three single pinion planetary gear sets 34, 36, 38 coaxially arranged along a common axis concentric with the above-indicated input shaft 20, an output gear 39 rotated with a ring gear of the third planetary gear set 38, and an output shaft in the form of a counter shaft 40 which is parallel to the input shaft 20 and disposed between the output gear 39 and the above-indicated differential gear device. The three planetary gear sets 34, 36, 38 include rotary elements which are integrally connected to each other, and rotary elements which are selectively connected to each other through three clutches C0, C1 and C2. The planetary gear sets 34, 36, 38 further include rotary elements which are selectively fixed to the housing 26 through four brakes B0, B1, B2 and B3, and rotary elements which are selectively connected to each other or fixed to the housing 26 through three one-way clutches F0, F1 and F2, depending upon their rotating directions.

The clutches C0, C1, C2 and brakes B0, B1, B2, B3 may be multiple-disk clutches, and band brakes each of which has a single band or two bands whose winding directions are opposite to each other. These clutches C and brakes B are operated by respective hydraulic actuators (not shown), which are controlled by a hydraulic control device 44 according to control signals received from an electronic control device 42 which will be described. With the clutches C and brakes B being selectively engaged by the hydraulic control device 44, as indicated in the table of FIG. 2, the automatic transmission 14 is automatically shifted to one of the four forward-drive positions "1st", "2nd", "3rd" and "O/D", or the rear-drive position "R". These operating positions of the automatic transmission 14 have different speed ratio values r. The speed ratio r is a ratio of the speed of the input shaft 20 to the speed of the counter shaft 40. In the table of FIG. 2, the positions "1st", "2nd", "3rd" and "O/D" are a first-speed position, a second-speed position, a third-speed position and a fourth-speed (overdrive) position, respectively. The speed ratios r of these first-speed, second-speed, third-speed and fourth-speed positions "1st", "2nd", "3rd" and "O/D" decrease in the order of description of the positions. The forward-drive positions are available when a shift lever 78 is placed in a drive position "D".

Since the torque converter 12 and the automatic transmission 14 are symmetrical with respect to their axis, the lower half halves of the torque converters 12 and automatic transmission 14 (on the lower side of the input shaft 20), and the upper half of the counter shaft 40 are not shown in FIG. 1, in the interest of simplification.

The hydraulic control device 44 includes a shift control hydraulic circuit for shifting the automatic transmission 14, and a lock-up clutch control hydraulic circuit for selectively engaging and releasing the lock-up clutch 32. The shift control hydraulic circuit includes a first solenoid-operated valve 46 operated by a first solenoid coil (coil No. 1 indicated in FIG. 2), and a second solenoid-operated valve 48 operated by a second solenoid coil (coil No. 2 indicated in FIG. 2). The clutches C and brakes B are selectively engaged by a selected combination of the operating states of the first and second solenoid-operated valves 46, 48, as indicated in the table of FIG. 2, so that the automatic transmission 14 is automatically shifted up or down to a selected one of the forward-drive operating positions.

The lock-up clutch control hydraulic circuit includes a third solenoid-operated valve 50, and a linear solenoid valve 54. The third solenoid-operated valve 50 generates a pilot pressure for controlling a lock-up clutch switching valve (not shown) which has a releasing position for releasing the lock-up clutch 32 and an engaging position for engaging the lock-up clutch 32. The linear solenoid valve 54 is controlled by a drive current supplied from the electronic control device 42, so as to apply a slip control pressure to a slip control valve (not shown) which is adapted to regulate a pressure difference ΔP between the hydraulic pressures in the releasing and engaging oil chambers 33, 35 of the lock-up clutch 32, for thereby controlling the amount of slip of the lock-up clutch 32.

The electronic control device 42 is a so-called microcomputer incorporating a central processing unit (CPU) 60, a random-access memory (RAM) 62, a read-only memory (ROM) 64, and input and output interface circuits (not shown). The control device 42 is adapted to receive output signals of various sensors or detectors, which include: a throttle sensor 70 for detecting an opening angle TA of a throttle valve 68 disposed in an intake pipe 66 of the engine 10; an engine speed sensor 72 for detecting a rotating speed $N_E$ of the engine 10; an input shaft speed sensor 74 for detecting a rotating speed $N_{IN}$ of the input shaft 20 of the automatic transmission 14; a vehicle speed sensor 76 for detecting a rotating speed $N_{OUT}$ of the counter or output shaft 40 of the automatic transmission 14; a shift position sensor 80 for detecting a currently selected one (Ps) of operating positions "L", "S", "D", "N", "R" and "P" of a shift lever 78; a brake switch 84 for detecting an operation of a brake pedal 82. The speed $N_{OUT}$ represented by the output signal of the vehicle speed sensor 76 is used to determine a running speed V of the motor vehicle. The brake switch 84 generates a BRAKE signal $S_{BK}$ indicating whether the brake pedal 82 is presently depressed or not. The throttle valve 68 is mechanically linked with an accelerator pedal 58, such that the opening angle TA of the throttle valve 68 (hereinafter referred to as "throttle opening angle TA") increases with an increase in the amount of depression of the accelerator pedal 58.

It will be understood that the accelerator pedal 58 functions as manually operated means for designating a desired output of the engine 10 or a desired drive force or torque for driving the motor vehicle. It will also be understood that the throttle sensor 70 functions as a sensor for detecting an operation amount $A_{CC}$ of the accelerator pedal 58, which represents the desired output of the engine 10 or the desired vehicle drive force or torque.

The CPU 60 of the electronic control device 42 operates to process the received input signals as described above, according to control programs stored in the ROM 64, while utilizing a temporary data storage function of the RAM 62. The control programs include programs for executing a drive mode estimation control routine illustrated in the flow chart of FIG. 14, and for controlling the automatic transmission 14 and the lock-up clutch 32.

It will be understood that the electronic control device 42 functions as a drive mode estimating device, and a shift control apparatus which incorporates the drive mode estimating device.

Figure 3:
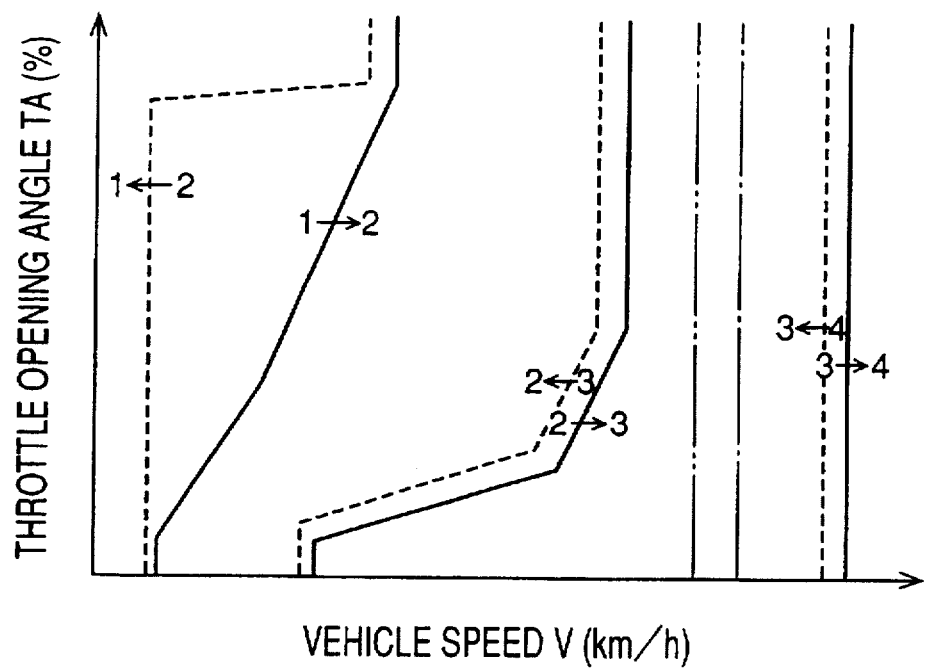
FIG. 3 is a graph showing a SPORTY DRIVE MODE shift pattern for shifting the automatic transmission, which shift pattern is selected by the shift control apparatus of FIG. 1, when the drive mode estimating device estimates that the vehicle operator desires to drive the vehicle in a sporty drive mode.
Figure 4:
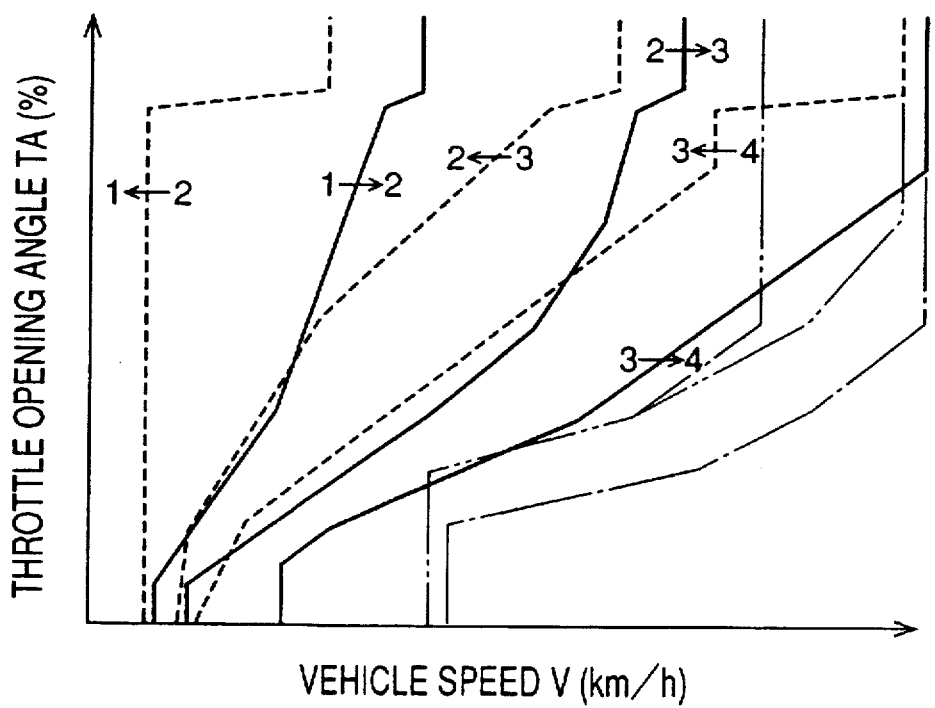
FIG. 4 is a graph showing a NORMAL DRIVE MODE shift pattern selected when the drive mode estimating device estimates that the vehicle operator desires to drive the vehicle in a normal drive mode.
Figure 5:
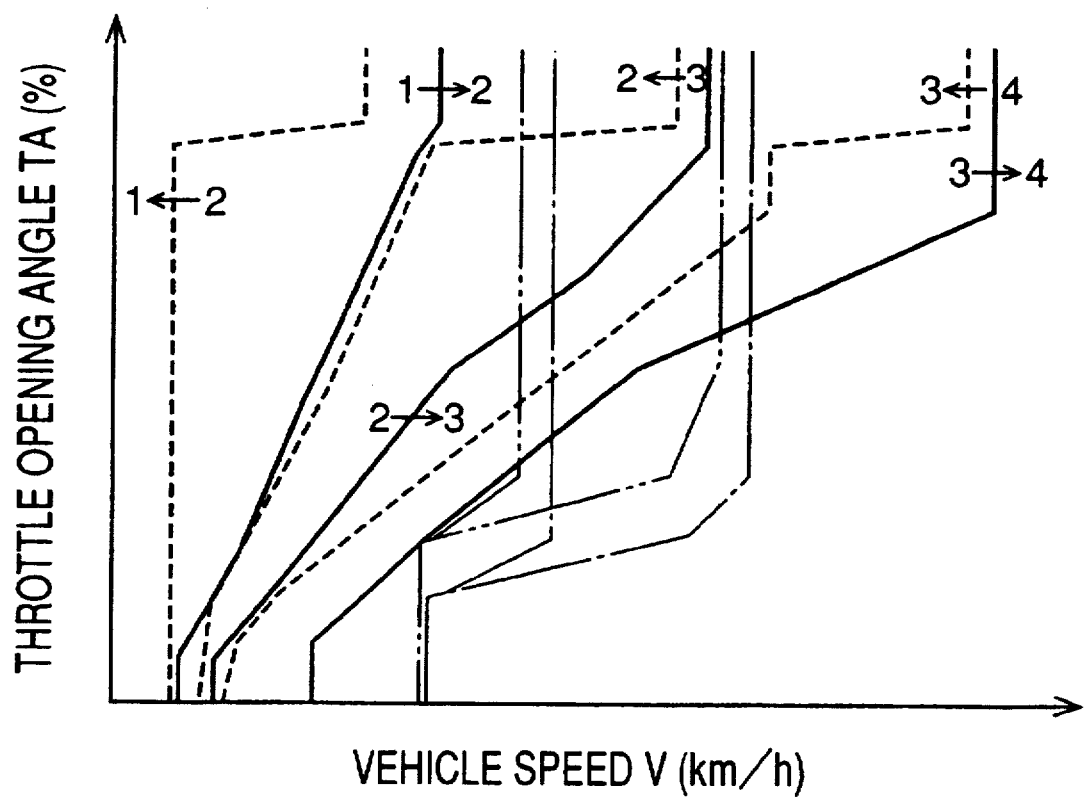
FIG. 5 is a graph showing an ECONOMY DRIVE MODE shift pattern selected when the drive mode estimating device estimates that the vehicle operator desires to drive the vehicle in an economy drive mode.
Figure 14:
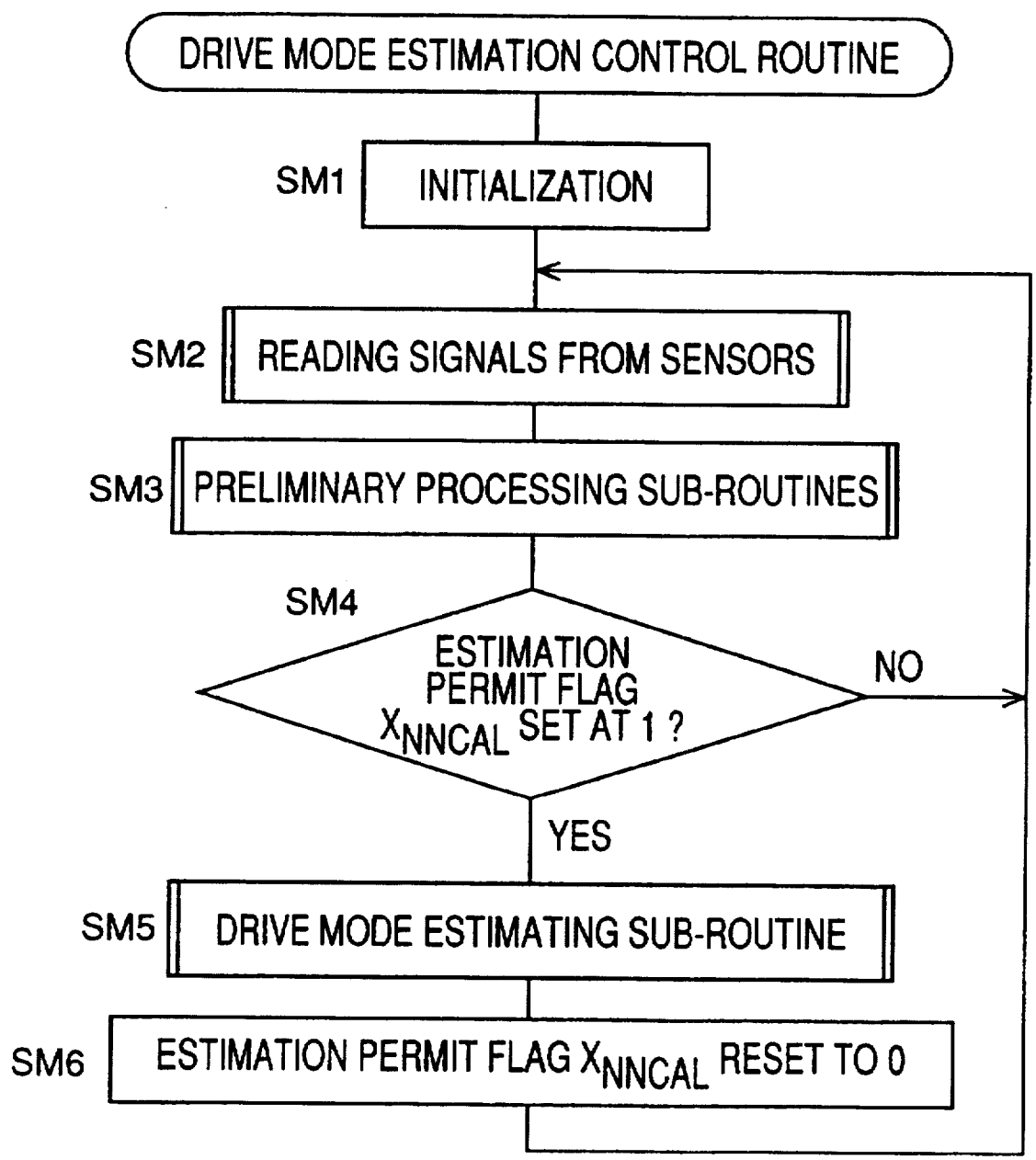
FIG. 14 is a flow chart illustrating a drive mode estimation control routine executed by the electronic control device of the shift control apparatus of FIG. 1.

As described below in detail, the drive mode estimation control routine of FIG. 14 executed by the control device 42 is formulated to process the input signals and obtain selected variables or parameters reflecting a vehicle drive mode desired by the vehicle operator, so that the obtained variables or parameters (hereinafter referred to as "drive mode indicating variables") are received by a neural network NN, which produces an output used to estimate the operator's desired vehicle drive mode. For controlling the automatic transmission 14 and the lock-up clutch 32, the ROM 64 stores a plurality of shift patterns, namely, a SPORTY DRIVE MODE shift pattern shown in FIG. 3, a NORMAL DRIVE MODE shift pattern shown in FIG. 4, and an ECONOMY DRIVE MODE shift pattern shown in FIG. 5. One of these shift patterns is selected depending upon the estimated vehicle drive mode desired by the vehicle operator. The automatic transmission 14 is shifted up or down to an appropriate forward-drive position, and the lock-up clutch 32 is engaged or released, on the basis of the actually detected vehicle running speed V and throttle opening angle TA, and according to the selected shift pattern. The shift patterns are relationships between the vehicle running speed V and the throttle opening angle TA, as indicated in FIGS. 3–5. When the SPORTY DRIVE MODE shift pattern is selected, the automatic transmission 14 is shifted so as to drive the motor vehicle with a relatively high degree of drivability or acceleration performance. When the ECONOMY DRIVE MODE shift pattern is selected, the automatic transmission 14 is shifted so as to drive the motor vehicle with a relatively high degree of fuel economy.

Referring to FIG. 4 showing the NORMAL DRIVE MODE shift pattern, for example, the shift pattern consists of shift-up and shift-down boundary lines representing relationships between the vehicle speed V and the throttle opening angle TA. If a point determined by the actually detected vehicle speed V and throttle opening angle TA passes across a shift-up or shift-down boundary line, the automatic transmission 14 is commanded to be shifted up or down by the selective energization of the solenoid coils of the first and second solenoid-operated valves 46, 48, and the lock-up clutch 32 is appropriately engaged or released by the third solenoid-operated valve 50 and the linear solenoid valve 54.

In FIGS. 3–5, solid lines are the shift-up boundary lines, and broken lines are the shift-down boundary lines. One-dot chain lines indicate lock-up clutch engaging boundary lines for engaging the lock-up clutch 32, while two-dot chain lines indicate lock-up clutch releasing boundary lines for releasing the lock-up clutch 32. The shift-up and shift-down boundary lines of the SPORTY DRIVE MODE shift pattern of FIG. 3 ar e determined so that the shifting actions of the automatic transmission 14 take place at higher vehicle speeds V (higher engine speeds $N_E$), than the boundary lines of the NORMAL DRIVE MODE shift patter of FIG. 4. Conversely, the boundary lines of the ECONOMY DRIVE MODE shift pattern of FIG. 5 are determined so that the shifting actions take place at lower engine speeds $N_E$, than the boundary lines of the NORMAL DRIVE MODE shift pattern.

Figure 6:
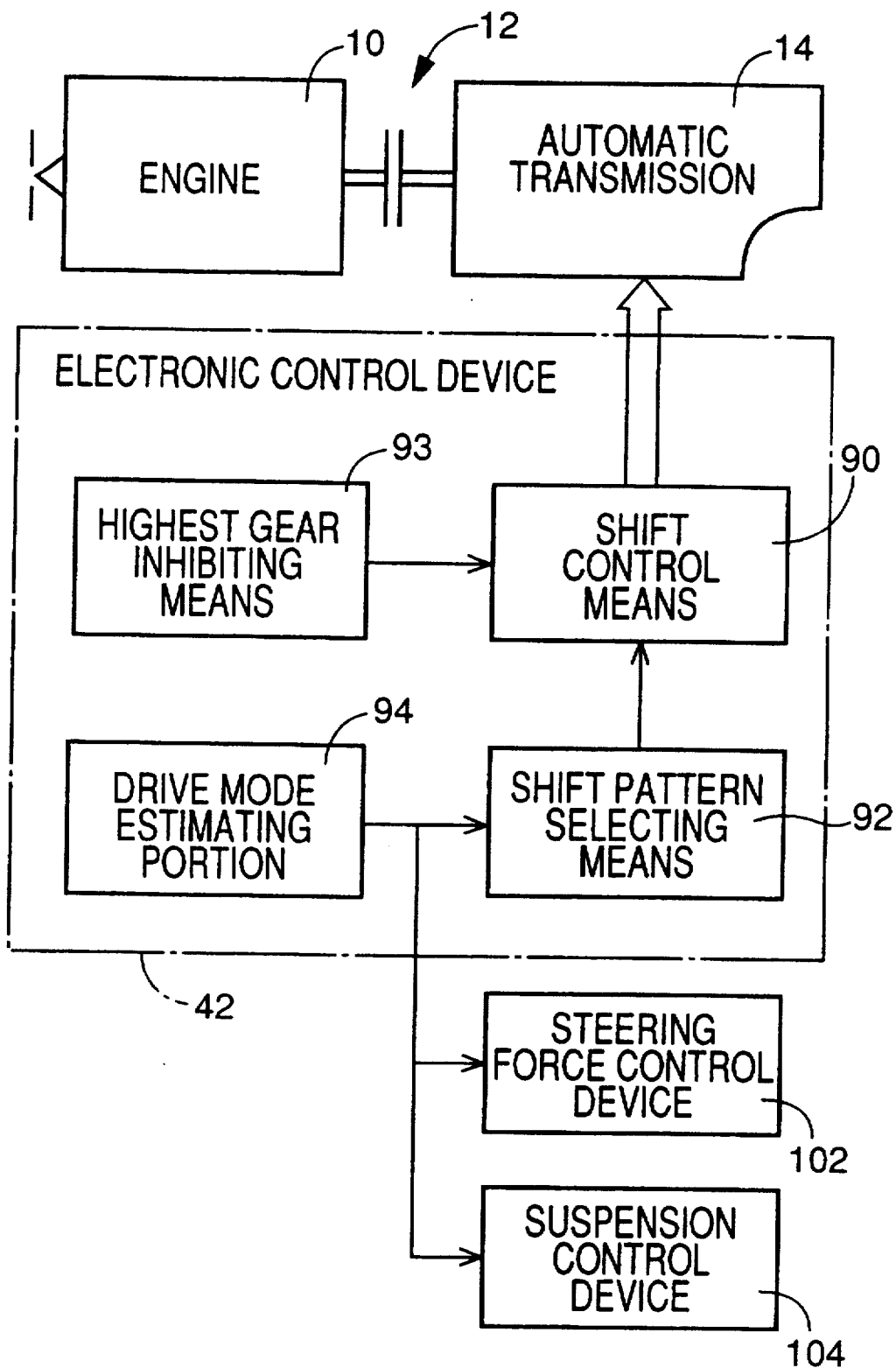
FIG. 6 is a functional block diagram indicating major control functions of an electronic control device of the shift control apparatus.

Referring next to the block diagram of FIG. 6, there are indicated the functions of various functional means of the electronic control device 42, which include shift control means 90, shift pattern selecting means 92, highest gear inhibiting means 93, and drive mode estimating portion 94. The shift control means 90 is adapted to select one of the operating positions of the automatic transmission 14, according to the selected shift pattern, and on the basis of the vehicle running speed V detected by the vehicle speed sensor 76 and the throttle opening angle TA detected by the throttle sensor 70. The shift pattern selecting means 92 is adapted to select one of the SPORTY DRIVE MODE, NORMAL MODE and ECONOMY DRIVE MODE shift patterns stored in the ROM 64. The shift control means 90 controls the solenoid-operated valves 46, 48, 50 so as to shift the automatic transmission 14 to the selected operating position.

The highest gear inhibiting means 93 is adapted to inhibit the automatic transmission 14 from being shifted to the highest-speed position, i.e., fourth-speed position "O/D", with the shift lever 78 placed in the drive position "D", in order to assure a sufficient vehicle drive force, in the following three cases: 1) when the vehicle is running on an uphill road; 2) when the vehicle is running on a downhill road; and 3) when an output $NN_{OUT}$ of the neural network NN is larger than a predetermined threshold K, that is, when a SPORTY MODE flag $X_{SP}$ indicative of a desire to establish the SPORTY DRIVE mode is set at "1". The highest gear inhibiting means 93 is disabled when the vehicle is running in a steady state at a substantially constant speed V and when the output $NN_{OUT}$ of the neural network NN is smaller than the threshold K.

The shift pattern selecting means 92 is adapted to select one of the shift patterns of FIGS. 3, 4 and 5 stored in the ROM 64, which corresponds to the vehicle drive mode selected by the drive mode estimating portion 94. More specifically described, one of the shift patterns is selected on the basis of the output $NN_{OUT}$ used in the drive mode estimating portion 94. When the SPORTY MODE flag $X_{SPORT}$ is set to "1" by the drive mode estimating portion 94, the shift pattern selecting means 92 selects the SPORTY DRIVE MODE shift pattern of FIG. 3. When an ECONOMY MODE flag $X_{ECO}$ indicative of a desire to establish the ECONOMY DRIVE mode is set to "1" by the drive mode estimating portion 94, the shift pattern selecting means 92 selects the ECONOMY DRIVE MODE shift pattern of FIG. 5. When a NORMAL MODE flag $X_{NORM}$ indicative of a desire to establish the NORMAL DRIVE mode is set to "1", the shift pattern selecting means 92 selects the NORMAL DRIVE MODE shift pattern of FIG. 4.

The drive mode estimating portion 94 uses the neural network NN which is adapted to initiate an appropriate estimating operation based on the drive mode indicating variables, each time any of the variables is calculated according to the input signals. The drive mode estimating portion 94 estimates the vehicle drive mode desired by the vehicle operator, according to the output $NN_{OUT}$ of the neural network NN. That is, the output $NN_{OUT}$ determines one of the SPORTY, NORMAL and ECONOMY drive modes, as the vehicle drive mode currently desired by the vehicle operator. The drive mode estimating portion 94 includes signal reading means 96, preliminary processing means 98, and drive mode estimating means 100.

The signal reading means 96 is adapted to read the output signals of the sensors such as the sensors 70, 72, 74, 76, 80, 84, with a relatively short cycle time. As described above, the output signals of the sensors 70, 72, 74, 76, 80, 84 represent the throttle opening angle TA, engine speed $N_E$, input shaft speed $N_{IN}$, vehicle speed V, selected position of the shift lever 78, and operation or non-operation of the brake pedal 82, respectively.

The preliminary processing means 98 functions as drive mode indicating variable calculating means for calculating the drive mode indicating variables, on the basis of the input signals read by the signal reading means 96. The drive mode indicating variables represent in some way or other the operator's manipulation of the vehicle which reflects the drive mode desired by the operator. The drive mode indicating variables include: starting throttle opening angle $TA_{ST}$, which represents a starting output of the engine 10 (operation amount $A_{CC}$ of the accelerator pedal 58) upon starting of the vehicle; maximum increase rate $A_{CCMAX}$ of the operation amount $A_{CC}$, which represents a maximum increase rate of the engine output during acceleration of the vehicle; maximum deceleration $G_{NMAX}$ during braking of the vehicle; coasting run time $T_{COAST}$ during which the vehicle is coasting; steady run time $T_{VCONST}$ which is a time during which the vehicle is running in a steady state; peak values of the input signals received from the sensors during a predetermined sampling time interval (e.g., about three seconds); and maximum vehicle speed $V_{MAX}$ after the start of the vehicle.

The drive mode estimating means 100 includes the neural network NN, which performs drive mode estimating operations on the basis of the drive mode indicating variables calculated by the preliminary processing means 98. The neural network NN is operated to perform the drive mode estimating operations each time the neural network NN receives the drive mode indicating variables from the preliminary processing means 98. The drive mode estimating means 100 generates an output, which is the output $NN_{OUT}$ of the neural network NN indicative of the estimated vehicle drive mode. The output $NN_{OUT}$ is directly fed to the shift pattern selecting means 92, and to other control devices which are provided on the vehicle and which are desirably controlled depending upon the vehicle operator's desired drive mode. The output $NN_{OUT}$ may be classified into three output magnitude values, for instance, which correspond to the SPORTY, NORMAL and ECONOMY drive modes. In this case, one of the above-indicated flags $X_{SPORT}$, $X_{NORM}$ and $X_{ECO}$ is set to "1" depending upon the magnitude of the output $NN_{OUT}$.

The other control devices which are also controlled depending upon the output $NN_{OUT}$ of the neural network NN of the drive mode estimating means 100 of the drive mode estimating portion 94 include a steering force control device 102, and a suspension control device 104. The steering force control device 102 is adapted to control the steering force of a power steering system of the vehicle, depending upon the vehicle drive mode selected by the drive mode estimating portion 94. The suspension control device 104 is adapted to control the damping force or spring characteristics of shock absorbers in the suspension system, depending upon the drive mode selected by the drive mode estimating portion 94. As described above, the output $NN_{OUT}$ of the neural network NN of the drive mode estimating means 100 is determined on the basis of the drive mode indicating variables including the starting throttle opening angle $TA_{ST}$, maximum increase rate $A_{CCMAX}$ of the operation amount $A_{CC}$ of the accelerator pedal 58, maximum deceleration $G_{NMAX}$ of the vehicle, and coasting run time $T_{COAST}$ and steady run time $T_{VCONST}$ of the vehicle. Since the vehicle operator's desired drive mode of the vehicle is estimated based on the output $NN_{OUT}$ thus determined by the drive mode indicating variables which are not used in the conventional neural network, the operator's desired vehicle drive mode can be more accurately estimated, in a relatively short time with a relatively reduced number of estimating cycles, so that the drive mode estimating device of the shift control apparatus provided by the control device 42 exhibits a significantly improved response to the operator's manipulation of the vehicle.

The preliminary processing means 98 of the drive mode estimating portion 94 incorporates starting output calculating means 98a, maximum output increase rate calculating means 98b, maximum deceleration calculating means 98c, coasting run time calculating means 98d, steady run time calculating means 98e, signal peak calculating means 98f and maximum vehicle speed calculating means 98g. The starting output calculating means 98a is adapted to calculate the starting output of the engine 10 in the form of the starting throttle opening angle $TA_{ST}$ upon starting of the vehicle. The maximum output increase rate calculating means 98b is adapted to calculate the maximum increase rate of the engine output in the form of the maximum increase rate $A_{CCMAX}$ of the throttle opening angle TA during acceleration of the vehicle. The maximum increase rate $A_{CCMAX}$ is a positive maximal value of the rate of change of the throttle opening angle TA. The maximum deceleration calculating means 98c is adapted to calculate the maximum deceleration $G_{NMAX}$ of the vehicle during braking of the vehicle. The coasting run time calculating means 98c is adapted to calculate the coasting run time $T_{COAST}$ of the vehicle, while the steady run time calculating means 98e is adapted to calculate the steady run time $T_{VCONST}$ of the vehicle. The signal peak calculating means 98f is adapted to calculate the peak values of the input signals during a predetermined sampling time, for example, about three seconds. The maximum vehicle speed calculating means 98g is adapted to calculate the highest vehicle speed $V_{MAX}$ after starting of the vehicle.

The peak values of the input signals calculated by the signal peak calculating means 98f in the predetermined sampling time include: maximum throttle opening angle $TA_{MAXt}$; maximum engine speed $NE_{MAXt}$ and maximum longitudinal acceleration $GOGBW_{MAXt}$ (a negative value of which represents longitudinal deceleration) during vehicle acceleration, or maximum deceleration $G_{NMAXt}$ (absolute value) during vehicle braking. The maximum longitudinal acceleration $NOGBW_{MAXt}$ and maximum deceleration $G_{NMAXt}$ may be obtained from a rate of change in the vehicle speed V (calculated from the speed $N_{OUT}$ of the output shaft 40).

Figure 7:
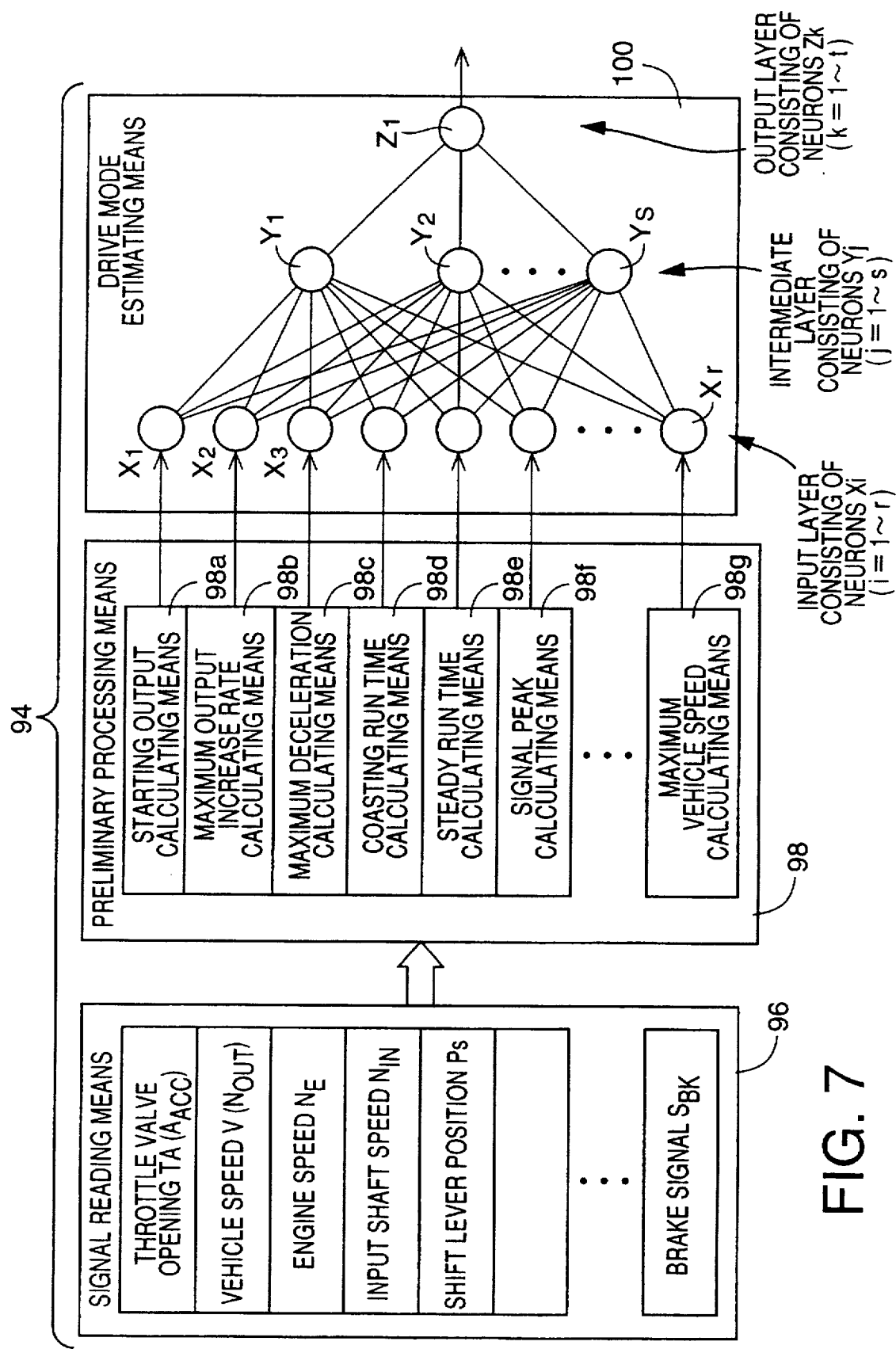
FIG. 7 is a functional block diagram indicating functions of a drive mode estimating portion of the control device of FIG. 6.

The neural network NN of the drive mode estimating means 100 shown in FIG. 7 is constituted by a computer software or a hardware consisting of electronic elements, which simulates a group of neurons (nerve cells) of a living body. For instance, the neural network NN may be a three-layered network consisting of an input layer consisting of neurons Xi (X1~Xr), an intermediate layer consisting of neurons Yj (Y1~Ys), and an output layer consisting of neurons Zk (Z1~Zt). The numbers of the neurons Xi, Yj and Zk are equal to "r", "s" and "t", respectively. For communicating the states of the neurons from the input layer to the output layer, the neural network NN has transfer elements $D_{xij}$ which have connecting coefficients (weights) $W_{xij}$ and which connect the neurons X1~Xr and the neurons Y1~Ys, and transfer elements $D_{yjk}$ which have connecting coefficients (weights) $W_{yjk}$ and which connect the neurons Y1~Ys and the neurons Z1~Zt.

The neural network NN is a pattern recognition type system wherein the connecting coefficients (weights) $W_{xij}$, $W_{yjk}$ are obtained by learning according to a so-called "reverse error propagation learning" algorithm. This learning is completed by running tests or experimentations of the vehicle in question, in which the drive mode indicating variables are related to the vehicle drive modes. In the electronic control device 42, therefore, the neural network NN of the drive mode estimating means 100 of the drive mode estimating portion 94 use the predetermined connecting coefficients or weights $W_{xij}$, $W_{yjk}$. In the running tests to learn the coefficients, the vehicle in question is run by different operators or drivers under different road and running conditions, in the SPORTY, NORMAL and ECONOMY drive modes. The test runs under the different road and running conditions include: superhighway runs; suburban road runs; mountain road runs; and urban road runs. The drive modes established in the test runs are used as teacher signals, and n number of indexes (input signals) are obtained by pre-processing the teacher signals and the output signals of the sensors, so that the indexes are put into the neural network NN. The teacher signals of the drive modes are converted into numerical values between 0 and 1. For instance, the teacher signals of the ECONOMY, NORMAL and SPORTY drive modes are converted into "0", "0.5" and "1.0". On the other hand, the input signals are normalized into numerical values between −1 and +1, or between 0 and 1.

The starting output calculating means 98a of the preliminary processing means 98 calculates the starting throttle opening angle $TA_{ST}$ upon starting of the vehicle, on the basis of the throttle opening angle TA (desired starting output of the engine 10) detected by the throttle sensor 70 (means for detecting the desired engine output), and the vehicle running speed V detected by the vehicle speed sensor 76 (vehicle speed detecting means). The starting throttle opening angle $TA_{ST}$, which represents the desired starting output of the engine 10, has a close relationship with the drive mode desired by the vehicle operator in starting the vehicle. The use of this starting throttle opening angle $TA_{ST}$ by the neural network NN improves the reliability of the drive mode selected by the drive mode selecting means 100.

Figure 8:
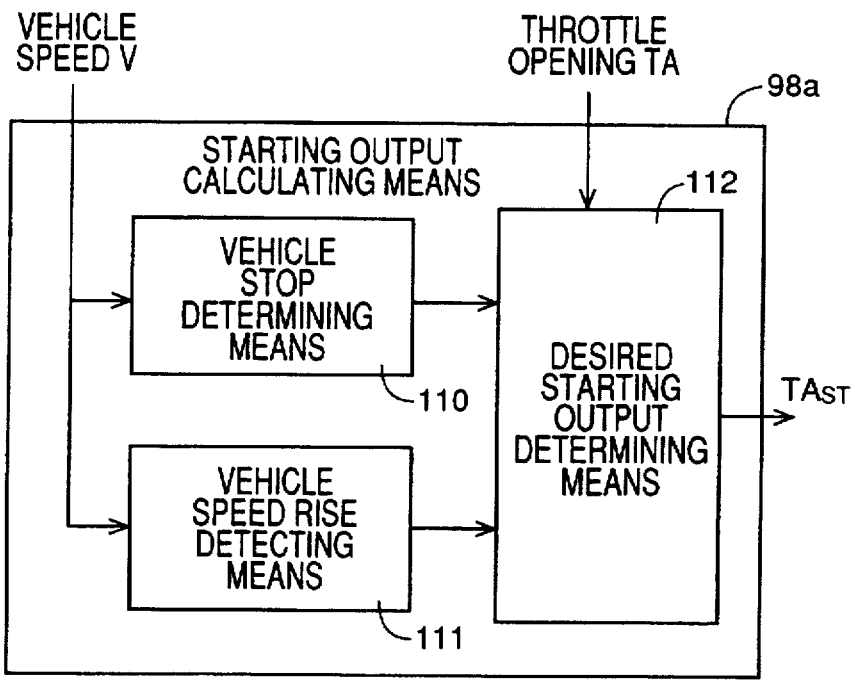
FIG. 8 is a view showing starting output calculating means of the drive mode estimating portion of FIG. 7.

As shown in FIG. 8, the starting output calculating means 98a incorporates vehicle stop determining means 110, vehicle speed rise detecting means 111, and desired starting output determining means 112. The vehicle stop determining means 110 is adapted to determine whether the vehicle is held stationary for more than a predetermined time $T_{V01}$. This determination may be made on the basis of the vehicle speed V. The vehicle speed rise detecting means 111 is adapted to determine whether the vehicle speed V has reached a predetermined level V1. The desired starting output determining means 112 is adapted to determine the desired starting engine output in the form of the starting throttle opening angle $TA_{ST}$ such that the desired starting engine output is represented by the throttle opening angle TA when the vehicle speed V has been raised to the predetermined level V1, for example, about 10 km/h, after starting of the vehicle.

The maximum output increase rate calculating means 98b of the preliminary processing means 98 shown in FIG. 7 calculates the maximum increase rate $A_{CCMAX}$ of the engine output, on the basis of the maximum increase rate of the throttle opening angle TA detected by the throttle sensor 70 except when the accelerator pedal 58 is abruptly depressed and immediately released in a short time. The maximum increase rate $A_{CCMAX}$ represents the maximum rate of increase of the amount of operation of the accelerator pedal 58, which is the manually operated means for designating the drive force or torque of the vehicle as desired by the vehicle operator. The maximum increase rate $A_{CCMAX}$ also has a close relationship with the drive mode desired by the vehicle operator immediately after starting the vehicle or during acceleration of the vehicle. The use of this maximum increase rate $A_{CCMAX}$ by the neural network NN improves the reliability of the drive mode selected by the drive mode selecting means 100. The exclusion of the maximum increase rate $A_{CCMAX}$ upon abrupt depression and immediate releasing (so-called "tip-in" action) of the accelerator pedal 58 by the vehicle operator results in further improvement of the reliability.

Figure 9:
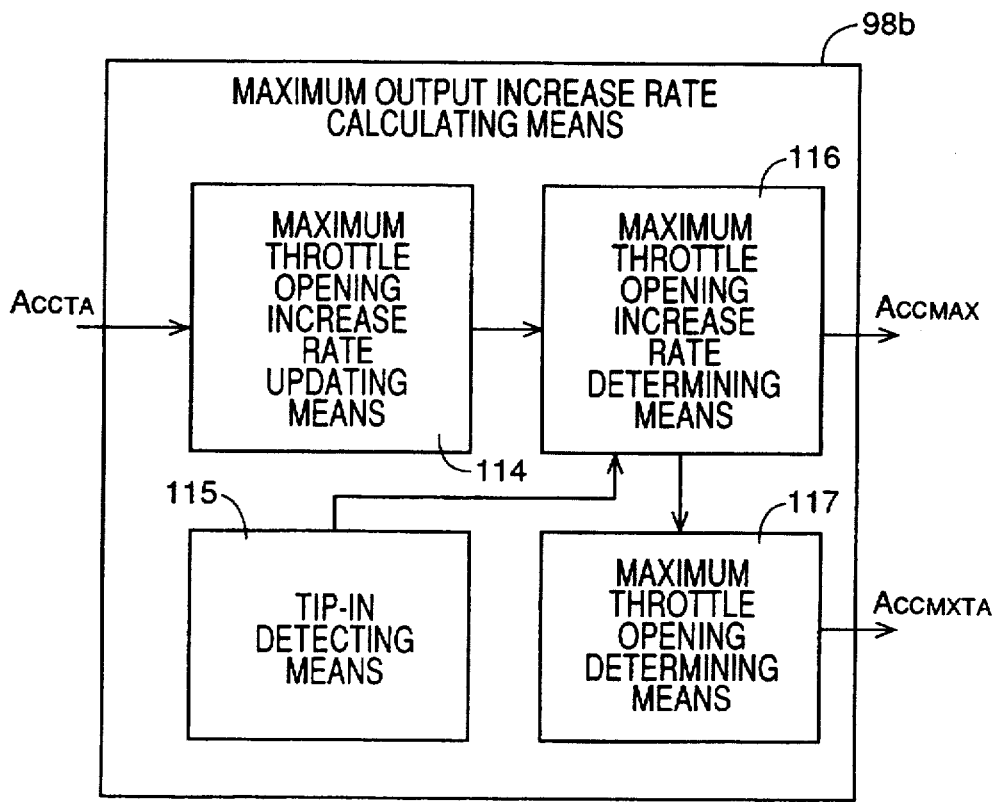
FIG. 9 is a view showing maximum output increase rate calculating means of the drive mode estimating portion of FIG. 7.

As shown in FIG. 9, the maximum increase rate calculating means 98b incorporates maximum throttle opening increase rate updating means 114, tip-in determining means 115, maximum throttle opening increase rate determining means 116, and maximum throttle opening determining means 117. The maximum throttle opening increase rate updating means 114 is adapted to update the stored maximum value $A_{CCMAX}$ of an increase rate $A_{CCTA}$ of the throttle opening angle TA during increasing of the depressing speed of the accelerator pedal 58. The increase rate $A_{CCTA}$ is represented by an amount of change of the throttle opening angle TA which is sampled at a predetermined sampling interval. The tip-in detecting means 115 is adapted to detect the "tip-in" (abrupt depression and immediate releasing in a short time) of the accelerator pedal 58. The maximum throttle opening increase rate determining means 116 determines the maximum increase rate $A_{CCMAX}$ of the throttle opening angle TA such that the maximum increase rate $A_{CCMAX}$ is represented by the maximum value of the increase rate $A_{CCTA}$ of the throttle opening angle TA which is updated by the maximum throttle opening increase rate updating means 114 when the "tip-in" is not detected by the detecting means 115. The maximum throttle opening determining means 117 is adapted to determine the maximum throttle opening angle $A_{CCMAXTA}$ before the maximum throttle opening angle increase rate $A_{CCMAX}$ is determined by the maximum throttle opening angle increase rate determining means 116.

The tip-in detecting means 115 detects the "tip-in" action of the accelerator pedal 58 if the throttle opening angle TA a predetermined time $(K_{SHRT}+T_{MAXTA})$ after the acquisition of the maximum throttle opening angle $A_{CCMAXTA}$ is not larger than a predetermined threshold $K_{TACHIP}$, and if the throttle opening angle increase rate $A_{CCTA}$ is zero or negative, or a positive value smaller than a predetermined threshold $K_{THRS}$.

Figure 10:
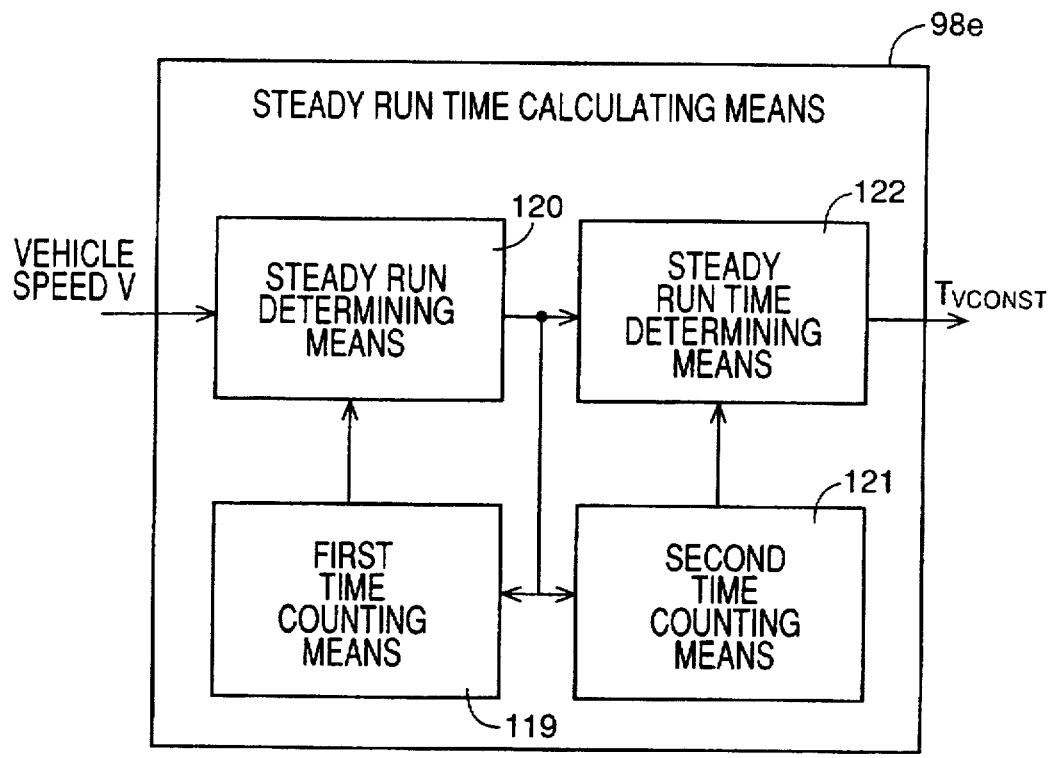
FIG. 10 is a view showing steady run time calculating means of the drive mode estimating portion of FIG. 7.

As shown in FIG. 10, the steady run time calculating means 98e of the preliminary processing means 98 includes first time counting means, steady run determining means 120, second time counting means 121, and steady run time determining means 122. The first time counting means 119 is adapted to determine that the amount of change of vehicle speed V is held within a predetermined range $\Delta V$ for a predetermined time period $K_{VCONAV}$. The steady run determining means 120 is adapted to determine that the vehicle is running in a steady state, when the first time counting means 119 determines that the amount of change of the vehicle speed V is held within the predetermined range $\Delta V$ for the predetermined time period $K_{VCONAV}$. The second time counting means 121 is adapted to measure a time during which the vehicle is running in the steady state, that is, a time during which the steady run determining means 120 continues to determine that the vehicle is running in the steady state. The steady run time determining means 122 determines the steady run time $T_{VCONST}$ based on the time measured by the second time counting means 121. The steady run time determining means 122 determines this steady run time $T_{VCONST}$ at a predetermined time interval.

Figure 11:
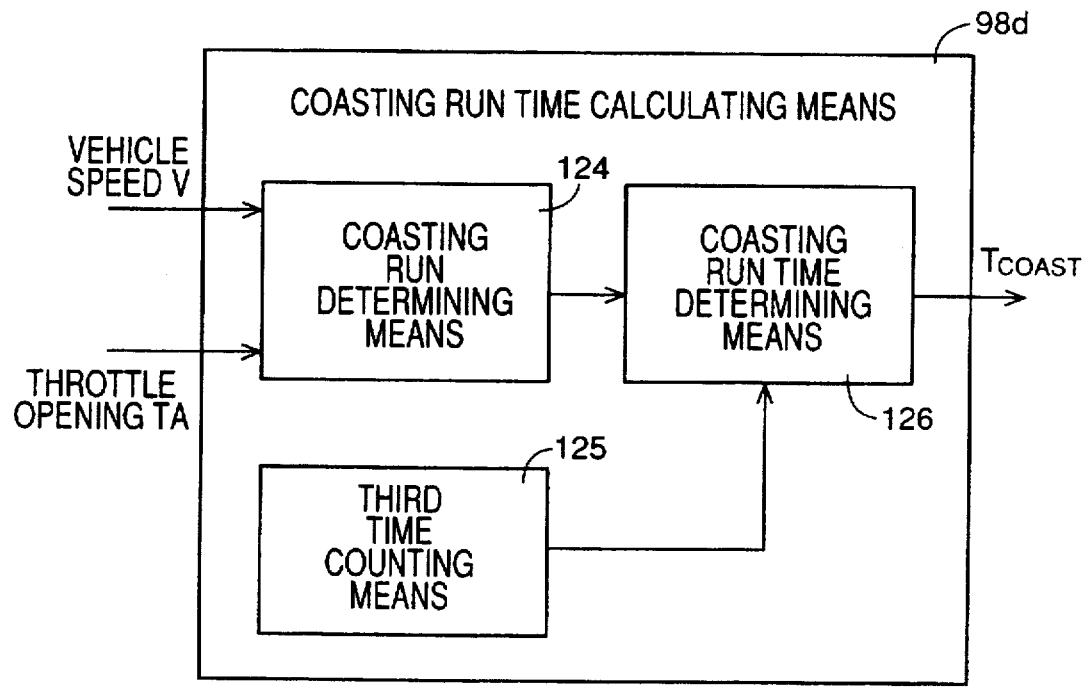
FIG. 11 is a view showing coasting run time calculating means of the drive mode estimating portion of FIG. 7.

As shown in FIG. 11, the coasting run time calculating means 98d of the preliminary processing means 98 incorporates coasting run determining means 124, third time counting means 125, and coasting run time determining means 126. The coasting run determining means 124 is adapted to determine whether the vehicle is coasting. This determination is made, for example, depending upon the throttle opening angle TA is held substantially zero. The third time counting means 125 is adapted to measure a time during which the vehicle is coasting, that is, a time during which the coasting run determining means 124 continues to determine that the vehicle is coasting. The coasting run time determining means 126 determines the coasting run time $T_{COAST}$ based on the time measured by the third time counting means 125. The coasting run time determining means 126 determines the coasting run time $T_{COAST}$ at a predetermined time interval $K_{ILON}$.

Figure 12:
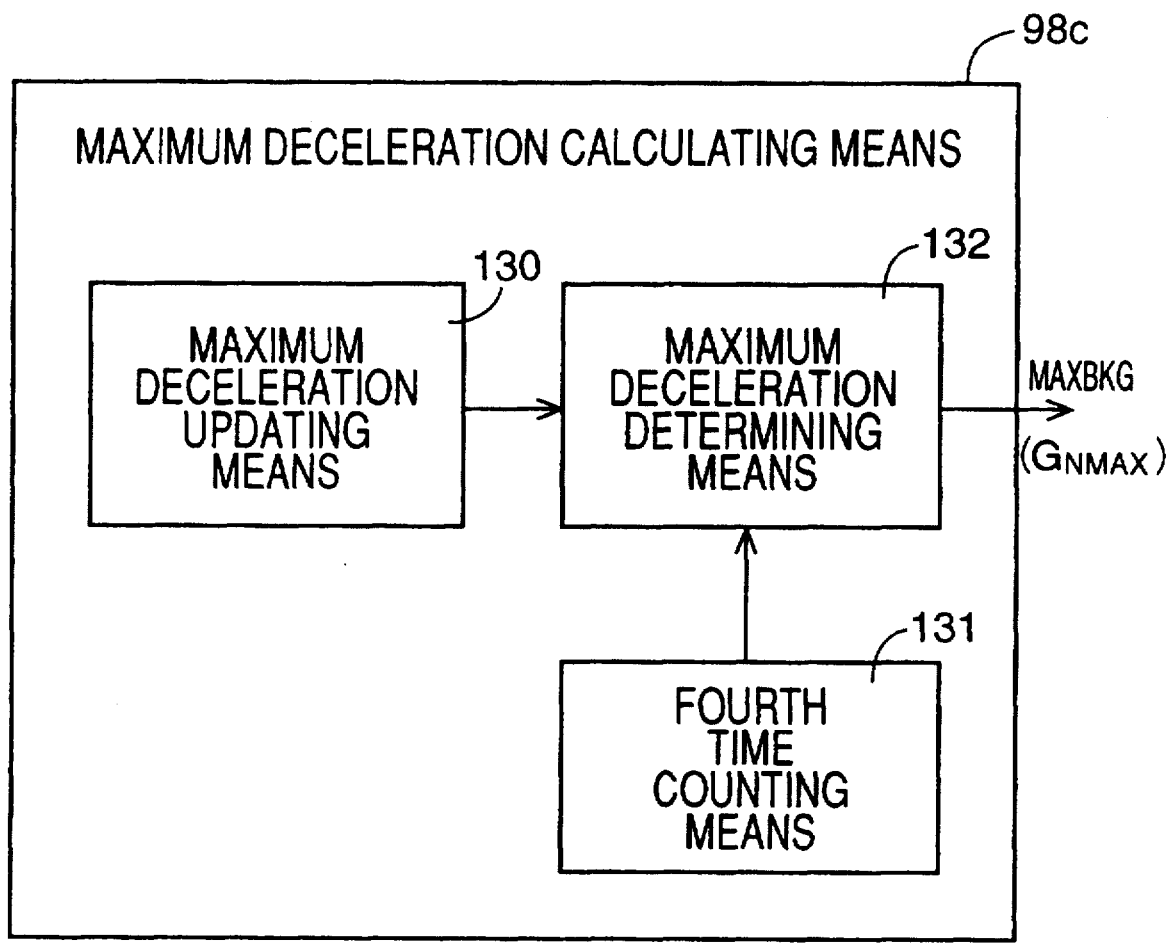
FIG. 12 is a view showing maximum deceleration calculating means of the drive mode estimating portion of FIG. 7.

As shown in FIG. 12, the maximum deceleration calculating means 98c of the preliminary processing means 98 incorporates maximum deceleration updating means 130, fourth time counting means 131, and maximum deceleration determining means 132. The maximum deceleration updating means 130 is adapted to update the stored negative value of the longitudinal acceleration NOGBW of the vehicle during braking of the vehicle. The fourth time counting means 131 is adapted to detect a passage of a predetermined time $K_{BKCON}$ during braking of the vehicle. The maximum deceleration determining means 132 is adapted to determine the negative value of the longitudinal acceleration NOGBW updated by the updating means 130, as a maximum braking deceleration MAXBKG (i.e., $G_{NMAX}$), if the negative value of the longitudinal acceleration NOGBW is smaller than a predetermined threshold $K_{SPBKG}$. If the negative value of the longitudinal acceleration NOGBW subsequently obtained is equal to the maximum braking acceleration MAXBKG or is not larger by more than a predetermined value $K_{BKGYS}$ than the maximum braking acceleration MAXBKG, the maximum deceleration determining means 132 determines, as the maximum braking deceleration MAXBKG, the negative value of the longitudinal acceleration NOGBW which is smaller than the threshold $K_{SPBKG}$ and which was initially determined as the maximum braking deceleration MAXBKG. This determination is repeatedly effected at the predetermined time interval $K_{BKCON}$ measured by the fourth time counting means 131.

Figure 13:
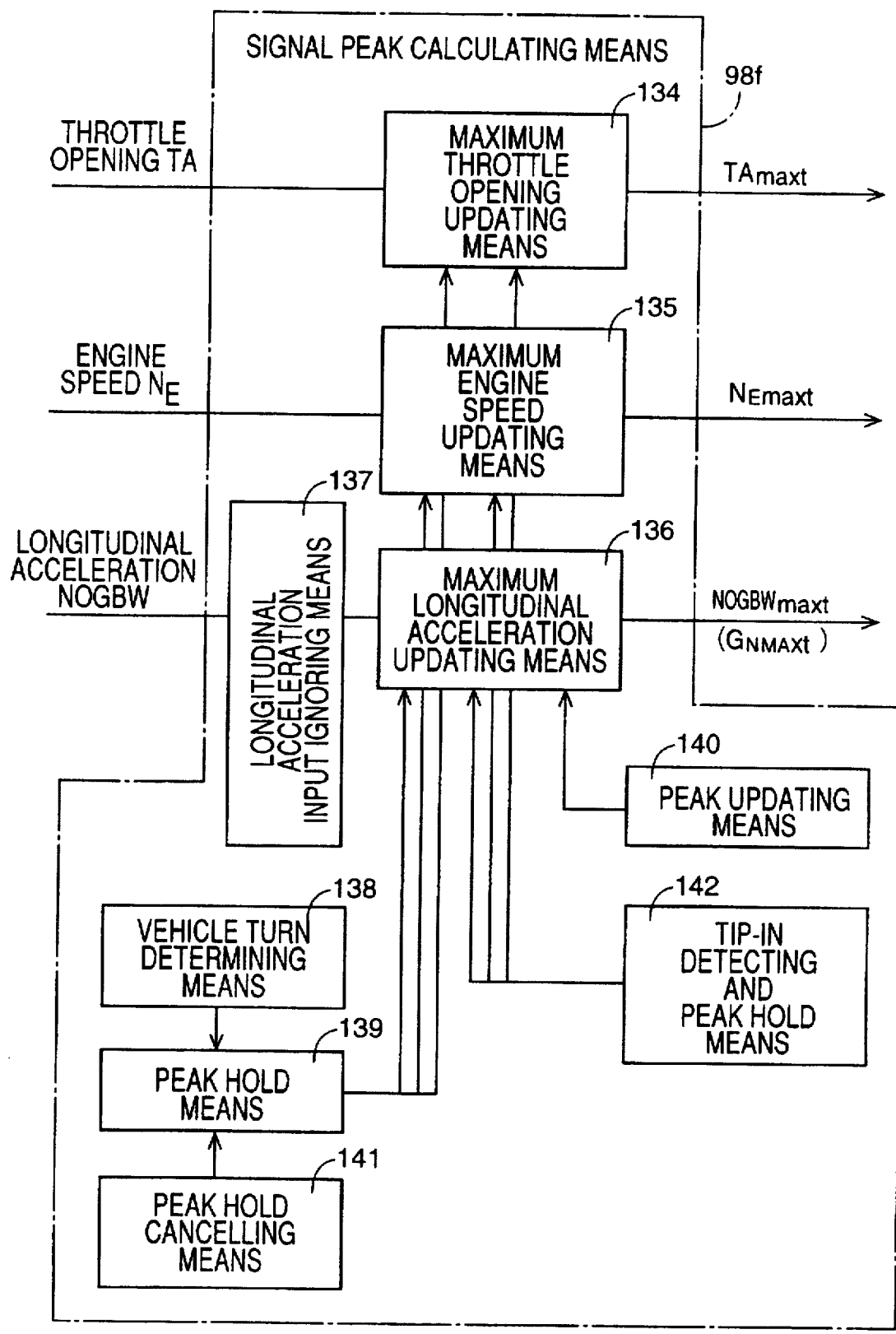
FIG. 13 is a view showing signal peak calculating means of the drive mode estimating portion of FIG. 7.

As described above, the signal peak calculating means 98f of the preliminary processing means 98 periodically calculates the peak values of the input signals of the sensors at a predetermined time interval, for example, about three seconds. As shown in FIG. 13, this signal peak calculating means 98f incorporates maximum throttle opening updating means 134, maximum engine speed updating means 135, maximum longitudinal acceleration updating means 136, longitudinal acceleration ignoring means 137, vehicle turn determining means 138, peak hold means 139, peak updating means 140, peak hold cancelling means 141, and tip-in detecting and peak hold means 142.

The maximum throttle opening updating means 134 is adapted to update the maximum value $TA_{MAXt}$ of the throttle opening angle TA such that the already stored value $TA_{MAXt}$ and the newly obtained value $TA_{MAXt}$ are compared with each other, so that the already stored value $TA_{MAXt}$ is replaced by the newly obtained value if the newly obtained value is larger than the already stored value. The maximum engine speed updating means 135 is adapted to update the maximum value $N_{EMAXt}$ of the engine speed $N_E$ such that the already stored value $N_{EMAXt}$ and the newly obtained value $N_{EMAXt}$ are compared with each other, so that the already stored value $N_{EMAXt}$ is replaced by the newly obtained value if the newly obtained value is larger than the already stored value. The maximum longitudinal acceleration updating means 136 is adapted to update the maximum value $NOGBW_{MAXt}$ of the longitudinal acceleration NOGBW such that the already stored value $NOGBW_{MAXt}$ and the newly obtained value $NOGBW_{MAXt}$ are compared with each other, so that the already stored value $NOGBW_{MAXt}$ is replaced by the newly obtained value if the newly obtained value is larger than the already stored value. The thus updated maximum throttle opening angle $TA_{MAXt}$, maximum engine speed $N_{EMAXt}$ and maximum longitudinal acceleration $NOGBW_{MAXt}$ are sent to the neural network NN at a predetermined time interval.

The longitudinal acceleration input ignoring means 137 is adapted to ignore an input of the longitudinal acceleration NOGBW into the signal peak calculating means 98f, during a period of predetermined shifting actions of the automatic transmission 14, such as shift-up actions and a shift-down action from the fourth-speed position "O/D" to the third-speed position "3rd" during downhill running of the vehicle. These shifting actions of the automatic transmission 14 are considered to have no close relationship with the vehicle drive mode desired by the vehicle operator. Accordingly, the longitudinal acceleration NOGBW during the period of such specific shifting actions is ignored by the ignoring means 137 and is not fed to the neural network NN, whereby the accuracy or reliability of estimation of the operator's desired vehicle drive mode is improved.

The vehicle turn determining means 138 is adapted to determines that the vehicle is turning, when the releasing speed of the accelerator pedal 58 is higher than a predetermined threshold $K_{DTAMK}$ or when the vehicle deceleration $G_N$ during braking of the vehicle is higher than a predetermined threshold $K_{SPBKG}$, while the vehicle is running in the SPORTY DRIVE mode, except where the accelerator pedal 58 is in the "tip-in" action (abrupt depression and immediate releasing of the pedal). This vehicle turn determining means 138 makes it possible to detect turning or cornering run of the vehicle along a curve, or running of the vehicle immediately before the turning or cornering, without an exclusive sensor such as a steering angle sensor.

The peak hold means 139 is operated if the SPORTY drive mode is selected by the drive mode selecting means 100 and if the vehicle turning is detected by the vehicle turn determining means 138. The peak hold means 139, when operated, holds the maximum throttle opening angle $TA_{MAXr}$, maximum engine speed $N_{EMAXt}$ and maximum longitudinal acceleration $NOGBW_{MAXr}$, that is, inhibits the operations of the maximum throttle opening updating means 134, maximum engine speed updating means 135 and maximum longitudinal acceleration updating means 136. Thus, the above-indicated maximum values are not updated during vehicle turning or vehicle running immediately before the turning while the SPORTY drive mode is selected. In this respect, it is noted that if the above-indicated maximum values were updated immediately before or during turning of the vehicle in the SPORTY drive mode, the ECONOMY drive mode might be selected even though the vehicle operator continues to drive the vehicle in the SPORTY drive mode. Thus, the peak hold means 139 is effective to improve the reliability of estimation of the vehicle drive mode by the drive mode estimating means 100.

The peak updating means 140 is adapted to permit the maximum throttle opening updating means 134, maximum engine speed updating means 135 and maximum longitudinal acceleration updating means 136 to update the maximum throttle opening angle $TA_{MAXr}$, maximum engine speed $N_{EMAXt}$ and maximum longitudinal acceleration $NOGBW_{MAXr}$ even when the peak hold means 139 is operated, if the newly obtained maximum values are larger than the present values which have been held by the peak hold means 139. The peak updating means 140 permits updating of the drive mode indicating variables as frequently as possible, so that the neural network NN receives the drive mode indicating variables which reflect the operator's desired vehicle drive mode with high accuracy. The peak hold cancelling means 141 is adapted to cancel the inhibition of the operations of the updating means 134, 135, 136 by the peak hold means 139, if the accelerator pedal 58 is depressed again.

The tip-in detecting and peak hold means 142 is adapted to detect the "tip-in" action (abrupt depression and immediate releasing in a short time) of the accelerator pedal 58, and inhibit the operation of at least one of the maximum throttle opening updating means 134, maximum engine speed updating means 135 and maximum longitudinal acceleration updating means 136, to hold at least one of the maximum values $TA_{MAXr}$, $N_{EMAXr}$, $NOGBW_{MAXr}$. It is noted that the "tip-in" action of the accelerator pedal 58 usually takes place for some reasons related to the road surface condition, and does not reflect the vehicle operator's desired drive mode. Therefore, the drive mode indicating variables during the tip-in action are excluded from the effective variables used by the neural network NN, to improve the accuracy of estimation of the operator's desired drive mode.

Referring next to the flow chart of FIG. 14, there will be described a drive mode estimation control routine executed by the electronic control device 42. This routine is initiated with step SM1 in which the RAM 62 is initialized. More specifically described, step SM1 is provided to clear various memory areas or registers, counters and timers, reset an ESTIMATION PERMIT flag $X_{NNCAL}$ to "0" and set a VEHICLE STOP flag $X_{STOP}$ to "1". Step SM1 is followed by step SM2 to read in the output signals of the various sensors described above. It will be understood that a portion of the control device 42 assigned to implement step SM2 constitutes the signal reading means 96.

Then, the control flow goes to step SM3 in which preliminary processing sub-routines are executed. It will be understood that a portion of the control device 42 assigned to implement step SM3 constitutes the preliminary processing means 98, which functions as means for calculating the drive mode indicating variables. The preliminary processing sub-routines are executed to calculate the drive mode indicating variables which change with various events or operations caused by vehicle operator's manipulation of the vehicle. As described above, the drive mode indicating variables include: starting throttle opening angle $TA_{ST}$; maximum throttle opening angle increase rate $A_{CCMAX}$ after vehicle starting; maximum vehicle deceleration $G_{NMAX}$ during vehicle braking; coasting run time $T_{COAST}$; steady run time $T_{VCONST}$ of the vehicle; and peak signal values such as maximum throttle opening angle $TA_{MAXr}$, maximum vehicle speed $V_{MAXr}$; maximum engine speed $N_{EMAXr}$ and maximum longitudinal vehicle acceleration $NOGBW$ ($G_{NMAXt}$).

It is noted that the drive mode estimation by the drive mode estimating means 100 is not effected when the shift lever 78 is placed in the parking position "P" or reverse position "R".

The control flow then goes to step SM4 to determine whether the ESTIMATION PERMIT flag $X_{NNCAL}$ is set at "1". If a negative decision (NO) is obtained in step SM4, the control flow goes back to step SM2, and steps SM2–SM4 are repeatedly implemented until an affirmative decision (YES) is obtained in step SM4. If the affirmative decision is obtained in step SM4, the control flow goes to step SM5 in which a drive mode estimating sub-routine is executed. It will be understood that a portion of the control device 42 assigned to implement step SM5 constitutes the drive mode estimating means 100. The ESTIMATION PERMIT flag $X_{NNCAL}$ is set to "1" each time a drive mode indicating variable is calculated by the appropriate preliminary processing sub-routine in step SM3, or at a predetermined time interval during measurement or determination of the coasting run time $T_{COAST}$, steady run time $T_{VCONST}$ or maximum deceleration $G_{NNMAXt}$ during vehicle braking. Each time the ESTIMATION PERMIT flag $X_{NNCAL}$ is set to "1", step SM5 is implemented to execute the drive mode estimating sub-routine.

In the drive mode estimating sub-routine in step SM5, the neural network NN of the drive mode estimating means 100 produces an output $NN_{OUT}$ which is determined by the received drive mode indicating variables. The flags $X_{SPORT}$, $X_{NORM}$ and $X_{ECO}$ are set to "1" or reset to "0", depending upon the output $NN_{OUT}$, whereby one of the SPORTY, NORMAL and ECONOMY drive mode is selected as the operator's desired drive mode. As described above, the drive mode indicating variables include: starting throttle opening angle $TA_{ST}$; maximum throttle opening angle increase rate $A_{CCMAX}$ after vehicle starting; maximum vehicle deceleration $G_{NMAX}$ during vehicle braking; coasting run time $T_{COAST}$; steady run time $T_{VCONST}$ of the vehicle; and peak signal values such as maximum throttle opening angle $TA_{MAXr}$ maximum vehicle speed $V_{MAXr}$ maximum engine speed $N_{EMAXt}$ and maximum longitudinal vehicle acceleration NOGBW ($G_{NMAXt}$).

Step SM5 is followed by step SM6 in which the ESTIMATION PERMIT flag $X_{NNCAL}$ is reset to "0".

Referring to the flow charts of FIGS. 15–24, there will be described the various preliminary processing sub-routines.

Figure 15:
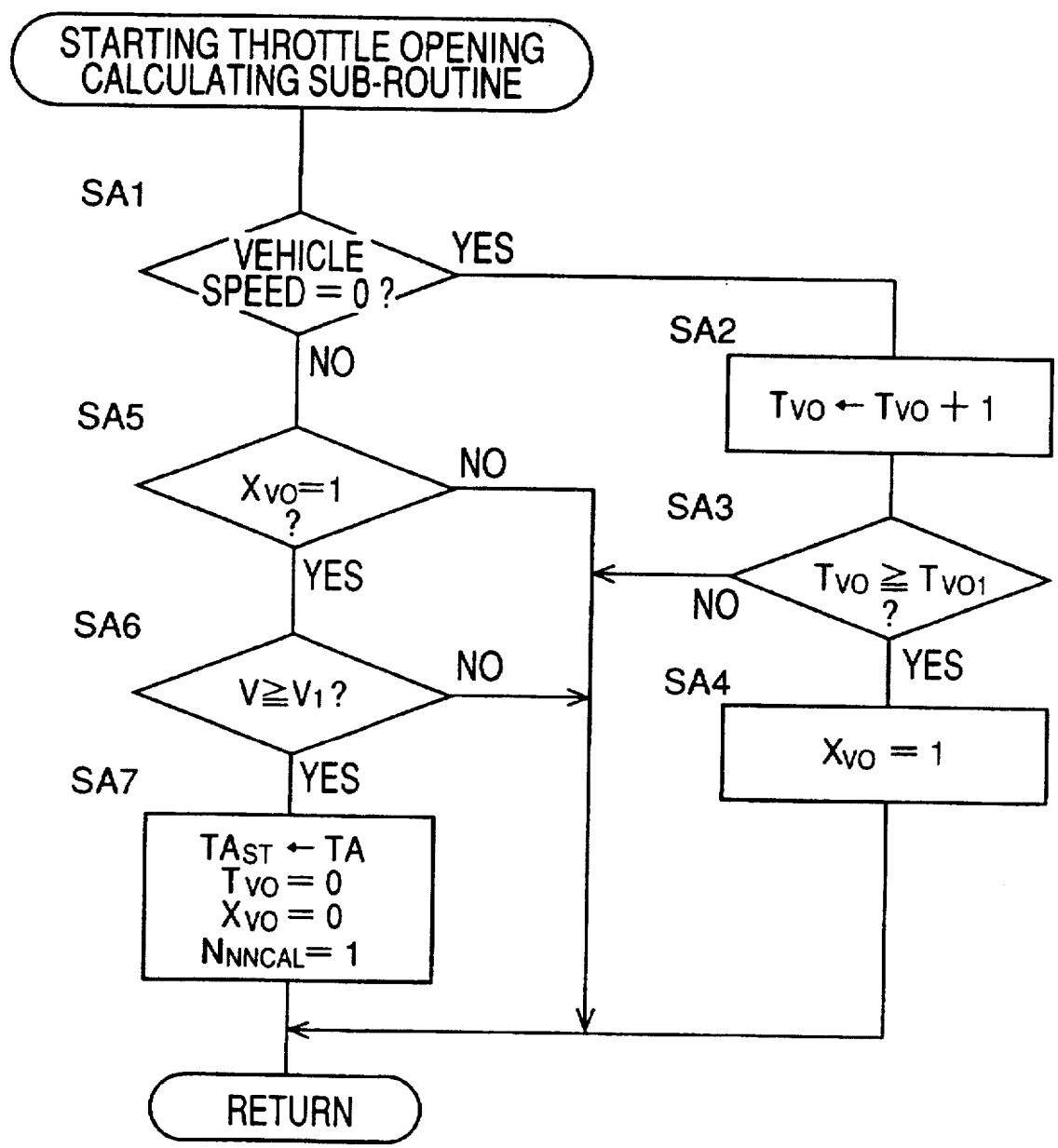
FIG. 15 is a flow chart illustrating a starting throttle opening calculating sub-routine executed in step SM3 of the drive mode estimating routine of FIG. 14.

The starting output calculating means 98a calculates the throttle opening angle $TA_{ST}$ upon or immediately after staring of the vehicle, according to a starting throttle opening calculating sub-routine illustrated in the flow chart of FIG. 15. The maximum output increase rate calculating means 98b calculates the maximum throttle opening increase rate $A_{CCMAX}$ upon or during depression of the accelerator pedal 58, according to a maximum throttle opening increase rate calculating sub-routine illustrated in the flow chart of FIG. 16. The steady run time calculating means 98e calculates the steady run time $T_{VCONST}$ of the vehicle, according to a steady run time calculating sub-routine illustrated in the flow chart of FIG. 17. The coasting run time calculating means 98d calculates the coasting run time $T_{COAST}$ of the vehicle, according to a coasting run time calculating sub-routine illustrated in the flow chart of FIG. 18. The maximum deceleration calculating means 98c calculates the maximum deceleration $G_{NMAX}$ during vehicle braking, according to a maximum deceleration calculating sub-routine illustrated in the flow chart of FIG. 19. The signal peak calculating means 98f calculates the peak values of the input signals such as $TA_{MAXt}$, $V_{MAXt}$, $N_{EMAXt}$, $NOGBW_{MAXt}$ ($G_{NMAXt}$), according to a signal peak calculating sub-routine illustrated in the flow chart of FIGS. 20–24. The maximum vehicle speed calculating means 98g calculates the maximum vehicle speed $V_{MAX}$, according to a maximum vehicle speed calculating sub-routine illustrated in the flow chart of FIG. 24.

The starting throttle opening calculating sub-routine of FIG. 15 for calculating the starting throttle opening angle $TA_{ST}$ is initiated with step SA1 to determine whether the vehicle speed V is zero, that is, whether the vehicle is stationary or stopped. If the vehicle is stopped, namely, if an affirmative decision (YES) is obtained in step SA1, the control flow goes to step SA2 in which the content of a timer $T_{V0}$ is incremented. Step SA2 is followed by step SA3 corresponding to the vehicle stop determining means 110 of FIG. 8, to determine whether the content of the timer $T_{V0}$ is equal to or larger than a predetermined threshold $T_{V01}$. The threshold $T_{V01}$ is selected so as to determine whether the vehicle is brought into a complete stop. For example, the threshold $T_{V01}$ is selected to be about 0.2 second. If a negative decision (NO) is obtained in step SA3, one cycle of execution of the present sub-routine is terminated. If an affirmative decision (YES) is obtained in step SA3, the control flow goes to step SA4 to set a STOP flag $X_{V0}$ to "1". When the STOP flag $X_{V0}$ is set at "1", it means that the vehicle has been stopped.

When the vehicle is running, a negative decision (NO) is obtained in step SA1, and the control flow goes to step SA5 to determine whether the STOP flag $X_{V0}$ is set at "1". Immediately after the vehicle has started running, the STOP flag $X_{V0}$ is set at "1", and the affirmative decision (YES) is obtained in step SA5, and the control flow goes to step SA6 corresponding to the vehicle speed rise detecting means 111 OF FIG. 8, to determine whether the vehicle running speed V is equal to or higher than a threshold V1. This threshold V1 is determined to determine whether the vehicle has started. For example, the threshold V1 is selected to be about 10 km/h.

Before the vehicle speed V has been raised to the threshold level V1, a negative decision (NO) is obtained in step SA6. When the vehicle speed V has been raised to the threshold level V1, an affirmative decision (YES) is obtained in step SA6, and the control flow goes to step SA7 corresponding to the desired starting output determining means 112, to determine the currently detected throttle opening angle TA as the starting throttle opening angle $TA_{ST}$ reset the STOP timer $T_{V0}$ and the STOP flag $X_{V0}$ to "0", and set the ESTIMATION PERMIT flag $X_{NNCAL}$ to "1".

Figure 16:
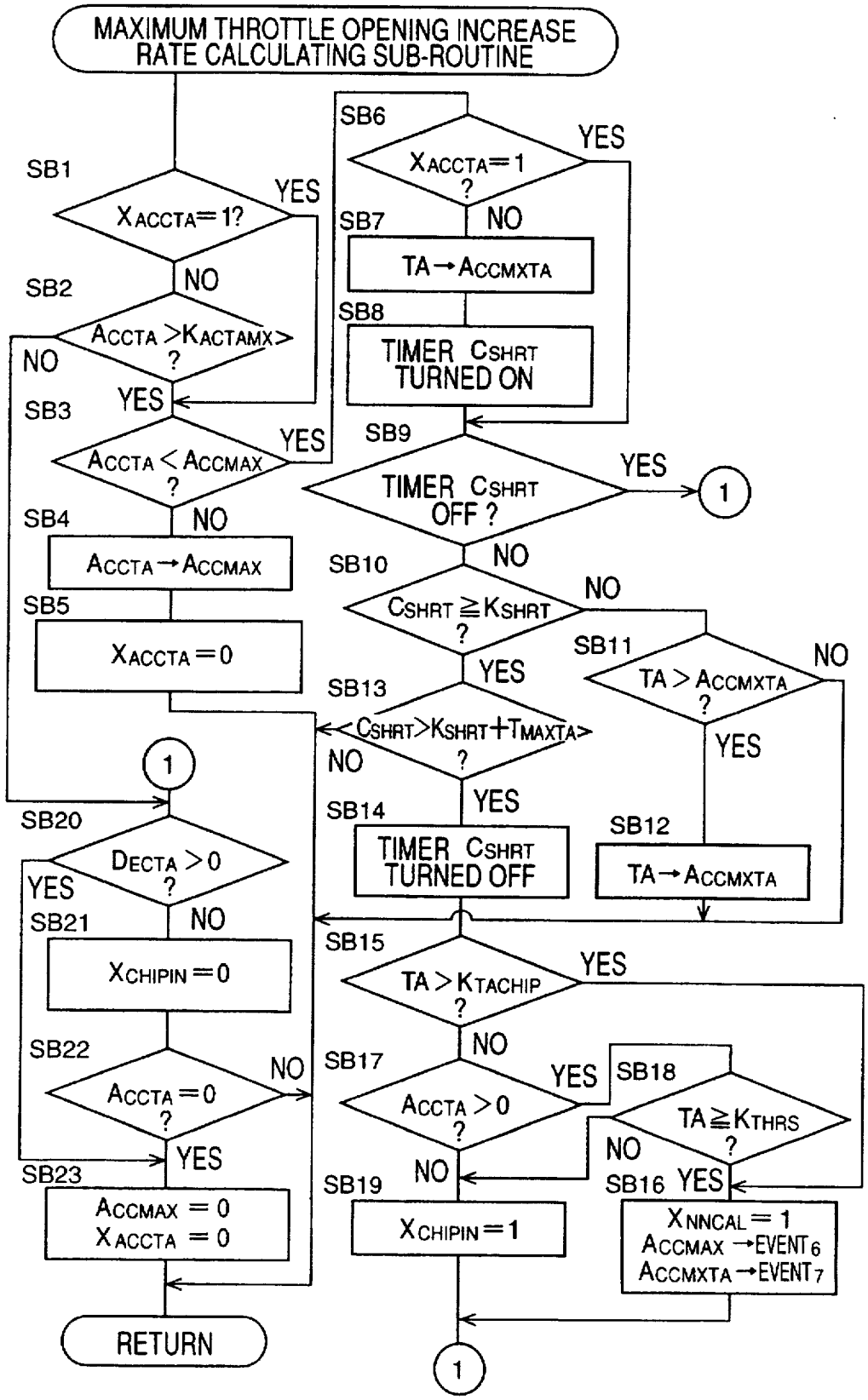
FIG. 16 is a flow chart illustrating a maximum throttle opening increase rate calculating sub-routine executed in step SM4 of the routine of FIG. 14.

The maximum throttle opening increase rate calculating sub-routine of FIG. 16 for calculating the maximum throttle opening angle increase rate $A_{CCMAX}$ during depression of the accelerator pedal 58 is initiated with step SB1 to determine whether an ACCELERATOR PEDAL SPEED flag $X_{ACCTA}$ is set at "1". This flag $X_{ACCTA}$, when it is set at "1", indicates that the operating or depressing speed of the accelerator pedal 58 is constant or decreasing. Initially, a negative decision (NO) is obtained in step SB1, and the control flow goes to step SB2 to determine whether a rate of increase ACCTA (%) of the throttle opening angle TA exceeds a predetermined threshold $K_{ACTAMX}$. The increase rate ACCTA may be represented by a difference of two values of the throttle opening angle TA which are successively read at a predetermined cycle time, for example, several tens of seconds. The threshold $K_{ACTAMX}$ is selected so as to ignore a slow depression of the accelerator pedal 58. For example, the threshold $K_{ACTAMX}$ is selected to be about 6%.

If a negative decision (NO) is obtained in step SB2, the control flow goes to step SB20. If an affirmative decision (YES) is obtained in step SB3, the control flow goes to step SB3 to determine whether the increase rate ACCTA of the throttle opening angle TA becomes lower than the maximum throttle opening angle increase rate $A_{CCMAX}$ currently stored in the RAM 62. If a negative decision (NO) is obtained in step SB3, that is, if the increase rate ACCTA is equal to or higher than the maximum value $A_{CCMAX}$, the control flow goes to step SB4 corresponding to the maximum throttle opening increase rate updating means 114 of FIG. 9, to update the maximum increase rate $A_{CCMAX}$, that is, determine the present increase rate ACCTA as the maximum throttle opening angle increase rate $A_{CCMAX}$. Then, step SB5 is implemented to reset the ACCELERATOR PEDAL SPEED flag $X_{ACCTA}$ to "0", and one cycle of execution of the present sub-routine is terminated.

If the operating speed of the accelerator pedal 58 is reduced after the maximum increase rate $A_{CCTA}$ of the throttle opening angle TA increased as a result of depression of the accelerator pedal 58 is updated and stored, an affirmative decision (YES) is obtained in step SB6, and the control flow goes to step SB6 and the following steps, to ignore the "tip-in" action (abrupt depression and immediate releasing) of the accelerator pedal 58, and determine the maximum throttle opening angle increase rate $A_{CCMAX}$ and the corresponding throttle opening angle $A_{CCMXTA}$ which are caused by continuous depression of the accelerator pedal 58 that reflects the operator's desire to accelerate the vehicle. The ESTIMATION PERMIT flag $X_{NNCAL}$ is then set to "1".

That is, the affirmative decision (YES) is obtained in step SB3 when the increase rate ACCTA of the throttle opening angle TA which is read at the predetermined cycle time becomes lower than the presently stored maximum increase rate $A_{CCMAX}$. In this case, therefore, the control flow goes to step SB6 to determine whether the ACCELERATOR PEDAL SPEED flag $X_{ACCTA}$ is set at "1" or not. Initially, a negative decision (NO) is obtained in step SB6, and the control flow goes to step SB7 in which the present throttle opening angle TA is stored as the maximum throttle opening angle $A_{CCMXTA}$ during a decrease in the depressing speed of the accelerator pedal 58. Step SB8 is then implemented to turn on a timer $C_{SHRT}$, and set the ACCELERATOR PEDAL SPEED flag $X_{ACCTA}$ to "1".

Step SB8 is followed by step SB9 to determine whether the timer $C_{SHRT}$ is off. Initially, a negative decision (NO) is obtained in step SB9, and the control flow goes to step SB10 to determine whether the content of the timer $C_{SHRT}$ is equal to or larger than a predetermined threshold $K_{SHRT}$. This threshold $K_{SHRT}$ is selected to determine a time period after the depressing speed of the accelerator pedal 58 has been reduced. For instance, the threshold $K_{SHRT}$ is selected to be about 0.1 second.

Immediately after the depression of the accelerator pedal 58 has been started, a negative decision (NO) is obtained in step SB11, and the control flow goes to step SB7 to determine whether the throttle opening angle TA is larger than the stored throttle opening angle $A_{CCMXTA}$ which was stored in the RAM 62 in step SB7. If a negative decision (NO) is obtained in step SB11, it means that the throttle opening angle TA is decreasing. In this case, one cycle of execution of the sub-routine of FIG. 16 is terminated. If an affirmative decision (YES) is obtained in step SB11, the control flow goes to step SB12 in which the present throttle opening angle TA is stored as the throttle opening angle $A_{CCMXTA}$ which is the throttle opening angle TA during which the depressing speed of the accelerator pedal 58 is decreasing. Thus, the value $A_{CCMAXTA}$ is updated, and one cycle of execution of the sub-routine is terminated.

If an affirmative decision (YES) is obtained in step SB10 with the content of the tier $C_{SHRT}$ being equal to or larger than the threshold $K_{SHRT}$, step SB13 is implemented to determine whether the content of the timer $C_{SHRT}$ is larger than a sum of the threshold $K_{SHRT}$ and a threshold $T_{MAXTA}$. This sum is about 0.2 second, for example. The threshold $T_{MAXTA}$ is selected to determine a suitable point of time at which a determination is made as to whether the "tip-in" action (abrupt depression and immediate releasing in a short time) of the accelerator pedal 58 has taken place. For instance, the threshold $T_{MAXTA}$ is selected to be about 0.1 second. If a negative decision (NO) is obtained in step SB13, one cycle of execution of the present sub-routine of FIG. 16 is terminated. If an affirmative decision (YES) is obtained in step SB13, the control flow goes to step SB14 to stop or turn off the timer $C_{SHRT}$, and step SB15 to determine whether the throttle opening angle TA is larger than a predetermined threshold $K_{TACHIP}$. This threshold $K_{TACHIP}$ is selected to detect the "tip-in" action of the accelerator pedal 58. For instance, the threshold $K_{TACHIP}$ is selected to be about 33%.

The response of the drive mode estimating means 100 or neural network NN to the vehicle operator's manipulation desirably increases with a decrease in the threshold $(K_{SHRT}+T_{MAXTA})$ used in step SB13. However, the reliability or accuracy of detection of the tip-in action of the accelerator pedal 58 decreases with the decrease in the threshold $(K_{SHRT}+T_{MAXTA})$. Accordingly, this threshold is minimized to the extent possible to assure satisfactory accuracy of detection of the tip-in action. This arrangement makes it possible to efficiently obtain the maximum value $A_{CCMAX}$ of the throttle opening angle increase rate $A_{CCTA}$ during depression of the accelerator pedal 58, while assuring high response of the drive mode estimating means 100.

Figure 25:
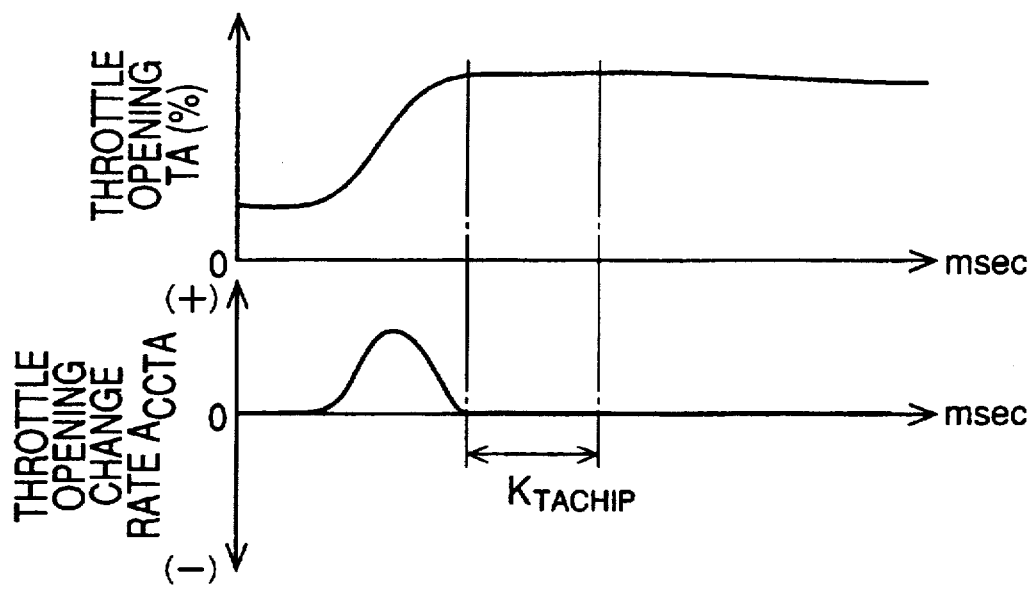
FIG. 25 is a time chart explaining an operation of an accelerator pedal monitored in the sub-routine of FIG. 16, where the pedal operation does not involve a "tip-in" action.
Figure 26:
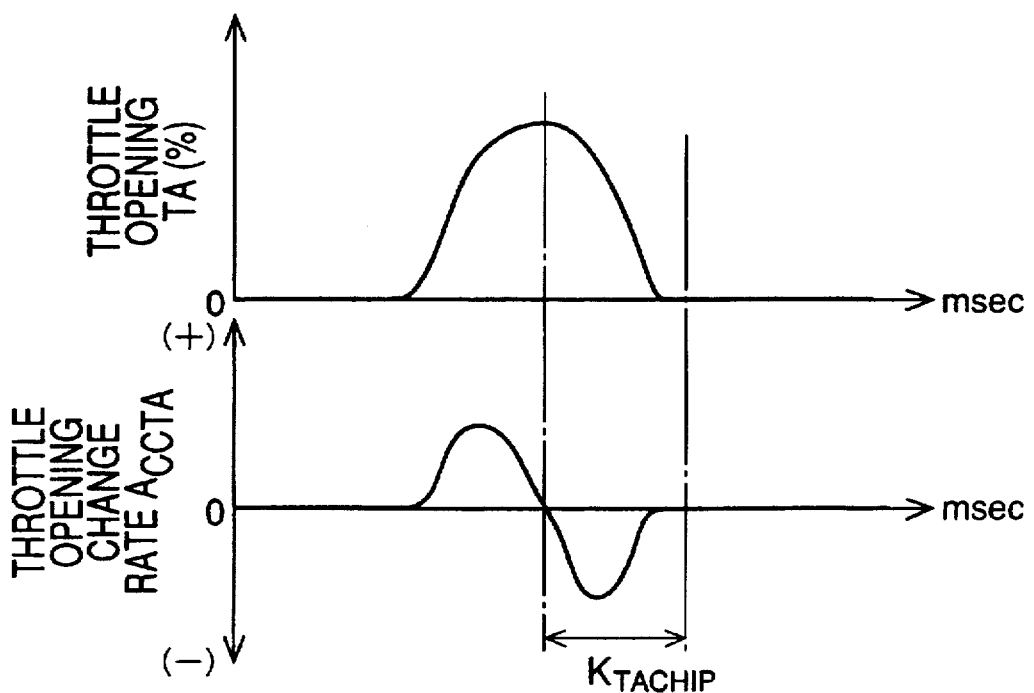
FIG. 26 is a time chart explaining an operation of the accelerator pedal which involves the "tip-in" action.

If an affirmative decision (YES) is obtained in step SB15, it means that the accelerator pedal 58 has been continuously depressed such that the throttle opening angle TA is larger than the threshold $K_{TACHIP}$ (about 33%) even after the predetermined time $(K_{SHRT}+T_{MAXTA}=$ about 0.2 second) has passed after the decrease of the depressing speed of the accelerator pedal 58. That is, the affirmative decision in step SB15 indicates a continuously depressing action of the accelerator pedal 58 as indicated in FIG. 25, and not the so-called "tip-in" action as indicated in FIG. 26. In this case, therefore, the control flow goes to step SB16 in which the ESTIMATION PERMIT flag $X_{NNCAL}$ is set to "1", and the maximum value $A_{CCMAX}$ of the throttle opening angle increase rate $A_{CCTA}$ and the corresponding throttle opening angle $A_{CCMXTA}$ are stored in respective memory areas EVENT6 and EVENT7 from which the neural network NN receives the corresponding input signals. Thus, step SB16 corresponds to the maximum throttle opening angle increase rate determining means 116 and maximum throttle opening angle determining means 117 which are shown in FIG. 9.

If a negative decision (NO) is obtained in step SB15, it means that the throttle opening angle TA is not larger than the threshold $K_{TACHIP}$ (about 33%) even after the predetermined time $(K_{SHRT}+T_{MAXTA}=$ about 0.2 second) has passed after the decrease of the depressing speed of the accelerator pedal 58. In this case, the control flow goes to step SB17 to determine whether the throttle opening angle increase rate $A_{CCTA}$ is a positive value. If an affirmative decision (YES) is obtained in step SB17, the control flow goes to step SB18 to determine whether the throttle opening angle TA is equal to or larger than a threshold $K_{THRS}$. This threshold $K_{THRS}$ is selected to be smaller than the above-indicated threshold $K_{TACHIP}$ (about 33%). For example, the threshold $K_{THRS}$ is selected to be about 20%.

If an affirmative decision (YES) is obtained in step SB18, it means that the depression of the accelerator pedal 58 is not the "tip-in" action, and the control flow goes to the above-indicated step SB16. If a negative decision (NO) is obtained in step SB18, it means that the "tip-in" action of the accelerator pedal 58 has occurred, as shown in FIG. 26 by way of example. In this case, the control flow goes to step SB19 in which a TIP-IN flag $X_{CHIPIN}$ indicative of the tip-in action is set to "1". The control flow then goes to step SB20 and the following steps. If the throttle opening angle increase rate $A_{CCTA}$ is not a positive value, a negative decision (NO) is obtained in step SB17, and the control flow goes to step SB19, which is followed by step SB20 and the following steps. If the timer $C_{SHRT}$ is off after the depression of the accelerator pedal 58, an affirmative decision (YES) is obtained in step SB9, and the control flow goes to step SB20 and the following steps.

The present embodiment is adapted to detect the tip-in action (abrupt depression and immediate releasing in a short time) of the accelerator pedal 58, in the two following cases: 1) The throttle opening angle TA is smaller than the threshold $K_{TACHIP}$ (about 33%) after the predetermined time $(K_{SHRT}+T_{MAXTA}=0.2$ second) has passed after the decrease of the depressing speed of the accelerator pedal 58, and the throttle valve opening angle increase rate $A_{CCTA}$ is zero or negative; and 2) The throttle opening angle TA is smaller than the threshold $K_{THRS}$ even when the throttle opening angle increase rate $A_{CCTA}$ is positive. It will therefore be understood that steps SB15, SB17, SB18, SB19 correspond to the tip-in detecting means 115 shown in FIG. 9.

Step SB20 is provided to determine whether a decrease rate $D_{ECTA}$ of the throttle opening angle TA is a positive value. If an affirmative decision (YES) is obtained in step SB20, it means that the accelerator pedal is being released. In this case, the control flow goes to step SB23 in which the maximum value $A_{CCMAX}$ of the throttle opening angle increase rate $A_{CCTA}$ and the ACCELERATOR PEDAL SPEED flag $X_{ACCTA}$ are reset to zero, and one cycle of execution of the present sub-routine is terminated.

If a negative decision (NO) is obtained in step SB20, it means that the accelerator pedal 58 is not being released. In this case, the control flow goes to step SB21 in which the TIP-IN flag $X_{CHIPIN}$ indicative of the tip-in action of the accelerator pedal 58 is reset to "0". Then, step SB22 is implemented to determine whether the ACCELERATOR PEDAL SPEED flag $X_{ACCTA}$ is set at "0". If a negative decision (NO) is obtained in step SB22, one cycle of execution of the sub-routine is terminated. If an affirmative decision (YES) is obtained in step SB22, one cycle of execution of the sub-routine is terminated after step SB23 is implemented.

Figure 17:
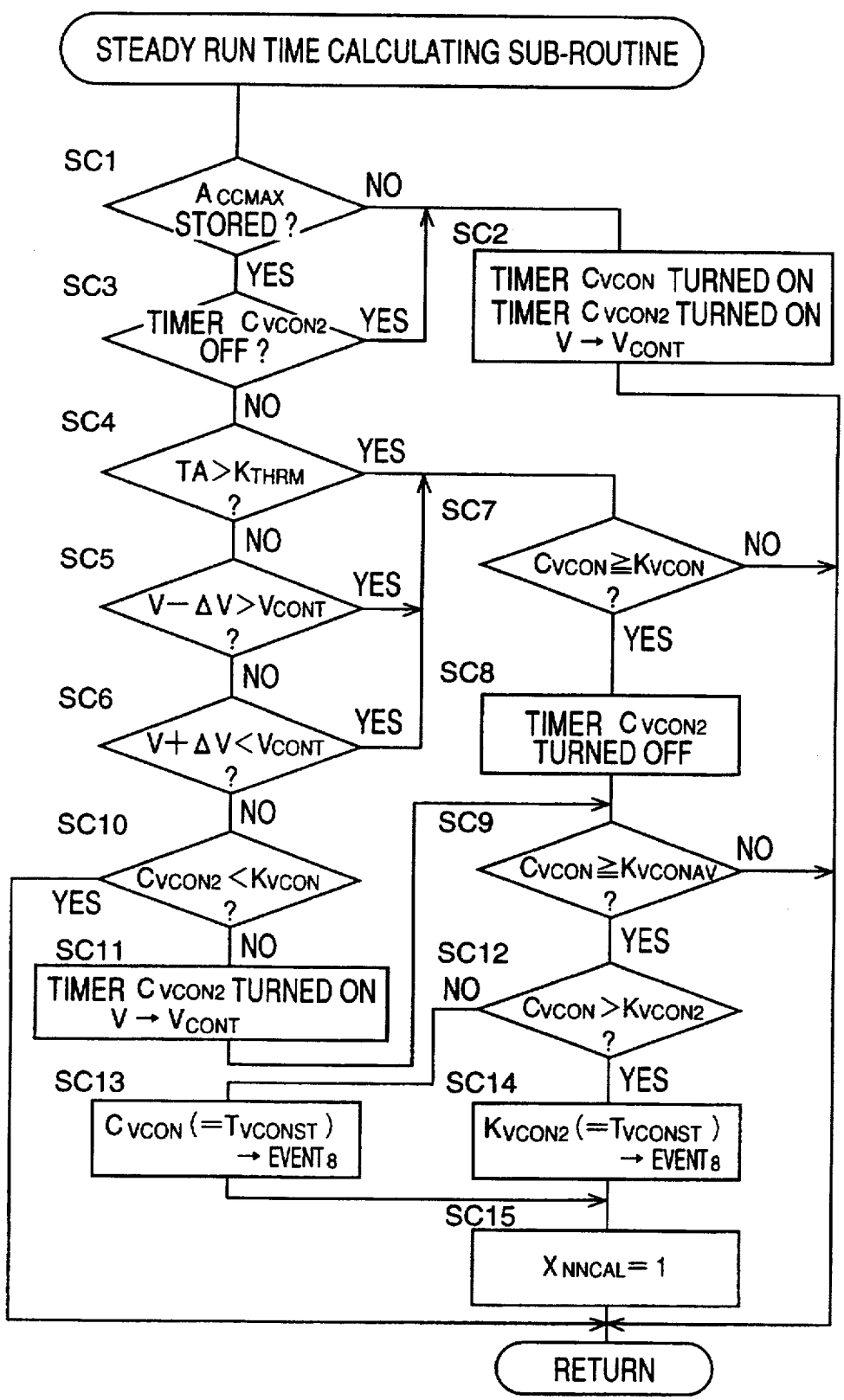
FIG. 17 is a flow chart illustrating a steady run time calculating sub-routine executed in step SM3 of the routine of FIG. 14.

The steady run time calculating sub-routine of FIG. 17 for calculating the steady run time $T_{VCONST}$ is initiated with step SC1 to determine whether the maximum throttle opening angle increase rate $A_{CCMAX}$ was stored in the above-indicated step SB16. If a negative decision (NO) is obtained in step SC1, the control flow goes to step SC2 in which a STEADY RUN timer $C_{VCON}$ and a START timer $C_{VCON2}$ are turned on, and the presently detected vehicle speed V is stored as a STEADY RUN START vehicle speed $V_{CONT}$. Thus, one cycle of execution of the sub-routine of FIG. 17 is terminated. Steps SC1 and SC2 are repeatedly implemented in respective cycles of execution of the present sub-routine, so that the timers $C_{VCON}$ and $C_{VCON2}$ are alternately turned on and off, and the STEADY RUN START vehicle speed $V_{CONT}$ is alternately set and reset (stored and cleared), until an affirmative decision (YES) is obtained in step SC1.

If an affirmative decision (YES) is obtained in step SC1, that is, if the maximum throttle opening angle increase rate $A_{CCMAX}$ is already stored, the control flow goes to step SC3 to determine whether the START timer $C_{VCON2}$ is off. If an affirmative decision (YES) is obtained in step SC3, the above-indicated step SC2 is again implemented. If a negative decision (NO) is obtained in step SC3, the control flow goes to steps SC4, SC5 and SC6 corresponding to the steady run determining means 120 of FIG. 10, to detect a steady run of the vehicle. Step SC4 is provided to determine whether the throttle opening angle TA is larger than a predetermined threshold $K_{THRM}$. This threshold $K_{THRM}$ is selected to determine whether the vehicle is running under a comparatively high load. For instance, the threshold $K_{THRM}$ is selected to be about 30%. Step SC5 is provided to determine whether a difference (V−ΔV) exceeds the STEADY RUN START vehicle speed $V_{CONT}$. ΔV is a predetermined reference value. Step SC6 is provided to determine whether a sum (V+ΔV) of the vehicle speed V and the reference value ΔV becomes lower than the STEADY RUN START vehicle speed $V_{CONT}$. The reference value ΔV is selected to determine an amount of variation of the vehicle speed V. For instance, the reference value ΔV is selected to be about 1 km/h.

If an affirmative decision (YES) is obtained in any one of the above steps SC4, SC5 and SC6, it indicates that the vehicle is running under a comparatively high load, or with a comparatively large variation in the running speed V. That is, the affirmative decision in step SC4, SC5 or SC6 indicates that the vehicle is not running in a steady state. In this case, the control flow goes to step SC7 determine whether the content of the STEADY RUN timer $C_{VCON}$ is equal to or larger than a predetermined threshold $K_{VCON}$, which is about 1 second. If a negative decision (NO) is obtained in step SC7, it means that running of the vehicle under a comparatively high load or at a varying speed V has just started. In this case, one cycle of execution of the present sub-routine of FIG. 17 is terminated. If an affirmative decision (YES) is obtained in step SC7, the control flow goes to step SC8 to turn off the START timer $C_{VCON2}$, and then goes to step SC9 corresponding to the first time counting means 119, to determine whether the content of the STEADY RUN timer $C_{VCON}$ is equal to or larger than a predetermined threshold $K_{VCONAV}$. This threshold time period $K_{VCONAV}$ is selected to determine whether the vehicle has been running in a steady state at a substantially constant speed V. For example, the threshold $K_{VCONAV}$ is selected to be about 3–4 seconds. A negative decision (NO) is obtained in step SC9 when the vehicle is running under a comparatively high load or at a varying speed V. In this case, one cycle of execution of the present sub-routine is terminated. As long as the vehicle is running under a comparatively high load or at a varying speed V, the affirmative decision (YES) is obtained in step SC3, and steps SC1 and SC2 are repeatedly implemented.

When running of the vehicle in a steady state under a comparatively low load has started, a negative decision (NO) is obtained in all of the above-indicated steps SC4, SC5 and SC6, and the control flow goes to step SC10 to determine whether the content of the START timer $C_{VCON2}$ is still smaller than the threshold $K_{VCON}$. This threshold $K_{VCON}$, which is about 1 second as described above, is to determine whether the negative decision (NO) has been obtained in all of steps SC4, SC5 and SC6 for a time period which is long enough to turn on the START timer $C_{CVON2}$.

If an affirmative decision (YES) is obtained in step SC10, it indicates that the negative decision (NO) has not been obtain in steps SC4, SC5 and SC6 for more than 1 second. In this case, one cycle of execution of the present sub-routine is terminated. If a negative decision (NO) is obtained in step SC10, it indicates a high possibility that the vehicle has been running in a steady state under a comparatively low load. In this case, the control flow goes to step SC11 in which the START timer $C_{VCON2}$ is turned on again, and the presently detected vehicle speed V is stored as the STEADY RUN vehicle speed $V_{CONT}$, which is subsequently used to determine vehicle running in a steady state under a comparatively low load.

Then, the control flow goes to step SC9 to determine whether the content of the STEADY RUN timer $C_{VCON}$ is equal to or larger than the threshold $K_{VCONAV}$. If a negative decision (NO) is obtained in step SC9, it indicates that the time which has passed after the determination of the vehicle running in a steady state under a comparatively low load does not exceed the threshold $K_{VCONAV}$, which is about 3–4 seconds. IN this case, one cycle of execution of the present sub-routine is terminated.

If an affirmative decision (YES) is obtained in step SC9, the control flow goes to step SC12 to determine whether the content of the STEADY RUN timer $C_{VCON}$ is larger than a predetermined threshold $K_{VCON2}$. This threshold $K_{VCON2}$ is an upper limit of the content of the STEADY RUN timer $C_{VCON}$, and is selected to be about 16 seconds, for example. If a negative decision (NO) is obtained in step SC12, the control flow goes to step SC13 in which the content of the STEADY RUN timer $C_{VCON}$ which indicates the steady run time $T_{VCONST}$ of the vehicle is stored in a memory area EVENT8. If an affirmative decision (YES) is obtained in step SC12, the control flow goes to step SC14 in which the upper limit $K_{VCON2}$ of the steady run time $T_{VCONST}$ is stored in the above-indicated memory area EVENT8. Then, step SC15 is implemented to set the ESTIMATION PERMIT flag $X_{NNCAL}$ to "1", and one cycle of execution of the present sub-routine is terminated.

The steady run time calculating means 98e executes the steady run time calculating sub-routine illustrated in the flow chart of FIG. 17, as described above. It will be understood that steps SC4 through SC6 correspond to the steady run time determining means 120 of FIG. 10 which determines that the vehicle is running in a steady state, when the predetermined time $K_{VCONAV}$ has passed, namely, when the affirmative decision (YES) is obtained in step SC9 which corresponds to the first time counting means 119. It will also be understood that steps SC11 and SC12 corresponds to the steady run time determining means 122 of FIG. 10 which is adapted to determine the steady run time $T_{VCONST}$ not only at the initial determination of a steady run of the vehicle but also at the predetermined time interval, that is, each time the time $K_{VCON}$ has been measured in step SC10 corresponding to the second time counting means 121. This arrangement is effective to reduce the delay in estimating the vehicle operator's desired drive mode, regarding the steady running state of the vehicle.

In the present arrangement, the affirmative decision (YES) is obtained in step SC7 and in step SC9 following step SC8, when the predetermined time $K_{VCON}$ has passed after the initial determination of the steady running state of the vehicle. Therefore, not only the steady run time $T_{VCONST}$ is determined, but also the ESTIMATION PERMIT flag $X_{NNCAL}$ is set to "1", so that the estimation of the drive mode is permitted once even after the initial determination of the steady running state.

Figure 18:
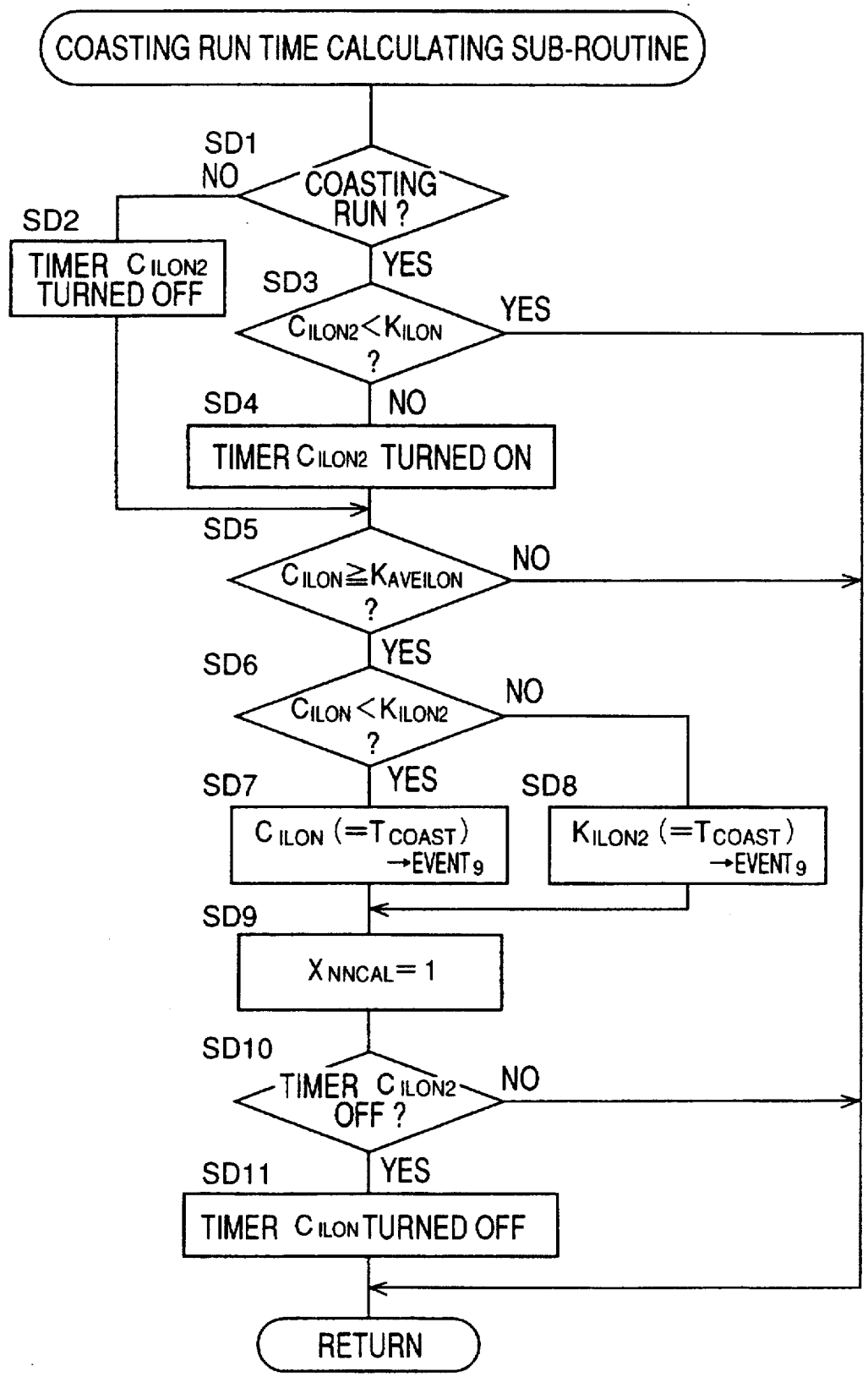
FIG. 18 is a flow chart illustrating a coating run time calculating sub-routine executed in step SM3 of the routine of FIG. 17.

The coasting time calculating sub-routine illustrated in the flow chart of FIG. 18 is initiated, for instance, while a coasting run of the vehicle is detected and while a COASTING RUN timer $C_{ILON}$ is in operation. The coasting run of the vehicle is detected if the engine idling detector switch incorporated in the throttle sensor 70 is on and if the BRAKE switch 84 is off. The coasting time calculating sub-routine of FIG. 18 is initiated with step SD1 to determine whether the vehicle is in a coasting state. This determination is made by determining whether the vehicle speed V is not zero while the throttle opening angle TA is zero. If a negative decision (NO) is obtained in step SD1, it means that a coasting run of the vehicle has been followed by an accelerating or decelerating run. In this case, the control flow goes to step SD2 to turn off a START timer $C_{ILON2}$, and then goes to step SD5 and the following steps. If the vehicle is accelerating, the COASTING RUN timer $C_{ILON}$ is off, and a negative decision (NO) is obtained in step SD5. In this case, one cycle of execution of the present sub-routine is terminated.

If an affirmative decision (YES) is obtained in step SD1, step SD3 is implemented to determine whether the content of the START timer $C_{ILON2}$ is smaller than a predetermined threshold $K_{ILON}$. This threshold $K_{ILON}$ is to determine a suitable point of time at which the vehicle operator's desired drive mode is estimated during coasting of the vehicle. For instance, the threshold $K_{ILON}$ is selected to be about 1 second. If an affirmative decision (YES) is obtained in step SD3, one cycle of execution of the present sub-routine is terminated. If a negative decision (NO) is obtained in step SD3, the control flow goes to step SD4 to turn on the START timer $C_{ILON2}$ again, and then goes to step SD5 determine whether the content of the COASTING RUN timer $C_{ILON}$ is equal to or larger than a predetermined threshold $K_{AVEILON}$. The COASTING RUN timer $C_{ILON}$ is provided to measure a time during which the engine idling detector switch of the throttle sensor 70 is on while the BRAKE switch 84 is off. The threshold $K_{AVEILON}$ is selected to effect initial determination of a coasting run of the vehicle. For example, the threshold $K_{AVEILON}$ is selected to be about 1.3 second.

If a negative decision (NO) is obtained in step SD5, it means that the vehicle is not coasting. In this case, one cycle of execution of the present sub-routine of FIG. 18 is terminated. If an affirmative decision (YES) is obtained in step SD5, the control flow goes to step SD6 to determine whether the content of the COASTING RUN timer $C_{ILON}$ is smaller than a predetermined threshold $K_{ILON2}$. This threshold $K_{ILON2}$ is an upper limit of the COASTING RUN timer $C_{ILON}$, and is selected to be about 16 seconds, for example. If an affirmative decision (YES) is obtained in step SD6, the control flow goes to step SD7 in which the content of the COASTING RUN timer $C_{ILON}$ is stored in a predetermined memory area EVENT 9 from which the appropriate input signal is received by the neural network NN. If a negative decision (NO) is obtained in step SD6, the control flow goes to step SD8 in which the upper limit $K_{ILON2}$ of the coasting run time $T_{COAST}$ is stored in the memory area EVENT 9.

Then, the control flow goes to step SD9 to set the ESTIMATION PERMIT flag $X_{NNCAL}$ to "1". Step SD9 is followed by step SD10 to determine whether the START timer $C_{ILON2}$ is off. If a negative decision (NO) is obtained in step SD10, one cycle of execution of the present sub-routine is terminated. If an affirmative decision (YES) is obtained in step SD10, the control flow goes to step SD11 to turn off the COASTING RUN timer $C_{ILON}$.

The coasting run time calculating means 98d executes the coasting run time calculating sub-routine illustrated in the flow chart of FIG. 18, as described above. It will be understood that steps SD1 and SD5 correspond to the coasting run time determining means 124 of FIG. 11 which determines that the vehicle is coasting, when the predetermined time $K_{AVEILON}$ has passed while the throttle opening angle TA is held zero during vehicle running. It will also be understood that steps SD7 and SD8 corresponds to the coasting run time determining means 126 of FIG. 11 which is adapted to determine the coasting run time $T_{VCONST}$ each time the time $K_{ILON}$ has been measured in step SC3 corresponding to the third time counting means 125. In this arrangement, the coasting run time $T_{COAST}$ is determined and the ESTIMATION PERMIT flag $X_{NNCAl}$ is set to "1" each time the predetermined time $K_{ILON}$ which is about 1 second has passed during the coasting run. This arrangement assures a high response of the drive mode estimating means 100 to the vehicle operator's desired drive mode, regarding the coasting state of the vehicle.

Figure 19:
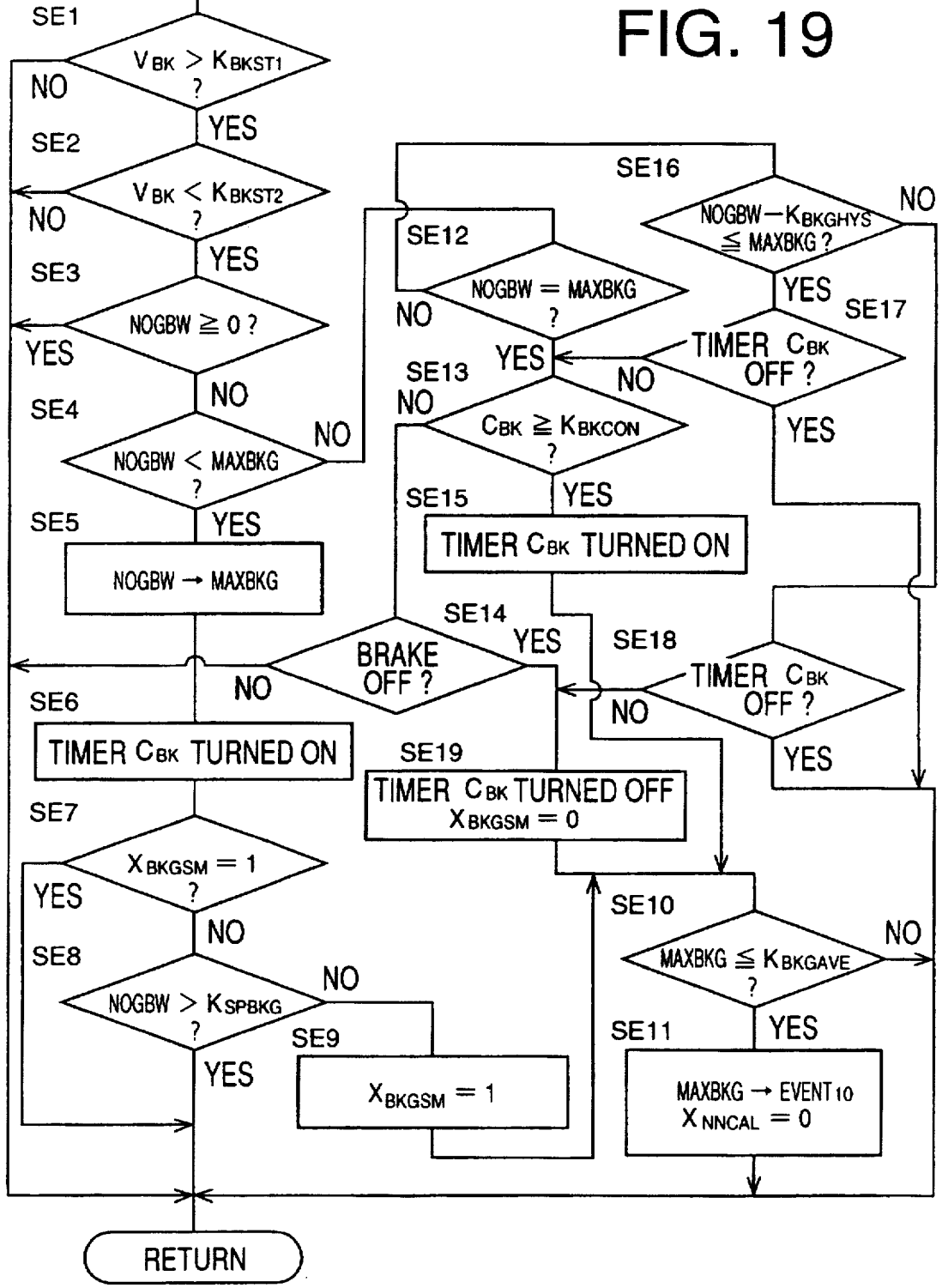
FIG. 19 is a flow chart illustrating a maximum deceleration calculating sub-routine executed in step SM3 of the routine of FIG. 17.

The maximum deceleration calculating sub-routine of FIG. 19 for calculating the maximum deceleration $G_{NMAX}$ during braking of the vehicle is initiated with step SE1 to determine whether a BRAKING START vehicle speed $V_{BK}$ upon starting of depression of the brake pedal 82 is higher than a predetermined lower limit $K_{BKST1}$. If an affirmative decision (YES) is obtained in step SE1, the control flow goes to step SE2 to determine whether the BRAKING START vehicle speed $V_{BK}$ is lower than a predetermined upper limit $K_{BKST2}$. The lower limit $K_{BKST1}$ and the upper limit $K_{BKST2}$ define a vehicle speed range in which the maximum vehicle deceleration $G_{NMAX}$ during vehicle braking is calculated. For example, the lower and upper limits $K_{BKST1}$ and $K_{BKST2}$ are selected to be about 25 km/h and 185 km/h, respectively.

If a negative decision (NO) is obtained in either of the steps SE1 and SE2, one cycle of execution of the present sub-routine of FIG. 18 is terminated. If an affirmative decision (YES) is obtained in both of the steps SE1 and SE2, the control flow goes to step SE3 to determine whether the longitudinal acceleration NOGBW of the vehicle calculated from a change in the pulse width of the output signal of the vehicle speed sensor 76 is equal to or higher than zero. If an affirmative decision (YES) is obtained in step SE3, it means that the vehicle is not decelerating due to brake application. In this case, one cycle of execution of the present sub-routine is terminated. If a negative decision (NO) is obtained in step SE3, it means that the longitudinal acceleration NOGBW is a negative value, that is, the vehicle is in deceleration due to brake application. In this case, the control flow goes to step SE4 and the following steps to calculate the maximum vehicle deceleration $G_{NMAX}$ during braking application.

Step SE4 is provided to determine whether the longitudinal acceleration NOGBW is smaller than the value stored in a memory area MAXBKGm, which is the maximum value of the vehicle deceleration $G_{NMAX}$ during a period of brake application to the vehicle. This maximum value is referred to as "maximum braking deceleration MAXBKG". The memory area MAXBKGm is cleared when the brake application is started. Usually, the longitudinal acceleration NOGBW during brake application is a relatively large negative value, and an affirmative decision (YES) is obtained in step SE4, so that step SE5 is implemented to update the maximum braking deceleration MAXBKG stored in the memory area MAXBKGm. Namely, the presently detected negative longitudinal deceleration value NOGBW is stored as the maximum braking deceleration MAXBKG (maximum deceleration $G_{NMAX}$). Then, the control flow goes to step SE6 to turn on a START timer $C_{BK}$, and then to step SE7 to determine whether a HEAVY BRAKE flag $X_{BKGSM}$ indicative of a comparatively large amount of operation of the brake pedal 82 is set at "1".

Initially, a negative decision (NO) is obtained in step SE7, and the control flow goes to step SE8 to determine whether the longitudinal acceleration NOGBW is larger than a predetermined threshold $K_{SPBKG}$. This threshold $K_{SPBKG}$ is a negative value for determining whether the amount of operation of the brake pedal 82 is comparatively large. In this respect, it is noted that a comparatively large amount of operation of the brake pedal 82 is an important factor reflecting the vehicle operator's desired drive mode. The threshold $K_{SPBKG}$ is determined by experiments. If the amount of operation of the brake pedal 82 is comparatively small, an affirmative decision (YES) is obtained in step SE8. If the amount of operation of the brake pedal 82 is comparatively large, a negative decision (NO) is obtained in step SE8, and the control flow goes to step SE9 in which the HEAVY BRAKE flag $X_{BKGSM}$ is set to "1". Then, step SE10 is implemented to determine whether the maximum braking deceleration MAXBKG is equal to or smaller than a predetermined threshold $K_{BKGAVE}$. This threshold $K_{BKGAVE}$ is a value smaller than the threshold $K_{SPBKG}$, and is selected to determine whether a comparatively heavy brake is applied to the vehicle. The threshold $K_{BKGAVE}$ is determined by experiments. If a negative decision (NO) is obtained in step SE10, one cycle of execution of the present sub-routine is terminated. If an affirmative decision (YES) is obtained in step SE10, the control flow goes to step SE11 in which the maximum braking deceleration MAXBKG (maximum vehicle deceleration $G_{NMAX}$ stored in the memory area MAXBKGm) is stored in a predetermined memory area EVENT10 from which the appropriate input signal is received by the neural network NN. The ESTIMATION PERMIT flag $X_{NNCAL}$ is set to "1" also in step SE11.

Once the HEAVY BRAKE flag $X_{BKGSM}$ is set to "1", an affirmative decision (YES) is obtained in step SE7 in the next cycle of execution of the sub-routine. Therefore, steps SE8 and SE11 are not implemented unless the longitudinal acceleration NOGBW has increased to or exceeded the maximum braking deceleration MAXBKG stored in the memory area MAXBKGm, namely, unless the longitudinal deceleration has reduced to or below the presently stored maximum braking deceleration MAXBKG. When the longitudinal acceleration NOGBW has increased to or exceeded the maximum braking deceleration MAXBKG, a negative decision (NO) is obtained in step SE4, and the control flow goes to step SE12 to determine whether the longitudinal acceleration NOGBW is equal to the maximum braking deceleration stored in the memory area MAXBKGm, namely, the maximum deceleration value $G_{NMAX}$.

If the longitudinal acceleration NOGBW is equal to the maximum braking deceleration MAXBKG, an affirmative decision (YES) is obtained in step SE12, and the control flow goes to step SE13 to determine whether the content of the START timer $C_{BK}$ is equal to or larger than a predetermined threshold $K_{BKCON}$. This threshold $K_{BKCON}$ is a time interval at which the estimation of the vehicle operator's drive mode is permitted, to improve the response of the drive mode estimating means 100, after the longitudinal acceleration NOGBW has once exceeded the threshold $K_{SPBKG}$, as long as the longitudinal acceleration NOGBW is not smaller than the threshold $K_{BKGAVE}$ smaller than the threshold $K_{SPBKG}$, and as long as the present longitudinal acceleration NOGBW is smaller than the maximum braking deceleration MAXBKG presently stored in the memory area MAXBKGm, by an amount not larger than a predetermined hysteresis value $K_{BKGHYS}$ (positive value). The threshold $K_{BKCON}$ is selected to be about 0.2 second, for example.

If a negative decision (NO) is obtained in step SE13, it means that the time interval determined by the threshold $K_{BKCON}$ has not passed, and the control flow goes to step SE14 to determine whether the brake pedal 82 is released. If a negative decision (NO) is obtained, it means that the vehicle is still braked. In this case, one cycle of execution of the present sub-routine is terminated. If an affirmative decision (YES) is obtained in step SE13 during repeated execution of the sub-routine, the control flow goes to step SE15 to turn on the START timer $C_{BK}$, and then to steps SE10 and the following steps. Namely, if the maximum braking deceleration MAXBKG is equal to or smaller than the threshold $K_{BKGAVE}$, value MAXBKG stored in the memory area MAXBKGm is stored in the memory area EVENT10, as the maximum deceleration $G_{NMAX}$ during vehicle braking, and the ESTIMATION PERMIT flag $X_{NNCAL}$ is set to "1".

If the longitudinal acceleration NOGBW is not equal to the value stored in the memory area MAXBKGm, that is, if the longitudinal acceleration NOGBW has decreased, a negative decision (NO) is obtained in step SE12, and the control flow goes to step SE16 to determine whether the longitudinal acceleration NOGBW minus the hysteresis value $K_{BKGHYS}$ (positive value) is equal to or smaller than the presently stored maximum braking deceleration value MAXBKG, namely, whether the longitudinal acceleration NOGBW has become smaller than the value in the memory area MAXBKGm, by the hysteresis value $K_{BKGHYS}$ or larger. If a negative decision (NO) is obtained in step SE16, it indicates that the longitudinal acceleration NOGBW has not become smaller than the value stored in the memory area MAXBKGm by the hysteresis value $K_{BKGHYS}$ or larger. In this case, the control flow goes to step SE18 to determine whether the timer $C_{BK}$ is off. If a negative decision (NO) is obtained in step SE18, the control flow goes to step SE19 in which the timer $C_{BK}$ is turned off, and the HEAVY BRAKE flag $X_{BKGSM}$ is reset to "0". Then, step SE10 and the following steps are implemented so that the maximum braking deceleration MAXBKG is stored in the memory area EVENT10 as the maximum vehicle deceleration value $G_{NMAX}$, and the ESTIMATION PERMIT flag $X_{NNCAL}$ is set to "1".

If an affirmative decision (YES) is obtained in step SE18, one cycle of execution of the present sub-routine is terminated. If an affirmative decision (YES) is obtained in step SE16 during repeated execution of the sub-routine, the control flow goes to step SE16 to determine whether the timer $C_{BK}$ is off. If a negative decision (NO) is obtained in step SE17, the control flow goes to step SE13 and the following steps. That is, step SE10 and the following steps are implemented so that the maximum braking deceleration MAXBKG is stored in the memory area EVENT10 as the maximum deceleration value $G_{NMAX}$, and the ESTIMATION PERMIT flat $X_{NNCAL}$ is set to "1", each time the time interval $K_{BKCON}$ has been measured by the START timer $C_{BK}$. If an affirmative decision (YES) is obtained in step SE17, one cycle of execution of the present sub-routine is terminated.

Figure 27:
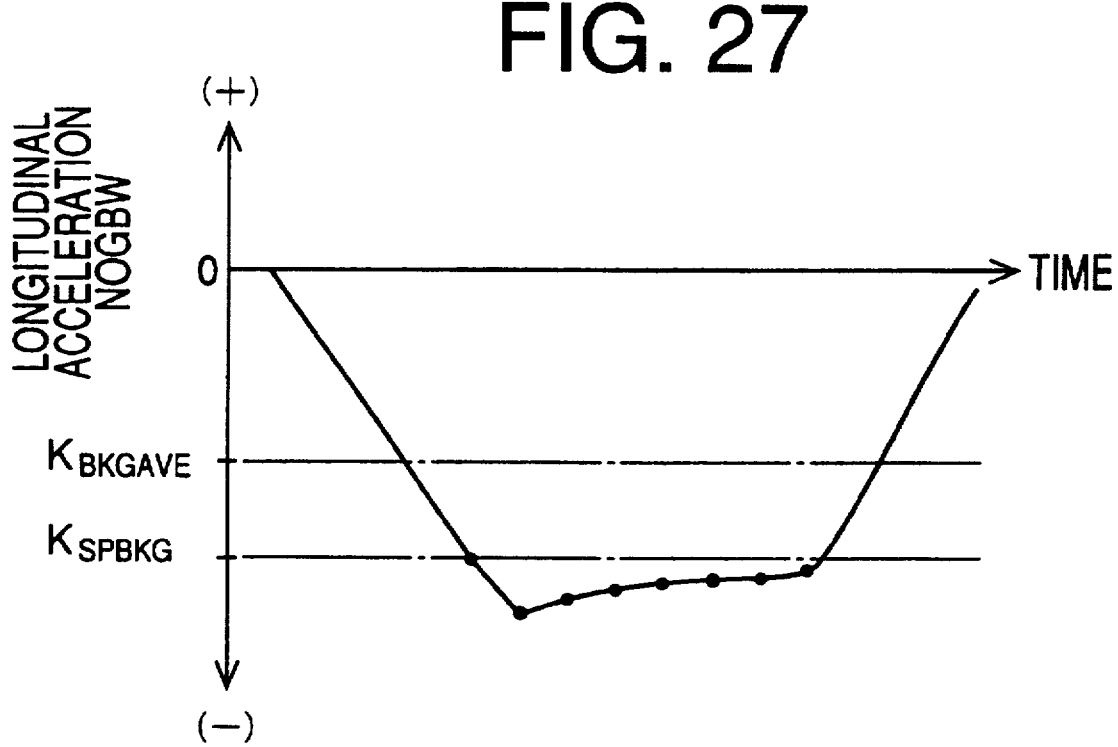
FIG. 27 is a time chart explaining updating of the longitudinal acceleration of the vehicle monitored in the sub-routine of FIG. 19.

Black dots in FIG. 27 indicate points of time at which the maximum braking deceleration MAXBKG is stored in the memory area EVENT 10 as the maximum vehicle deceleration $G_{NMAX}$, and the ESTIMATION PERMIT flag $X_{NNCAL}$ is set to "1". In the present embodiment, the value stored in the memory area MAXBKGm is stored as the maximum deceleration $G_{NMAX}$ in the memory area EVENT 10 and the ESTIMATION PERMIT flag $X_{NNCAL}$ is set to "1" at the time interval $K_{BKCON}$ (e.g., about 0.2 second), after the longitudinal acceleration NOGBW has once exceeded the threshold $K_{BKGAVE}$ as long as the longitudinal acceleration NOGBW is not smaller than the threshold $K_{BKGAVE}$ smaller than the threshold $K_{SPBKG}$, and as long as the present longitudinal acceleration NOGBW is smaller than the maximum braking deceleration $G_{NMAX}$ presently stored in the memory area MAXBKGm, by an amount not larger than a predetermined hysteresis value $K_{BKGHYS}$ (positive value). This arrangement permits improved response of the drive mode estimating means 100, regarding the vehicle deceleration during brake application.

The maximum deceleration calculating means 98c executes the maximum deceleration calculating sub-routine illustrated in the flow chart of FIG. 19, as described above. It will be understood that step SE5 corresponds to the maximum deceleration updating means 130 of FIG. 12 for updating the maximum braking deceleration MAXBKG (updating the maximum deceleration value $G_{NMAX}$) as the longitudinal acceleration NOGBW decreases during brake application to the vehicle. It will also be understood that step SE11 corresponds to the maximum deceleration determining means 132 which is adapted to determine, as the maximum deceleration $G_{NMAX}$, the value updated by the maximum deceleration updating means 130, if the longitudinal acceleration NOGBW is smaller than the predetermined threshold $K_{SPBKG}$. If the longitudinal acceleration NOGBW (negative value) subsequently becomes equal to or larger than the maximum braking deceleration MAXBKG, the maximum deceleration determining means 130 determines the maximum deceleration value $G_{NMAX}$ at the predetermined time interval $K_{BKCON}$ measured in step SE13 corresponding to the fourth time counting means 131, as long as the present longitudinal acceleration NOGBW is smaller than the maximum braking deceleration MAXBKG ($G_{NMAX}$) presently stored in the memory area MAXBKGm, by an amount not larger than a predetermined hysteresis value $K_{BKGHYS}$.

The signal peak calculating sub-routine illustrated in the flow charts of FIGS. 20–23 is executed by the signal peak calculating means 98f, to calculate the peak values of the output signals of the various sensors at respective predetermined time intervals, for example, about 3 seconds. The output signals represent the drive mode indicating variables, and the peak values of these drive mode indicating variables include the maximum throttle opening angle $TA_{MAXr}$, maximum vehicle speed $V_{MAXr}$, maximum engine speed $N_{EMAXr}$, and maximum longitudinal acceleration $NOGBW_{MAXr}$ (or maximum deceleration $G_{NMAXr}$). The signal peak calculating sub-routine is initiated with step SF1 (FIG. 20) to read in the throttle opening angle TA and the engine speed $N_E$ and store them in respective memory areas INPVAL1 and INPVAL2. Step SF1 is followed by step SF2 to determine whether the speed ratio of a presently established operating position SHIFT1 of the automatic transmission 14 is equal to or smaller than that of the operating position which is presently selected according to the presently selected shift pattern.

If an affirmative decision (YES) is obtained in step SF2, it means that the automatic transmission 14 should be shifted up or remain in the presently established operating position. In this case, the control flow goes to step SF3 to determine whether the presently established operating position SHIFT1 is the same as the presently selected operating position. If an affirmative decision (YES) is obtained in step SF3, it means that the automatic transmission 14 should remain in the presently established position. In this case, the control flow goes to step SF4 to reset a SHIFT-UP flag $X_{PTUP}$ to "0", and then to step SF5 to determine a timer $C_{GMCAN}$ for measuring a time after the point of time of determination to shift-up the automatic transmission 14 is off. If an affirmative decision (YES) is obtained in step SF5, it means that a shift-down action of the automatic transmission 14 has not been effected a short time before. In this case, the control flow goes to step SF7 to turn off the timer $C_{GMCAN}$ and reset the SHIFT-UP flag $X_{PTUP}$ to "0", and then to step SF8 to calculate the absolute value of the longitudinal acceleration NOGBW which represents the maximum vehicle deceleration $G_{NMAXt}$ during a predetermined time period. The calculated value (maximum vehicle deceleration $G_{NMAXt}$) is stored in a memory area INPVAL3. Then, steps SF13 and the following steps are implemented.

If a negative decision (NO) is obtained in step SF5, it means that the timer $C_{GMCAN}$ for measuring the time of a shift-up action or a 4th to 3rd shift-down action (4-3 shift down action) of the automatic transmission 14 in a downhill run control of the vehicle is not off, that is, a shift-up action of the transmission 14 has just been effected. In this case, the control flow goes to step SF6 to determine whether the content of the timer $C_{GMCAN}$ is equal to or smaller than a predetermined threshold $K_{GMCAN}$. This threshold $K_{GMCAN}$ is selected to determine the time length of a shifting action, and is longer than this time length. For instance, the threshold $K_{GMCAN}$ is selected to be about 1.5 second. If a negative decision (NO) is obtained in step SF6, it means that the automatic transmission 14 is not in the process of a shifting action. In this case, the control flow goes to the above-indicated steps SF7 and SF8 to store the longitudinal acceleration NOGBW. If an affirmative decision (YES) is obtained in step SF6, it means that the automatic transmission 14 is in the process of a shifting action. The longitudinal acceleration NOGBW during a shifting action of the automatic transmission 14 does not represent the vehicle operator's desired drive mode, and this longitudinal acceleration NOGBW is not stored. Therefore, the control flow goes to step SF13 and the following steps, skipping the step SF8.

If a negative decision (NO) is obtained in step SF2, it means that a shift-down action of the automatic transmission 14 is selected according to the shift pattern. In this case, the longitudinal acceleration NOGBW during the 4-3 shift-down action in the downhill run control of the vehicle should not be stored. Therefore, the control flow goes to step SF9 to determine whether the brake pedal 82 is operated. If a negative decision (NO) is obtained in step SF9, it means that the vehicle running condition does not require the downhill run control 4-3 shift-down action of the automatic transmission 14. In this case, the control flow goes to the above-indicated step SF7 and the following steps. If an affirmative decision (YES) is obtained in step SF9, the control flow goes to step SF10 to determine whether the timer $C_{GMCAN}$ is off. If a negative decision (NO) is obtained in step SF10, step SF11 is implemented to determine whether the SHIFT-UP flag $X_{PTUP}$ is set at "1". If an affirmative decision (YES) is obtained in step SF10, the control goes to step SF12 in which the timer $C_{GMCAN}$ is turned on, and the SHIFT-UP flag $X_{PTUP}$ is set to "1". If a shift-down action of the automatic transmission 14 is effected during operation of the brake pedal 82, that is, during the downhill run control of the vehicle, a negative decision (NO) is obtained in step SF11. IN this case, step SF12 is implemented to turn on the timer $C_{GMCAN}$, and set the SHIFT-UP flag $X_{PTUP}$ to "1". If a shift-up action of the automatic transmission 14 is effected, an affirmative decision (YES) is obtained in step SF11, and the control flow goes to step SF6 and the following steps. If a shift-up action of the transmission 14 is selected according to the shift pattern, a negative decision (NO) is obtained in step SF3, and the control flow goes to the above-indicated steps SF10 and the following steps.

It is noted that a shift-up action, and a shift-down action during vehicle braking in the downhill run control, of the automatic transmission 14, do not reflect the vehicle operator's desired drive mode of the vehicle. In this case, the longitudinal acceleration NOGBW is not stored. In the present embodiment, steps SF3, SF6 and SF9 correspond to the longitudinal acceleration input ignoring means 137 for ignoring the longitudinal acceleration NOGBW and inhibiting it from being stored, in the above condition, that is, while the automatic transmission 14 is in the process of a shift-up action, or a shift-down action during operation of the brake pedal 82 in the downhill run control of the vehicle.

Figure 21:
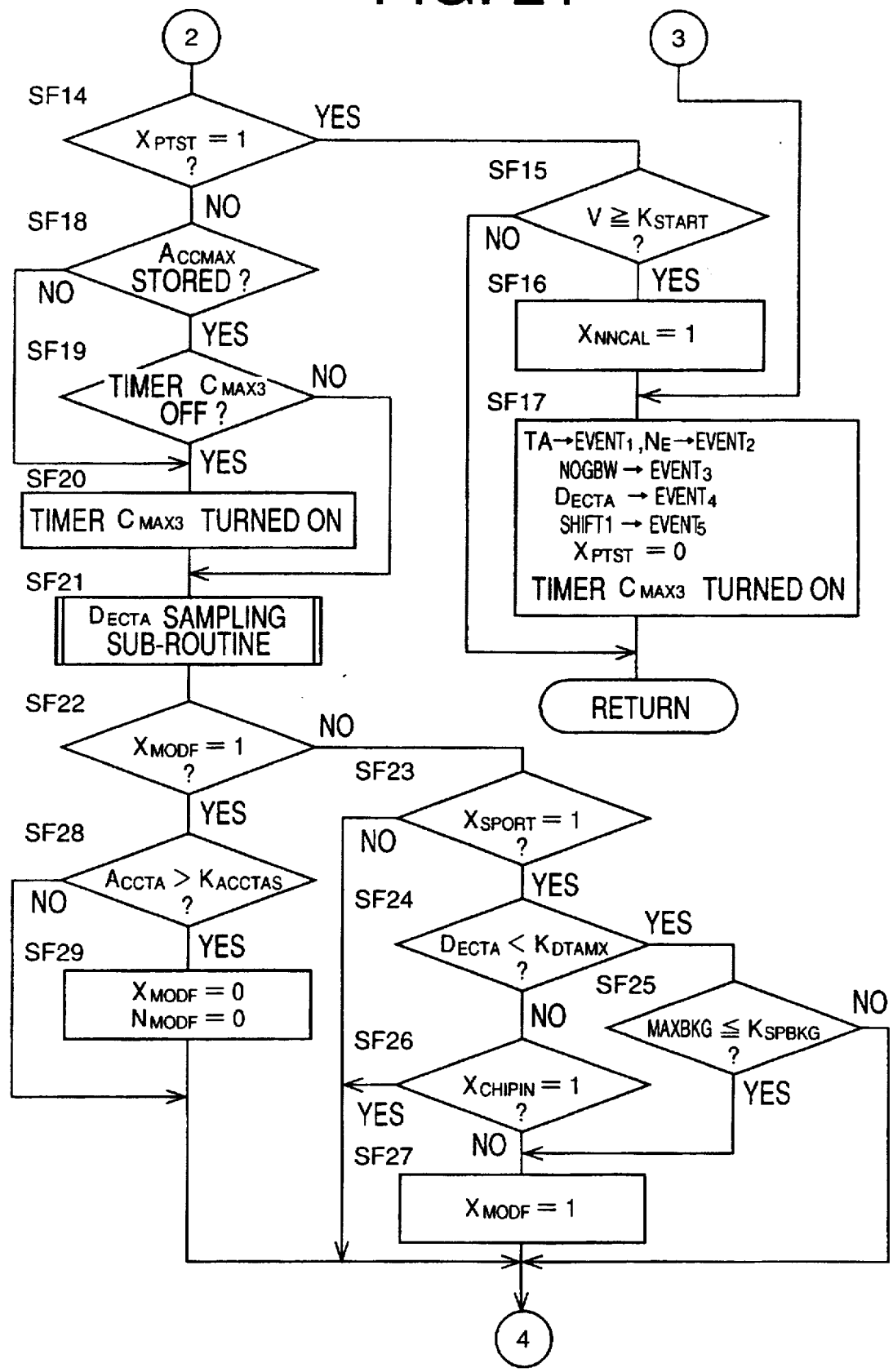

After the steps for storing the longitudinal acceleration NOGBW have been implemented, the control flow goes to step SF13 to determine whether the shift lever 78 is placed in the neutral position "N". If an affirmative decision (YES) is obtained in step SF13, the control flow goes to step SF17 (FIG. 21). In this step SF17, the throttle opening angle TA, engine speed NE and longitudinal acceleration NOGBW which are stored in the respective memory areas INPVAL1, INPVAL2 AND INPVAL3, and a releasing rate $D_{ECTA}$ of the accelerator pedal 58 and presently selected position of the automatic transmission 14 are stored in respective memory areas EVENT1, EVENT2, EVENT3, EVENT4 and EVENT5. Further, a START flag $X_{PTST}$ is reset to "0", and a TIME PERIOD timer $C_{MAX3}$ is turned on.

If a negative decision (NO) is obtained in step SF13, it means that the shift lever 78 is placed in one of the forward-drive positions "D", "2" and "L". In this case, the control flow goes to step SF14 (FIG. 21) to determine whether the START flag $X_{PTST}$ for starting the vehicle is set at "1". In an affirmative decision (YES) is obtained in step SF14, the control flow goes to step SF15 to determine whether the vehicle speed V is equal to or higher than a predetermined threshold $K_{START}$. This threshold $K_{START}$ is selected so as to determine whether the vehicle is being started. For example, the threshold $K_{START}$ is selected to be about 10 km/h. If a negative decision (NO) is obtained in step SF15, it means that the vehicle is not being started, but is running at a low speed. In this case, one cycle of execution of the present sub-routine is terminated. If an affirmative decision (YES) is obtained in step SF15, it means that the vehicle speed V has exceeded about 10 km/h, for example, during starting of the vehicle. In this case, the control flow goes to step SF16 to set the ESTIMATION PERMIT flag $X_{NNCAL}$ to "1", and then to step SF17 in which the output signals of the various sensors are initially stored.

If a negative decision (NO) is obtained in step SF14, it means that the vehicle is not being started, and the control flow goes to step SF18 to determine whether the maximum value $A_{CCMAX}$ of the throttle opening angle TA upon depression of the accelerator pedal 58 has been stored in the step SB16 described above. If an affirmative decision (YES) is obtained in step SF18, it means that the accelerator pedal 59 which was depressed has been released, and that the maximum value $A_{CCMAX}$ has been stored. In this case, the control flow goes to step SF19 to determine whether the TIME PERIOD timer $C_{MAX3}$ is off. If a negative decision (NO) is obtained in step SF18, the control flow goes to step SF20 to turn on the TIME PERIOD timer $C_{MAX3}$. This timer $C_{MAX3}$ is provided to measure a time period during which the peak values of the output signals of the sensors are obtained.

After the TIME PERIOD timer $C_{MAX3}$ is turned on or started in step SF20, the control flow goes to step SF21 to execute a $D_{ECTA}$ sampling sub-routine to obtain the releasing rate $D_{ECTA}$ of the accelerator pedal 58. If the accelerator pedal 58 is still in the process of being depressed, the maximum value $A_{CCMAX}$ has not been stored in step SB16, and the negative decision (NO) is obtained in step SF18. In this case, case, step SF18 is followed by step SF20. If the negative decision (NO) is obtained in step SF19, that is, if the TIME PERIOD timer $C_{MAX3}$ is still on, step SF19 is followed by step SF21.

Step SF21 is followed by step SF22 to determine whether a HOLD flag $X_{MODF}$ is set at "1". The HOLD flag $X_{MODF}$ is set to "1" not to obtain the peak values of the output signals of the sensors while the vehicle is running in a transient state with the accelerator pedal 58 being released or with a comparatively high degree of deceleration. Initially, a negative decision (NO) is obtained in step SF22, and the control flow goes to step SF23 to determine whether the SPORTY DRIVE flag $X_{SPORT}$ indicative of the SPORTY drive mode is set at "1". If a negative decision (NO) is obtained in step SF23, it means that the vehicle is not running in a transient state. In this case, step SF30 and the following steps are implemented. If an affirmative decision (YES) is obtained in step SF23, it means that the vehicle is running in the SPORTY drive mode, and the control flow goes to steps SF24, SF25 and SF26 to determine whether the vehicle is running in a transient state.

SF24 is provided to determine whether the releasing rate $D_{ECTA}$ of the accelerator pedal 58 is lower than a predetermined threshold $K_{DTAMX}$. This threshold $K_{DTAMX}$ is selected so as to determine whether the accelerator pedal 58 has been released rapidly. For example, the threshold $K_{DTAMX}$ is selected to be about 13%. If an affirmative decision (YES) is obtained in step SF24, the control flow goes to step SF25 to determine whether the value of the longitudinal acceleration during braking stored in the memory area MAXBKGm, that is, the maximum braking deceleration MAXBKG is equal to or smaller than the predetermined threshold KSPBKG, which is used in the above-indicated step SE8. If a negative decision (NO) is obtained in step SF25, it means that the accelerator pedal 59 has been released comparatively slowly, and the longitudinal acceleration is comparatively small. IN this case, the control flow goes to step SF30 and the following steps. If an affirmative decision (YES) is obtained in step SF25, it means that the longitudinal acceleration is comparatively large even if the releasing rate $D_{ECTA}$ of the accelerator pedal 58 is comparatively low. In this case, the control flow goes to step SF27 to set the HOLD flag $X_{MODF}$ to "1".

If a negative decision (NO) is obtained in step SF24, the control flow goes to step SF26 to determine whether the TIP-IN flag $X_{CHIPIN}$ is set at "1". If an affirmative decision (YES) is obtained in step SF26, it means that the accelerator pedal 58 has been released comparatively rapidly due to a "tip-in" action (abrupt depression and immediate releasing)

of the accelerator pedal. In this case, the control flow goes to step SF30 and the following steps. If a negative decision (NO) is obtained in step SF26, it means that the accelerator pedal 58 has been released comparatively rapid in the absence of the "tip-in" action. In this case, the control flow goes to step SF27 to set the HOLD flag $X_{MODF}$ to "1".

After the HOLD flag $X_{MODF}$ is set to "1" as described above, the affirmative decision (YES) is obtained in step SF22 in the next cycle of execution of the present subroutine, and the control flow goes to step SF28 to determine whether the value $A_{CCTA}$ corresponding to the rate of depression of the accelerator pedal 58 is higher than a predetermined threshold $K_{ACCTAS}$. This threshold $K_{ACCTAS}$ is selected so as to detect re-depression of the accelerator pedal 58. For example, the threshold $K_{ACCTAS}$ is selected to be about 3%. If an affirmative decision (YES) is obtained in step SF28, the control flow goes to step SF29 in which the HOLD flag $X_{MODF}$ and a value $N_{MODF}$ are reset to "0". The value $N_{MODF}$ represents the number of cycles in which the peak values of the output signals of the sensors are not obtained. Then, step SF30 and the following steps are implemented. If a negative decision (NO) is obtained in step SF28, this step SF28 is followed by step SF30. That is, while the HOLD flag $X_{MODF}$ is set at "1", the HOLD flag $X_{MODF}$ and the value $N_{MODF}$ are reset each time the accelerator pedal 58 is depressed again.

As described above, the HOLD flag $X_{MODF}$ is set to "1" to ignore the peak values of the input signals (output signals of the sensors) for the preceding time period of three seconds, 1) if the releasing rate $D_{ECTA}$ of the accelerator pedal 58 is not lower than the threshold $K_{DTAMX}$ in the absence of the tip-in action (abrupt depression and immediate releasing) of the accelerator pedal 58 (steps SF24, SF26), or 2) if it is considered that the vehicle is approaching a curve or going to turn a curve, that is, if the releasing rate $D_{ECTA}$ of the accelerator pedal 58 is lower than the threshold $K_{DTAMX}$, and the maximum braking deceleration MAXBKG is not higher than the threshold $K_{SPBKG}$ (step SF25). This arrangement is effective to prevent deterioration of the accuracy of estimation of the vehicle operator's desired drive mode, due to temporary reduction of the peak values of the input signals. That is, the peak values obtained while the vehicle is approaching or turning a curve in the SPORTY drive mode may indicate the ECONOMY drive mode, although the vehicle operator actually desires to drive the vehicle in the SPORTY drive mode. Therefore, the ECONOMY drive mode might be selected under such running condition, contrary to the operator's desired drive mode, if the control device 42 is not provided with information (e.g., wheel speed, steering angle, lateral acceleration and yaw rate) necessary to determine or detect turning of the vehicle. In the present embodiment, steps SF24, SF25 and SF26 described above provide the vehicle turn determining means 138 of FIG. 13 for determining the vehicle turning. Further, the peak hold means 139 of FIG. 13 for inhibiting the peak values of the input signals from being applied to the neural network NN during the determination of the vehicle turning is provided by step SF27 adapted to set the HOLD flag $X_{MODF}$ to "1" upon determination of the vehicle turning, and step SF48 adapted to inhibit the peak values of the input signals from being stored in the respective memory areas EVENTi while the HOLD flag $X_{MODF}$ is set at "1".

In the present embodiment, the HOLD flag $X_{MODF}$ is reset to "0" (step SF29) if the re-depression of the accelerator pedal 58 is detected (step SF28) while $t_{he\ flag}\ X_{MODF}$ is set at "1". In this case, the peak hold means 139 is disabled to permit the neural network NN to receive the peak values of the input signals upon re-depression of the accelerator pedal 58, which tend to represent the SPORTY drive mode desired by the vehicle operator. Thus, the reliability of estimation of the desired vehicle drive mode can be improved. That is, the above-indicated steps SF28 and SF29 provide the peak hold cancelling means 141 of FIG. 13 which is adapted to disable the peak hold means 139 when the accelerator pedal 58 is depressed again after it has been released.

Figure 22:
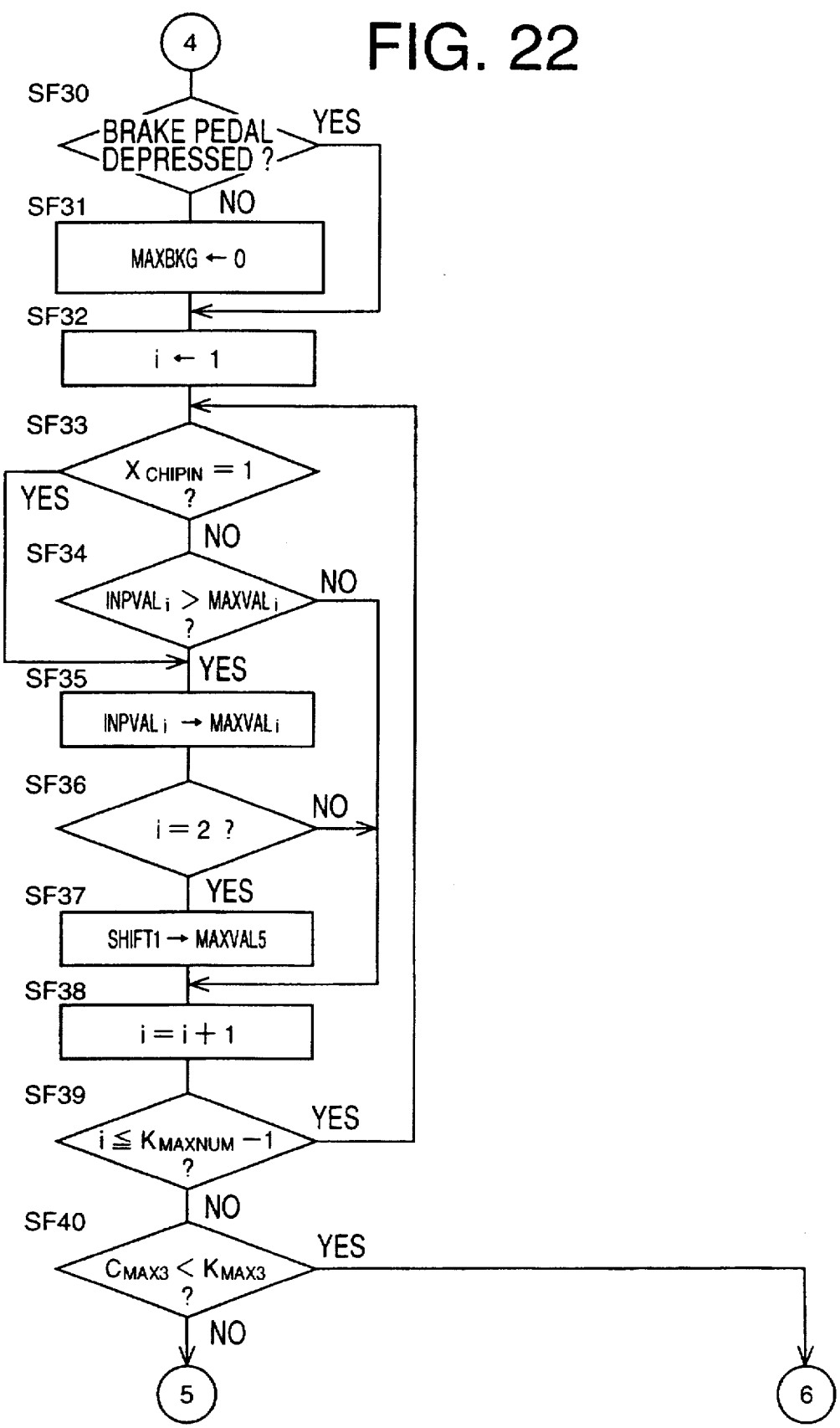
Figure 23:
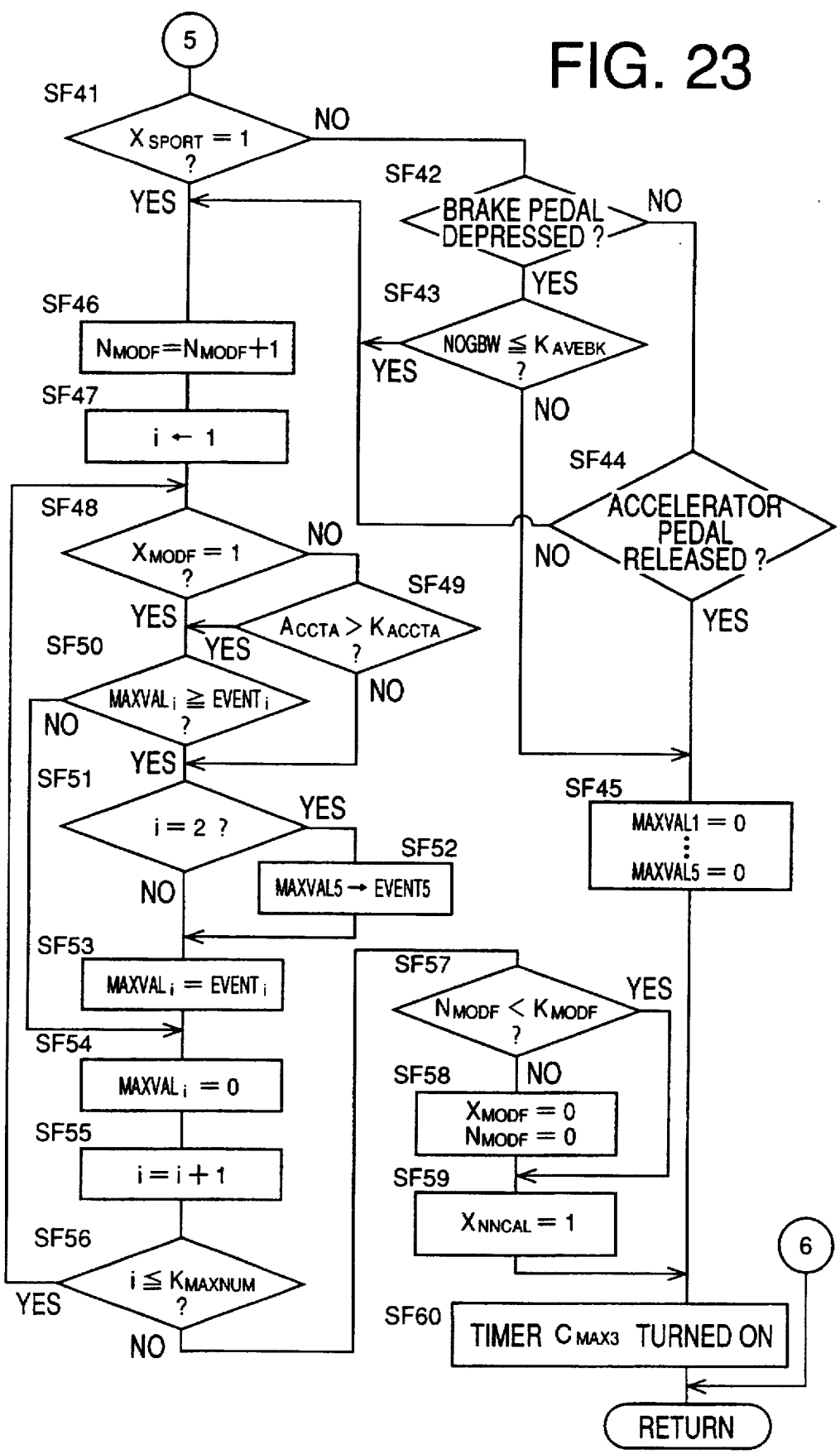

Step SF30 of FIG. 22 is provided to determine whether the brake pedal 82 is being depressed. If a negative decision (NO) is obtained in step SF30, the control flow goes to step SF31 to zero the maximum braking deceleration MAXBKG during braking, and then to step SF32 and the following steps. If an affirmative decision (YES) is obtained in step SF30, this step SF30 is followed by step SF32 and the following steps. Steps SF32 through SF39 cooperate to constitute a closed-loop routine which is repeated a predetermined number of times ($K_{MAXNUM}-1$), for example, three times, for determining the maximum values of the throttle opening angle TA, engine speed $N_E$ and longitudinal acceleration NOGBW which have been stored in the respective memory areas INPVAL1, INPVAL2 and INPVAL3, for a predetermined time period (e.g., three minutes).

In the routine of steps SF32 through SF39, actual repetition number of the routine "i" is set to "1" in step SF32, and "1" is added to the repetition number "i" in step SF38, and a determination is made in step SF39 as to whether the repetition number "i" is equal to or smaller than the predetermined number ($K_{MAXNUM}-1$). Steps SF33 through SF39 are repeatedly implemented until a negative (NO) is obtained in step SF39. If the value $K_{MAXNUM}$ is set to be "4", steps SF33–SF39 are repeatedly implemented until the actual repetition number "i" becomes equal to "3". Step SF33 is provided to determine whether the TIP-IN flag $X_{CHIPIN}$ is set at "1". If an affirmative decision (YES) is obtained in step SF33, it means that the accelerator pedal 58 is abruptly depressed and immediately released. In this case, the maximum values of TA, $N_E$, NOGBW should not be determined, and the control flow goes to step SF36, skipping steps SF34 and SF35.

If a negative decision (NO) is obtained in step SF33, it means that an abrupt depression and immediate releasing action of the accelerator pedal 58 has not taken place. In this case, the control flow goes to step SF34 to determine whether the signal value stored in the memory area INPVALi is equal to or smaller than the maximum value which is stored in a memory area MAXVALi. Namely, step SF34 is provided to determine whether each of the values TA, $N_E$, NOGBW newly read and stored into the respective memory areas INPVAL1, INPVAL 2, INPVAL3 is larger than the maximum value stored in the corresponding memory area MAXVAL1, MAXVAL2, MAXVAL3. If an affirmative decision (YES) is obtained in step SF34, the control flow goes to step SF35 in which the newly read value is stored into the corresponding memory area MAXVALi as the maximum value. With the routine of steps SF33–SF39 repeatedly implemented, the maximum throttle opening angle value $TA_{MAXt}$, maximum engine speed value $N_{EMAXt}$ and maximum longitudinal acceleration NOGBW (maximum deceleration $G_{NMAXT}$) are stored in the respective memory areas MAXVAL1, MAXVAL2 and MAXVAL3. In the present embodiment, steps SF34 and SF35 correspond to the maximum throttle opening updating means 134, maximum engine speed updating means 135 and maximum longitudinal acceleration updating means 136.

In the closed-loop routine of SF32–SF39, step SF36 functions assure that the position SHIFT1 of the automatic transmission 14 is stored in the memory area MAXVAL5 in step SF37 when the repetition number "i" is equal to "2", that is, when the engine speed $N_E$ is the highest.

The closed-loop routine described above is followed by step SF40 to determine whether the content of the TIME PERIOD timer $C_{MAX3}$ is smaller than a predetermined time period $X_{MAX3}$ This predetermined time period $K_{MAX3}$ is a time duration during which the peak values of the input signals (output signals of the sensors) are obtained for the neural network NN to be able to estimate the operator's desired drive mode with a sufficiently high response. For instance, the time period $K_{MAX3}$ is selected to be about 3 seconds. If an affirmative decision (YES) is obtained in step SF40, it means that the predetermined time period has not expired yet. In this case, one cycle of execution of the present signal peak calculating sub-routine of FIGS. 20–23 is terminated. If a negative decision (NO) is obtained in step SF40, the control flow goes to step SF41 and the following steps.

Step SF41 is provided to determine whether the content of the SPORTY DRIVE flag $X_{SPORT}$ is set at "1". If a negative decision (NO) is obtained in step SF41, it indicates that the vehicle is running in the NORMAL drive mode. In this case, the control flow goes to step SF42 to determine whether the brake pedal 42 is being depressed. If an affirmative decision (YES) is obtained in step SF42, the control flow goes to step SF43 to determine whether the longitudinal acceleration NOGBW is lower than a predetermined threshold $K_{AVEBKG}$ (negative value). If an affirmative decision (YES) is obtained in step SF43, it indicates that the amount of operation of the brake pedal 82 is comparatively large. In this case, step SF46 and the following steps are implemented. If a negative decision (NO) is obtained in step SF43, it means that the amount of operation of the brake pedal 82 is comparatively small, and the control flow goes to step SF45 in which the memory areas MAXVAL1 through MAXVAL5 for storing the peak values of the input signals are cleared, and then to step SF60 to turn on the TIME PERIOD timer $C_{MAX3}$ again. If a negative decision (NO) is obtained in step SF42, the control flow goes to step SF44 to determine whether the accelerator pedal 58 is being released. If a negative decision (NO) is obtained in step SF44, it means that the vehicle is running without brake application, and the control flow goes to step SF46 and the following steps. If an affirmative decision (YES) is obtained in step SF44, it means that the accelerator pedal 58 is being released. In this case, the control flow goes to step SF45 in which the memory areas MAXVAL1 through MAXVAL5 for storing the peak values are cleared, and then to step SF60 to turn on the TIME PERIOD timer $C_{MAX3}$ again. Thus, the peak values or the input signals are not used by the neural network NN if the brake pedal 82 is operated by a comparatively small amount or the accelerator pedal 58 is released, while the vehicle is running in the NORMAL drive mode.

If an affirmative decision (YES) is obtained in step SF41, it means that the NORMAL drive mode is established when the predetermined time period $K_{MAX3}$ has expired. In this case, step SF46 is implemented increment the number $N_{MODF}$ which represents the number of cycles in which the signal peak values are not stored in the memory areas MAXVAL1 through MAXVAL5. Then, the control flow goes to a closed-loop routine of steps SF47 through SF56 in which the signal peak values stored in the memory areas MAXPALi are stored in the memory areas EVENTi the contents of which are received by the neural network NN. In step SF47, actual repetition number "i" of the routine is set to "1". In step SF55, this repetition number "i" is incremented. Steps SF48 through SF56 are repeatedly implemented until a negative decision (NO) is obtained in step SF56, that is, until the actual repetition number "i" has become equal to the predetermined number $K_{MAXNUM}$.

Step SF48 is provided to determine whether the HOLD flag $X_{MODF}$ is set at "1". If a negative decision (NO) is obtained in step SF48, the control flow goes to step SF49 to determine whether the depressing speed $A_{CCTA}$ of the accelerator pedal 58 (rate of increase of the throttle valve opening TA) is higher than a predetermined threshold $K_{CCTA}$. This threshold $K_{CCTA}$ is smaller than the above-indicated threshold $K_{ACCTAS}$, which is determined to detect even a comparatively small amount of depression of the accelerator pedal 58. The threshold $K_{CCTA}$ is selected to be about 1.3%. If an affirmative decision (YES) is obtained in step SF49, it means that the accelerator pedal 58 is depressed again. In this case, the control flow goes to step SF50 as in the case where the affirmative decision (YES) is obtained in step SF48, that is, if the HOLD flag $X_{MODF}$ is set at "1". In step SF50, the peak values stored in the memory areas EVENTi are updated to the present values if the present values are larger than the peak values currently stored in the memory areas EVENTi.

If a negative decision (NO) is obtained in step SF49, it is considered that the vehicle is running with a comparatively small change of the amount of depression of the accelerator pedal 58, as in the case where the vehicle is turning. In this case, the control goes to step SF51 and the following steps while skipping step SF50.

Step SF50 is provided to determine whether the maximum or peak value in the memory area MAXVALi is equal to or larger than the value stored in the memory area EVENTi the content of which is received by the neutral network NN. If an affirmative decision (YES) is obtain in step SF50, the control flow goes to step SF53 in which the content of the memory area MAXVALi is stored in the memory area EVENTi. Then, step SF54 is implemented to clear the memory area MAXVALi. Thus, the values of the throttle opening angle TA, engine speed $N_E$, longitudinal acceleration NOGBW and accelerator pedal releasing speed $D_{ECTA}$ which are stored in the memory areas EVENT1 through EVENT4 are updated to the values stored in the memory areas MAXVAL1 through MAXVAL4, if the latter values are higher than the former values, so that the updated peak values are sent to the neural network NN. If the repetition number "i" is equal to "2", that is, if an affirmative decision (YES) is obtained in step SF51, the control flow goes to step SF52 in which the position SHIFT1 of the automatic transmission 14 stored in the memory area MAXVAL5 is stored in the memory area EVENT5, at the same time when the maximum value of the engine speed $N_E$ is stored in the memory area EVENT 2.

The closed-loop routine of steps SF47–SF56 is followed by step SF57 to determine whether the number $N_{MODF}$ is smaller than a predetermined threshold $K_{MODF}$. The number $N_{MNODF}$ represents the number of cycles in which the input signals are not used for the estimation of the vehicle operator's desired drive mode. The threshold $K_{MODF}$ is determined to avoid erroneous estimation of the drive mode. For instance, the threshold $K_{MODF}$ is equal to "1". If an affirmative decision (YES) is obtained in step SF57, the control flow goes to step SF59 to set the ESTIMATION PERMIT flag $X_{NNCAL}$ to "1", and then to step SF60 to turn on the TIME PERIOD timer $C_{MAX3}$ again.

If the content of the HOLD flag $X_{MODF}$ is determined to be "1", that is, if the affirmative decision (YES) is obtained in step SF25 or the negative decision (NO) is obtained in step SF26, the affirmative decision (YES) is obtained in step SF48, and step SF50 is implemented, so that the peak value stored in each memory area EVENTi is updated, only where the value stored in the corresponding memory area MAX-VALi is larger than the peak value in the memory area EVENTi. It will therefore be understood that step SF50 corresponds to the peak updating means 140 of FIG. 13.

The present embodiment is adapted such that the peak values of the input signals are updated in step SF35 only when the "tip-in" action of the accelerator pedal 58 has not taken place, that is, only when the negative decision (NO) is obtained in step SF33, so as to avoid inaccurate estimation of the operator's desired drive mode due to the tip-in action of the accelerator pedal 48, and to thereby improve the accuracy of the estimation. It will be understood that step SF33 corresponds to the tip-in detecting and peak hold means 142 of FIG. 13.

Figure 24:
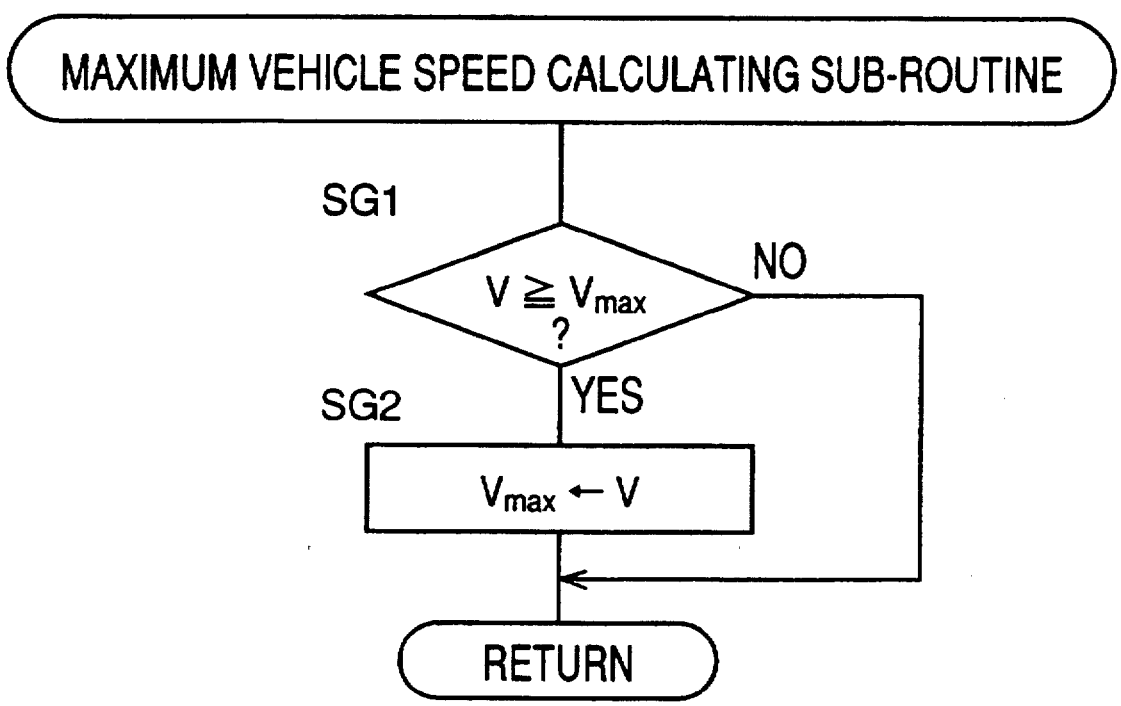
FIG. 24 is a flow chart illustrating a maximum vehicle speed calculating sub-routine executed in step SM3 of the routine of FIG. 14.

The maximum vehicle speed calculating sub-routine of FIG. 24 executed by the maximum vehicle speed calculating means 98g is initiated with step SG1 to determine whether the present vehicle speed V read at a predetermined sampling interval is equal to or higher than the maximum value Vmax already stored in a predetermined memory area. If a negative decision (NO) is obtained in step SG1, one cycle of execution of the present sub-routine is terminated. If an affirmative decision (YES) is obtained in step SG1, step SG2 is implemented to store the present vehicle speed V as the maximum vehicle speed value Vmax. Thus, the maximum vehicle speed Vmax after starting of the vehicle is determined.

Figure 28:
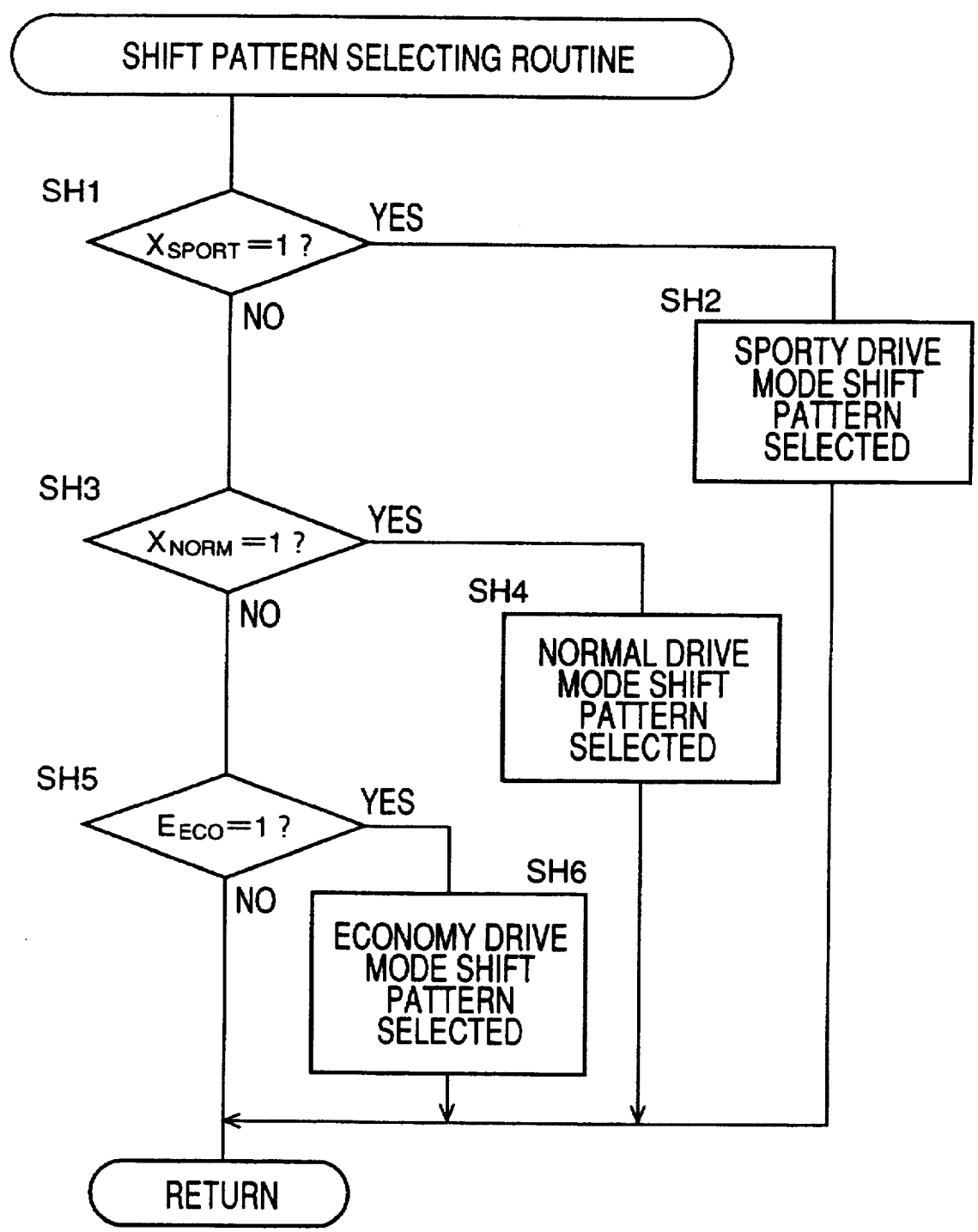
FIG. 28 is a flow chart illustrating a shift pattern selecting routine executed by the control device of the shift control apparatus.

Referring to the flow chart of FIG. 28, there will be described the shift pattern selecting routine executed by the shift pattern selecting means 92. This shift pattern selecting routine is initiated with step SH1 to determine whether the content of the SPORTY DRIVE flag $X_{SPORT}$ is set at "1". If an affirmative decision (YES) is obtained in step SH1, the control flow goes to step SH2 to select the SPORTY DRIVE MODE shift pattern as illustrated in FIG. 3 by way of example. If a negative decision (NO) is obtained in step SH1, the control flow goes to step SH3 to determine whether the NORMAL DRIVE flag $X_{NORM}$ is set at "1". If an affirmative decision (YES) is obtained in step SH3, the control flow goes to step SH4 to select the NORMAL DRIVE MODE shift pattern illustrated in FIG. 4 by way of example. If a negative decision (NO) is obtained in step SH3, step SH5 is implemented to determine whether the ECONOMY DRIVE flag $X_{ECO}$ is set at "1". If an affirmative decision (YES) is obtained in step SH5, the control flow goes to step SH6 to select the ECONOMY DRIVE MODE shift pattern illustrated in FIG. 5 by way of example. If a negative decision (NO) is obtained in step SH5, one cycle of execution of the present sub-routine of FIG. 28 is terminated.

Figure 29:
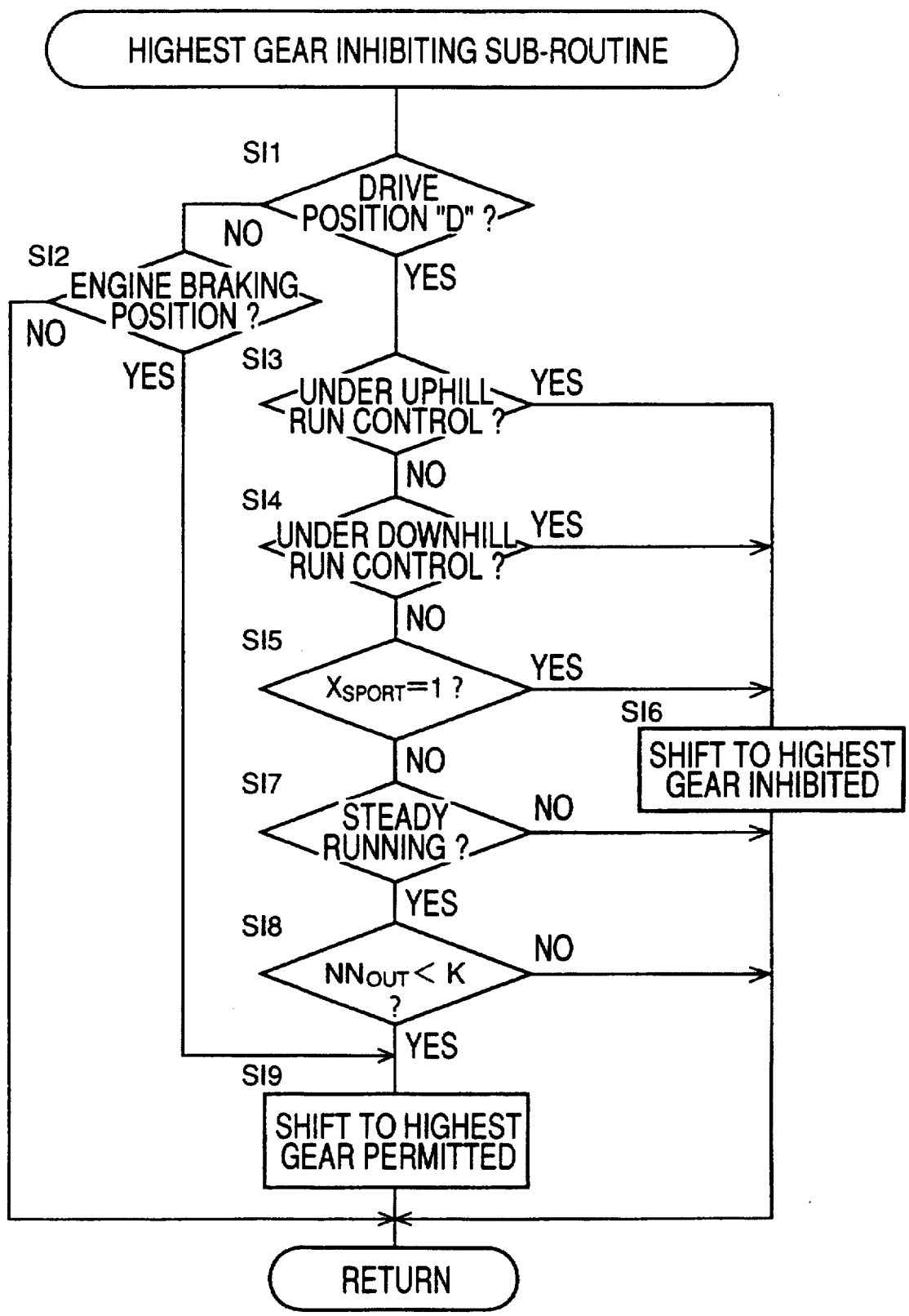
FIG. 29 is a flow chart illustrating a highest gear inhibiting sub-routine executed by the control device.

Referring to the flow chart of FIG. 29, there will be described the highest gear inhibiting sub-routine executed by the highest gear inhibiting means 93. This routine is initiated with step SI1 to determine whether the shift lever 79 is placed in the drive position "D". If a negative decision (NO) is obtained in step SI1, the control flow goes to step SI2 to determine whether the shift lever 78 is placed in the highest engine-braking position which is one position lower than the drive position "D". Where the automatic transmission 14 has four forward-drive positions, the shift lever 78 has engine-braking positions "S" and "L", and the highest engine-braking position of the shift lever 78 is the second position "S". Where the automatic transmission 14 has five forward-drive positions, the shift lever 78 has engine-braking positions "3", "S" and "L", and the highest engine-braking position is the third position "3".

If an affirmative decision (YES) is obtained in step SI2, the control flow goes to step SI9 to permit the automatic transmission 14 to be shifted up to the highest gear position when the shift lever 78 is operated from the highest engine-braking position to the drive position "D". If a negative decision (NO) is obtained in step SI2, it means that the shift lever 78 is placed in the position "L" where the automatic transmission 14 has four forward-drive positions, or in the position "S" or "L" where the automatic transmission 14 has five forward-drive positions. In this case, the automatic transmission 14 is not permitted to be shifted to the highest gear position, that is, one cycle of execution of the present sub-routine of FIG. 29 is terminated.

If an affirmative decision (YES) is obtained in step SI1, the control flow goes to step SI3 to determine whether the vehicle is under the uphill run control. If a negative decision (NO) is obtained in step SI3, step SI4 is implemented to determine whether the vehicle is under the downhill run control. If a negative decision (NO) is obtained in step SI4, step SI5 is implemented to determine whether the SPORTY DRIVE flag $X_{SPORT}$ is set at "1". In this respect, it is noted that the flag $X_{SPORT}$ is set to "1" when the output $NN_{OUT}$ of the neural network NN is relatively large. The determinations in step SI3 and SI4 can be made according to a routine known in the art, depending upon whether an actual vehicle accelerating corresponding to the throttle opening angle TA and vehicle speed V is larger or smaller than a normal accelerating force during a vehicle run on a flat road surface.

If the vehicle is under the uphill run control in which a sufficient drive force is produced to drive the vehicle on an uphill road, or under the downhill run control in which a sufficient engine braking force is produced to drive the vehicle on a downhill road, an affirmative decision (YES) is obtained in step SI3 or SI4. IN this case, the control flow goes to step SI6 in which the automatic transmission 16 is inhibited from being shifted to the highest gear position. If the SPORTY DRIVE flag $X_{SPORT}$ is set at "1" with a relatively large output $NN_{OUT}$ of the neural network NN, an affirmative decision (YES) is obtained in step SI5, and the control flow goes to step SI6 to inhibit shifting of the automatic transmission 14 to the highest gear position. Where the automatic transmission 14 has four forward-drive positions, the shifting of the automatic transmission 14 from the third-speed position "3rd" to the fourth-speed position "O/D" is inhibited in step SI6. Where the automatic transmission 14 has five forward-drive positions, the shifting from the fourth-speed position "4th" to the fifth-speed position "O/D" is inhibited.

If the negative decision (NO) is obtained in all of the above-indicated steps SI3, SI4 and SI5, the shifting of the automatic transmission 14 to the highest gear position is permitted in step SI9, if the vehicle is running in a steady state (at a substantially constant speed V), and if the output $NN_{OUT}$ of the neural network NN is smaller than than a threshold K which corresponds to the NORMAL drive mode.

Referring next to the functional block diagram of FIG. 30 corresponding to that of FIG. 6, there will be described a second embodiment of this invention, wherein the electronic control device 42 incorporates drive mode estimation inhibiting means 143 which is adapted to inhibit the operation of the neural network NN of the drive mode estimating means 100 of the drive mode estimating portion 94, when the vehicle turning determining means 138 determines that the vehicle is turning. That is, the drive mode estimation inhibiting means 143 holds the output $NN_{OUT}$-1 before the determination of the vehicle turning. Like the arrangement of FIGS. 13 and 20-24, this arrangement is effective to prevent reduction of the output $NN_{OUT}$ of the neural network NN during the vehicle turning, which may result in erroneous estimation that the vehicle operator desires the ECONOMY drive mode, when the drive mode actually desired by the vehicle operator is the SPORTY drive mode. The second embodiment of FIG. 30 does not require the peak hold means 139 (FIG. 13) provided in the first embodiment.

Figure 30:
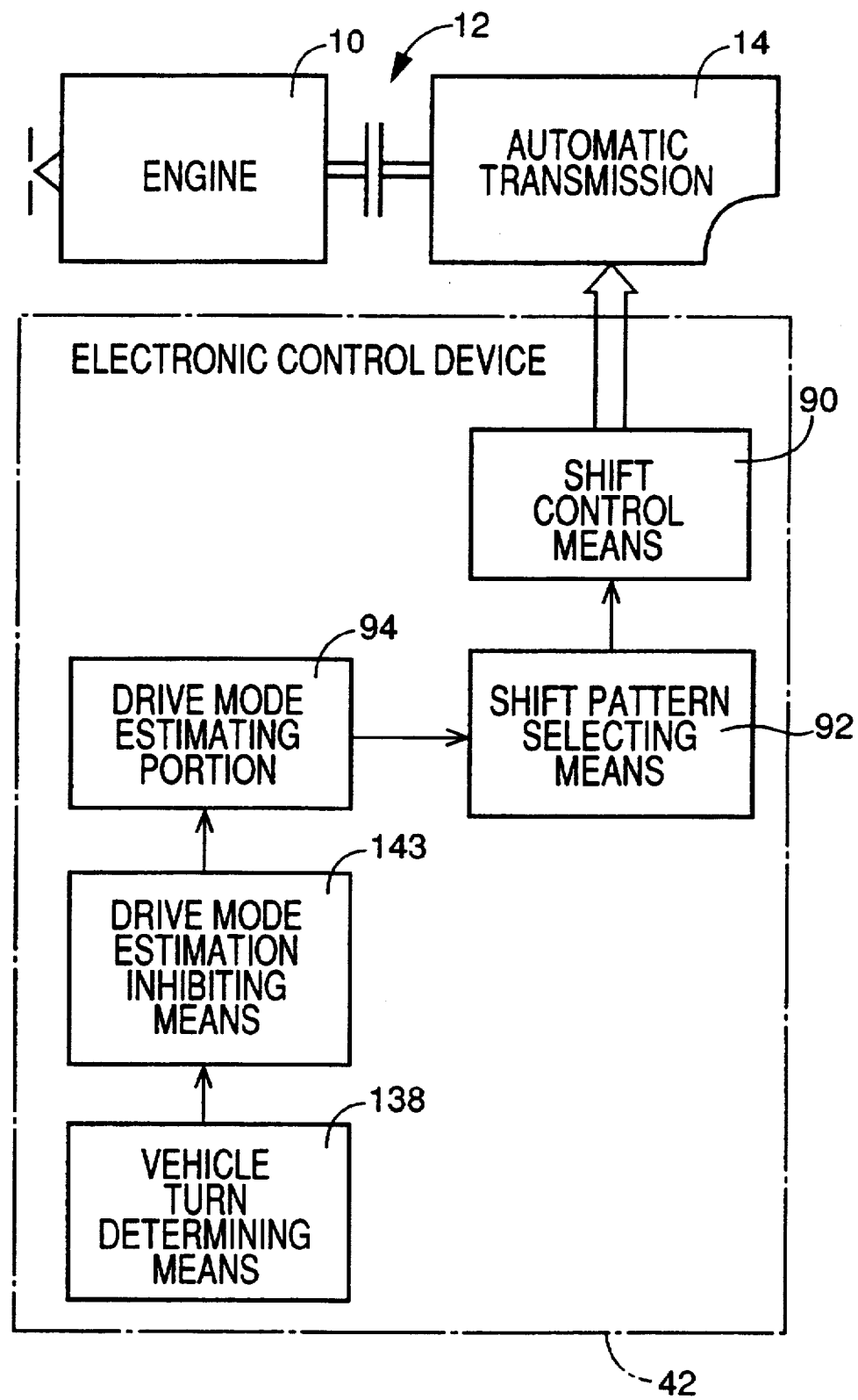
FIG. 30 is a functional block diagram corresponding to that of FIG. 6, showing functions of an electronic control device of the shift control apparatus according to a second embodiment of this invention.
Figure 31:
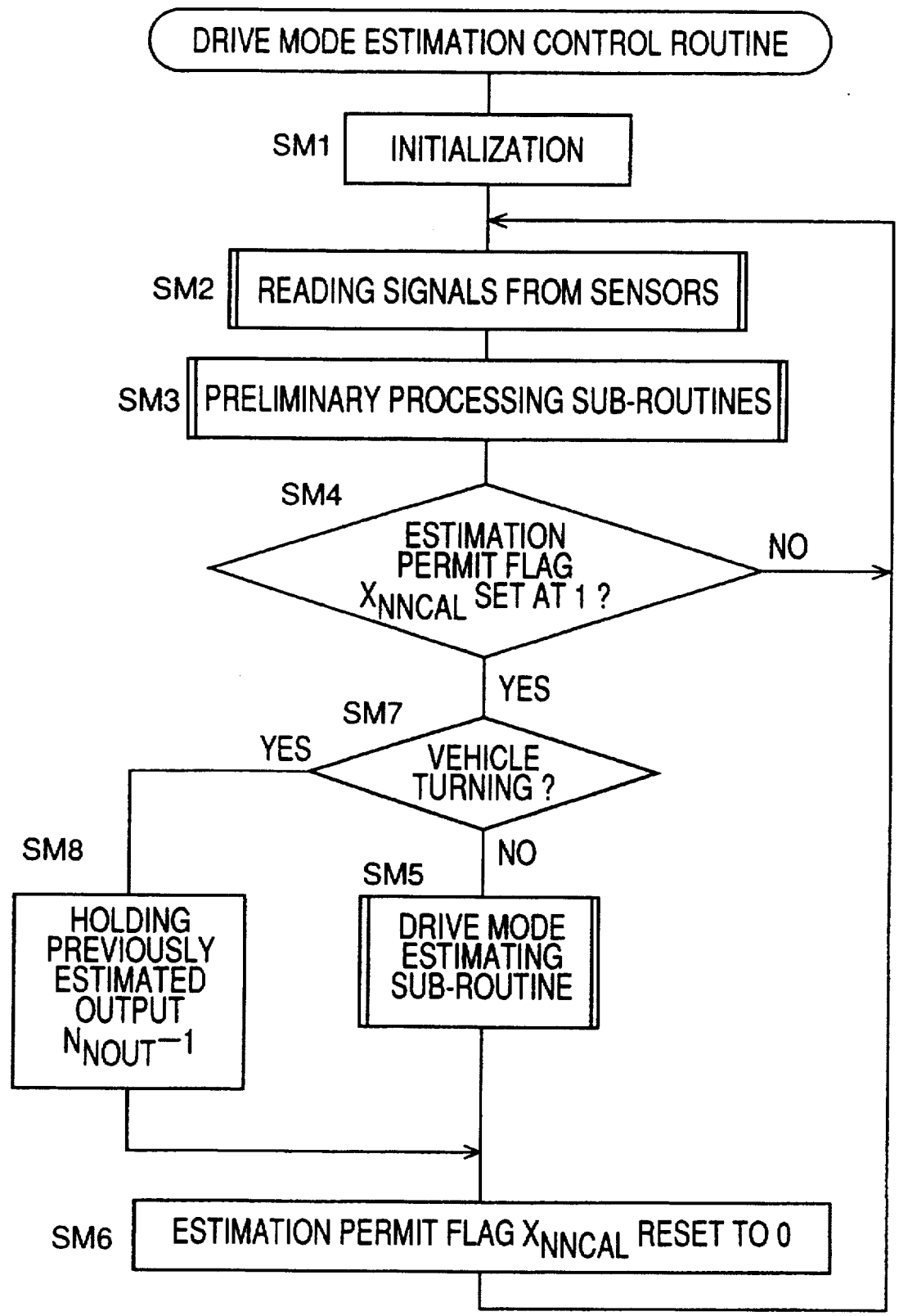
FIG. 31 is a flow chart corresponding to that of FIG. 14, illustrating a drive mode estimation control routine executed by the control device of FIG. 30.

The control device 42 in the second embodiment of FIG. 30 is adapted to execute a drive mode estimating control routine illustrated in the flow chart of FIG. 31. This drive mode estimating control routine includes steps SM7 and SM8 in addition to the steps of the routine of FIG. 14. In the routine of FIG. 31 in the present second embodiment, step SM7 corresponding to the vehicle turn determining means 138 of FIG. 30 is implemented when the affirmative decision (YES) is obtained in step SM4. Step SM7 is executed prior to the drive mode estimating sub-routine in step SM5, to determine whether the vehicle is turning. Step SM7 is identical with steps SF24, SF25 and SF26 of FIG. 21. If a negative decision (NO) is obtained in step SM7, the control flow goes to step SM5 to execute the drive mode estimating sub-routine. If an affirmative decision (YES) is obtained in step SM7, the control flow goes to step SM8 corresponding to the drive mode estimation inhibiting means 143 of FIG. 30. Step SM8 is provided to inhibit the operation of the neural network NN, and hold its output $NN_{OUT}$-1 before the determination of the vehicle turning in step SM7. Step SM8 is followed by step SM6.

Referring to the functional block diagram of FIG. 32 corresponding to that of FIG. 13, there will be described a third embodiment of this invention, wherein the signal peak calculating means 98f of the electronic control device 42 incorporates engine speed compensating means 145, which is adapted to compensate the engine speed $N_E$ if the vehicle has been running in a steady state at a substantially constant speed V for more than a predetermined time $K_{VCONAV}$, with the automatic transmission 14 placed in the second highest gear position (e.g., third-speed position "3rd"). In this case, the engine speed $N_E$ detected when the automatic transmission 14 is in the second highest gear position is lowered to that of the highest gear position. Where the currently selected second highest gear position is the third-speed position "3rd" whose speed ratio $i_3$ is 1.0, for example, the engine speed NE in the third-speed position "3rd" is lowered to that of the fourth-speed position "O/D" whose speed ratio $i_{O/D}$ is 0.8 (smaller than the speed ratio $i_3$). The engine speed $N_E$ thus compensated to $N_E \times i_{O/D}$ is applied to the maximum engine speed updating means 135, which is adapted to update the maximum engine speed $N_{EMAX}$, as described above with respect to the first embodiment. The engine speed compensating means 145 is effective to prevent erroneous estimation of the operator's desired drive mode while the vehicle is running at a relatively high speed (e.g., 120 km/h) in a steady state, with the automatic transmission 14 placed in the second highest gear position, for example, in the third-speed position "3rd". Namely, in the absence of the engine speed compensating means 145, the output $NN_{OUT}$ of the neural network NN may be large enough to select the SPORTY drive mode in the above case, while in fact the vehicle operator desires to drive the vehicle in the NORMAL drive mode (in a steady state) at a relatively high speed in the second highest gear position.

Figure 20:
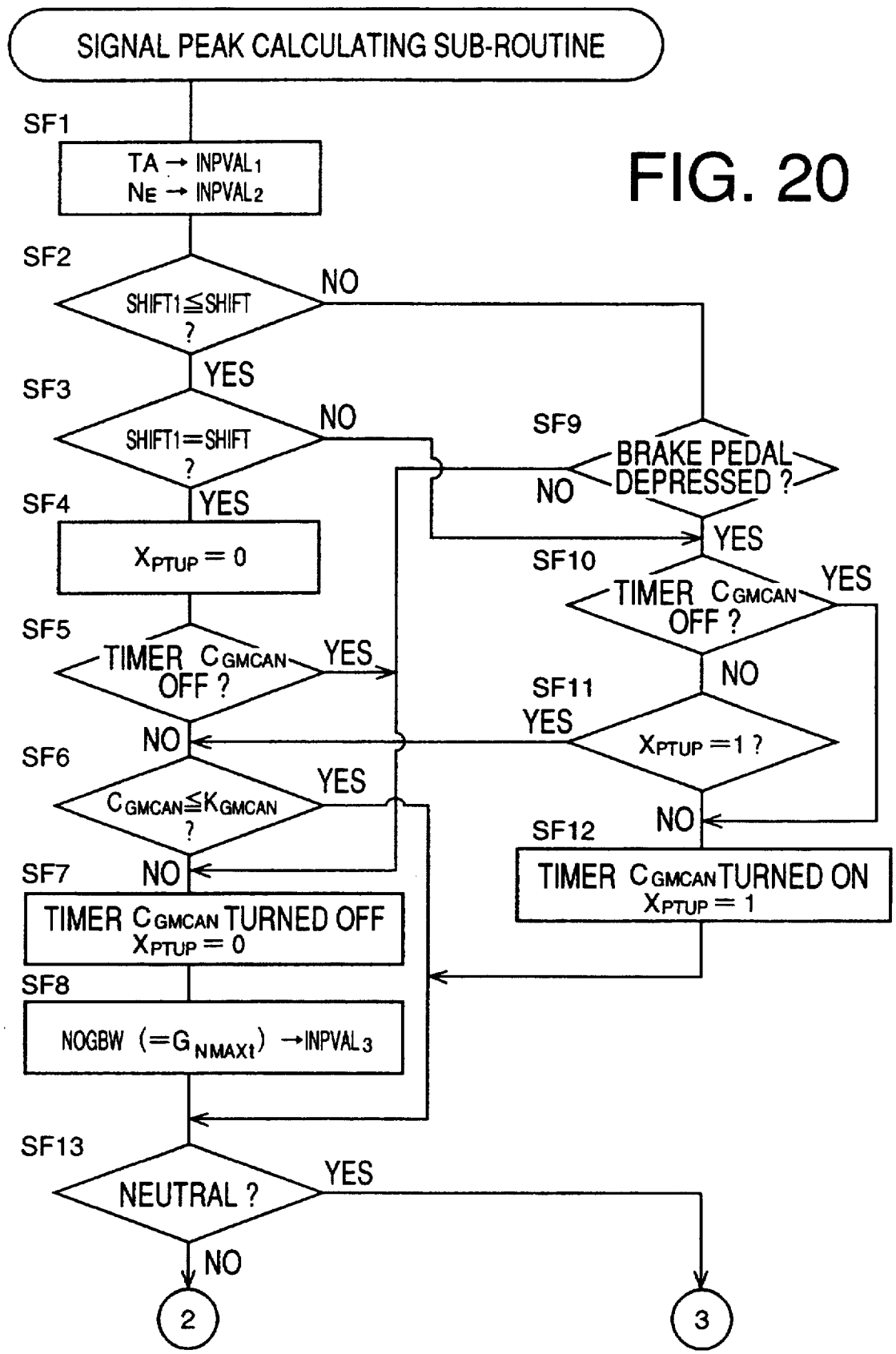
FIGS. 20–23 are flow charts illustrating a signal peak calculating sub-routine executed in step SM3 of the routine of FIG. 14.
Figure 32:
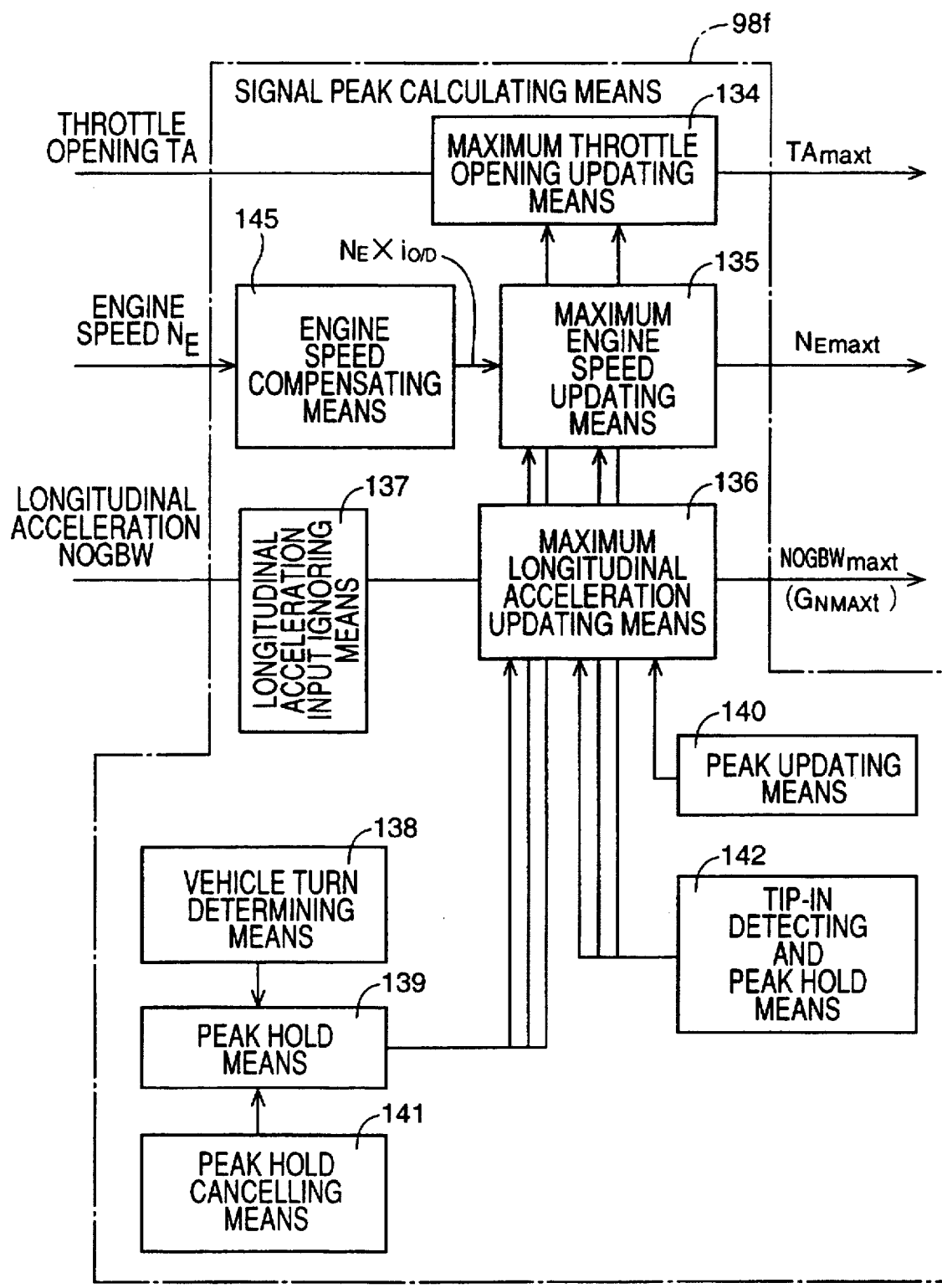
FIG. 32 is a functional block diagram corresponding to that of FIG. 13, showing signal peak calculating means used in a third embodiment of this invention.
Figure 33:
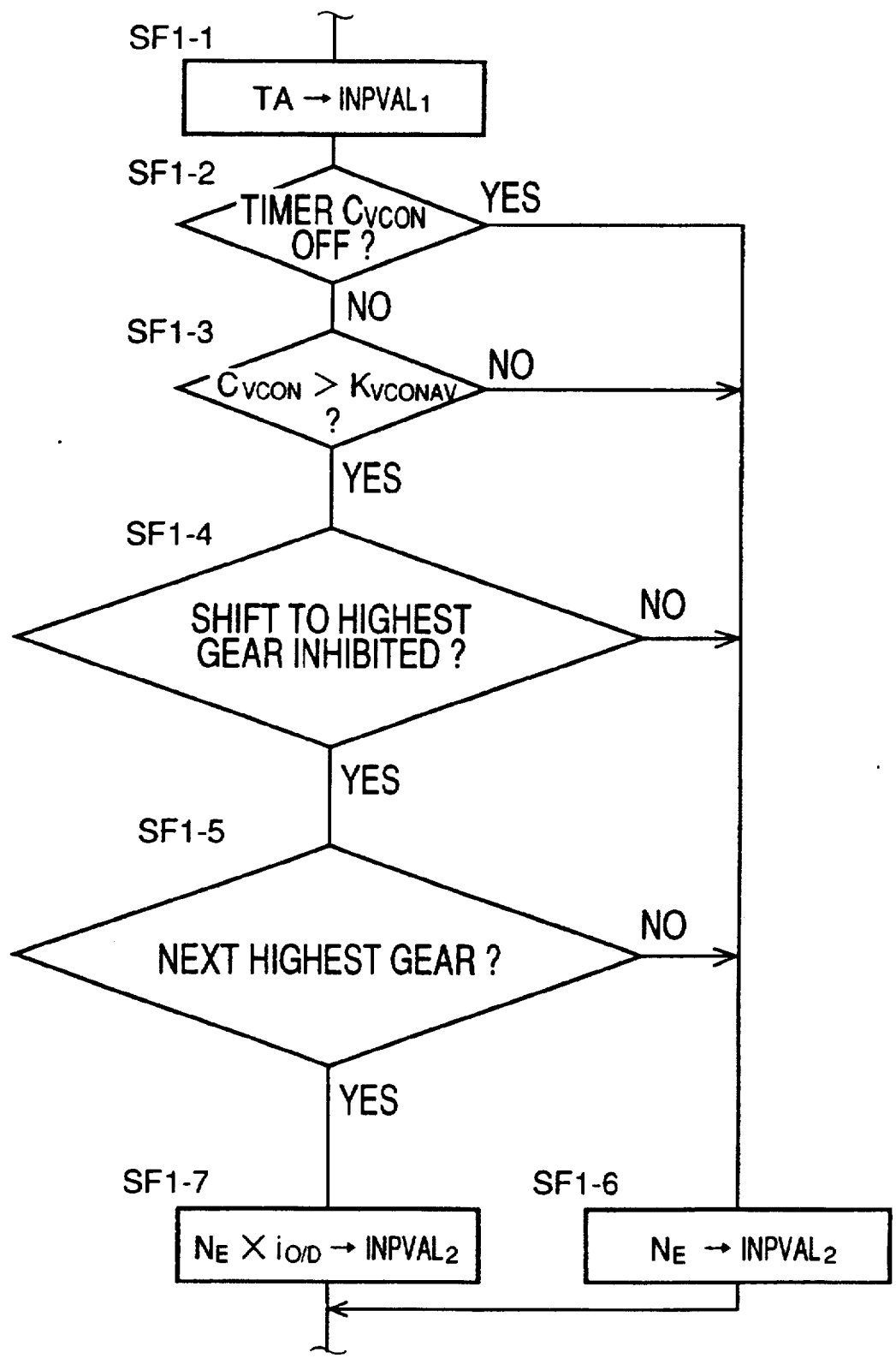
FIG. 33 is a flow chart illustrating a part of signal peak calculating sub-routine executed by the signal peak calculating means of FIG. 32, which part corresponds to step SF1 of the sub-routine of FIG. 20.

The flow chart of FIG. 33 shows steps which are executed in the control device 42 of the third embodiment of FIG. 32, in place of step SF1 of the flow chart of FIG. 20. In step SF1-1 of FIG. 33 corresponding to step SF1 of FIG. 20, the throttle opening angle TA is read and stored in the memory area INPVAL1. Step SF1-1 is followed by step SF1-2 to determine whether a CONSTANT VEHICLE SPEED timer $C_{VCON}$ for measuring a time during which the vehicle is running at a constant speed is off. If an affirmative decision (YES) is obtained in step SF1-2, it means that the vehicle is not running at a constant speed. In this case, step SF1-6 is implemented to read in the engine speed $N_E$ and store it a memory area INPVAL2, to determine the maximum engine speed.

If a negative decision (NO) is obtained in step SF1-2, it means that the vehicle speed V is constant. In this case, the control flow goes to step SF1-3 to determine whether the content of the CONSTANT VEHICLE SPEED timer $C_{VCON}$ is larger than the predetermined threshold $K_{VCONAV}$. This threshold $K_{VCONAV}$ is selected so as to determine that a steady run of the vehicle at a relatively high speed is not a result of the vehicle operator's desire to drive the vehicle in the SPORTY drive mode. For instance, the threshold $K_{VCONAV}$ is selected to be about 3-4 seconds. If a negative decision (NO) is obtained in step SF1-3, step SF1-6 and the following steps are implemented. If an affirmative decision (YES) is obtained in step SF1-3, the control flow goes to step SF1-4 to determine whether the shift of the automatic transmission 14 to the highest gear position is inhibited due to the uphill run control or downhill run control of the vehicle, or due to a relatively large output $NN_{OUT}$ of the neural network NN. If a negative decision (NO) is obtained in step SF1-4, steps SF1-6 and the following steps are implemented. If an affirmative decision (YES) is obtained in step SF1-4, the control flow goes to step SF1-5 to determine whether the automatic transmission 14 is placed in the next highest gear position.

If a negative decision (NO) is obtained in step SF-1-5, the step SF1-6 and the following steps are implemented. If an affirmative decision (YES) is obtained in step SF1-5, the control flow goes to step SF1-7 in which the engine speed NE is compensated as described above, namely, lowered to that in the highest gear position (e.g., $N_E \times i_{O/D}$), and the compensated engine speed $N_E$ is stored in the memory area INPVAL2. It sill be understood that steps SF1-2 through SF1-5 and SF1-7 correspond to the engine speed compensating means 145.

Referring next to FIGS. 34-37, there will be described a fourth embodiment of this invention. This embodiment is different from the first embodiment of FIGS. 1-29, with respect to maximum output increase rate calculating means 148 shown in FIG. 34, and a maximum throttle opening increase rate calculating sub-routine shown in FIG. 37 which is executed by the calculating means 148.

Figure 34:
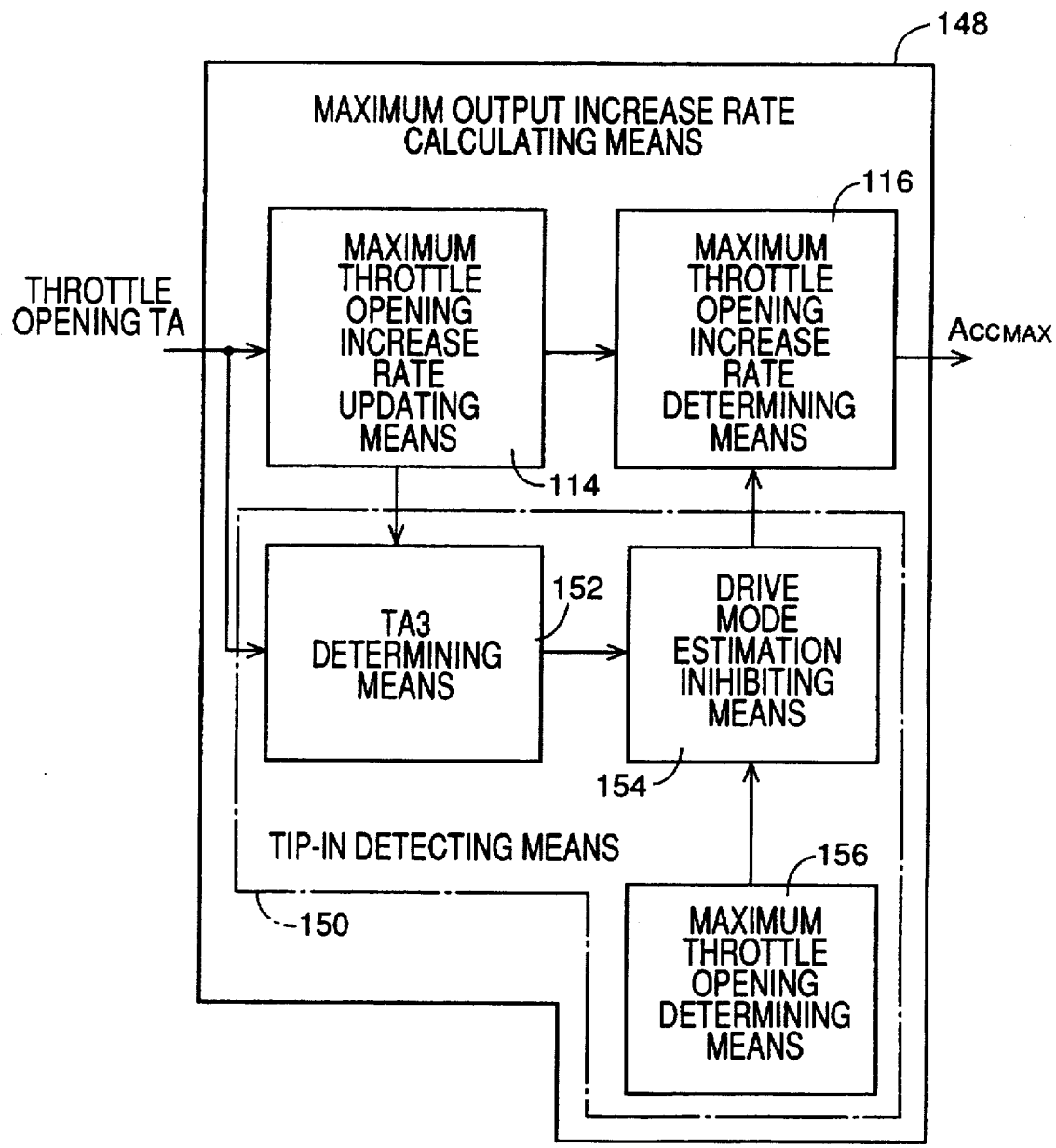
FIG. 34 is a view corresponding to that of FIG. 9, showing maximum output increase rate calculating means provided in a fourth embodiment of the present invention
Figure 35:
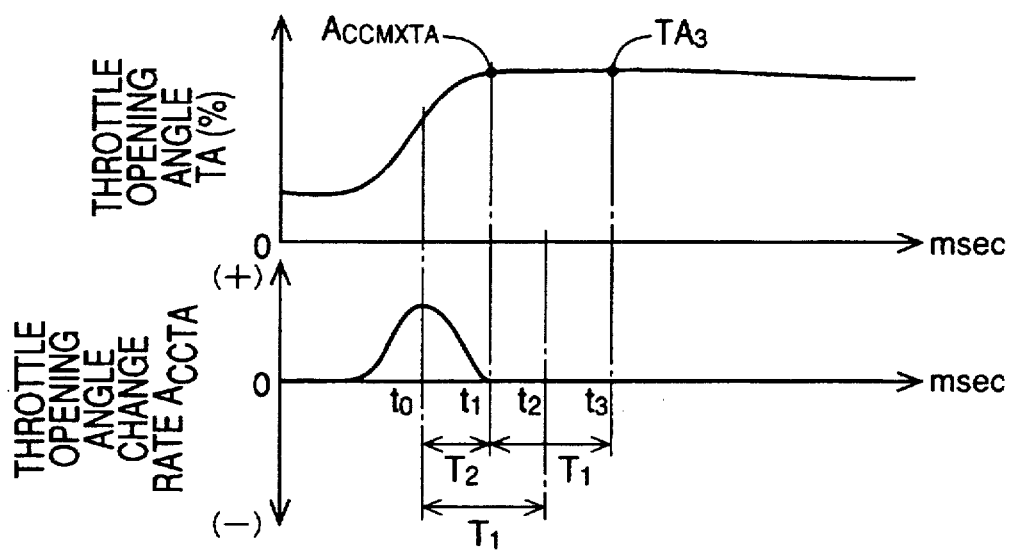
FIGS. 35 and 36 are time charts corresponding to those of FIGS. 25 and 26, for explaining the fourth embodiment of FIG. 34.
Figure 36:
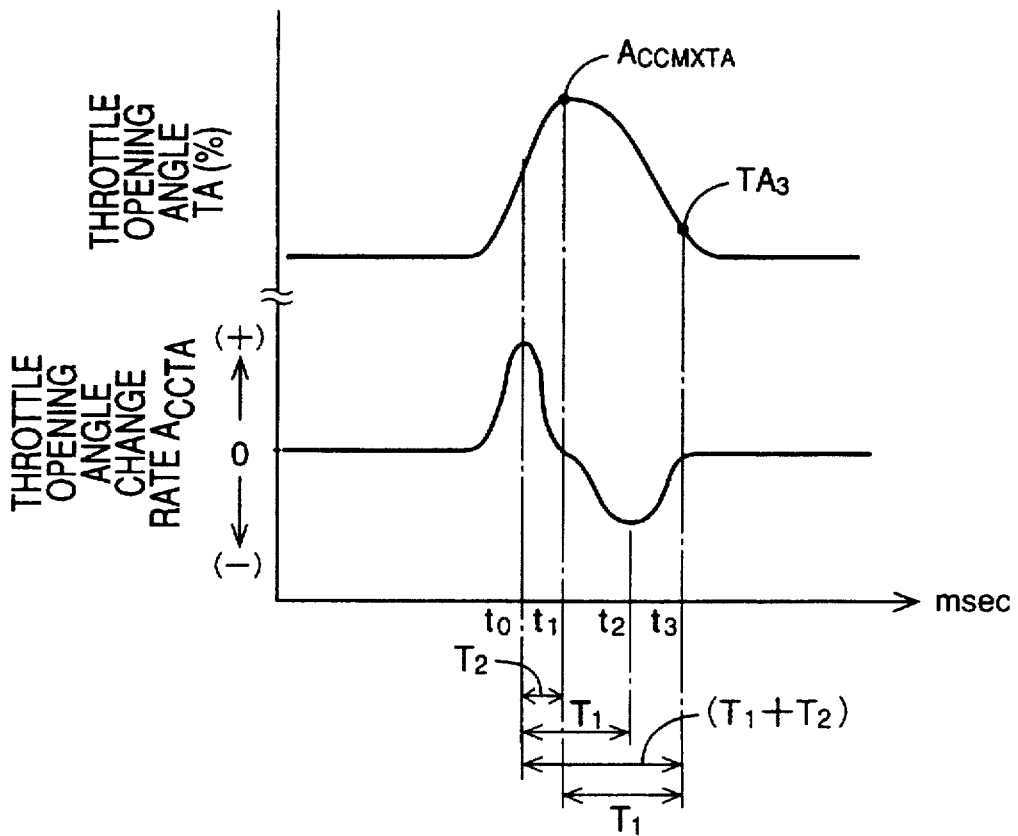

As shown in FIG. 34, the maximum output increase rate calculating means 148 used in the preliminary processing means 98 incorporates the maximum throttle opening increase rate updating means 114 and the maximum throttle opening increase rate determining means 116 which have been described above with respect to the first embodiment by reference to FIG. 9. However, tip-in detecting means 150 incorporated in this maximum output increase rate calculating means 148 is different from the tip-in detecting means 115 in the first embodiment of FIG. 9. The tip-in detecting means 150 determines that the "tip-in" action (abrupt depression and immediate releasing) of the accelerator pedal 58 has taken place, if a difference ($A_{CCMXTA}$-TA3), that is, a difference between the maximum throttle opening angle $A_{CCMXTA}$ (during vehicle acceleration) and the throttle opening angle TA3 a predetermined time (e.g., T1+T2 as indicated in FIGS. 35 and 36) after the point of determination of the maximum increase rate $A_{CCMAX}$ of the throttle opening angle TA is larger than a predetermined threshold $K_{TACHIP}$ The tip-in action of the accelerator pedal 58 does not necessarily reflect the drive mode of the vehicle desired by the vehicle operator. If the tip-in detecting means 150 detects the occurrence of the tip-in action of the accelerator pedal 58, the tip-in detecting means 150 inhibits an operation of the maximum throttle opening increase rate determining means 116 to determine the maximum or maximal value $A_{CCMAX}$ of the increase rate of the throttle opening angle TA. In this case, the output of the maximum throttle opening increase rate determining means 116 is not applied to the drive mode estimating means 100 of the drive mode estimating portion 94 of the electronic control device 42.

The tip-in detecting means 150 includes TA3 determining means 152, drive mode estimation inhibiting means 154 and maximum throttle opening determining means 156. The maximum throttle opening determining means 156 monitors the maximum amount of operation of the accelerator pedal 58 (manually operated means for designating the desired output of the engine 10 or the desired drive force of the vehicle), more particularly, the maximum throttle opening angle $A_{CCMXTA}$, for the predetermined time period (e.g., T1 as indicated in FIGS. 35 and 36) after the maximum throttle opening angle increase rate $A_{CCMXTA}$ is determined by the maximum throttle opening increase rate updating means 114 described above.

The TA3 determining means 152 determines the throttle opening angle value TA3 when the predetermined time (e.g., T1+T2) has passed after the determination of the maximum increase rate $A_{CCMAX}$ of the throttle opening angle TA. The throttle opening angle value TA3 is considered to be the throttle opening angle TA at the end of an operation of the accelerator pedal 58 by the operator to accelerate the vehicle. The throttle opening angle value TA3 will be referred to as "critical value" of the throttle opening angle TA. The TA3 determining means 152 functions as critical throttle opening value determining means for determining the critical value TA3 of the throttle opening angle TA. For instance, the maximum increase rate $A_{CCMAX}$ of the throttle opening angle TA is determined by the maximum throttle opening increase rate updating means 114, at point of time t0, as indicated in FIGS. 35 and 36, and the maximum throttle opening angle $A_{CCMXTA}$ is obtained at point of time t1 as also indicated in FIGS. 35 and 36. In this case, the TA3 determining means 152 determines the critical value TA3 of the throttle opening angle TA at point of time t3 which is the predetermined time T1 after the point of time t1. The point of time t3 is the predetermined time (T1+T2) after the point of time t0 at which the maximum increase rate $A_{CCMAX}$ is determined.

The drive mode estimation inhibiting means 154 determines whether the difference ($A_{CCMXTA}$-TA3) between the maximum throttle opening angle $A_{CCMXTA}$ determined by the maximum throttle opening determining means 156 and the critical throttle opening angle value TA3 determined by the TA3 determining means 152 is larger than the predetermined threshold $K_{TACHIP}$. If the affirmative determination is obtained, the drive mode estimation inhibiting means 154 inhibits the operation of the maximum throttle opening increase rate determining means 116, and thereby inhibits the operation of the drive mode estimating means 100 to estimate the vehicle operator's desired vehicle drive mode on the basis of the output of the maximum throttle opening increase rate determining means 116. If the difference ($A_{CCMXTA}$-TA3) is not larger than the threshold $K_{TACHIP}$, the drive mode estimation inhibiting means 154 permits the operation of the maximum throttle opening increase rate determining means 116 and the operation of the drive mode estimating means 100 to estimate the operator's desired drive mode on the basis of the output of the determining means 116, namely, the maximum throttle opening increase rate $A_{CCMAX}$, which represents the maximum increase rate of the amount of operation or depression of the accelerator pedal 58 which functions as the manually operated means for designating the desired output of the engine 10 or desired drive force of the vehicle.

The time chart of FIG. 36 shows an example of the tip-in action of the accelerator pedal 58, wherein the time T1 is a time after the moment at which the maximum throttle opening angle $A_{CCMXTA}$ is determined. In the present fourth embodiment, the time T1 is fixed. However, the time T1 may be equal to a time between the point of time t0 (at which the maximal value $A_{CCMAX}$ of the increase rate of the throttle opening TA) and point of time t2 at which the minimal value $A_{CCMIN}$ of the throttle opening angle increase rate), as indicated in FIG. 36. The time T2 indicated in FIGS. 35 and 36 is a time length between the point of time t0 at which the maximum or maximal throttle opening angle increase rate $A_{CCMAX}$ is determined, and the point of time t1 at which the maximum throttle opening angle $A_{CCMXTA}$ (maximum amount of operation of the accelerator pedal 58) is determined.

Figure 37:
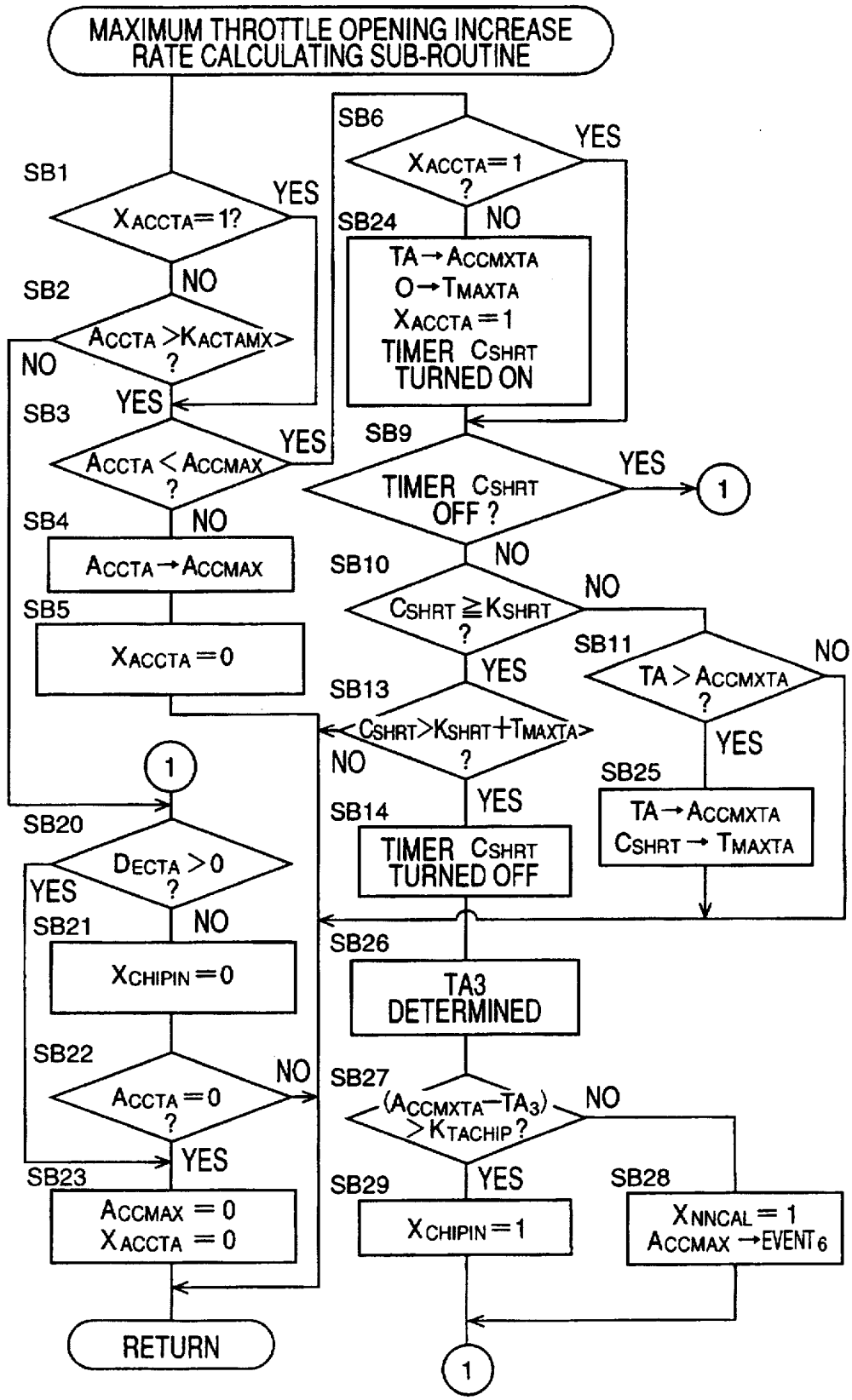
FIG. 37 is a flow chart illustrating a maximum throttle opening increase rate calculating sub-routine executed by the maximum output increase rate calculating means of FIG. 34.

In the present fourth embodiment of FIGS. 34–37, the maximum throttle opening angle increase rate calculating means 148 is adapted to execute the maximum throttle opening increase rate calculating sub-routine illustrated in the flow chart of FIG. 37 for calculating the maximum throttle opening angle increase rate $A_{CCMAX}$ during depression of the accelerator pedal 58. This sub-routine of FIG. 37 is identical with the sub-routine of FIG. 16 of the first embodiment, except for steps SB24–SB28 in the sub-routine of FIG. 37.

If the negative decision (NO) is obtained in step SB6, the control flow goes to step SB24 in which the present throttle opening angle TA is stored as the maximum throttle opening angle $A_{CCMXTA}$, and the threshold $T_{MAXTA}$ used in steps SB13 is reset to "0". Further, the ACCELERATOR PEDAL SPEED flag $X_{ACCTA}$ is set to "1", and the timer $C_{SHRT}$ is turned on, in step SB24. Step SB24 is followed by steps SB9–SB11, SB13 and SB14 which have been described by reference to the flow chart of FIG. 16, and step SB25 which is different from step SB12 of FIG. 9. The threshold $K_{SHRT}$ used in step SB10 is set to be about 0.15 second in this present fourth embodiment. This threshold $K_{SHRT}$ corresponds to the above-indicated time T2 between the points of time t1 and t2. In step SB25, the content of the timer $C_{SHRT}$ is stored as the threshold $T_{MAXTA}$, as well as the present throttle opening angle TA is set as the maximum throttle opening angle $A_{CCMXTA}$ as in the first embodiment. Step SB25 corresponds to the point of time t1 in FIG. 36. It will be understood that steps SB11 and SB25 corresponds to the maximum throttle opening determining means 156. The threshold $T_{MAXTA}$ used in step SB13 is held within a range of 0–0.15 second, and corresponds to the time T2 between the points of time t0 and t1.

Step SB14 implemented when the affirmative decision (YES) is obtained in step SB13 is followed by step SB26 in which the present throttle opening angle TA is determined as the critical value TA3. Step SB26 corresponds to the point of time t3 indicated in FIG. 35. It will be understood that steps SB3, SB7, SB11, SB25, SB13 and SB26 correspond to the TA3 determining means 152 for determining the critical value TA3 of the throttle opening angle TA.

Step SB26 is followed by step SB27 to determine whether the difference ($A_{CCMXTA}$-TA3) is larger than the predetermined threshold $K_{TACHIP}$. This threshold $K_{TACHIP}$ is selected to be about 7%.

If a negative decision (NO) is obtained in step SB27, it means that the accelerator pedal 58 has been continuously depressed such that the difference (ACCMXTA-TA3) between the maximum throttle opening angle $A_{CCMXTA}$ and the critical throttle opening angle value TA3 is not larger than the predetermined threshold $K_{TACHIP}$ (about 7%) even after the predetermined time ($K_{SHRT}$+$T_{MAXTA}$=about 0.3 second) has passed after the depressing speed of the accelerator pedal 58 has begun to decrease. That is, the affirmative decision in step SB27 indicates a continuously depressing action of the accelerator pedal 58 as indicated in FIG. 35, and not the so-called "tip-in" action as indicated in FIG. 36. In this case, the control flow goes to step SB28 in which the ESTIMATION PERMIT flag $X_{NNCAL}$ is set to "1", and the maximum value $A_{CCMAX}$ of the throttle opening angle increase rate $A_{CCTA}$ is stored in a memory area EVENT 6 from which the appropriate signal is applied to the neural network NN.

If a negative decision (NO) is obtained in step SB27, it means that the difference (ACCMXTA-TA3) between the maximum throttle opening angle $A_{CCMXTA}$ and the critical throttle opening angle value TA3 is not larger than the predetermined threshold $K_{TACHIP}$ after the predetermined time ($K_{SHRT}$+$T_{MAXTA}$) has passed after the depressing speed of the accelerator pedal 58 has begun to decrease. That is, the negative decision in step SB27 indicates that the tip-in action (abrupt depression and immediate releasing) of the accelerator pedal 58 has taken place. In this case, the control flow goes to step SB29 in which the TIP-IN flag $X_{CHIPIN}$ indicative of the tip-in action is set to "1", so that the maximum throttle opening increase rate $A_{CCMAX}$ is not applied to the drive mode estimating means 100, and the operation of this estimating means 100 to estimate the operator's drive drive mode on the basis of the maximum increase rate $A_{CCMAX}$ is inhibited.

Step SB29 is followed by steps SB20-SB23 which have been described by reference to the flow chart of FIG. 16.

In the present fourth embodiment of FIG. 37, steps SB27 and SB29 correspond to the drive mode estimation inhibiting means 154, and steps SB3, SB7, SB11, SB25, SB13, SB26 (TA3 determining means 152) and steps SB27, SB29 (estimation inhibiting means 154) correspond to the tip-in detecting means 150 of FIG. 34.

In the present fourth embodiment, the drive mode estimation inhibiting means 154 inhibits the operation of the drive mode estimating means 100 to estimate the vehicle operator's desired drive mode on the basis of the maximum or maximal value $A_{CCMAX}$ of the increase rate of the throttle opening angle TA (increase rate of the operation amount of the accelerator pedal 58), if the difference ($A_{CCMXTA}$-TA3) between the maximum throttle opening angle $A_{CCMXTA}$ determined by the maximum throttle opening determining means 156 and the critical value TA3 of the throttle opening angle TA at the point of time t3 is larger than the predetermined threshold $K_{TACHIP}$. The point of time t2 is the predetermined time T1 after the point of time t1 at which the maximum throttle opening angle $A_{CCMXTA}$ is obtained. Thus, the operation of the drive mode estimating means 100 to estimate the operator's desired drive mode of the vehicle is inhibited when the opening angle TA of the throttle valve 68 is abruptly increased and decreased due to the so-called "tip-in" action of the accelerator pedal 58. If the above-indicated difference ($A_{CCMXTA}$-TA3) is not larger than the threshold $K_{TACHIP}$, the estimation of the operator's desired drive mode by the drive mode estimating means 100 is permitted. The present arrangement permits accurate estimation of the desired vehicle drive mode, on the basis of the maximum value of the increase rate of the amount of operation of the accelerator pedal 58 except when the tip-in action of the accelerator pedal 58 has occurred.

It is also noted that the TA3 determining means 152 is adapted to determine the critical value TA3 of the throttle opening angle TA on the basis of the throttle opening angle TA at the point of time t3 which is the predetermined time (T1+T2) after the point of time t0 at which the maximal value $A_{CCMAX}$ of the increase rate of the throttle opening angle TA is determined by the maximum throttle opening increase rate updating means 114. The drive mode estimation inhibiting means 154 is adapted to calculate the difference ($A_{CCMXTA}$-TA3) between the maximum or maximal increase rate $A_{CCMXTA}$ determined by the maximum throttle opening determining means 156 and the critical throttle opening angle value TA3 determined by the TA3 determining means 152. The above-indicated difference is a variable which accurately reflects the occurrence of the tip-in action of the accelerator pedal 58.

The maximum throttle opening determining means 156 is adapted to monitor the maximum throttle opening angle $A_{CCMXTA}$ during the time period T1 after the determination of the maximum increase rate $A_{CCMAX}$ by the maximum throttle opening increase rate updating means 114. The TA3 determining means 152 determines, as the critical value TA3, the throttle opening angle TA at the point of time t3 which is the predetermined time (T1+T2) after the point of time t0 at which the maximum increase rate $A_{CCMAX}$ is determined. The time T2 is the time period between the point of time t0 at which the maximal increase rate $A_{CCMAX}$ is determined and the point of time t1 at which the maximum throttle opening angle $A_{CCMXTA}$ is determined by the determining means 128. The time T1 is the monitoring period of the determining means 156, or the time period between the point of time t0 at which the maximal increase rate $A_{CCMAX}$ is determined and the point of time t2 at which the minimal increase rate $A_{CCMIN}$ is determined. This arrangement also contributes to an improvement in the accuracy of detection of the tip-in action of the accelerator pedal 58.

Figure 38:
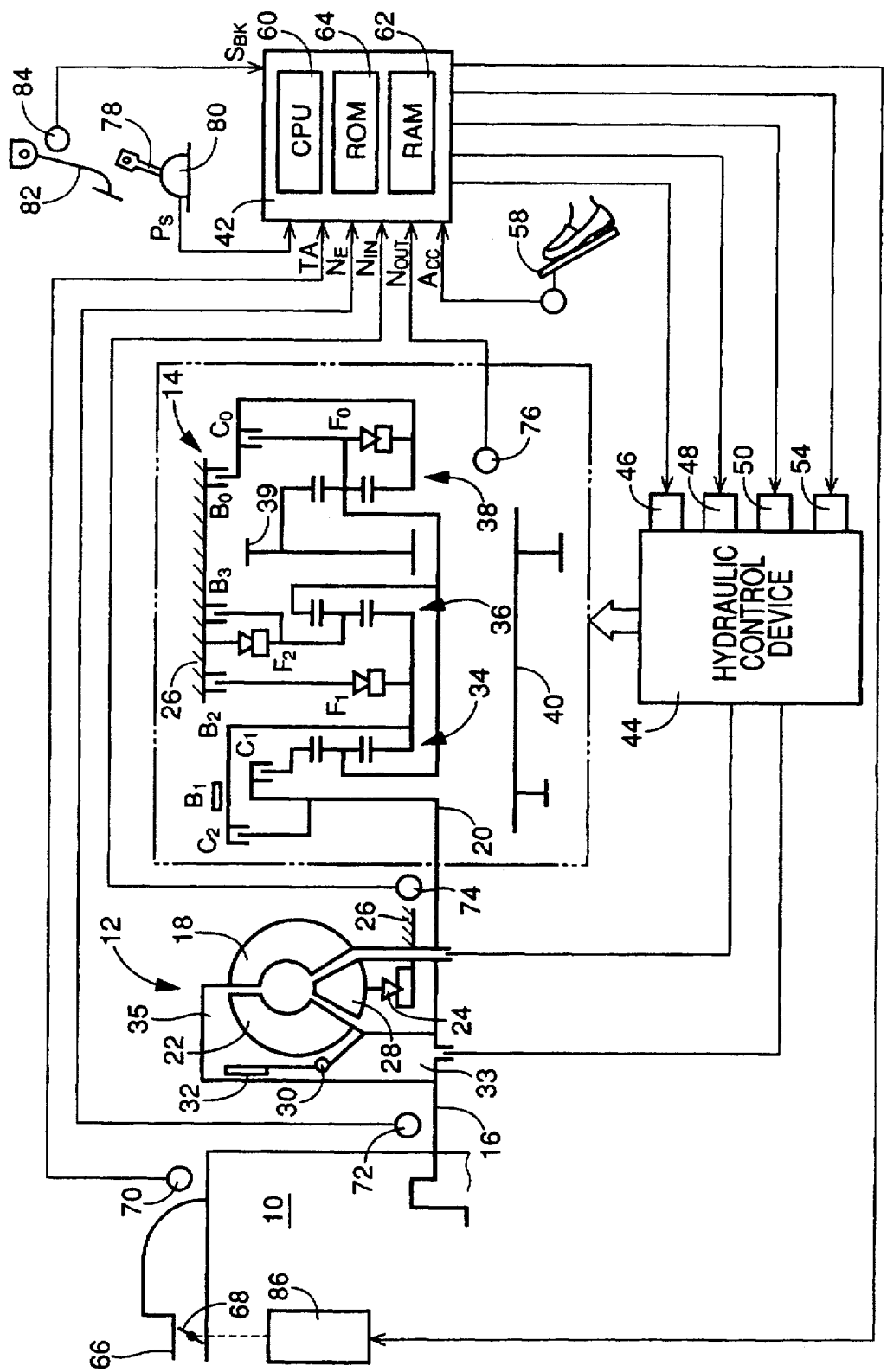
FIG. 38 is a schematic view showing a shift control apparatus including a drive mode estimating device constructed according to a fifth embodiment of this invention.
Figure 57:
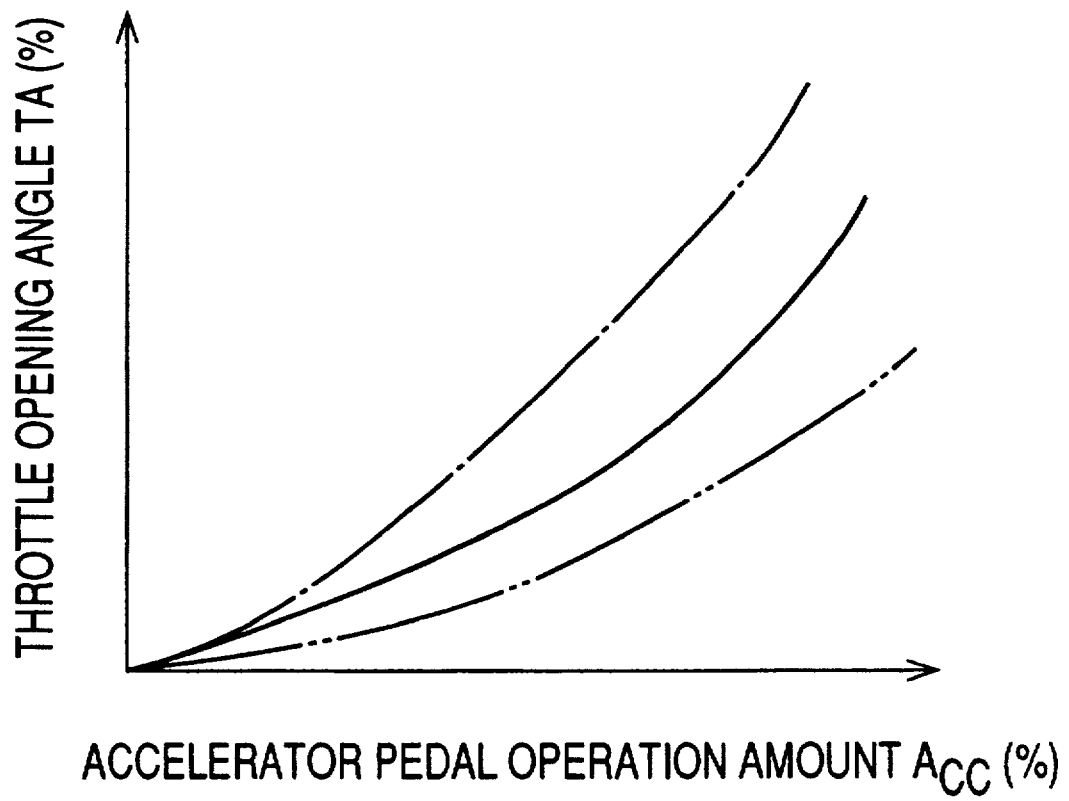
FIG. 57 is a graph indicating relationships between operation amount $A_{CC}$ of accelerator pedal and throttle opening angle TA, which are used in a ninth embodiment of the invention, for controlling the throttle valve.

Referring to FIGS. 38-48, there will be described a fifth embodiment of this invention. In the present embodiment, a throttle actuator 86 is provided to operate the throttle valve 68, as shown in FIG. 38. The throttle actuator 86 is adapted to change the opening angle TA of the throttle valve 68, according to a control signal from the electronic control device 42, such that the throttle opening angle TA changes with a change in the operation amount $A_{CC}$ of the accelerator pedal 58, according to a predetermined relationship as indicated in FIG. 57, by way of example. The accelerator pedal 58 functions as the manually operated means for designating the vehicle drive force or engine output as desired by the vehicle operator.

Figure 39:
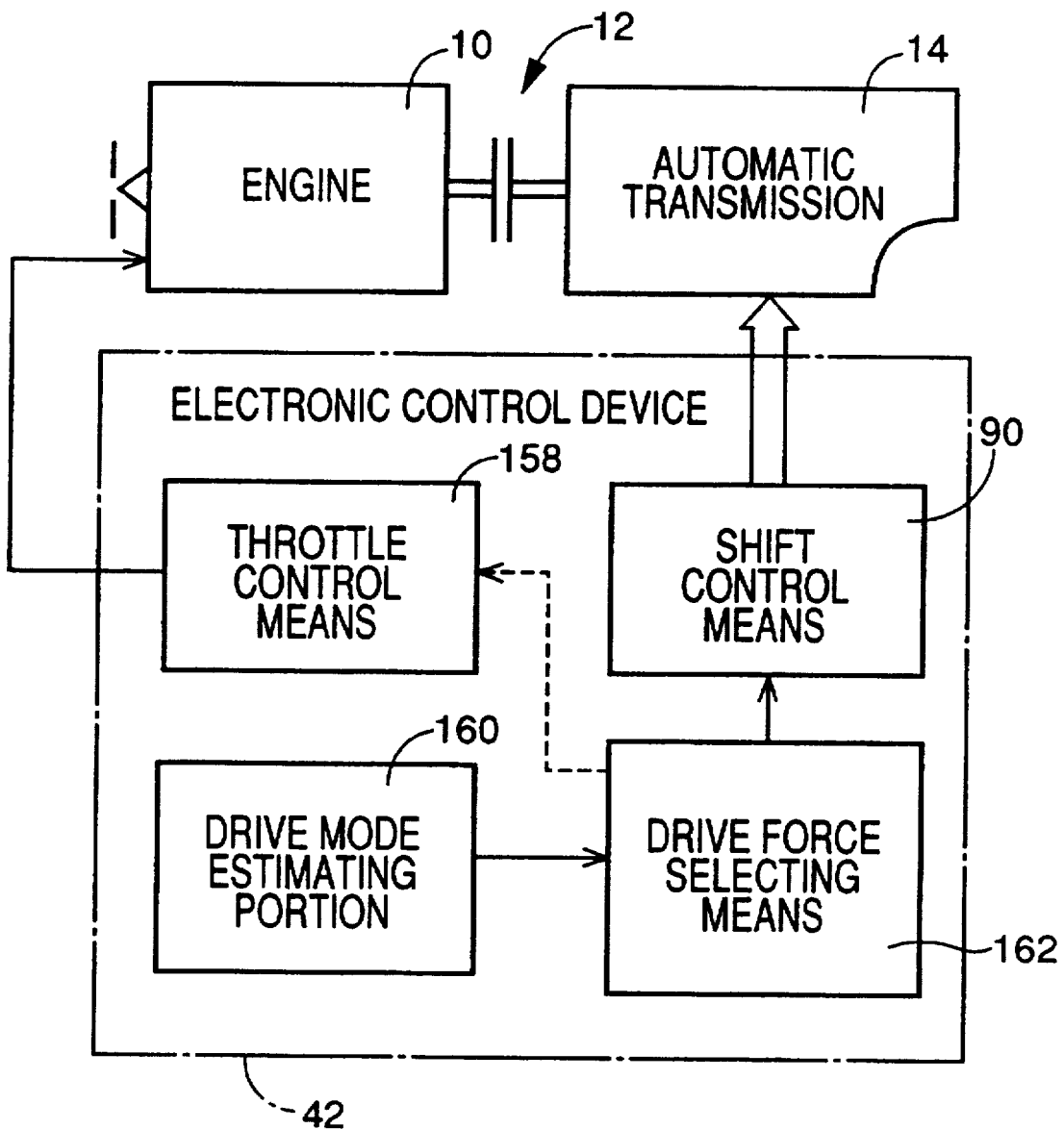
FIG. 39 is a functional block diagram indicating major control functions of an electronic control device of the shift control apparatus of FIG. 38.

As shown in the block diagram of FIG. 39, the electronic control device 42 includes the shift control means 90 as described above, and throttle control means 158, drive mode estimating portion 160, and drive force selecting means 162. The throttle control means 158 is adapted to activate the throttle actuator 86 on the basis of the detected operation amount $A_{CC}$ of the accelerator pedal 58 and according to the predetermined relationship as indicated in FIG. 57. The drive force control means 162 is adapted to select one of the shift patterns stored in the ROM 64, so that the shift control means 90 controls the solenoid-operated valves 46, 48, 50 to control the shifting actions of the automatic transmission 14, according to the selected shift pattern, on the basis of the vehicle running speed V detected by the vehicle speed sensor 76 and the throttle opening angle TA detected by the throttle sensor 70.

The drive force control means 162 selects one of the shift patterns of FIGS. 3, 4 and 5 described above, on the basis of a drive mode index value FDL received from the drive mode estimating portion 94. The drive mode index value FDL is taken along the vertical axis in FIG. 43. When the drive mode index value changes as indicated by solid line in FIG. 43, for example, the drive force selecting means 162 selects the SPORTY DRIVE MODE shift pattern of FIG. 3 if the index value exceeds a SPORTY DRIVE threshold PSL, and selects the ECONOMY DRIVE MODE shift pattern of FIG. 5 if the index value is lowered below an ECONOMY DRIVE threshold ESL. If the drive mode index value is between the two threshold values PSL and ESL, the drive force selecting means 162 selects the NORMAL DRIVE MODE shift pattern of FIG. 4.

Figure 40:
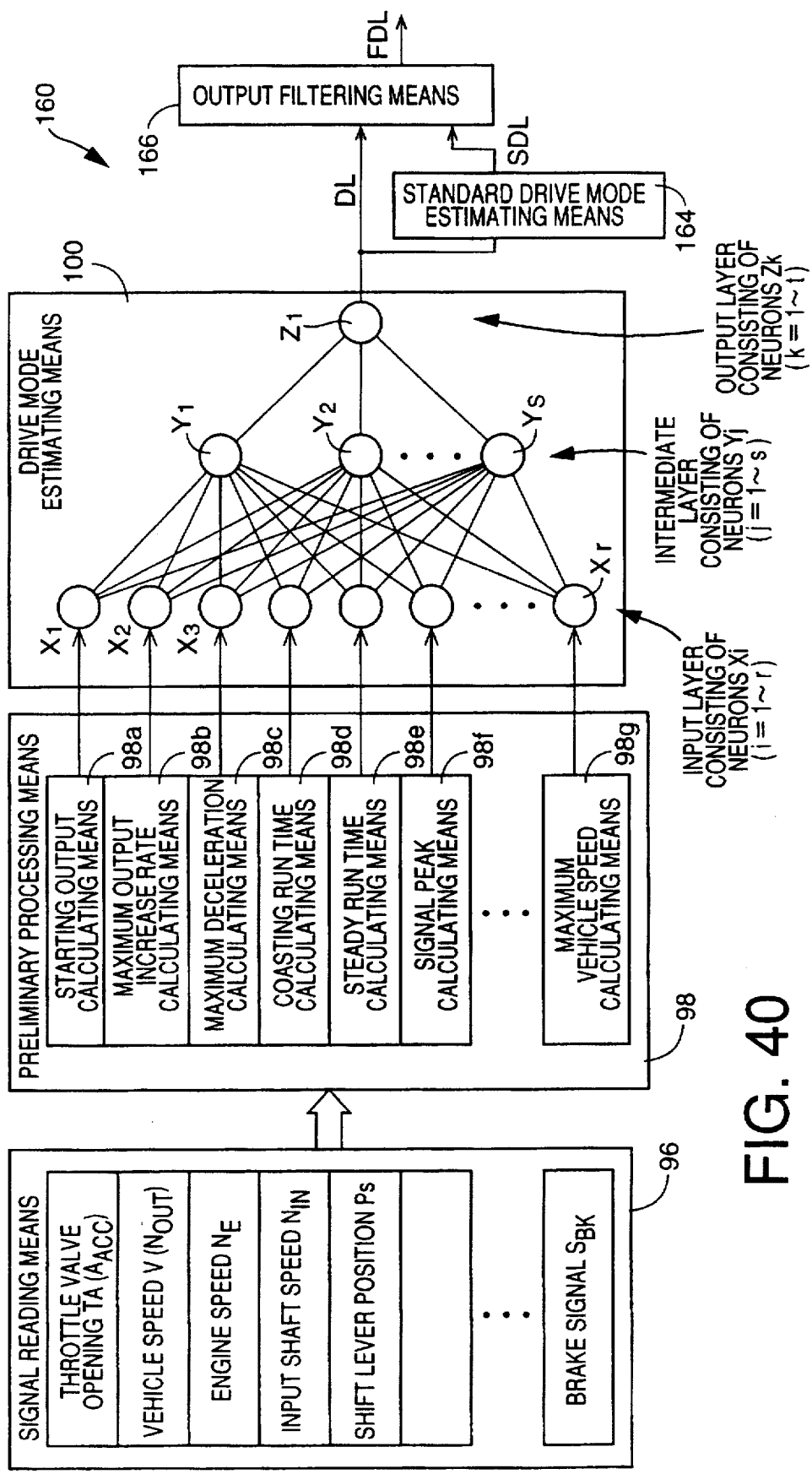
FIG. 40 is a functional block diagram indicating functions of a drive mode estimating portion of the control device of FIG. 39.

As shown in FIG. 40, the drive mode estimating position 160 includes a neural network NN as described above, and produces an output in the form of the drive mode index FDL, on the basis of the output $NN_{OUT}$ of the neural network NN. As described above, the drive mode index FDL indicates the vehicle drive mode desired by the vehicle operator. For example, the drive mode index value FDL continuously varies within a range between "0" and "1".

The drive mode estimating portion 160 includes the signal reading means 96, preliminary processing means 98 and drive mode estimating means 100, as described above. In the present fifth embodiment, the drive mode estimating portion 160 further includes standard drive mode estimating means 164, and output filtering means 166. The standard drive mode estimating means 164 estimates a standard vehicle drive mode index value SDL on the basis of the outputs of the drive mode estimating means 100, namely, a non-processed drive mode index value DL which represents the past drive mode. The output filtering means 166 is adapted to filter the non-drive mode index value DL received from the drive mode estimating means 100, with a filtering constant $K_{DL2}$ which changes as a function of the standard drive mode index value SDL estimated by the standard drive mode estimating means 164. The output filtering means 166 produces an output representative of the processed drive mode index value FDL. The drive mode index value FDL obtained by the drive mode estimating portion 160 of FIG. 40 is applied to the drive force selecting means 162 so that the drive force selecting means 162 selects one of the shift patterns on the basis of the drive mode index value FDL, and so that the shift control means 90 controls the automatic transmission 14 according to the selected shift pattern.

The drive mode estimating means 100 receives the various parameters or variables from the preliminary processing means 98, as described above. These variables include a group of first drive mode indicating variables which are generated in relation to the operator's manipulation of the vehicle, and a group of second drive mode indicating variables which are periodically generated. The first drive mode indicating variables include: staring throttle opening angle $TA_{ST}$ upon starting of the vehicle; maximum increase rate $A_{CCMAX}$ of the throttle opening angle TA; maximum braking deceleration of the vehicle during brake application to the vehicle; coasting run time $T_{COAST}$ of the vehicle; and steady run time $T_{VCONST}$ of the vehicle. These variables have been described above. The second drive mode indicating variables include: peak values of the sensors described above; and maximum vehicle running speed Vmax after starting of the vehicle. With these first and second drive mode indicating variables being received by the neural network NN, the drive mode estimating means 100 produces the output in the form of the non-processed drive mode index value DL at a predetermined frequency, for example, at a time interval of not longer than three seconds.

The standard drive mode estimating means 164 estimates the standard drive mode index value SDL indicative of a standard drive mode of the vehicle, on the basis of those of the non-filtered drive mode index values DL which represent the estimated past drive modes. Described in detail, the standard drive mode estimating means 164 performs operations to smooth or average the non-filtered index values $DL_n$ which are generated from time to time by the drive mode estimating means 100. A moving average technique is used for the averaging operation performed by the estimating means 164. Thus, the non-processed index values $DL_n$ are smoothed or averaged into the standard drive mode index value SDL which includes a component representative of the average or standard drive mode which has been desired by the vehicle operator after starting of the vehicle. The following equation (1) is an example of an equation used for the smoothing operation:

$$SDL_{n+1} = (DL_{n+1} + K_{DL1} \cdot SDL_n)/(1 + K_{DL1}) \tag{1}$$

where, n: integer indicating sampling number $K_{DL1}$: filtering constant for smoothing The filtering constant $K_{DL1}$ is selected to be about 10. The component of the standard index value SDL which represents the past drive mode increases as the filtering constant $K_{DL1}$ increases.

The output filtering means 166 calculates the filtering constant $K_{DL2}$ on the basis of the standard drive mode index value SDL, and according to the following equation (2):

$$K_{DL2} = CK_{DL} + K_{SDLO} \cdot SDL \tag{2}$$

where, $CK_{DL}$: reference filtering constant $K_{SDLO}$: constant

The constant $K_{SDLO}$ is selected to be about 6.

The output filtering means 166 filters a component of the non-processed index value DL which has been changing toward the ECONOMY drive mode. This filtering operation is effected according to the following equation (3) including the filtering constant $K_{DL2}$.

$$FDL_{n+1} = (DL_{n+1} + K_{DL2} \cdot FDL_n)/(1 + K_{DL2}) \tag{3}$$

where, n: integer indicating sampling number

Thus, the processed drive mode index value FDL is obtained from the output filtering means 166.

Referring next to the flow chart of FIG. 41, there will be described a drive mode estimating routine executed by the drive mode estimating portion 160. This routine includes steps SM1 through SM6, which have been described above with respect to the first embodiment, by reference to the flow chart of FIG. 14. The routine of FIG. 41 further includes steps SM7 and SM8 which are characteristic of the present fifth embodiment of the invention.

In step SM7 corresponding to the standard drive mode estimating means 164, the non-processed drive mode index value DLn estimated in step SM5 is subjected to a smoothing operation according to the above equation (1), whereby the standard drive mode index value SDL is obtained. Step SM7 is followed by step SM8 corresponding to the output filtering means 166, in which the filtering constant $K_{DL2}$ is calculated according to the above equation (2) on the basis of the standard drive mode index value SDL, and the component of the non-processed index value DL which has been changing toward the ECONOMY drive mode is subjected to a filtering operation according to the above equation (3) which includes the filtering constant $K_{DL2}$, whereby the processed drive mode index value FDL is obtained as the output of the output filtering means 166.

Step SM8 is followed by step SM6 in which the ESTIMATION PERMIT flag $X_{NNCAL}$ is reset to "0", and the control flow goes back to step SM2, so that steps SM2–SM8 are repeatedly implemented.

Figure 42:
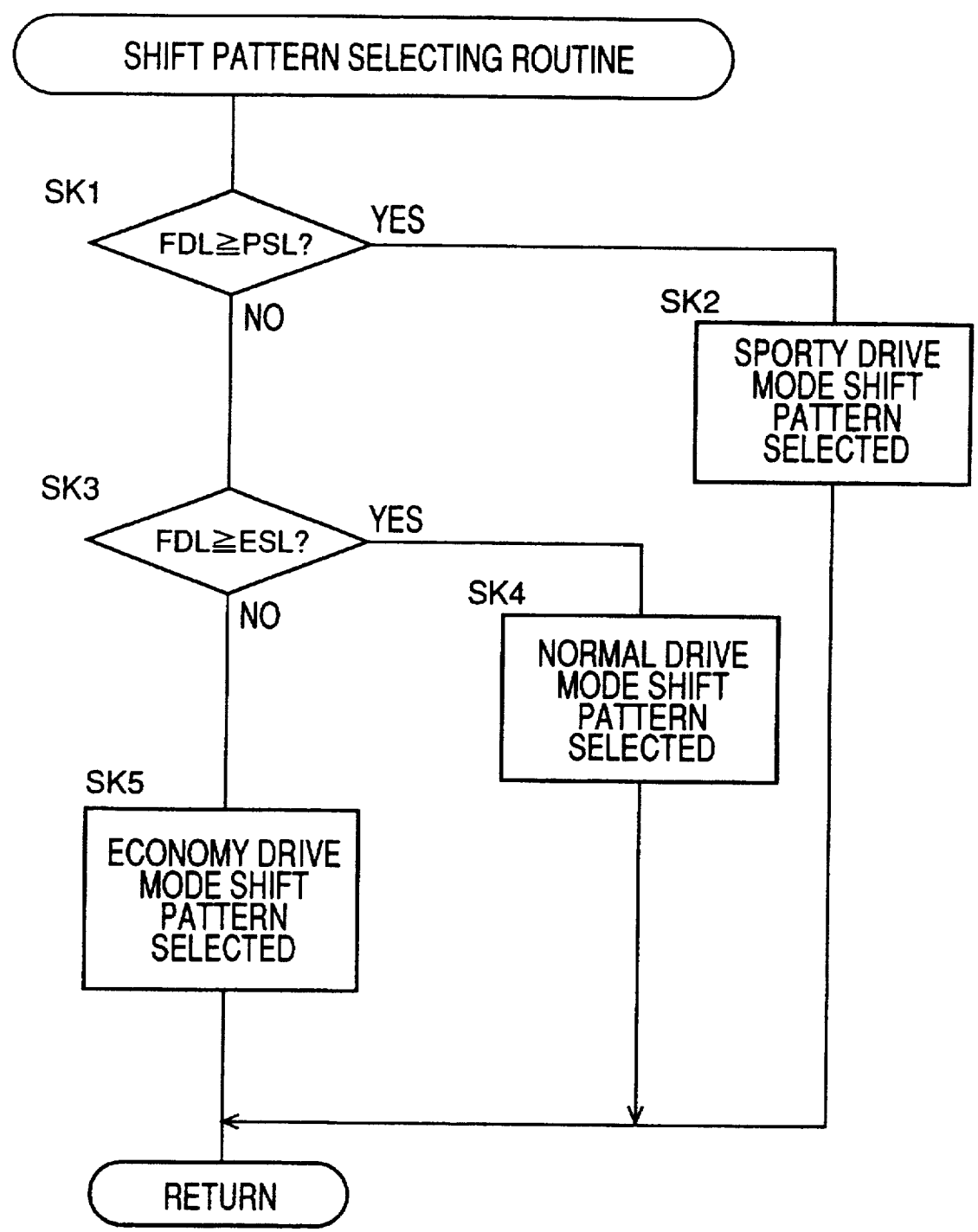
FIG. 42 is a flow chart illustrating a shift pattern selecting routine executed by the control device of FIG. 39.

The drive force selecting means 162 is adapted to execute a shift pattern selecting routine illustrated in the flow chart of FIG. 42. This sub-routine is initiated with step SK1 to determine whether the processed drive mode index value FDL obtained from the output filtering means 166 is equal to or larger than the predetermined SPORTY DRIVE threshold PSL. If an affirmative decision (YES) is obtained in step SK1, the control flow goes to step SK2 in which the SPORTY DRIVE MODE shift pattern of FIG. 3 is selected. If a negative decision (NO) is obtained in step SK1, the control flow goes to step SK3 to determine whether the processed drive mode index value FDL is equal to or larger than the predetermined ECONOMY DRIVE threshold ESL. If an affirmative decision (YES) is obtained in step SK3, the control flow goes to step SK4 in which the NORMAL DRIVE MODE shift pattern of FIG. 4 is selected. If a negative decision (NO) is obtained in step SK3, the control flow goes to step SK5 in which the ECONOMY DRIVE MODE shift pattern of FIG. 5 is selected. The shift patterns are formulated such that the vehicle drive force is changed depending upon the selected shift pattern. Therefore, the vehicle drive force is controlled according to the shift pattern selecting routine of FIG. 42.

As described above, the drive mode estimating means 100 (step SM5) is adapted to obtain the drive mode index value DL on the basis of the drive mode indicating variables, and the standard drive mode estimating means 164 (step SM7) is adapted to obtain the standard drive mode index value SDL on the basis of the drive mode index value DL indicative of the drive mode which has been desired by the vehicle operator. Further, the output filtering means 166 (step SM8) is adapted to obtain the processed drive mode index value FDL, by filtering the non-processed index value DL with the filtering constant $K_{DL2}$ which changes as a function of the standard drive mode index SDL obtained by the standard drive mode estimating means 164. Since the non-processed drive mode index value DL obtained by the drive mode estimating means 100 is filtered by the output filtering means 165 using the filtering constant $K_{DL2}$ which reflects the standard drive mode index value SDL, the processed index value FDL obtained by the filtering operation accurately reflects the intention of the vehicle operator regarding the manner in which the vehicle is driven.

Figure 43:
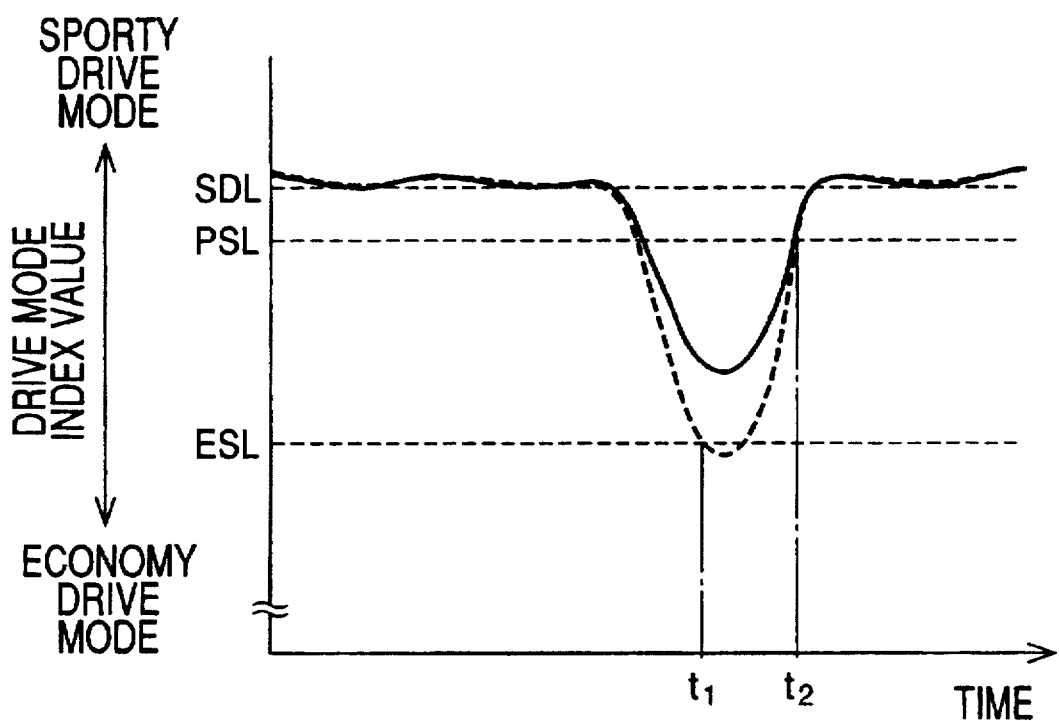
FIG. 43 is a time chart explaining an operation of drive force selecting means of the control device of FIG. 39, and showing a relationship between a drive mode index FDL indicative of the vehicle operator's desired vehicle drive mode and a shift pattern selected for the automatic transmission.

Broken line in FIG. 43 indicates the non-processed drive mode index value DL obtained by the drive mode estimating means 100. This non-processed index value DL is more largely influenced by a decrease in the amount of operation of the accelerator pedal 58, namely, by a releasing action of the accelerator pedal 58, than the processed index value FDL. In the specific example of FIG. 43, the estimated drive mode is changed from the SPORTY drive mode to the ECONOMY drive mode and is then changed to the SPORTY drive mode, during a time period between t1 and t2, whereby the vehicle drive mode is temporarily reduced as a result of a temporary selection of the ECONOMY DRIVE MODE shift pattern. This temporary reduction of the vehicle drive force is not desired by the vehicle driver who desires to continue to drive the vehicle in the SPORTY drive mode.

Figure 44:
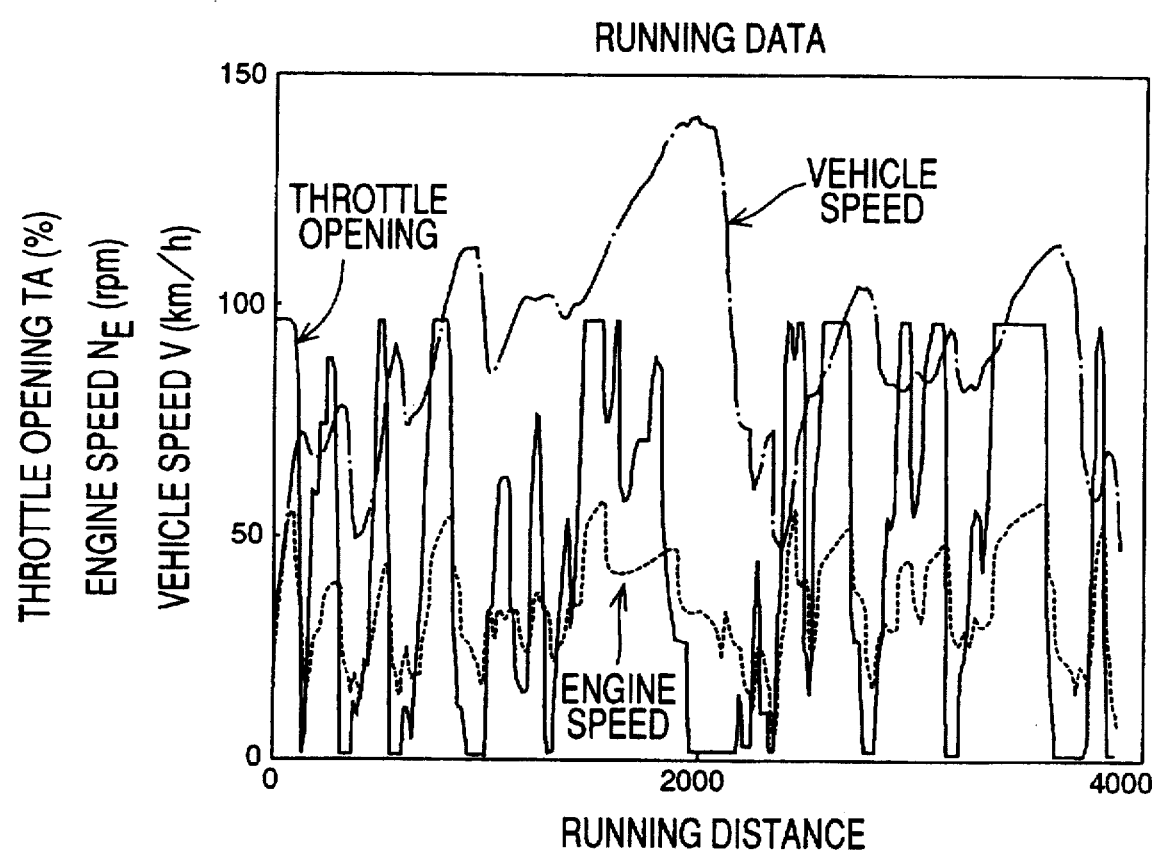
FIG. 44 is a time chart indicating changes of throttle opening angle TA, vehicle running speed V and engine speed $N_E$, in relation to a running distance of the vehicle during a test run in SPORTY drive mode.
Figure 45:
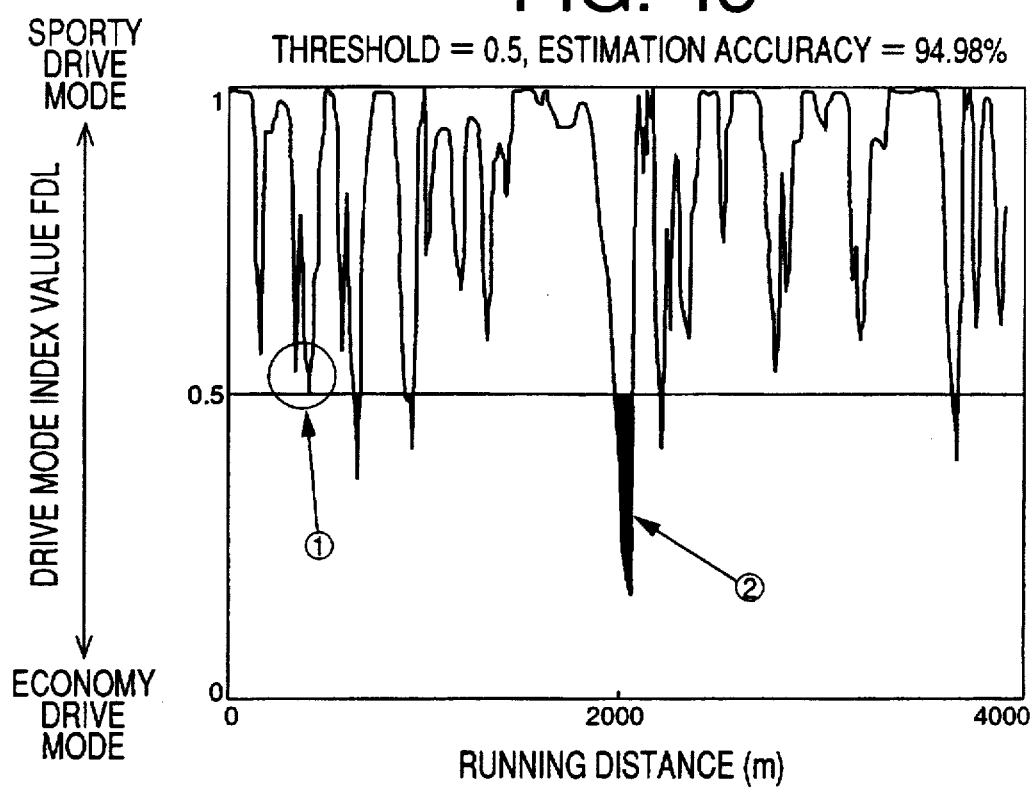
FIG. 45 is a time chart showing a change in the drive mode index FDL obtained by drive mode estimation in step SM5 and output filtering in step SM8 of the drive mode estimation routine of FIG. 41, during the test run in the SPORTY drive mode of FIG. 44.
Figure 46:
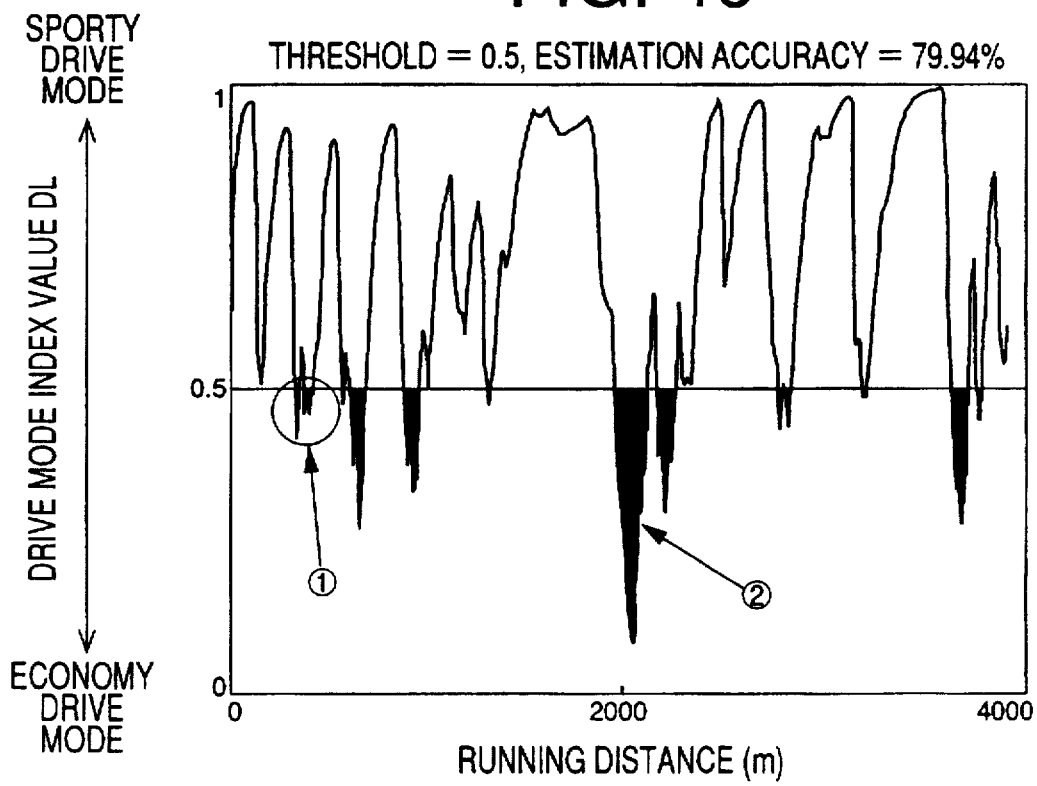
FIG. 46 is a time chart showing a change in a drive mode index DL obtained during the test run in the SPORTY drive mode of FIG. 44, without the output filtering in the step SM8 of FIG. 41.
Figure 47:
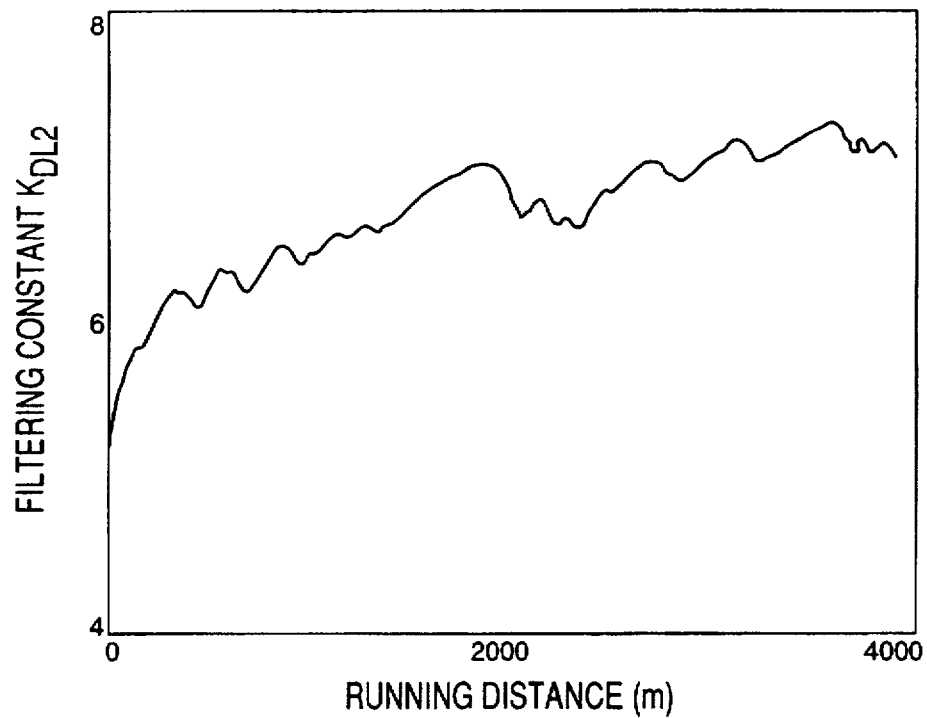
FIG. 47 is a time chart indicating a change in filtering constant used in the output filtering in the step SM8 of FIG. 41 during the test run of FIG. 44.
Figure 48:
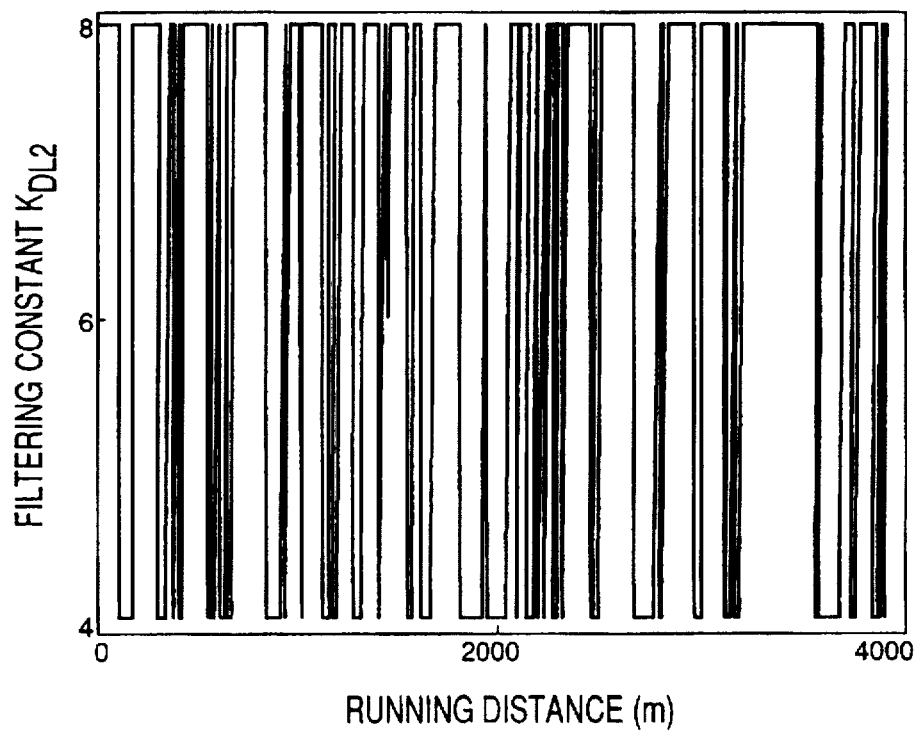
FIG. 48 is a time chart indicating a change in filtering constant during the test run of FIG. 44, when the output filtering is not effected in the same manner as in the step SM8 of FIG. 41.

Running data shown in FIG. 44 were obtained in a test run of the vehicle in the SPORTY drive mode in a 4 km test course. The obtained running data indicate changes of the throttle opening angle TA, vehicle speed V and engine speed $N_E$. FIG. 45 shows the processed drive mode index value FDL obtained by filtering using the filtering constant $K_{DL2}$ which changes as a function of the standard drive mode index value SDL obtained by the standard drive mode estimating means 164 in the above-indicated test run. FIG. 47 indicates a change in the filtering constant $K_{DL2}$ as a function of the standard index value SDL. FIG. 46 shows the drive mode index value DL which is obtained by filtering according to the conventional technique (as disclosed in JP-A-7-167272) wherein the filtering constant $K_{DL2}$ is changed depending upon a temporary change of the operating speed of the accelerator pedal and a temporary change of the operation amount of the accelerator pedal. FIG. 48 shows the filtering constant $K_{DL2}$ in the conventional technique. Suppose the SPORTY DRIVE threshold PSL is 0.5, the component of the processed drive mode index value FDL which is larger than the SPORTY DRIVE threshold PSL=0.5 is 94.98% of the index value FDL, as indicated in FIG. 45. On the other hand, the same component of the index value DL according to the conventional filtering technique is 79.94% of the index value DL. This means that the accuracy of estimation of the actual drive mode (SPORTY drive mode) according to the processed index value FDL is improved by more than 15% with respect to that according to the conventionally obtained index value DL. Solid black areas in FIGS. 45 and 46 indicate erroneous estimation of the actual drive mode. The drive mode index value DL of FIG. 46 according to the conventional technique suffers from erroneous estimation at point (1), while the processed drive mode index value FDL of FIG. 45 obtained by the output filtering means 166 does not suffer from erroneous estimation at point (1).

In the present fifth embodiment, the output filtering means 166 (step SM8) is adapted such that the non-processed index value DL produced by the drive mode estimating means 100 is filtered only when the index value DL tends to be decreasing toward the ECONOMY drive mode. In other words, the index value DL is not filtered by the output filtering means 166 when the accelerator pedal 58 is rapidly depressed to increase the drive force, while the index value DL is increasing toward the SPORTY drive mode. In this case, therefore, the processed drive mode index value FDL rapidly changes toward the SPORTY drive mode, whereby the response of the index value FDL is improved. When the index value DL changes toward the ECONOMY drive mode, there is a possibility of erroneous estimation of the drive mode due to some vehicle running and operating conditions or road condition. In this case, the response of the processed index value FDL is purposely lowered by filtering of the index value DL. In this respect, attention is drawn to the erroneous estimation at point (2) in FIGS. 45 and 46.

According to the processed index value FDL of FIG. 45 which is obtained by filtering only that component of the index value DL which tends to be decreasing, the response to the increase in the index value DL is comparatively high, permitting comparatively fast removal of the erroneous estimation of the drive mode, whereby the vehicle drive force is increased with comparatively high response to the vehicle operator's desire. According to the conventional index value DL which is obtained by filtering the original index value also when the original index value tends to be increasing, the response to the vehicle operator's desire to increase the drive force is comparatively low, resulting in comparatively slow removal of the erroneous estimation.

Further, the output filtering means 166 (step SM8) is adapted such that the filtering constant $K_{DL2}$ is larger when the obtained standard drive mode index value SDL is comparatively large (on the side of the SPORTY drive mode) than when the index value SDL is comparatively small (on the side of the ECONOMY drive mode). In this arrangement, the filtering constant $K_{DL2}$ remains to be large even when the non-processed index value DL has decreased toward the ECONOMY drive mode, as long as the standard drive mode index value SDL which has been relatively large remains on the side of the SPORTY drive mode. In this case, therefore, the response of the processed index value FDL is lowered by the filtering operation using the relatively large filtering constant $K_{DL2}$, and the possibility of erroneous estimation of the vehicle operator's desired drive mode is minimized. Conversely, the filtering constant $K_{DL2}$ remains to be small even when the index value DL has increased toward the SPORTY drive mode, as long as the standard drive mode index value SDL which has been relatively small remains on the side of the ECONOMY drive mode. In this case, the response of the index value FDL is increased by the filtering operation using the relatively small filtering constant $K_{DL2}$, permitting accurate estimation of the operator's desired drive mode.

In the present fifth embodiment, the drive force selecting means 162 selects the shift pattern on the basis of the drive mode index value FDL processed by the output filtering means 166 by filtering the non-process index value DL received from the drive mode estimating means 100. Accordingly, the shift control means 90 is operated according to the shift pattern determined by the processed drive mode index value FDL, so that the automatic transmission 14 is shifted so as to drive the vehicle with a sufficient drive force or a high degree of fuel economy, in accordance with the vehicle operator's intention. That is, the shift pattern is selected by the drive force selecting means 162, according to the processed index value FDL indicated by the solid line in FIG. 43, rather than the non-processed index value DL indicated by the broken line, so that a temporary releasing of the accelerator pedal 58 due to a change in the road condition, for example, will not result in changing the shift pattern from the SPORTY DRIVE MODE shift pattern to the ECONOMY DRIVE mode shift pattern during the time period t1–t2. The index value FDL is obtained by taking into account the standard drive mode index value SDL which is applied from the standard drive mode estimating means 164 to the output filtering means 166. Thus, the present shift control apparatus including the drive mode estimating portion 160 permits the automatic transmission 14 to be controlled according to the vehicle operator's desire regarding the drive force, acceleration and fuel economy of the vehicle.

Figure 49:
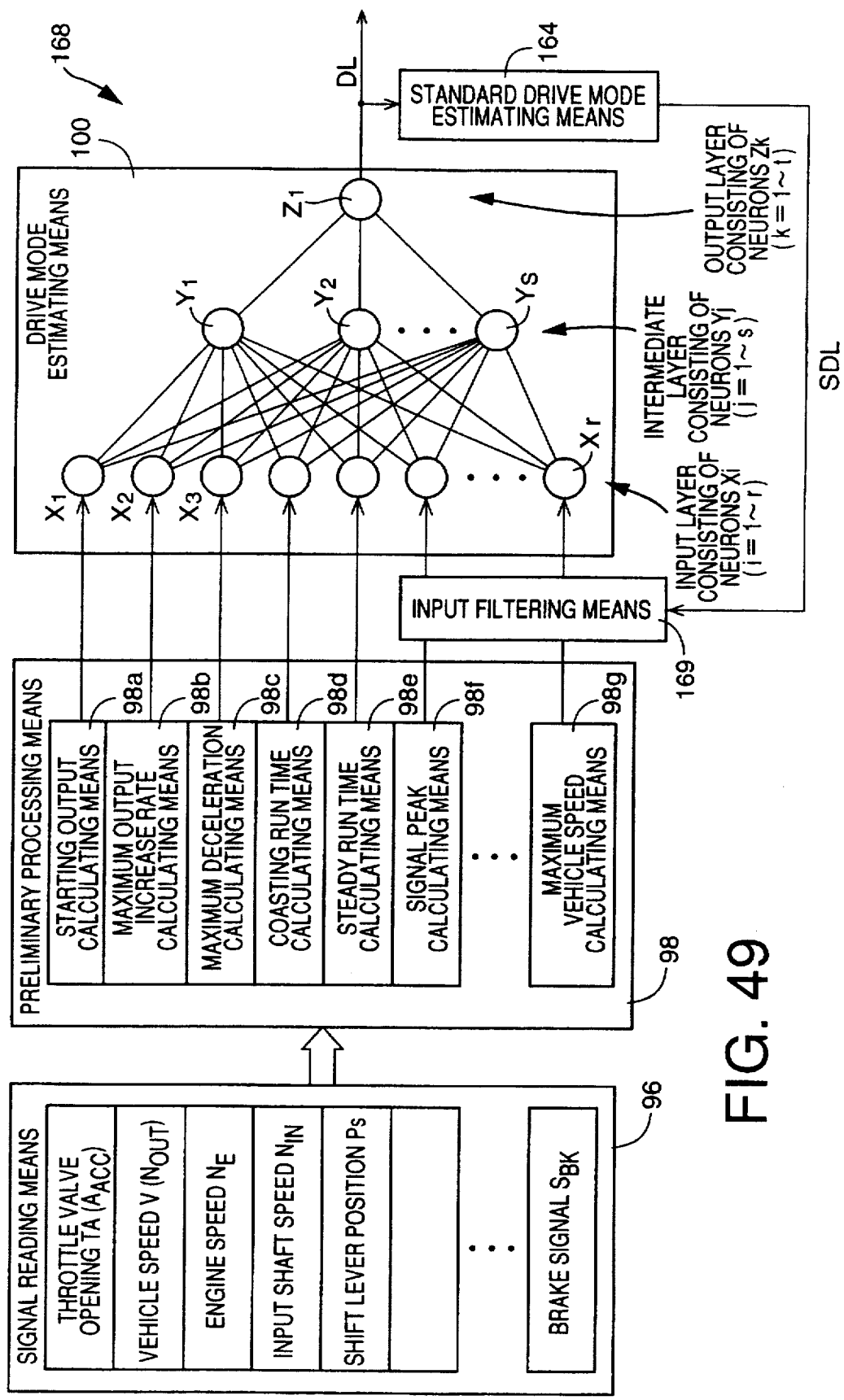
FIG. 49 is a functional block diagram corresponding to that of FIG. 40, indicating functions of a drive mode estimating portion according to a sixth embodiment of the invention.
Figure 50:
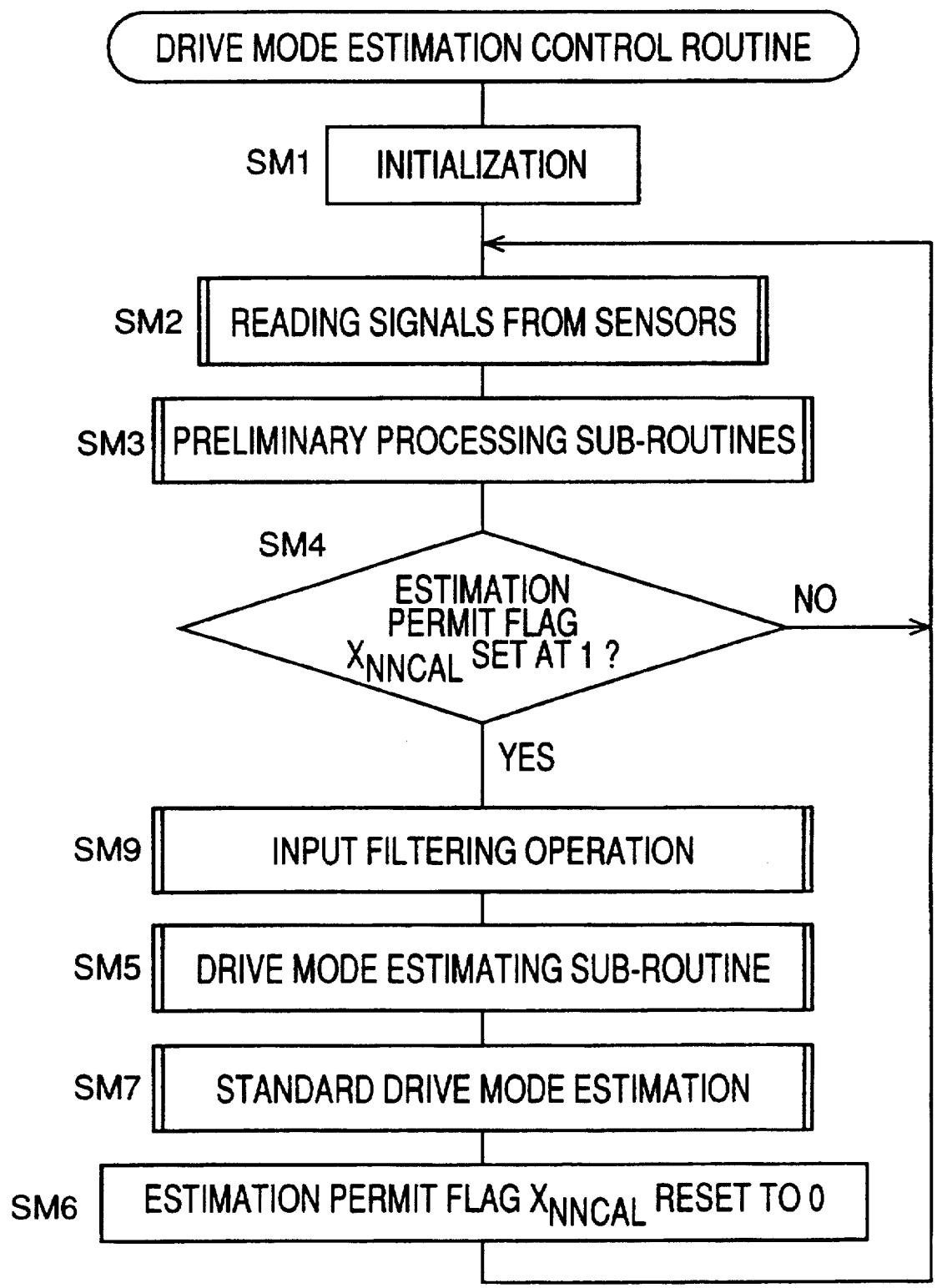
FIG. 50 is a flow chart corresponding to that of FIG. 41, illustrating a drive mode estimating routine executed by the drive mode estimating portion of FIG. 49.
Figure 51:
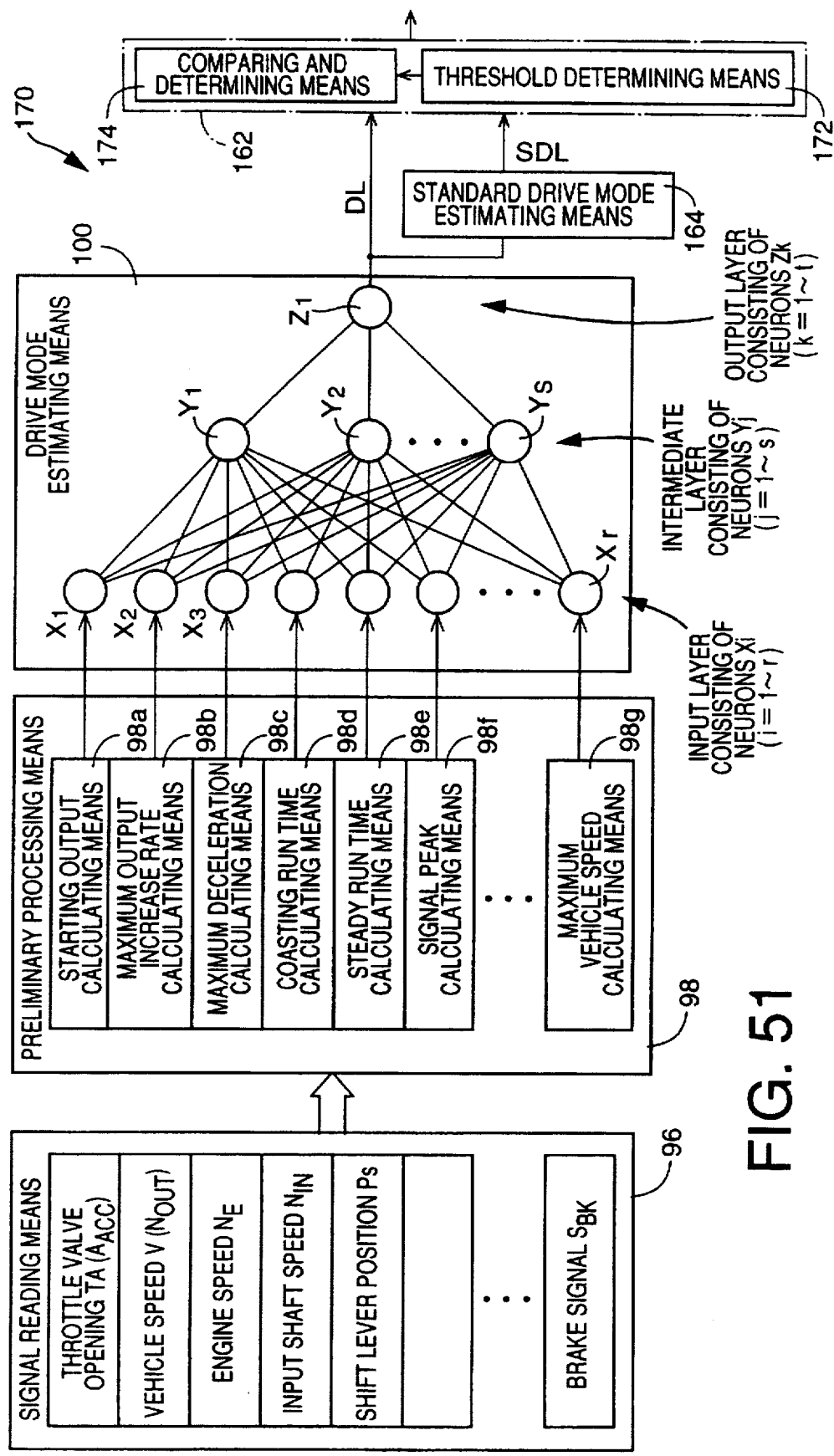
FIG. 51 is a functional block diagram corresponding to that of FIG. 40, indicating functions of a drive mode estimating portion according to a seventh embodiment of the invention.

Referring next to FIGS. 49 and 50, there will be described a sixth embodiment of the present invention. In this embodiment, the control device 42 includes a drive mode estimating portion 168 which does not include the output filtering means 166, but includes an input filtering means 169. As in the drive mode estimating portion 160 of the fifth embodiment, the drive mode estimating means 100 of the drive mode estimating portion 168 of the present sixth embodiment is adapted to receive, from the preliminary processing means 98, the first drive mode indicating variables such as the staring throttle opening angle $TA_{ST}$, maximum increase rate $A_{CCMAX}$ of the throttle opening angle TA, maximum braking deceleration of the vehicle, coasting run time $T_{COAST}$ of the vehicle, and steady run time $T_{VCONST}$ of the vehicle, and the second drive mode indicating variables such as the peak values of the sensors described above, and maximum vehicle running speed Vmax after starting of the vehicle. The drive mode estimating means 100 estimates the drive mode index value DL on the basis of these first and second drive mode indicating variables.

The drive mode estimating means 100 receives the second drive mode indicating variables from the signal peak calculating means 98f and the maximum vehicle speed calculating means 98g through the input filtering means 169. This input filtering means 169 is adapted to filter the second drive mode indicating variables with a filtering constant $K_{DL3}$ which is changed as a function of the standard drive mode index value SDL generated by the standard drive mode estimating means 164, which operates as described above with respect to the fifth embodiment of FIG. 40.

The input filtering means 169 calculates the filtering constant $K_{DL3}$ on the basis of the standard drive mode index value SDL, according to the following equation (4) similar to the above equation (2):

$$K_{DL3}=CK_{DL3}+K_{SDL03} \cdot SDL \qquad (4)$$

where, $CK_{DL3}$: reference filtering constant $K_{SDL0}3$: constant (e.g., about 6)

The input filtering means 169 filters the second drive mode indicating variables according to the following equation (5) similar to the above equation (3). The equation (5) includes the filtering constant $K_{DL3}$. The second drive mode indicating variables are filtered by the input filtering means 169 only when the drive mode index value DL tends to be decreasing toward the ECONOMY drive mode.

$$FOP_{n+1}=OP_{n+1}+K_{DL3} \cdot FOP_n)/(1+K_{DL3}) \qquad (5)$$

where, n: sampling number $OP_n$, $OP_{n+1}$: pre-filtered second drive mode indicating variables $FOP_{n+1}$: filtered second drive mode indicating variables The drive mode estimating portion 168 is adapted to execute a drive mode estimating routine illustrated in the flow chart of FIG. 50. This routine does not include step SM8 provided in the routine of FIG. 41, but includes step SM9 which is implemented before step SM5 (drive mode estimating sub-routine).

In step SM9, the filtering constant $K_{DL3}$ is first determined on the basis of the standard drive mode index value SDL and according to the above equation (4). Then, the second drive mode indicating variables (peak values of the output signals of the various sensors 70, 72, 76, etc., and maximum vehicle running speed Vmax) which are periodically generated are filtered according to the above equation (5), only when the drive mode index value DL generated by the drive mode estimating means 100 has a tendency of decreasing toward the ECONOMY drive mode.

In step SM5, the drive mode estimating means 100 obtains the drive mode index value DL, on the basis of the first drive mode indicating variables which are generated in response to vehicle operator's manipulation of the vehicle, and the second drive mode indicating variables which are periodically generated and which have been filtered by the input filtering means 169. In step SM7, the standard drive mode estimating means 164 obtains the standard drive mode index SDL in the same manner as described above. The standard drive mode index value SDL is used by the input filtering means 169 to calculate the filtering constant $K_{DL3}$, which is used to filter the second drive mode indicating variables as described above. Since the second drive mode indicating variables are filtered by the input filtering means 168 using the filtering constant $K_{DL3}$ which reflects the standard drive mode index value SDL indicative of the average or standard drive mode in the past, the drive mode index value DL obtained by the drive mode estimating means 100 on the basis of the thus filtered second drive mode indicating variables accurately reflects the vehicle operator's desired drive mode of the vehicle.

Since the input filtering means 169 is operated to filter the second drive mode indicating variables only when the drive mode index value DL is changing toward the ECONOMY drive mode, the drive mode index value DL is rapidly changed toward the SPORTY drive mode when the accelerator pedal 58 is rapidly depressed to increase the vehicle drive force. Thus, the response of the drive mode index value DL is relatively high when the index value DL is changing toward the SPORTY drive mode. When the drive mode index value DL is changing toward the ECONOMY drive mode, on the other hand, there is a possibility of erroneous estimation of the operator's desired drive mode, and the input filtering means 169 is operated to filter the second drive mode indicating variables, so that the response of the drive mode index value DL is lowered.

Further, the input filtering means 169 (SM9) is adapted such that the filtering constant $K_{DL3}$ is larger when the obtained standard drive mode index value SDL is comparatively large (on the side of the SPORTY drive mode) than when the index value SDL is comparatively small (on the side of the ECONOMY drive mode). In this arrangement, the filtering constant $K_{DL3}$ remains to be large even when the index value DL has decreased toward the ECONOMY drive mode, as long as the standard drive mode index value SDL which has been relatively large remains on the side of the SPORTY drive mode. In this case, therefore, the response of the second drive mode indicating variables is lowered by the input filtering means 169 using the relatively large filtering constant $K_{DL3}$, and the possibility of erroneous estimation of the vehicle operator's desired drive mode is minimized. Conversely, the filtering constant $K_{DL3}$ remains to be small even when the index value DL has increased toward the SPORTY drive mode, as long as the standard drive mode index value SDL which has been relatively small remains on the side of the ECONOMY drive mode. In this case, the response of the second drive mode indicating variables is increased by the input filtering means 169 using the relatively small filtering constant $K_{DL3}$, thereby permitting accurate estimation of the operator's desired drive mode.

In the present sixth embodiment, the drive force selecting means 162 selects the shift pattern on the basis of the drive mode index value DL which is obtained on the basis of the second drive mode estimating variables which are filtered by the input filtering means 169 as described above. Accordingly, the shift control means 90 is operated according to the shift pattern determined by the drive mode index value DL, so that the automatic transmission 14 is shifted so as to drive the vehicle with a sufficient drive force or a high degree of fuel economy, in accordance with the vehicle operator's intention.

A seventh embodiment of the present invention will be described by reference to FIGS. 51–54. In this embodiment, the control device 42 includes a drive mode estimating portion 170, wherein one of the shift patterns for controlling the transmission 14 is selected by drive force selecting means 162 on the basis of the drive mode index value DL generated by the drive mode estimating means 100 and the standard drive mode index value SDL generated by the standard drive mode estimating means 164.

The drive force selecting means 162 used in the present seventh embodiment incorporates threshold determining means 172, and comparing and determining means 174. The threshold determining means 172 is adapted to determine a SPORTY DRIVE threshold PSL and an ECONOMY DRIVE threshold ESL which are used to select the shift pattern. The comparing and determining means 174 is adapted to compare the drive index value DL received from the drive mode estimating means 100, with the threshold values PSL, ESL determined by the threshold determining means 172, and select the shift pattern to be used by the shift control means 90. Thus, the vehicle drive force can be controlled by the drive force selecting means 162.

The threshold determining means 172 calculates the SPORTY DRIVE threshold PSL according to the following equation (6), and on the basis of the standard drive mode index values SDL and a predetermined reference value CPSL which is selected to be about 0.8, and calculates the ECONOMY DRIVE threshold ESL according to the following equation (7), and on the basis of the standard drive mode index value SDL and a predetermined reference value CESL which is selected to be about 0.2.

$$PSL_n = CPSL + K_{PSL}(CNDL - SDL_n) \qquad (6)$$

$$ESL_n = CESL + K_{ESL}(CNDL - SDL_n) \qquad (7)$$

In the above equations (6) and (7), $K_{PSL}$ and $K_{ESL}$ are constants which are selected to be about 0.2, and CNDL is a constant which is intermediate between the reference values CPSL and CESL. The constant CNDL is selected to be about 0.5.

The comparing and determining means 174 selects the SPORTY DRIVE MODE shift pattern of FIG. 3 if the drive mode index value DL is equal to or larger than the SPORTY DRIVE threshold PSL, selects the NORMAL DRIVE MODE shift pattern of FIG. 4 if the drive mode index value DL is smaller than the SPORTY DRIVE threshold PSL and is equal to or larger than the ECONOMY DRIVE threshold ESL, and selects the ECONOMY DRIVE MODE shift pattern of FIG. 5 if the drive mode index value DL is smaller than the ECONOMY DRIVE threshold ESL.

Figure 41:
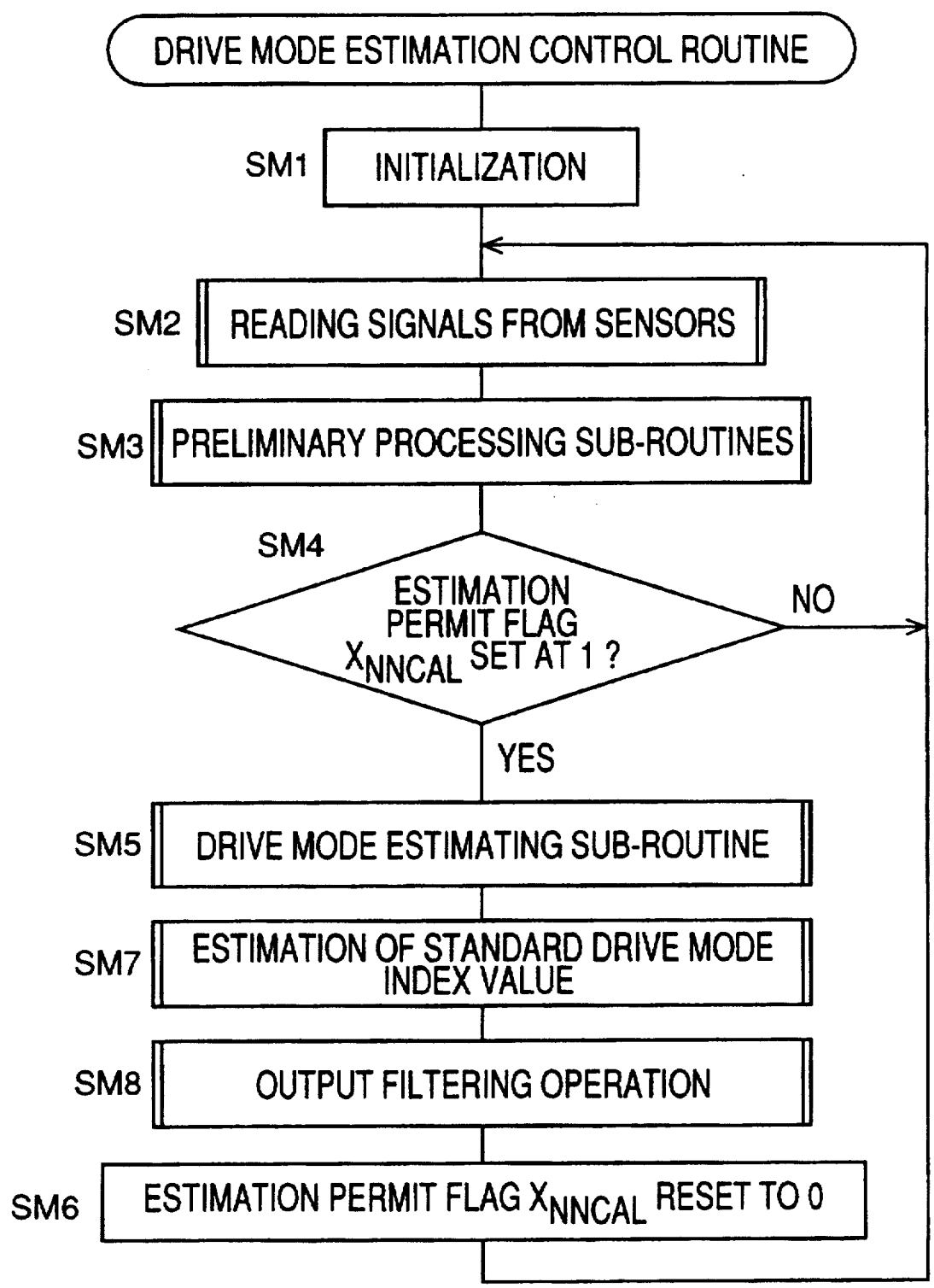
FIG. 41 is a flow chart illustrating a drive mode estimation control routine executed by the electronic control device of FIG. 39.
Figure 52:
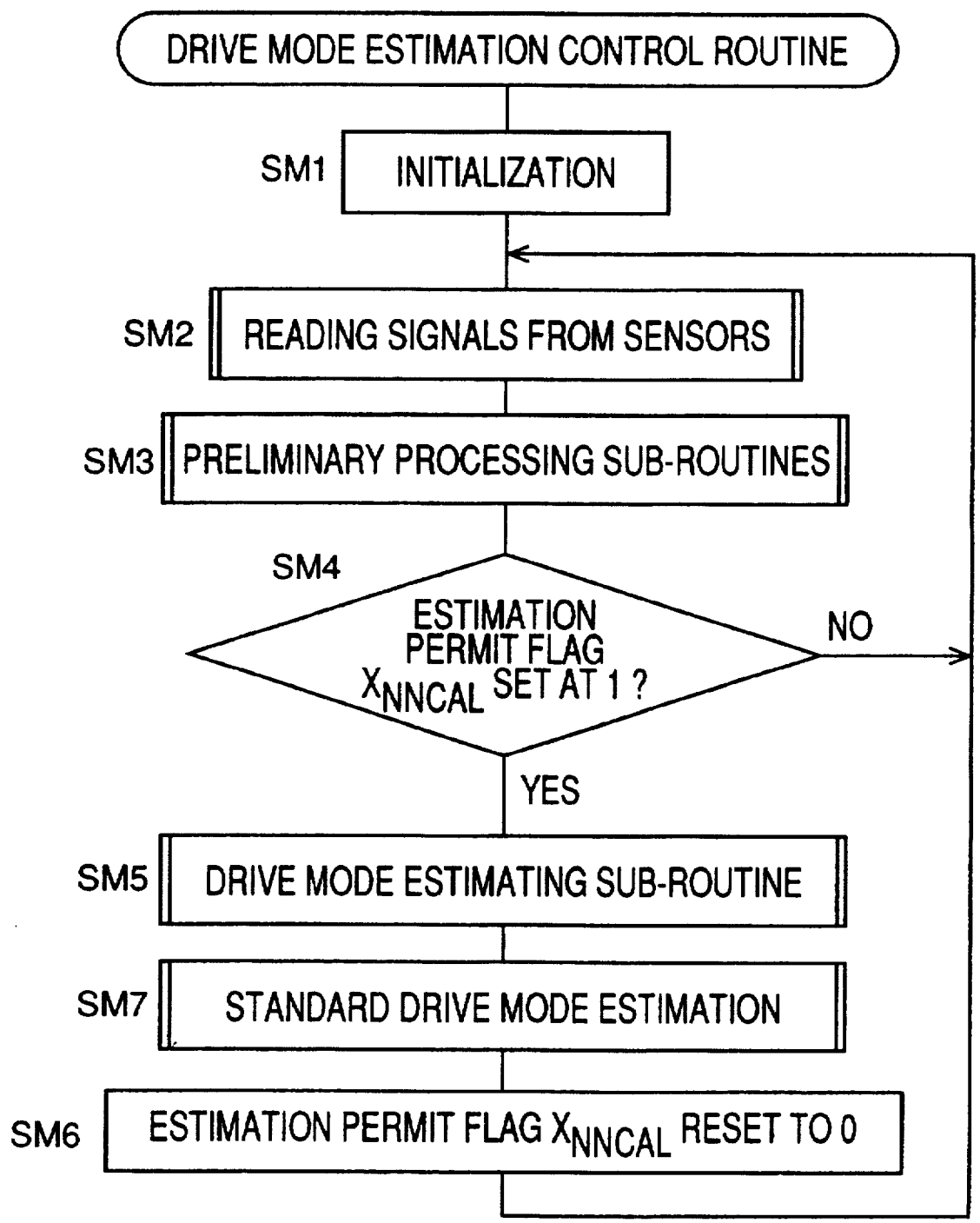
FIG. 52 is a flow chart corresponding to that of FIG. 41, illustrating a drive mode estimating routine executed by the drive mode estimating portion of FIG. 51.

In the present seventh embodiment, the drive mode estimating portion 170 executes a drive mode estimating routine illustrated in the flow chart of FIG. 52, which is different from the routine of FIG. 41 in that step SM8 is not implemented in the routine of FIG. 52.

Figure 53:
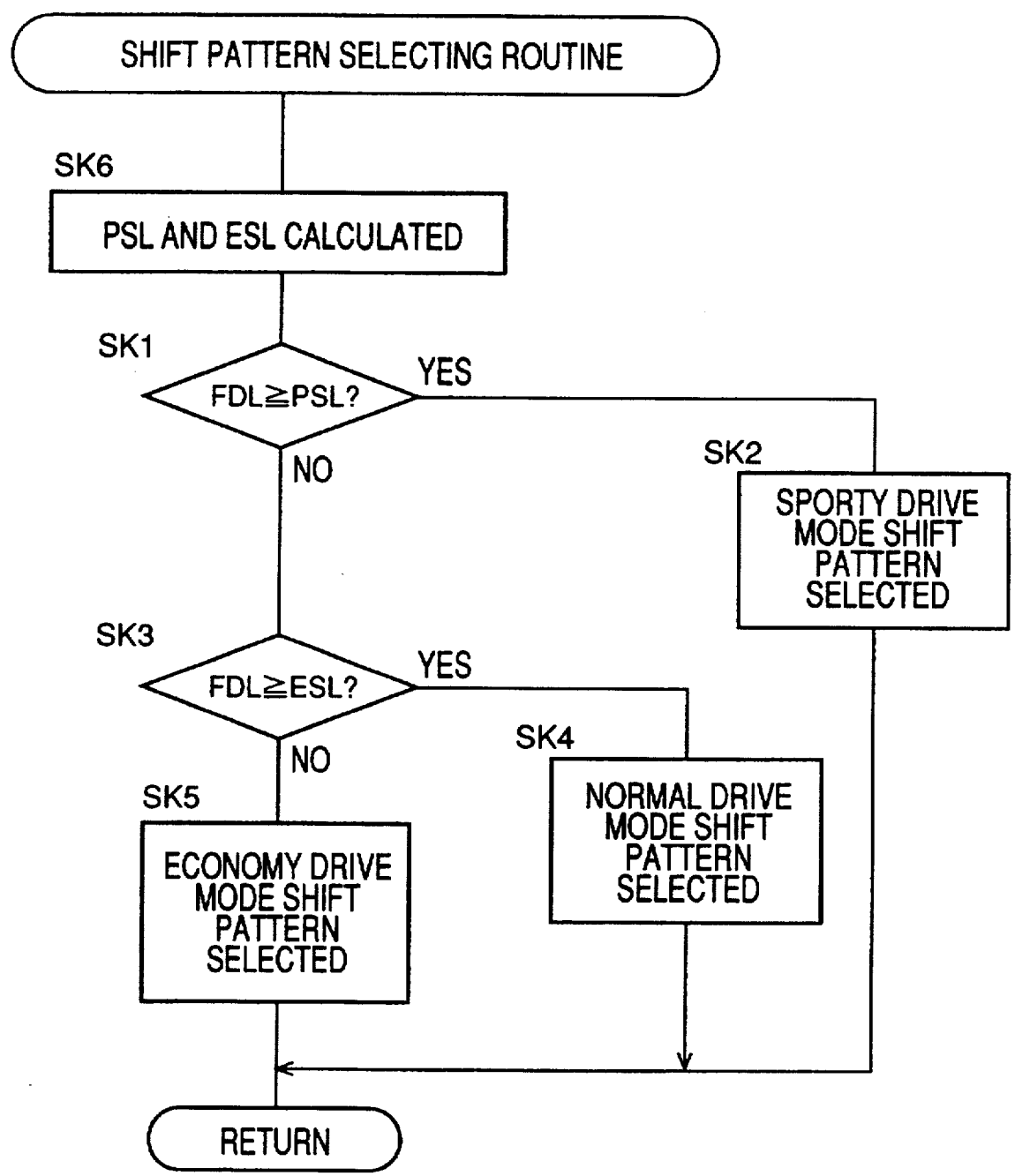
FIG. 53 is a flow chart corresponding to that of FIG. 42, illustrating a shift pattern selecting routine executed in the seventh embodiment of FIG. 51.

The drive force selecting means 162 executes a shift pattern selecting routine illustrated in the flow chart of FIG. 53. This shift pattern selecting routine is identical with the routine of FIG. 42, except for the addition of step SK6 which is implemented before step SK1, the shift pattern selecting routine of FIG. 53 is initiated with step SK6 which corresponds to the threshold determining means 172. In this step SK6, the SPORTY DRIVE threshold PSL is calculated according to the above equation (6) on the basis of the standard drive mode index value SDL and the reference value CPSL, while the ECONOMY DRIVE threshold ESL is calculated according to the above equation (7) on the basis of the standard drive mode index value SDL and the reference value CESL. Then, steps SK1–SK5 are implemented by the comparing and determining means 174, in the same manner as described above with respect to the routine of FIG. 42.

In the present seventh embodiment, the drive force selecting means 162 selects the shift pattern and thereby controls the vehicle drive force, on the basis of the drive mode index value DL generated by the drive mode estimating means 100 and the standard drive mode index value SDL generated by the standard drive mode estimating means 164, whereby the vehicle can be driven according to the vehicle operator's desire regarding the vehicle drive force.

Figure 54:
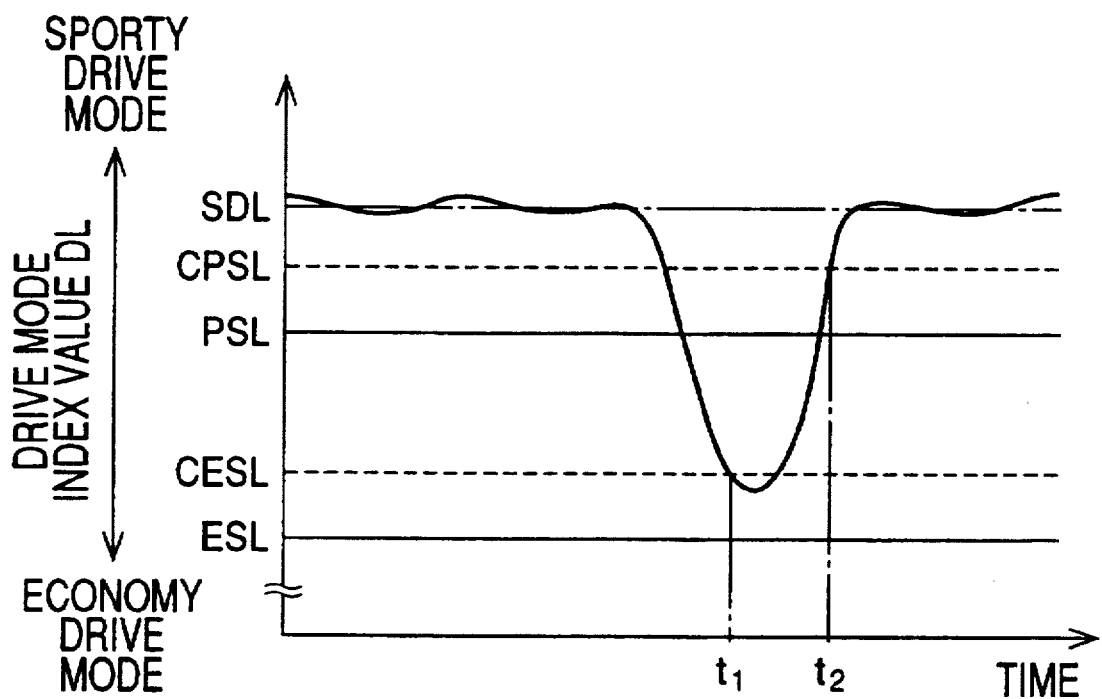
FIG. 54 is a time chart corresponding to that of FIG. 43, for explaining an operation of the drive force selecting means in the seventh embodiment of FIG. 51.

Described in detail, the threshold determining means 172 determines the SPORTY DRIVE and ECONOMY DRIVE threshold values PSL and ESL on the basis of the standard drive mode index value SDL, and the comparing and determining means 174 compares the drive mode index value DL received from the drive mode estimating means 100, with the threshold values PSL, ESL, and selects one of the shift patterns. In the present arrangement, erroneous estimation that the vehicle operator desires the ECONOMY drive mode can be prevented, even if the drive mode index value DL is abruptly decreased as a result of abrupt releasing of the accelerator pedal 59 during vehicle running in the SPORTY drive mode according to the SPORTY DRIVE MODE shift pattern, as indicated in FIG. 54. If predetermined constant SPORTY DRIVE and ECONOMY DRIVE threshold values CPSL, CESL are used, as indicated by broken lines in FIG. 54, for example, the ECONOMY drive mode is erroneously selected during a time period t1–t2 as a result of the releasing action of the accelerator pedal 58, while in fact the vehicle operator's desires to continue to drive the vehicle in the SPORTY drive mode, although the accelerator pedal 58 is temporarily released for some reason or other during running of the vehicle according to the SPORTY DRIVE MODE shift pattern.

Figure 55:
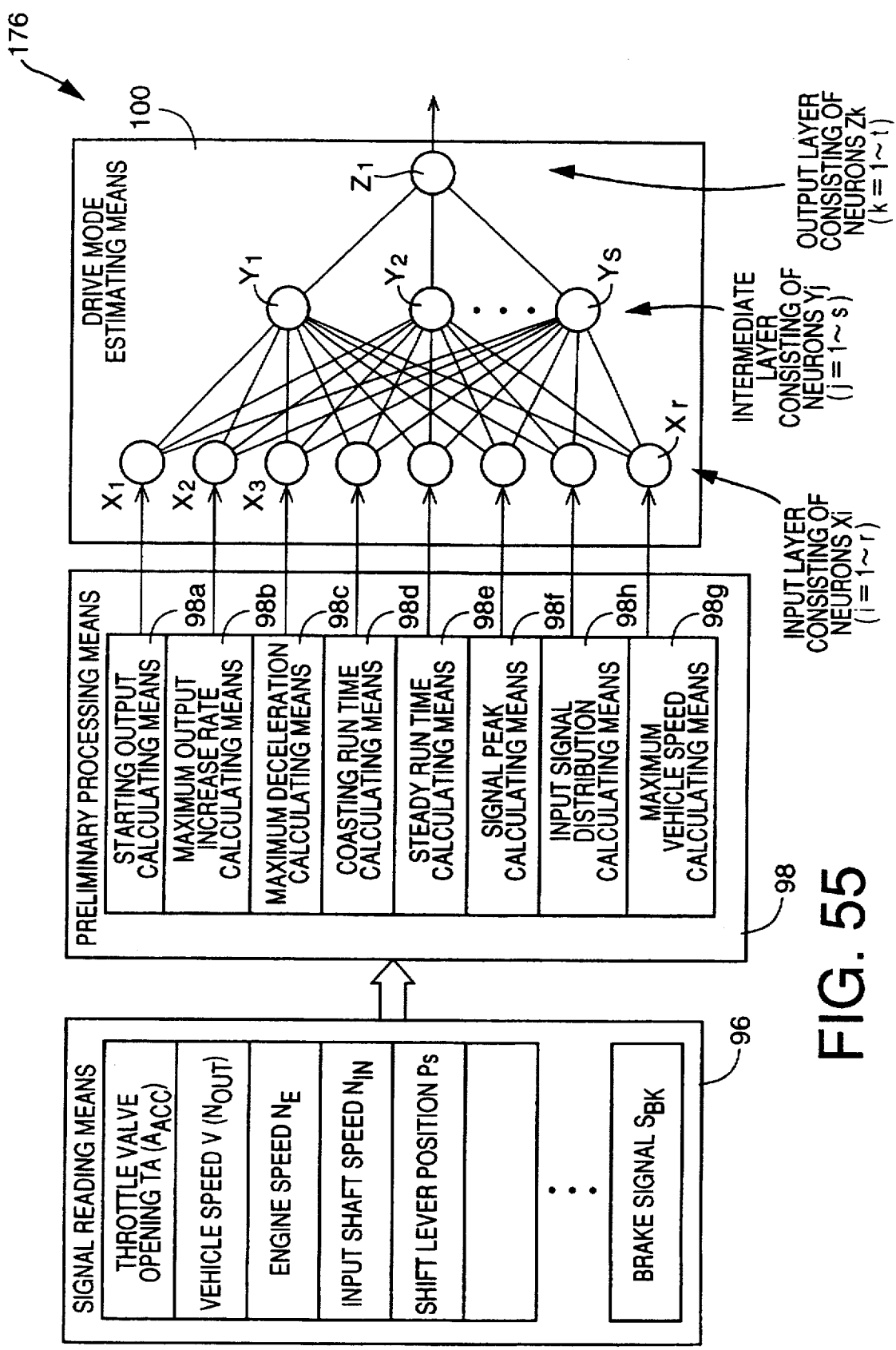
FIG. 55 is a functional block diagram corresponding to that of FIG. 40, indicating functions of a drive mode estimating portion according to an eighth embodiment of the invention.
Figure 56:
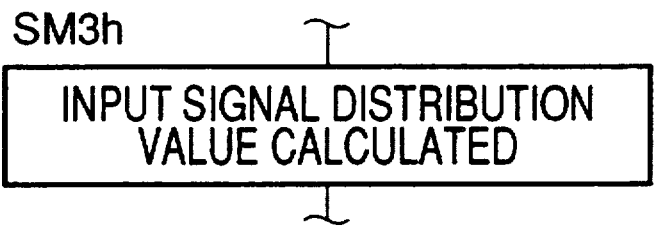
FIG. 56 is a flow chart indicating a step of calculating an input signal distribution value in a drive mode estimating routine in the eighth embodiment of FIG. 55.

Reference is now made to FIGS. 55 and 56, there will be described an eighth embodiment of this invention. The control device 42 of this embodiment includes a drive mode estimating portion 176 wherein the preliminary processing means 98 is different from that used in the preceding embodiments, in that the preliminary processing means 98 of the drive mode estimating portion 176 further incorporates input signal distribution calculating means 98h, as well as the calculating means 98a, 98b, 98c, 98d, 08f and 98g, which have been described. The input signal distribution calculating means 98h is adapted to calculate distribution values of the input signals such as the signals indicative of the throttle opening angle TA, engine speed $N_E$, vehicle speed V and longitudinal deceleration. The calculated distribution values are received by the neural network NN of the drive mode estimating means 100. The distribution values are interpreted to include not only standard deviation σ and variance $σ^2$, but also a difference between the maximum and minimum values (maximal and minimal values) and other values indicative of variations of the input signal values.

In the present eighth embodiment, the drive mode estimating portion 176 executes a drive mode estimating routine which is a modification of the routine of FIG. 41. That is, step SM3 of FIG. 41 is modified to include step SM3h as indicated in FIG. 56. Step SM3h corresponds to the input signal distribution calculating means 98h. In this step SM3h, the distribution values of the input signals such as TA, $N_E$, V are calculated.

In the present embodiment wherein the neural network NN receives from the input signal distribution calculating means 98h the distribution values of the input signals, erroneous estimation of the vehicle operator's desired drive mode can be prevented. For instance, the present arrangement is effective to prevent erroneous estimation that the vehicle operator desires the SPORTY drive mode, when the vehicle is running at a relatively high speed V on a superhighway with a relatively high engine speed $N_E$ in the ECONOMY drive mode according to the ECONOMY DRIVE MODE shift pattern. This erroneous estimation can be prevented since the distribution values of the vehicle speed V and engine speed $N_E$ are comparatively small in the running condition indicated above. Thus, the drive force selecting means 162 permits the vehicle to be driven in the drive mode determined by the drive mode index value DL, according to the vehicle operator's intention.

While the drive force selecting means 162 in the fifth through eighth embodiments is adapted to select one of the shift patterns for the automatic transmission 16, on the basis of the drive mode index value FDL or DL, the drive force selecting means 162 may be adapted to select one of a plurality of different relationships between the operation amount $A_{CC}$ of the accelerator pedal 58 and the opening angle TA of the throttle valve 68. Examples of these different relationships are indicated in FIG. 57. That is, the throttle actuator 86 is controlled by the throttle control means 158 to control the opening angle TA of the throttle valve 68 with a change in the operation amount $A_{CC}$ of the accelerator pedal 58, according to the TA-$A_{CC}$ relationship which is selected on the basis of the estimated drive mode index value FDL or DL and which is used by the throttle control means 158. In FIG. 57, one-dot chain line, solid line and two-dot chain line indicate a SPORTY DRIVE relationship corresponding to the SPORTY drive mode, a NORMAL DRIVE relationship corresponding to the NORMAL drive mode, and an ECONOMY DRIVE relationship corresponding to the ECONOMY drive mode.

While the present invention has been described above in its presently preferred embodiments with a certain degree of particularity by reference to the accompanying drawings, it is to be understood that the invention is not limited to the details of the illustrated embodiments, but may be otherwise embodied.

In the illustrated embodiments, the neural network NN of the drive mode estimating means 100, 168, 170, 176 is adapted to receive the starting throttle opening angle $TA_{ST}$, maximum throttle opening angle increase rate $A_{CCMAX}$, maximum braking deceleration MAXBKG, coasting run time $T_{COAST}$ and steady run time $T_{VCONST}$. However, the neural network NN may be adapted to receive at least one of these variables or parameters to estimate the vehicle operator's desired drive mode in the first, second and third embodiments of FIGS. 1–33, at least the maximum increase rate $A_{CCMAX}$ of the throttle opening angle TA in the fourth embodiment of FIGS. 34–37, and at least one drive mode indicating variable and at least one second drive mode indicating variable in the fifth through eighth embodiments of FIGS. 40–57.

Although the shift pattern selecting means 92 is adapted to select one of the three drive modes, i.e., SPORTY, NORMAL and ECONOMY drive modes according to the states of the flags $X_{SPORT}$, $X_{NORM}$ and $X_{ECO}$ received from the drive mode estimating means 100, the neural network NN of the drive mode estimating means 100 may be adapted to provide output values $NN_{OUT}$ corresponding to the SPORTY and ECONOMY drive modes, and a plurality of drive modes which are intermediate between the SPORTY and ECONOMY drive modes, or continuously change the drive mode between these two drive modes. In the latter case, the neural network NN may perform interpolation of the variables corresponding to the SPORTY and ECONOMY drive modes, or may be adapted to provide a continuously varying output $NN_{OUT}$.

The neural network NN may be adapted to receive road information signals indicative of vehicle runs on superhighways, suburban roads, mountain roads and urban roads. These road information signals may be generated by appropriate sensors or by manually operated switches. In this case, the input signals which are received by the neural network and which represent the drive mode indicating variables can be compensated by the road information signals, whereby the accuracy of estimation of the operator's desired drive mode can be further improved.

Further, the input signals received by the neural network NN may be compensated by suitable weights which are given to the respective input signals depending upon the time lengths between the point of time at which each input signal is obtained during a predetermined time interval T2 and the point of time at which the operator's desired drive mode is estimated upon expiration of the time interval T2. This arrangement is effective to estimate the desired drive mode with improved accuracy, with the hysteresis taken into account and with reduced influence by external disturbances.

The vehicle turn determining means 138 may be adapted to determine vehicle turning when the steering angle as detected by a steering angle sensor has exceeded a predetermined threshold.

The neural network NN of the drive mode estimating means 100 in the illustrated embodiments is the three-layered system consisting of the input, intermediate and output layers. However, the neural network NN may consist of four or more layers, and may be arranged such that the neurons are connected to each other.

In the illustrated embodiments, the amount of operation of the accelerator pedal 58 and the throttle opening angle TA are obtained from the output signal of the throttle sensor 70. However, an exclusive sensor may be provided for detecting the amount of operation $A_{CC}$ of the accelerator pedal 58.

While the illustrated embodiments use the throttle opening angle TA and the maximum increase rate $A_{CCTA}$ of the throttle opening angle to estimate the vehicle operator's desired drive mode, the throttle opening angle TA and its maximum increase rate $A_{CCTA}$ may be replaced by the amount of operation of the accelerator pedal 58 and its maximum increase rate, where the motor vehicle does not have the throttle valve 68, like a diesel engine vehicle. Further, the opening angle TA of the throttle valve 68 may be changed by a throttle actuator which is controlled depending upon the amount of operation of the accelerator pedal 58.

Although the automatic transmission 14 used in the illustrated embodiments is a planetary gear type having a plurality of speed ratios, the automatic transmission 14 may be replaced by a belt-and-pulley type continuously variable transmission as disclosed in JP-A-2-271149.

In the fourth embodiment of FIGS. 34–37, the drive mode estimation inhibiting means 154 of the tip-in detecting means 150 of the maximum output increase rate calculating means 148 is adapted to inhibit the drive mode estimating means 100 from receiving the maximum increase rate $A_{CCMAX}$ of the throttle opening angle TA (maximal value of the amount of operation of the manually operated means for designating the desired engine output or vehicle drive force). However, the inhibiting means 154 may be adapted to inhibit the drive mode estimating means 100 from receiving the maximum value of the throttle opening angle determined at a predetermined time interval. In this case, too, the erroneous estimation by the drive mode estimating means 100 due to the tip-in action of the accelerator pedal 58 may be prevented. Namely, the drive mode estimation inhibiting means 154 may be modified otherwise, provided the inhibiting means can inhibit the operation of the drive mode estimating means 100 when the accelerator pedal 58 is abruptly depressed and immediately released by the vehicle operator due to some road surface conditions or the operator's driving habit.

The standard drive mode estimating means 164 provided in the fifth, sixth and seventh embodiments of FIGS. 40–54 is adapted to estimate the standard drive mode index value SDL according to the above equation (1), which similar to an equation for a delayed processing or smoothing operation. However, the standard drive mode index value SDL obtained by the standard drive mode estimating means 164 may be replaced by an average of the drive mode index values DL generated by the drive mode estimating means 100 for a predetermined time period after the ignition switch of the vehicle is turned on, or by a moving average or a weighted average of those index values DL.

The signal reading means 96 may be adapted to receive rotating speeds of the wheels, lateral acceleration of the vehicle, or a steering angle of the steering wheel.

Each of the fifth, sixth, seventh and eighth embodiments of FIGS. 40, 49, 51 and 55 constitutes an independent apparatus for controlling the automatic transmission 14 according to the estimated operator's desired vehicle drive mode, the features of these embodiments may be incorporated in one independent apparatus.

It is to be understood that the present invention may be embodied with various other changes, modifications and improvements, which may occur to those skilled in the art, without departing from the spirit and scope of the invention defined in the following claims.

What is claimed is:

1. A drive mode estimating device for estimating a drive mode of a motor vehicle desired by an operator of the motor vehicle, comprising:

variable calculating means for calculating at least one of drive mode indicating variables selected from a group consisting of a fixed amount of operation of manually operated means operated by the operator for designating a drive force of the vehicle desired by the operator only upon starting of the vehicle, a maximum rate of increase of said amount of operation of said manually operated means, a maximum deceleration of the vehicle upon operation of a manually operated member for brake application to the vehicle, a coasting run time of the vehicle and a steady run time of the vehicle; and drive mode estimating means including a neural network receiving said at least one of drive mode indicating variables calculated by said variable calculating means, said drive mode estimating means estimating the drive mode of the motor vehicle desired by the operator, both during and after starting of the vehicle, on the basis of an output of said neural network.

2. A drive mode estimating device according to claim 1, wherein said drive mode estimating means estimates the drive mode of the motor vehicle on the basis of the output of said neural network when each one of said at least one of said drive mode indicating variables is calculated by said variable calculating means.

3. A drive mode estimating device according to claim 1, wherein said motor vehicle includes an engine and said manually operated means designates an output of said engine, said drive mode estimating device further comprising:
- operation amount detecting means for detecting the amount of operation of said manually operated means by the operator for designating the output of said engine; and
- vehicle speed detecting means for detecting a running speed of the vehicle,
  - and wherein said variable calculating means comprises starting output calculating means for calculating, as the drive force of the vehicle desired by the operator upon starting of the vehicle, a starting output of said engine upon starting of the vehicle, on the basis of the amount of operation of said manually operated means detected by said operation amount detecting means, and the running speed of the vehicle detected by said vehicle speed detecting means.

4. A drive mode estimating device according to claim 1, wherein said motor vehicle includes an engine and manually operated means for designating an output of said engine, and said drive mode estimating means further includes output detecting means for detecting an amount of operation of said manually operated means by the operator for designating the output of said engine,
- and wherein said variable calculating means comprises maximum output increase rate calculating means for calculating a maximum rate of increase of said output of said engine, on the basis of a maximum rate of increase of the amount of operation of said manually operated means detected by said output detecting means, except when an amount of operation of said manually operated means is abruptly changed.

5. A drive mode estimating device according to claim 4, wherein said manually operated means comprises an accelerator pedal, and said engine has a throttle valve whose opening angle changes with an amount of operation of said accelerator pedal, said maximum output increase rate calculating means comprising:
- maximum throttle opening increase rate updating means for storing and updating a maximum rate of increase of said opening angle of said throttle valve;
- abrupt change detecting means for detecting abrupt depression followed by immediate releasing of said accelerator pedal in a short time;
- maximum throttle opening increase rate determining means for determining, as a maximum value of an increase rate of said opening angle of the throttle valve, said maximum rate of increase of said opening angle updated by said maximum throttle opening increase rate updating means when said abrupt depression followed by immediate releasing of said accelerator pedal is not detected by said abrupt change detecting means; and
- maximum throttle opening determining means for determining a maximum value of said opening angle of the throttle valve until said maximum value of the increase rate of the opening angle is determined by said maximum throttle opening increase rate determining means.

6. A drive mode estimating device according to claim 1, wherein said variable calculating means determines each of at least one of said coasting run time, said steady run time and said maximum deceleration of the vehicle at a predetermined time interval, and said drive mode estimating means estimates the drive mode of the vehicle desired by the operator, on the basis of the output of said neural network when said neural network receives each one of said at least one of said coasting run time, said steady run time and said maximum deceleration of the vehicle which is determined by said variable calculating means at said predetermined time interval.

7. A drive mode estimating device according to claim 1, wherein said variable calculating means comprises at least one of coasting run time calculating means for calculating said coasting run time of the vehicle and steady run time calculating means for calculating said steady run time of the vehicle, and said drive mode estimating means estimates the drive mode of the vehicle desired by the operator, on the basis of the output of said neural network each time said neural network receives at least one of said coasting run time and said steady run time which is determined by said variable calculating means at a predetermined time interval.

8. A drive mode estimating device according to claim 7, wherein said steady run time calculating means comprises:
- steady run determining means for determining that an amount of change of a running speed of the vehicle is held within a predetermined range;
- first time counting means for measuring a first time length during which said amount of change of the running speed is held within said predetermined range;
  - said steady run determining means determining a steady run of the vehicle if said first time length exceeds a predetermined threshold,
- second time counting means for measuring a second time length during which said steady run determining means continues to determine said steady run of the vehicle; and
- steady run time determining means for determining said steady run time of the vehicle, on the basis of said second time length measured by said second time counting means, said steady run time determining means repeatedly determining said steady run time at a predetermined time interval while said steady run is determined by said steady run time determining means.

9. A drive mode estimating device according to claim 7, wherein said coasting run time calculating means comprises:
- coasting run determining means for determining a coasting run of the vehicle if the amount of operation of said manually operated means for designating the drive force of the vehicle is substantially zero;
- time counting means for measuring a time length during which said coating run determining means continues to determine said coasting run of the vehicle; and
- coasting run time determining means for determining said coasting run time of the vehicle, on the basis of said time length measured by said time counting means, said coasting run time determining means repeatedly determining said coasting run time at a predetermined time interval while said coasting run is determined by said coasting run time determining means.

10. A drive mode estimating device according to claim 1, wherein said variable calculating means comprises maximum deceleration calculating means for calculating said maximum deceleration of the vehicle during brake application to the vehicle, at a predetermined time interval, and said drive mode estimating means estimates the drive mode of the vehicle desired by the operator, on the basis of the output of said neural network each time said neural network receives said maximum deceleration determined by said maximum deceleration calculating means.

11. A drive mode estimating device according to claim 1, wherein the motor vehicle includes a transmission, and said variable calculating means comprises:

longitudinal acceleration updating means for storing and updating longitudinal acceleration of the vehicle, so that said neural network of said drive mode estimating means receives the updated longitudinal acceleration of the vehicle; and longitudinal acceleration input ignoring means for inhibiting said longitudinal acceleration updating means from applying said updated longitudinal acceleration to said neural network while said transmission is in the process of a predetermined shifting action.

12. A drive mode estimating device according to claim 1, wherein the motor vehicle has an engine, and said variable calculating means comprises signal peak calculating means for calculating at least one of a maximum value of the amount of operation of said manually operated means, a maximum value of a speed of said engine, and a maximum value of deceleration of the vehicle, for a predetermined period of time, so that said at least one of said maximum values is received by said neural network of said drive mode estimating means, and said drive mode estimating means selects one of a plurality of different drive modes of the vehicle, said different drive modes including a sporty drive mode for driving the vehicle with a higher degree of acceleration than in the other of said drive modes, said signal peak calculating means comprising:

vehicle turn determining means for determining that the vehicle is turning; and peak hold means for inhibiting said at least one of said maximum values from being applied to said neural network of said drive mode estimating means while said sporty drive mode is selected by said drive mode estimating means and while said vehicle turn determining means determines that the vehicle is turning.

13. A drive mode estimating device according to claim 1, wherein the motor vehicle has an engine, and said drive mode estimating means selects one of a plurality of different drive modes of the vehicle, said different drive modes including a sporty drive mode for driving the vehicle with a higher degree of acceleration than in the other of said drive modes, said variable calculating means comprises:

at least one of maximum output updating means for updating a maximum amount of operation of said manually operated means for a predetermined period of time, maximum engine speed updating means for updating a maximum speed of the engine for a predetermined period of time, and maximum deceleration updating means for updating maximum deceleration of the vehicle for a predetermined period of time, so that said neural network of said drive mode estimating means receives an output of said at least one of said maximum output updating means, said maximum engine speed updating means and said maximum deceleration updating means;

vehicle turn determining means for determining that the vehicle is turning; and peak hold means for inhibiting said at least one of said maximum output updating means, said maximum engine speed updating means and said maximum deceleration updating means from applying an output thereof to said neural network of said drive mode estimating means while said sporty drive mode is selected by said drive mode estimating means and while said vehicle turn determining means determines that the vehicle is turning.

14. A drive mode estimating device according to claim 13, wherein said manually operated means comprises an accelerator pedal, and said variable calculating means further comprises abrupt change detecting means for detecting abrupt depression followed by immediate releasing of said accelerator pedal in a short time, and inhibiting means for inhibiting said at least one of said maximum output updating means, said maximum engine speed updating means and said maximum deceleration updating means from updating a corresponding one of said maximum amount of operation of said manually operated means, said maximum speed of the engine and said maximum deceleration of the vehicle, if said abrupt depression followed by immediate releasing of said accelerator pedal is detected by said abrupt change detecting means.

15. A drive mode estimating device according to claim 1, wherein the motor vehicle has an engine, and a transmission having a plurality of gear positions including a highest gear position and a next highest gear position, and said variable calculating means comprises:

engine speed detecting means for detecting a speed of the engine;

maximum engine speed updating means for updating a maximum value of the speed of the engine for a predetermined period of time so that said neural network of said drive mode estimating means receives the maximum value of the speed of the engine updated by said maximum engine speed updating means; and engine speed compensating means for compensating the speed of the engine detected by said engine speed detecting means when the transmission is placed in said next highest gear position after the vehicle has been running in a steady state at a substantially constant speed for more than a predetermined length of time, said engine speed compensating means compensating the detected speed of the engine such that the compensated speed of the engine is lowered to a value which is equal to the detected speed of the engine multiplied by a speed ratio of said highest gear position, and wherein said maximum engine speed updating means receives said compensated speed of the engine, and updates the maximum value of the speed of the engine when the transmission is placed in said nest highest gear position after the vehicle has been running in said steady state for more than said predetermined length of time.

16. A drive mode estimating device according to claim 1, further comprising:

vehicle turn determining means for determining that the vehicle is turning; and drive mode estimation inhibiting means for inhibiting an operation of said neural network of said drive mode estimating means if said vehicle turn determining means determines that the vehicle is turning, said drive mode estimating inhibiting means commanding said neural network to hold the output thereof before the operation of the neural network is inhibited by said drive mode estimation inhibiting means.

17. An apparatus for controlling a controllable system of a motor vehicle, comprising:

a drive mode estimating device for estimating a drive mode of the motor vehicle desired by an operator of the vehicle, said drive mode estimating device including (a) variable calculating means for calculating at least one of drive mode indicating variables selected from a group consisting of an amount of operation of manually operated means operated by the operator for designating a drive force of the vehicle desired by the operator upon starting of the vehicle, a maximum rate of increase of said amount of operation of said manually operated means, a maximum deceleration of the vehicle upon operation of a manually operated member for brake application to the vehicle, a coasting run time of the vehicle and a steady run time of the vehicle; and (b) drive mode estimating means including a neural network receiving said at least one of drive mode indicating variables calculated by said variable calculating means, said drive mode estimating means estimating the drive mode of the motor vehicle desired by the operator on the basis of an output of said neural network;

control pattern selecting means for selecting, according to the drive mode estimated by said drive mode estimating means of said drive mode estimating device, one of a plurality of predetermined different control patterns for controlling said controllable system in respective different manners; and a control device for controlling said controllable system according to the control pattern selected by said control pattern selecting means.

18. A shift control apparatus for controlling an automatic transmission of a motor vehicle, comprising:

a drive mode estimating device for estimating a drive mode of the motor vehicle desired by an operator of the vehicle, said drive mode estimating device including (a) variable calculating means for calculating at least one of drive mode indicating variables selected from a group consisting of an amount of operation of manually operated means operated by the operator for designating a drive force of the vehicle desired by the operator upon starting of the vehicle, a maximum rate of increase of said amount of operation of said manually operated means, a maximum deceleration of the vehicle upon operation of a manually operated member for brake application to the vehicle, a coasting run time of the vehicle and a steady run time of the vehicle; and (b) drive mode estimating means including a neural network receiving said at least one of drive mode indicating variables calculated by said variable calculating means, said drive mode estimating means estimating the drive mode of the motor vehicle desired by the operator on the basis of an output of said neural network;

shift pattern selecting means for selecting, according to the drive mode estimated by said drive mode estimating means of said drive mode estimating device, one of a plurality of predetermined different shift patterns for shifting said automatic transmission in respective different manners; and a shift control device for controlling a speed ratio of said automatic transmission according to the shift pattern selected by said shift pattern selecting means.

19. A shift control apparatus according to claim 18, wherein said motor vehicle includes an engine provided with a throttle valve, said shift control apparatus further comprising:

throttle opening obtaining means for obtaining an opening angle of said throttle valve;

vehicle speed obtaining means for obtaining a running speed of the motor vehicle; and a shift pattern memory for storing said plurality of predetermined different shift patterns, each of said different shift patterns representing a relationship between said speed ratio of said automatic transmission, and said opening angle of the throttle valve and said running speed of the vehicle, and wherein said shift control device changes the speed ratio of said automatic transmission on the basis of the opening angle of the throttle valve and the running speed of the vehicle which are obtained by said throttle opening obtaining means and said vehicle speed obtaining means, respectively, and according to the shift pattern selected by said shift pattern selecting means.

20. A shift control apparatus according to claim 18, further comprising highest gear inhibiting means for inhibiting a shift-up operation of said shift control device to shift up said automatic transmission to a highest gear position when the output of said neural network of said drive mode estimating means of said drive mode estimating device is not smaller than a predetermined threshold, said highest gear inhibiting means cancelling inhibition of said shift-up operation of said shift control means when the output of said neural network is smaller than said predetermined threshold while the motor vehicle is running in a steady state at a substantially constant speed.

21. A drive mode estimating device for estimating a drive mode of a motor vehicle desired by an operator of the motor vehicle, comprising:

drive mode estimating means for estimating the drive mode of the vehicle desired by the operator of the vehicle, on the basis of an amount of operation of manually operated means operated by the operator for designating a desired drive force of the vehicle;

maximum operation amount determining means for determining a maximum value of said amount of operation of said manually operated means; and drive mode estimation inhibiting means for inhibiting an operation of said drive mode estimating means to estimate said drive mode on the basis of said amount of operation of said manually operated means, if a difference between said maximum value of the amount of operation of said manually operated means determined by said maximum operation amount determining means and a value of said amount of operation at a first point of time (t3) which is a predetermined time (T1) after a second point of time (t1) at which said maximum value is determined is larger than a predetermined threshold value.

22. A drive mode estimating device according to claim 21, wherein said drive mode estimation inhibiting means permits the operation of the drive mode estimating means to estimate the drive mode of the vehicle desired by the operator, if said difference is not larger than said predetermined threshold value.

23. A drive mode estimating device according to claim 21, further comprising:

maximum increase rate determining means for determining a maximum value of an increase rate of said amount of operation of said manually operated means; and critical value determining means for determining a critical value of the amount of operation of said manually operated means, said critical value being a value obtained at said first point of time (t3) which is a predetermined time (T1+T2) after a third point of time (t0) at which said maximum value of the increase rate is determined by said maximum increase rate determining means, and wherein said predetermined said drive mode estimation inhibiting means determining said difference on the basis of said maximum value determined by said maximum operation amount determining means and said critical value determined by said critical value determining means.

24. A drive mode estimating device according to claim 23, wherein said maximum operation amount determining means monitors the maximum value of the amount of operation of said manually operated means for a predetermined sampling time period (T1) after said third point of time (t0) at which said maximum value of said increase rate is determined by said maximum increase rate determining means, and wherein said predetermined time (T1+T2) between said first point of time (t3) and said third point of time (t0) is a sum of a time (T2) between said third point of time (t0) and said first point of time (t1), and one of said sampling time period (T1) and a time (T1) between said third point of time (t0) and a fourth point of time (t2) at which a minimum value of said amount of operation of said manually operated means is determined.

25. A drive mode estimating device according to claim 21, wherein the motor vehicle has an engine, and a throttle valve those opening angle changes with a change in the amount of operation of said manually operated means, said drive mode estimating means includes a neural network, and said maximum operation amount determining means and said drive mode estimation inhibiting means constitute a part of variable calculating means connected to said neural network, said variable calculating means including:

starting throttle angle calculating means for calculating a starting value of the opening angle of said throttle valve upon starting of the vehicle;

maximum throttle opening increase rate calculating means for calculating a maximum rate of increase of the opening angle of said throttle valve during acceleration of the vehicle;

maximum deceleration calculating means for calculating a maximum deceleration of the vehicle upon operation of a manually operated member for brake application to the vehicle;

coasting run time calculating means for calculating a coasting run time of the vehicle;

steady run time calculating means for calculating a steady run time of the vehicle; and signal peak calculating means for calculating peak values of input signals which include a signal indicative of the opening angle of said throttle valve, and wherein said neural network of said drive mode estimating means receives outputs of said starting throttle angle calculating means, said maximum throttle opening increase rate calculating means, said coasting run time calculating means, said steady run time calculating means and said signal peak calculating means.

26. A drive mode estimating device according to claim 21, wherein said vehicle has a shift control apparatus for controlling an automatic transmission whose speed ratio is variable, a steering force control apparatus for controlling a steering force of a power steering system, and a suspension control apparatus for controlling a damping force or spring characteristics of a shock absorber of a suspension system, an output of said drive mode estimating means being applied to said shift control apparatus, said steering force control apparatus and said suspension control apparatus, for controlling said speed ratio of said automatic transmission, said steering force of said power steering system and said damping force or spring characteristics of said shock absorber, according to the drive mode selected by said drive mode estimating means.

27. A drive mode estimating device according to claim 21, wherein said vehicle has an engine provided with a throttle valve, and a shift control apparatus for controlling an automatic transmission whose speed ratio is variable, said shift control apparatus comprising:

throttle opening obtaining means for obtaining an opening angle of said throttle valve;

vehicle speed obtaining means for obtaining a running speed of the motor vehicle;

a shift pattern memory for storing a plurality of different shift patterns for shifting said automatic transmission in different manner, each of said different shift patterns representing a relationship between said speed ratio of said automatic transmission, and said opening angle of the throttle valve and said running speed of the vehicle; and shift pattern selecting means for for selecting one of said plurality of shift patterns, according to the drive mode estimated by said drive mode estimating means, and wherein said shift control apparatus changes the speed ratio of said automatic transmission on the basis of the opening angle of the throttle valve and the running speed of the vehicle which are obtained by said throttle opening obtaining means and said vehicle speed obtaining means, respectively, and according to the shift pattern selected by said shift pattern selecting means.

28. A drive mode estimating device according to claim 21, wherein said drive mode estimating means includes a neural network which receives the amount of operation of said manually operated means upon starting of the vehicle, a maximum rate of increase of the amount of operation of said manually operated means, a maximum deceleration of the vehicle upon operation of a manually operated member for brake application to the vehicle, a coasting run time of the vehicle, and a steady run time of the vehicle, said drive mode estimating means estimating the drive mode desired by the operator, on the basis of an output of said neural network, when said neutral network receives each one of said amount of operation of said manually operated means upon starting of the vehicle, said maximum rate of increase and said maximum deceleration, coasting run time and steady run time of the vehicle.

29. A drive mode estimating device according to claim 21, wherein said indifference larger than said predetermined threshold indicates an abrupt increase followed by an immediate decrease of the amount of operation of said manually operated means.

30. A drive mode estimating device for estimating a drive mode of a motor vehicle desired by an operator of the motor vehicle, comprising:

drive mode estimating means for obtaining from time to time a non-processed drive mode index value for estimating the drive mode of the vehicle desired by the operator, on the basis of drive mode indicating variables relating to manipulation of the vehicle by the operator;

standard drive mode estimating means for obtaining a standard drive mode index value on the basis of the non-processed drive mode index values which have been obtained by said drive mode estimating means; and output filtering means for filtering the non-processed drive mode index value presently obtained by said drive mode estimating means, with a filtering constant which varies as a function of said standard drive mode index value obtained by said standard drive mode estimating means, said output filtering means generating a processed drive mode index value as a result of filtering said non-processed drive mode index value.

31. A drive mode estimating device according to claim 30, wherein said output filtering means filters said non-processed drive mode index value only when said non-processed drive mode index value is changing toward a value which indicates a drive mode of the vehicle in which the vehicle should be driven so as to increase fuel economy of the vehicle.

32. A drive mode estimating device according to claim 30, wherein said output filtering means includes means for determining said filtering constant such that said filtering constant is larger when said standard drive mode index value indicates a drive mode of the vehicle in which the vehicle should be driven so as to increase a drive force for driving the vehicle, than when said standard drive mode index value indicates a drive mode of the vehicle in which the vehicle should be driven so as to increase fuel economy of the vehicle.

33. A drive mode estimating device according to claim 30, further comprising drive force selecting means for selecting a drive force for driving the vehicle, on the basis of said processed drive mode index value obtained by said output filtering means.

34. A drive mode estimating device according to claim 33, wherein the motor vehicle includes an engine, an automatic transmission, and shift control means for automatically shifting said automatic transmission on the basis of a load of said engine and a running speed of the vehicle, and according to one of a plurality of shift patterns which is selected by said drive force selecting means on the basis of said processed drive mode index value.

35. A drive mode estimating device according to claim 30, wherein the vehicle has an engine with a throttle valve, an accelerator pedal, and throttle control means for controlling an opening angle of said throttle valve on the basis of an amount of operation of said accelerator pedal, and according to one of a plurality of relationships between said opening angle of said throttle valve and said amount of operation of said accelerator pedal, said one of said plurality of relationships being selected by said drive force selecting means on the basis of said processed drive mode index value.

36. A drive mode estimating device for estimating a drive mode of a motor vehicle desired by an operator of the motor vehicle, comprising:

drive mode estimating means for obtaining from time to time a drive mode index value for estimating the drive mode of the vehicle desired by the operator, on the basis of at least one first drive mode indicating variable generated in relation to manipulation of the vehicle by the operator, and at least one second drive mode indicating variable generated at a predetermined time interval;

standard drive mode estimating means for obtaining a standard drive mode index value on the basis of the drive mode index values which have been obtained by said drive mode estimating means; and input filtering means for filtering said at least one second drive mode indicating variable, with a filtering constant which varies as a function of said standard drive mode index value obtained by said standard drive mode estimating means.

37. A drive mode estimating device according to claim 36, wherein said input filtering means filters said at least one second drive mode indicating variable, only when said drive mode index value obtained by said drive mode estimating means is changing toward a value which indicates a drive mode of the vehicle in which the vehicle should be driven so as to increase fuel economy of the vehicle.

38. A drive mode estimating device according to claim 36, wherein said input filtering means includes means for determining said filtering constant such that said filtering constant is larger when said standard drive mode index value indicates a drive mode of the vehicle in which the vehicle should be driven so as to increase a drive force for driving the vehicle, than when said standard drive mode index value indicates a drive mode of the vehicle in which the vehicle should be driven so as to increase fuel economy of the vehicle.

39. A drive mode estimating device according to claim 35, further comprising drive force selecting means for selecting a drive force for driving the vehicle, on the basis of said drive mode index value obtained by said drive mode estimating means.

40. A drive mode estimating device according to claim 39, wherein the motor vehicle includes an engine, an automatic transmission, and shift control means for automatically shifting said automatic transmission on the basis of a load of said engine and a running speed of the vehicle, and according to one of a plurality of shift patterns which is selected by said drive force selecting means on the basis of said drive mode index value obtained by said drive mode estimating means.

41. A drive mode estimating device according to claim 39, wherein the vehicle has an engine with a throttle valve, an accelerator pedal, and throttle control means for controlling an opening angle of said throttle valve on the basis of an amount of operation of said accelerator pedal, and according to one of a plurality of relationships between said opening angle of said throttle valve and said amount of operation of said accelerator pedal, said one of said plurality of relationships being selected by said drive force selecting means on the basis of said drive mode index value obtained by said drive mode estimating means.

42. A drive mode estimating device according to claim 36, further comprising variable calculating means for calculating said at least one first variable and said at least one second drive mode indicating variable, and said variable calculating means calculating as said at least one first drive mode indicating variable an amount of operation of manually operated means operated by the operator of the vehicle for designating a drive force of the vehicle desired by the operator upon starting of the vehicle, a maximum rate of increase of said amount of operation of said manually operated means, a maximum deceleration of the vehicle upon operation of a manually operated member for brake application to the vehicle, a coasting run time of the vehicle and a steady run time of the vehicle, said variable calculating means calculating as said at least one second drive mode indicating variable a maximum value of each of at least one input signal, and a maximum value of a running speed of the vehicle, at a predetermined time interval, said drive mode estimating means including a neural network which receives each of said first and second drive mode indicating variables when said each of said first and second drive mode indicating variables is calculated by said variable calculating means.

43. A drive mode estimating device according to claim 42, wherein said drive mode estimating means obtains said drive mode index value on the basis of an output of said neural network, when each of said first and second drive mode indicating variables is calculated by said variable calculating means.

44. A drive mode estimating device according to claim 42, wherein said variable calculating means includes input signal distribution calculating means for calculating a distribution value of each of said at least one input signal, for a predetermined period of time, said drive mode estimating means receiving said distribution value.

45. A drive force control apparatus for controlling a drive force for driving a motor vehicle, comprising:

drive mode estimating means for obtaining from time to time a drive mode index value for estimating a drive mode of the vehicle desired by an operator of the vehicle, on the basis drive mode indicating variables relating to manipulation of the vehicle by the operator;

standard drive mode estimating means for obtaining a standard drive mode index value on the basis of the drive mode index values which have been obtained by said drive mode estimating means; and drive force selecting means for selecting a drive force for driving the vehicle, on the basis of said drive mode index value obtained by said drive mode estimating means and said standard drive mode index value obtained by said standard drive mode.

46. A drive force control apparatus according to claim 45, wherein the motor vehicle has an automatic transmission, and shift control means for controlling said automatic transmission according to a selected one of a plurality of shift patterns, said drive force selecting means comprises threshold determining means for determining at least one threshold for selecting said drive force, on the basis of said standard drive mode index value obtained by said standard drive mode estimating means, and comparing and determining means for comparing said drive mode index value obtained by said drive mode estimating means, with said threshold, and determining one of said plurality of shift patterns as a result of comparison of said drive mode index value with said threshold, whereby said drive force is selected by said drive force selecting means.

47. A drive force control apparatus according to claim 46, wherein said standard drive mode estimating means obtains said standard drive mode index value by subjecting said drive mode index value obtained by said drive mode estimating means, to one of a smoothing operation and a weighted averaging operation.

48. A drive force control apparatus according to claim 45, wherein the motor vehicle includes an engine, an automatic transmission, and shift control means for automatically shifting said automatic transmission on the basis of a load of said engine and a running speed of the vehicle, and according to one of a plurality of shift patterns which is selected by said drive force selecting means on the basis of said drive mode index value obtained by said drive mode estimating means.

49. A drive force control apparatus according to claim 45, wherein the vehicle has an engine with a throttle valve, an accelerator pedal, and throttle control means for controlling an opening angle of said throttle valve on the basis of an amount of operation of said accelerator pedal, and according to one of a plurality of relationships between said opening angle of said throttle valve and said amount of operation of said accelerator pedal, said one of said plurality of relationships being selected by said drive force selecting means on the basis of said drive mode index value obtained by said drive mode estimating means.

50. An apparatus for controlling a controllable system of a motor vehicle, comprising:

a drive mode estimating device for estimating a drive mode of the motor vehicle desired by an operator of the vehicle, said drive mode estimating device including (a) variable calculating means for calculating at least one of drive mode indicating variables selected from a group consisting of a fixed amount of operation of manually operated means operated by the operator for designating a drive force of the vehicle desired by the operator only upon starting of the vehicle, a maximum rate of increase of said amount of operation of said manually operated means, a maximum deceleration of the vehicle upon operation of a manually operated member for brake application to the vehicle, a coasting run time of the vehicle and a steady run time of the vehicle; and (b) drive mode estimating means including a neural network receiving said at least one of drive mode indicating variables calculated by said variable calculating means, said drive mode estimating means estimating the drive mode of the motor vehicle desired by the operator, both during and after starting of the vehicle, on the basis of an output of said neural network;

control pattern selecting means for selecting, according to the drive mode estimated by said drive mode estimating means of said drive mode estimating device, one of a plurality of predetermined different control patterns for controlling said controllable system in respective different manners; and a control device for controlling said controllable system according to the control pattern selected by said control pattern selecting means.

51. A shift control apparatus for controlling an automatic transmission of a motor vehicle, comprising:

a drive mode estimating device for estimating a drive mode of the motor vehicle desired by an operator of the vehicle, said drive mode estimating device including (a) variable calculating means for calculating at least one of drive mode indicating variables selected from a group consisting of a fixed amount of operation of manually operated means operated by the operator for designating a drive force of the vehicle desired by the operator only upon starting of the vehicle, a maximum rate of increase of said amount of operation of said manually operated means, a maximum deceleration of the vehicle upon operation of a manually operated member for brake application to the vehicle, a coasting run time of the vehicle and a steady run time of the vehicle; and (b) drive mode estimating means including a neural network receiving said at least one of drive mode indicating variables calculated by said variable calculating means, said drive mode estimating means estimating the drive mode of the motor vehicle desired by the operator, both during and after starting of the vehicle, on the basis of an output of said neural network;

shift pattern selecting means for selecting, according to the drive mode estimated by said drive mode estimating means of said drive mode estimating device, one of a plurality of predetermined different shift patterns for shifting said automatic transmission in respective different manners; and a shift control device for controlling a speed ratio of said automatic transmission according to the shift pattern selected by said shift pattern selecting means.

52. An apparatus for controlling a motor vehicle including a controllable system, comprising:

a drive mode estimating device for estimating a drive mode of the motor vehicle desired by an operator of the vehicle, said drive mode estimating device including (a) variable calculating means for calculating at least one of drive mode indicating variables selected from a group consisting of a fixed amount of operation of manually operated means operated by the operator for designating a drive force of the vehicle desired by the operator only upon starting of the vehicle, a maximum rate of increase of said amount of operation of said manually operated means, a maximum deceleration of the vehicle upon operation of a manually operated member for brake application to the vehicle, a coasting run time of the vehicle and a steady run time of the vehicle; and (b) drive mode estimating means including a neural network receiving said at least one of drive mode indicating variables calculated by said variable calculating means, said drive mode estimating means estimating the drive mode of the motor vehicle desired by the operator, both during and after starting of the vehicle, on the basis of an output of said neural network;

control pattern selecting means for selecting, according to the drive mode estimated by said drive mode estimating means of said drive mode estimating device, one of a plurality of predetermined different control patterns for controlling said controllable system in respective different manners; and a control device for controlling said controllable system according to the drive mode estimated by said drive mode estimating means of said drive mode estimating device.

53. A shift control apparatus for controlling an automatic transmission of a motor vehicle, comprising:

a drive mode estimating device for estimating a drive mode of the motor vehicle desired by an operator of the vehicle, said drive mode estimating device including (a) variable calculating means for calculating at least one of drive mode indicating variables selected from a group consisting of a fixed amount of operation of manually operated means operated by the operator for designating a drive force of the vehicle desired by the operator only upon starting of the vehicle, a maximum rate of increase of said amount of operation of said manually operated means, a maximum deceleration of the vehicle upon operation of a manually operated member for brake application to the vehicle, a coasting run time of the vehicle and a steady run time of the vehicle; and (b) drive mode estimating means including a neural network receiving said at least one of drive mode indicating variables calculated by said variable calculating means, said drive mode estimating means estimating the drive mode of the motor vehicle desired by the operator, both during and after starting of the vehicle, on the basis of an output of said neural network;

shift pattern selecting means for selecting, according to the drive mode estimated by said drive mode estimating means of said drive mode estimating device, one of a plurality of predetermined different shift patterns for shifting said automatic transmission in respective different manners; and a shift control device for controlling a speed ratio of said automatic transmission according to the drive mode estimated by said drive mode estimating means of said drive mode estimating device.

* * * * *